US011531990B2

(12) United States Patent
Pi Farias

(10) Patent No.: US 11,531,990 B2
(45) Date of Patent: Dec. 20, 2022

(54) POINT OF SALE APPARATUSES, METHODS AND SYSTEMS

(71) Applicant: APPI Tecnologia S/A, Rio de Janeiro (BR)

(72) Inventor: Alexandre Soares Pi Farias, Rio de Janeiro (BR)

(73) Assignee: IDID TECNOLOGIA LTDA, Barueri (BR)

( * ) Notice: Subject to any disclaimer, the term of this patent is extended or adjusted under 35 U.S.C. 154(b) by 0 days.

(21) Appl. No.: 15/917,267

(22) Filed: Mar. 9, 2018

(65) Prior Publication Data

US 2018/0260814 A1   Sep. 13, 2018

Related U.S. Application Data

(62) Division of application No. 15/178,532, filed on Jun. 9, 2016.

(Continued)

(51) Int. Cl.
   *G06Q 20/40* (2012.01)
   *G06Q 30/02* (2012.01)
   (Continued)

(52) U.S. Cl.
   CPC .......... *G06Q 20/409* (2013.01); *G06F 9/445* (2013.01); *G06K 7/10881* (2013.01);
   (Continued)

(58) Field of Classification Search
   CPC .... G06Q 20/409; G06Q 20/20; G06Q 20/202; G06Q 20/204; G06Q 20/40; G06Q 20/18
   (Continued)

(56) References Cited

U.S. PATENT DOCUMENTS

| 5,194,722 A | 3/1993 | Mergenthaler |
| 5,649,114 A | 7/1997 | Deaton et al. |

(Continued)

FOREIGN PATENT DOCUMENTS

| CN | 101726284 A | 6/2010 |
| EP | 1645931 A1 | 4/2006 |

(Continued)

OTHER PUBLICATIONS

Mastercard Incorporated (MA): Company Profile and SWOT Analysis. World Market Intelligence, London, Jan. 18, 2014.*

(Continued)

*Primary Examiner* — Victoria E. Frunzi
*Assistant Examiner* — Fawaad Haider
(74) *Attorney, Agent, or Firm* — Hanchuk Kheit LLP.; Walter G. Hanchuk

(57) ABSTRACT

Transformation of inputs including beacon inputs, Global Positioning System (GPS) inputs, captured panorama inputs, user-penned descriptive inputs, and payment-amount-specifying inputs, via components, into outputs including user device POS configuration setting outputs and/or payment-gateway-directed authorization request outputs. Further, transformation of inputs including POS scanner inputs, POS keyboard inputs, and/or POS printer-directed inputs, via components, into outputs including compliance check outputs, tagged omnibus record outputs, SKU-UPC mapping outputs, and/or convergence/correlation outputs. Additionally, transformation of inputs including older limited-capability POS software image inputs and/or newer limited-capability POS software image inputs, via components, into outputs including update directive outputs. Functionality set forth includes allowing user devices to directly communicate with payment gateways, capturing and making use of scanner-obtained data and printer-destined data in a way that (Continued)

does not require code alternation of already-installed POS software, and allowing software of limited-capability POS devices to be updated without sending large, full-overwrite software images.

28 Claims, 39 Drawing Sheets

Related U.S. Application Data

(60) Provisional application No. 62/249,919, filed on Nov. 2, 2015, provisional application No. 62/174,449, filed on Jun. 11, 2015.

(51) Int. Cl.

| | | |
|---|---|---|
| G06F 9/445 | (2018.01) | |
| G06Q 20/32 | (2012.01) | |
| G06Q 20/34 | (2012.01) | |
| G06Q 20/38 | (2012.01) | |
| G07F 7/08 | (2006.01) | |
| G06Q 20/20 | (2012.01) | |
| G07G 1/00 | (2006.01) | |
| G06Q 20/04 | (2012.01) | |
| G06K 7/10 | (2006.01) | |
| G06K 7/14 | (2006.01) | |
| G06K 19/06 | (2006.01) | |
| G06Q 20/02 | (2012.01) | |
| G06Q 30/00 | (2012.01) | |
| G06F 8/61 | (2018.01) | |
| G06F 8/654 | (2018.01) | |
| H04W 4/33 | (2018.01) | |

(52) U.S. Cl.
CPC ......... *G06K 7/1413* (2013.01); *G06K 7/1417* (2013.01); *G06K 19/06028* (2013.01); *G06K 19/06037* (2013.01); *G06Q 20/027* (2013.01); *G06Q 20/047* (2020.05); *G06Q 20/202* (2013.01); *G06Q 20/203* (2013.01); *G06Q 20/209* (2013.01); *G06Q 20/3224* (2013.01); *G06Q 20/3276* (2013.01); *G06Q 20/3278* (2013.01); *G06Q 20/34* (2013.01); *G06Q 20/387* (2013.01); *G06Q 20/405* (2013.01); *G06Q 30/018* (2013.01); *G06Q 30/0238* (2013.01); *G06Q 30/0242* (2013.01); *G06Q 30/0255* (2013.01); *G06Q 30/0269* (2013.01); *G07F 7/0873* (2013.01); *G07G 1/0009* (2013.01); *H04W 4/33* (2018.02); *G06F 8/63* (2013.01); *G06F 8/654* (2018.02)

(58) Field of Classification Search
USPC .......................................................... 705/16
See application file for complete search history.

(56) References Cited

U.S. PATENT DOCUMENTS

| | | |
|---|---|---|
| 6,606,744 B1 | 8/2003 | Mikurak |
| 8,751,316 B1* | 6/2014 | Fletchall ............. G07G 1/0081 705/16 |
| 2003/0200184 A1 | 10/2003 | Dominguez |
| 2005/0132348 A1 | 6/2005 | Meulemans et al. |
| 2008/0270514 A1 | 10/2008 | Soares |
| 2010/0131348 A1 | 5/2010 | Greenfield et al. |
| 2012/0209749 A1 | 8/2012 | Hammad et al. |
| 2014/0025573 A1* | 1/2014 | Keronen ............. G06Q 20/322 705/41 |
| 2014/0040014 A1 | 2/2014 | Abheek et al. |
| 2015/0079942 A1* | 3/2015 | Kostka ............. G06Q 30/0267 455/411 |
| 2015/0178693 A1* | 6/2015 | Solis .................... G06Q 20/027 705/30 |
| 2016/0171486 A1* | 6/2016 | Wagner ............. G06Q 20/3278 705/39 |
| 2016/0247141 A1 | 8/2016 | Graylin |

FOREIGN PATENT DOCUMENTS

| | | | |
|---|---|---|---|
| EP | 2278538 A1 | | 1/2016 |
| WO | 2006/096824 | | 9/2006 |
| WO | 2007/011695 | | 1/2007 |
| WO | 2012/054786 | | 4/2012 |
| WO | 2012/156977 | | 11/2012 |
| WO | 2013/103912 | | 7/2013 |
| WO | WO2015026862 | * | 8/2014 |
| WO | 2014/206046 | | 12/2014 |
| WO | 2015/015406 | | 2/2015 |
| WO | 2015/15406 | | 2/2015 |
| WO | 2015/026862 | | 2/2015 |
| WO | WO-2015026862 A1 * | 2/2015 | ............. H04W 4/029 |

OTHER PUBLICATIONS

Vishwakarma, Dharmistha D. Development, simulation and implementation of new strategies for power control and routing protocols for Wireless Ad-hoc Network. Maharaja Sayajirao University of Baroda (India) ProQuest Dissertations Publishing, 2011. (Year: 2011).*

Brown, Shawn Daniel. Case studies on optimizing algorithms for GPU architectures. The University of North Carolina at Chapel Hill ProQuest Dissertations Publishing, 2015. (Year: 2015).*

International Search Report and Written Opinion issued for PCT Application No. PCT/BR2016/050133.

European Search Report for Application No. EP20177238.

International search report and Written Opinion for PCT/EP2020/065628 dated Aug. 26, 2020.

Office action issued by Argentina patent office for application No. AR104983 A1.

* cited by examiner

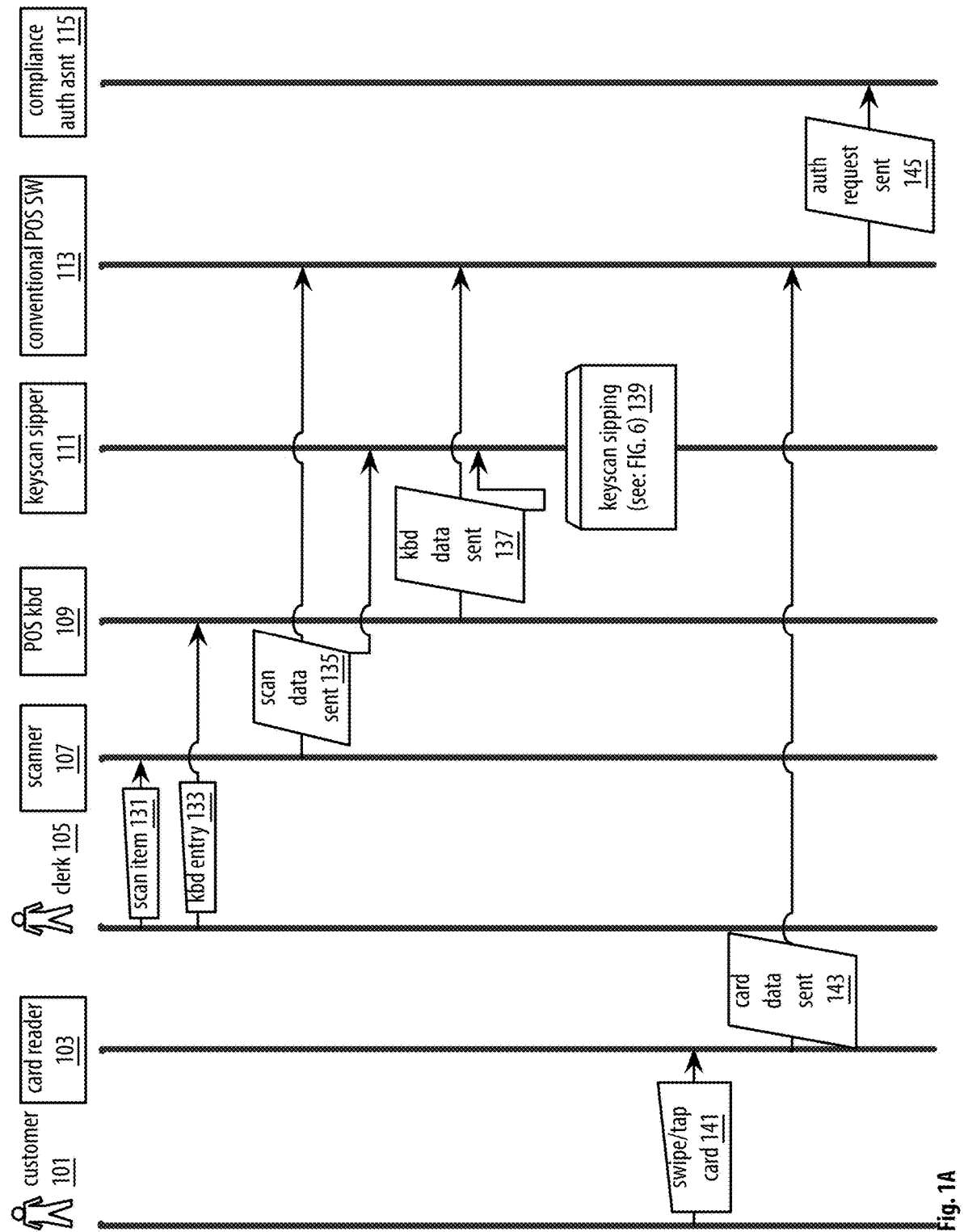

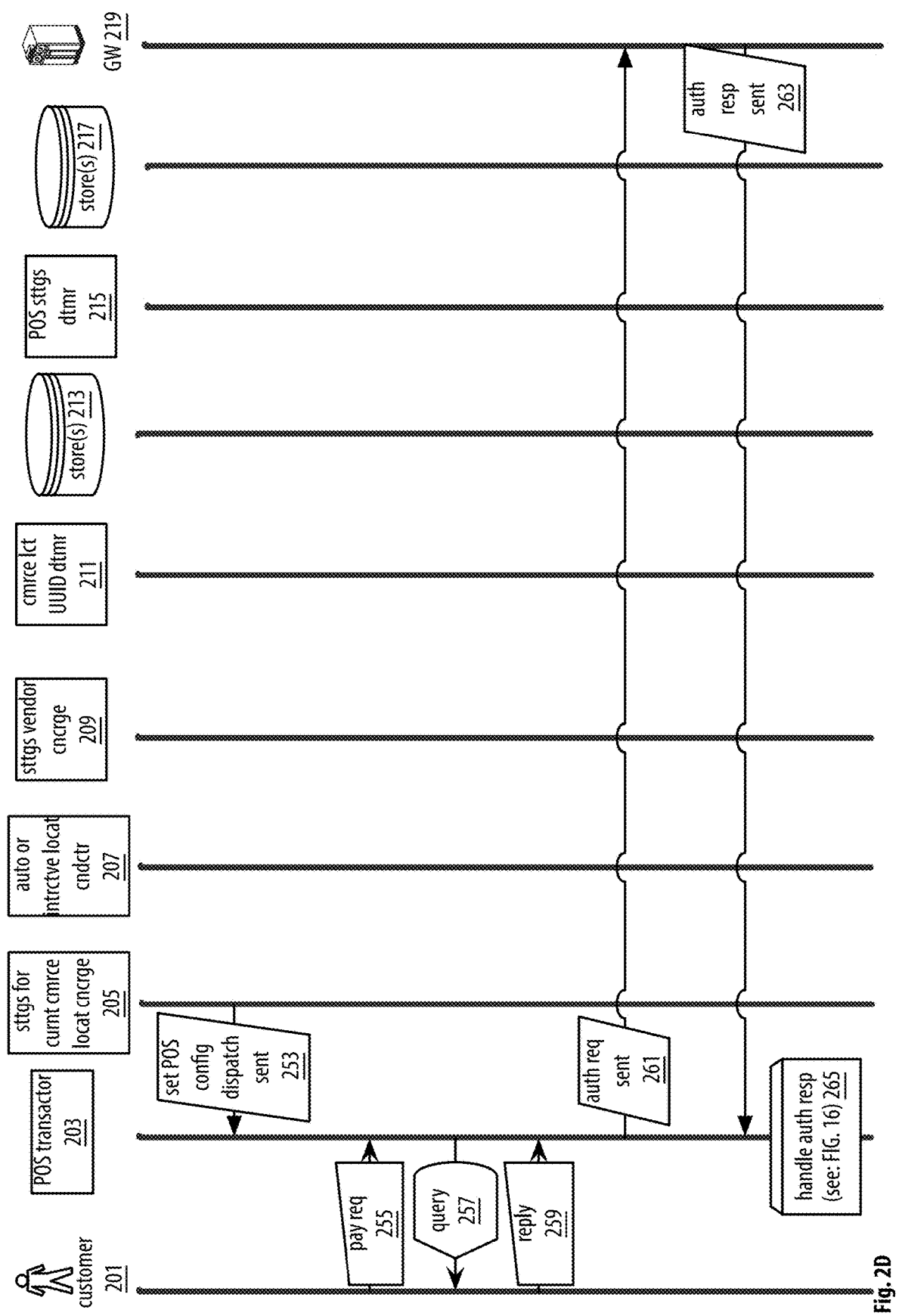

POINT OF SALE APPARATUSES, METHODS AND SYSTEMS

PRIORITY CLAIM

This application is a Divisional of and claims priority under 35 U.S.C. § 120 from U.S. application Ser. No. 15/178,532 titled "Virtualized Point of Sale Terminal Apparatuses, Methods and Systems" filed on Jun. 9, 2016, which in turn claims priority under 35 U.S.C. 119 for U.S. provisional patent application Ser. No. 62/174,449, filed Jun. 11, 2015, entitled "Virtualized Point of Sale Terminal Apparatuses, Methods and Systems;" and provisional patent application Ser. No. 62/249,919, filed Nov. 2, 2015, entitled "Virtualized Point of Sale Terminal Apparatuses, Methods and Systems." The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned applications are herein expressly incorporated by reference.

FIELD

The present innovations generally address Electronic Communications, and more particularly, include Point of Sale Apparatuses, Methods and Systems.

As such, the present innovations include (at least) the following distinct areas, including: Electronic Communications involving Condition Responsive Indicating Systems that are Responsive to a Particular Sequence of Conditions (with a suggested Class/Subclass of 340/523).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Individuals making payments at commerce locations increasingly opt for convenience's sake to pay using a payment card—say a credit card or a debit card—rather than with cash. Such payment card-based payments often involve the employ of a Point of Sale (POS) device.

BRIEF DESCRIPTION OF THE DRAWINGS

Appendices and/or drawings illustrating various, non-limiting, example, innovative aspects of the Point of Sale Apparatuses, Methods and Systems (hereinafter "POSAMS") disclosure, include:

FIG. 1A-D shows a datagraph diagram illustrating embodiments for the POSAMS of a commerce transaction.

FIG. 2A-D shows a datagraph diagram illustrating embodiments for the POSAMS of POS capabilities of a user device (e.g., a smartphone) being configured with respect to a particular commerce location, and those user device POS capabilities being employed in making a payment at that commerce location.

Figure 1B:
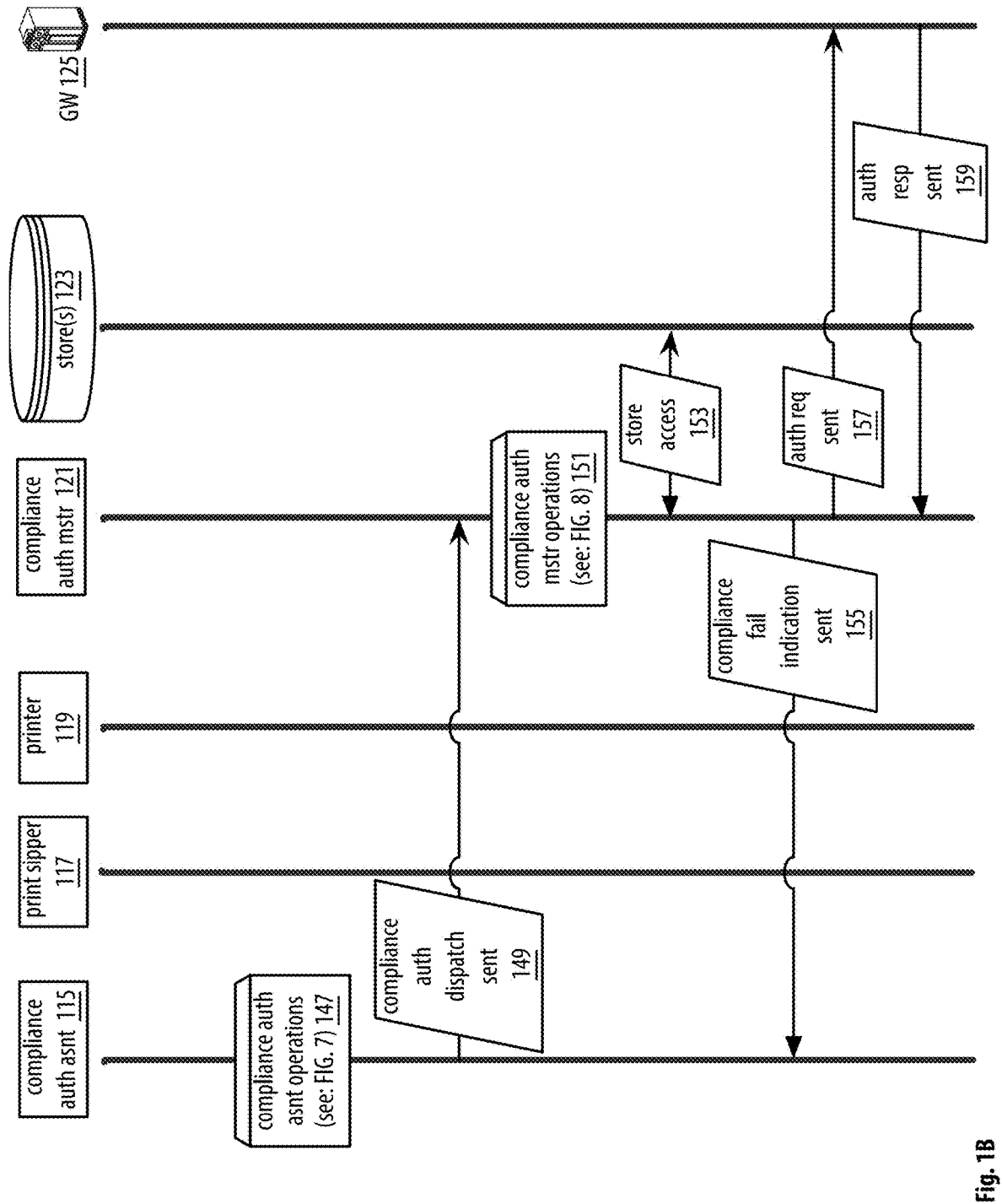
Figure 1C:
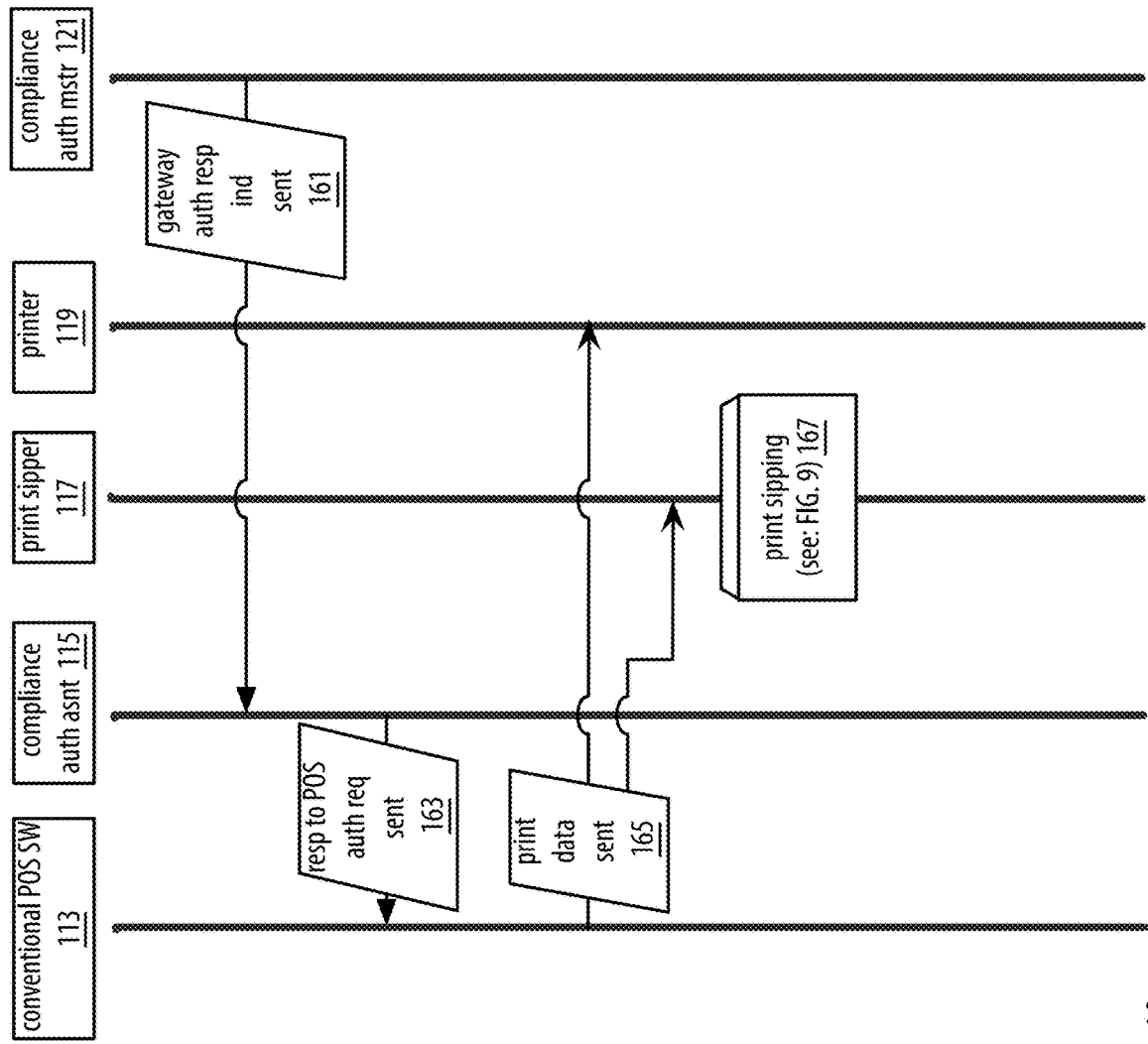
Figure 1D:
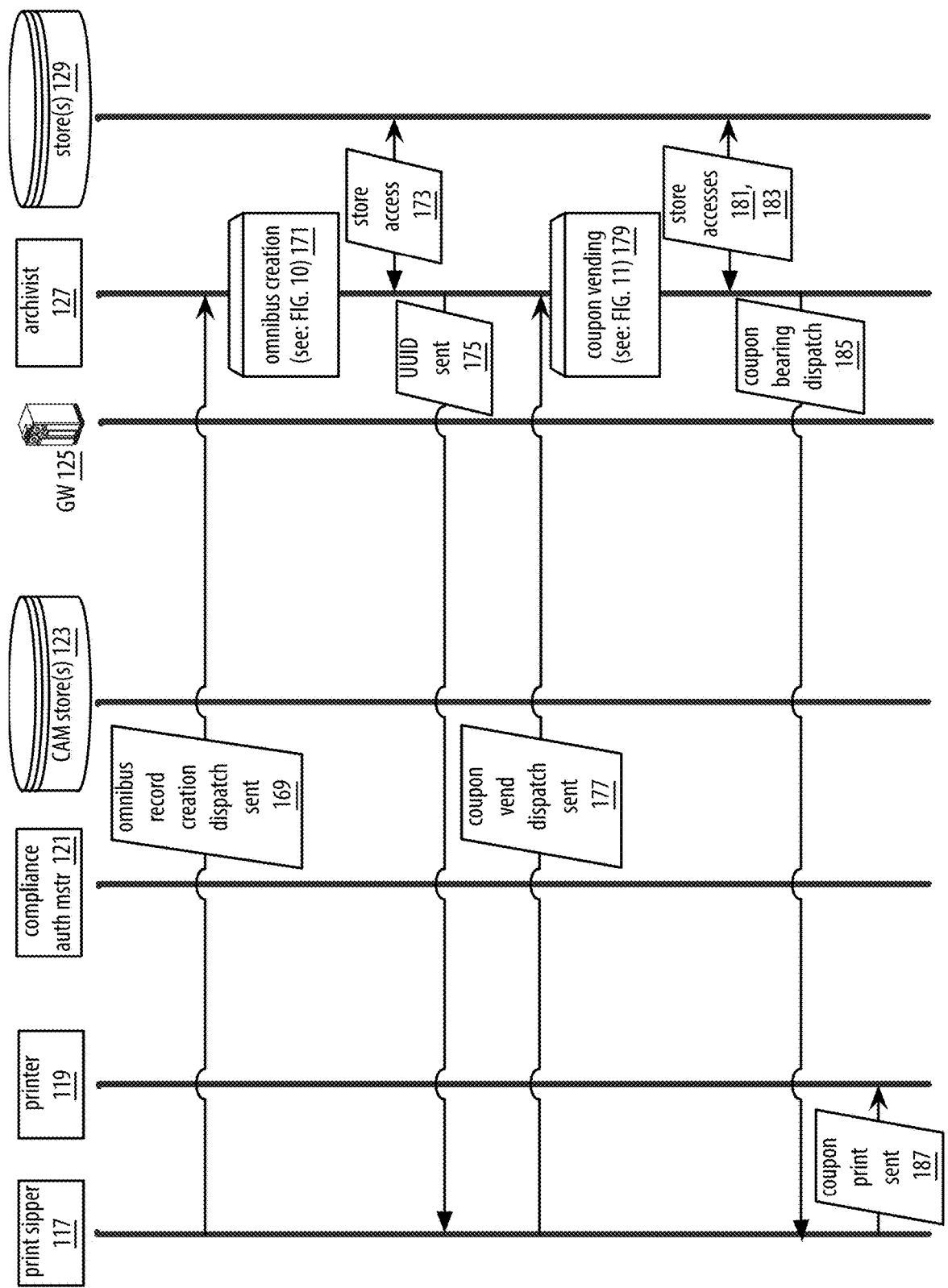
Figure 2A:
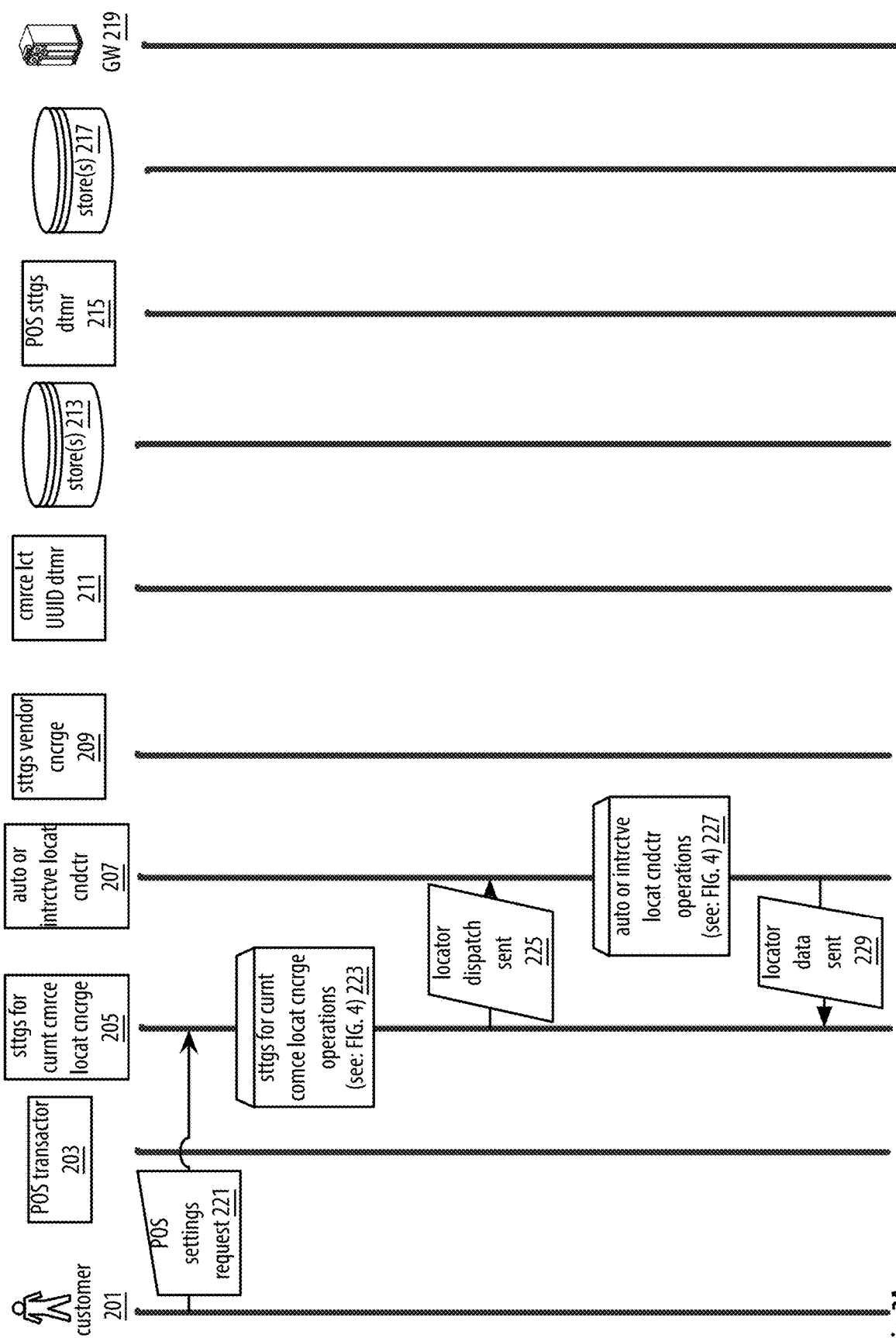
Figure 2B:
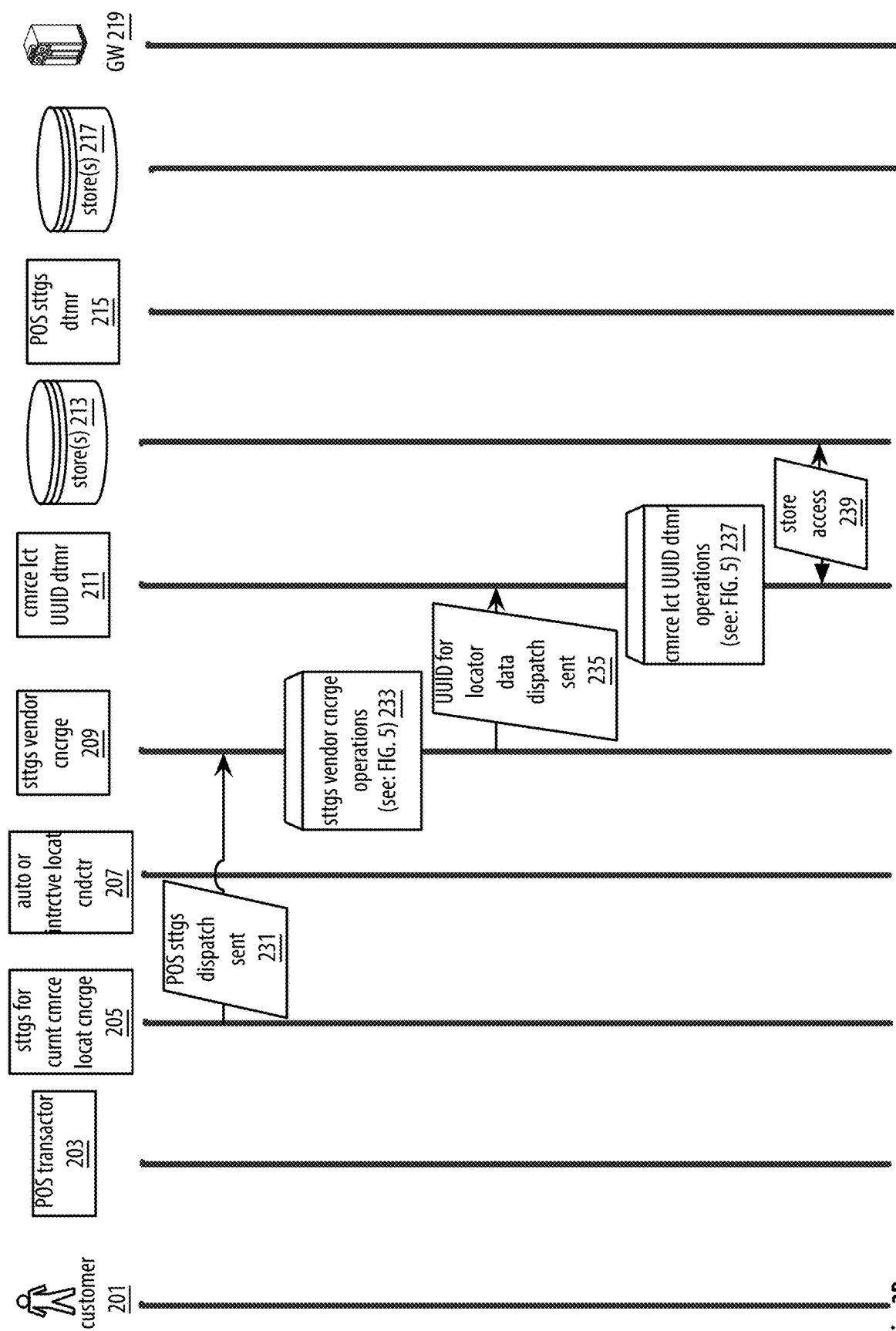
Figure 2C:
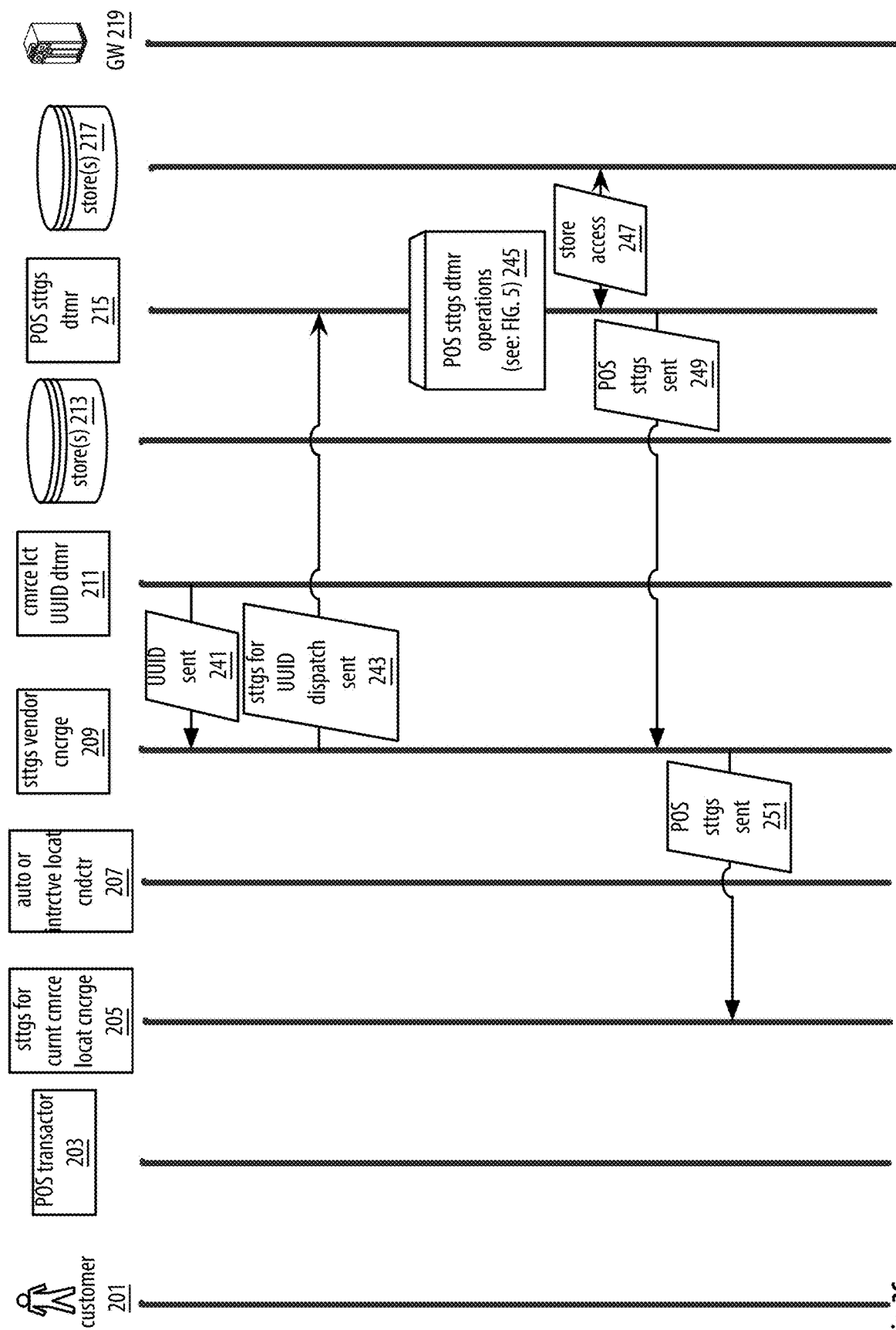

Generally, the leading number(s) of each citation number within the drawings indicates the figure in which that citation number is introduced and/or detailed. As such, a detailed discussion of citation number 101 would be found and/or introduced in FIG. 1. Citation number 1001 is introduced in FIG. 10, etc. Any citation and/or reference numbers are not necessarily sequences but rather just example orders that may be rearranged and other orders are contemplated.

DETAILED DESCRIPTION

In a first aspect, POSAMS transforms inputs including beacon inputs, Global Positioning System (GPS) inputs, captured panorama inputs, user-penned descriptive inputs, and payment-amount-specifying inputs, via POSAMS components (e.g., the settingsForCurrentCommerceLocation-Concierge component, the autoLocationConductor component, the interactiveLocationConductor component, the settingsVendorConcierge component, the commerceUUID-Determiner component, and the settingsDeterminer component), into outputs including user device POS configuration setting outputs and/or payment-gateway-directed authorization request outputs.

In a second aspect, POSAMS transforms inputs including POS scanner inputs, POS keyboard inputs, and/or POS printer-directed inputs, via POSAMS components (e.g., the keyScanSipper component, the prebillSipper component, the complianceAuthAssist component, the complianceAuthMaster component, the printSipper component, and the archivist component), into outputs including compliance check outputs, tagged omnibus record outputs, SKU-UPC mapping outputs, and/or convergence/correlation outputs.

In a third aspect, POSAMS transforms inputs including older limited-capability POS software image inputs and/or newer limited-capability POS software image inputs, via POSAMS components (e.g., the limitedPosUpdateHandler component), into outputs including update directive outputs.

The POSAMS components, in various embodiments, implement advantageous technological features as set forth below.

Introduction

An individual endeavoring to employ a payment card (e.g., a credit card or a debit card) to make a payment at a commerce location typically needs to make use of an infrastructure POS device situated at that commerce location such as a computer-based cash register. If desirous of employing her user device (e.g., a smartphone) to make the card-based payment at the commerce location she cannot conventionally, say, simply communicate with the same payment gateway with which that infrastructure POS device communicates. Instead she must typically engage one or more intermediary layers which stand between her user device and an ultimate payment made using her card. Moreover, such intermediary layers typically require complicated setup actions from a commerce location that wishes for patrons to be able to make user device-based payments to the commerce location using those intermediary layers. As such, many commerce locations find themselves unwilling to endure such complicated setup actions, leaving their patrons unable to make user device-based payments via those intermediary layers.

Turning to another facet of payments made at commerce locations, it is noted that an infrastructure POS device situated at such a commerce location often employs a scanner to read Universal Product Code (UPC) numbers and a printer to print receipts. The receipts typically set forth data including Stock Keeping Unit (SKU) numbers, prices paid, detailed descriptions of items purchased, and information regarding city and/or state of purchase. As such, that which is captured via the scanner and that which is printed at the printer represents a potential trove of information. However, such scanner-obtained data typically goes no further than the infrastructure POS, and such printer-destined data typically goes no further than the printer, thus leaving this trove of information untapped.

Turning to yet another facet of payments made at commerce locations, it is noted that often in use at commerce locations are limited-capability POS devices whose software-holding memory (e.g., a flash-based memory) does not allow for alteration of individual bytes or other portions thereof, but instead only for overwriting of the entirety of the memory. Such being the case, software updates are typically sent to such limited-capability POS devices in the form of large images to be employed in totally overwriting such memory. As such limited-capability POS devices often employ a link which is of low speed, high cost, or both in receiving such images (e.g., a cellular link), the large size of these images causes an uncomfortable—but seemingly unavoidable—situation.

That which is discussed herein—providing functionality including but not limited to allowing user devices to directly communicate with payment gateways, capturing and making use of scanner-obtained data and printer-destined data in a way that does not require code alternation of already-installed POS software, and allowing software of limited-capability POS devices of the sort discussed to be updated without sending large, full-overwrite software images—innovates past the shortcomings just discussed.

POSAMS

In one aspect, that which is set forth herein provides functionality by which an individual may employ her user device (e.g., a smartphone) to make payments at a commerce location in which her device is presently situated. Such functionality includes, for instance, ascertaining the at-hand commerce location (e.g., via Bluetooth beacons, geographical location determination, and/or panorama capture), configuring POS capabilities of the user device to communicate with an appropriate payment gateway for the at-hand commerce location, determining the amount to be paid at the commerce location (e.g., via Quick Response (QR) code reading and/or Optical Character Recognition (OCR)), and having the user device communicate directly with the payment gateway to affect payment.

In another aspect, that which is set forth herein provides functionality which allows, for instance, for—without code alternation to already-installed POS software—the capture of UPCs scanned by a POS barcode scanner and the capture of text printed to a POS printer. Further provided, for instance, is the creation of tagged omnibus records which join together such scanner-captured information and such printer-captured information, the vending of coupons in light of such tagged omnibus records, the determination of mappings between SKUs and UPCs, and the discovery of convergences and correlations among the data held by such omnibus records.

In yet another aspect, that which is set forth herein provides functionality which—for limited-capability POS devices whose software-holding memory (e.g., a flash-based memory) does not allow for alteration of individual portions thereof but instead only for total memory overwrite—software updating can be performed without the sending of a consequentially large complete-overwrite software update image. Such functionality includes, for instance, the creation of an update directive which is of smaller size than such a complete-overwrite software image and the employ of that update directive at a limited-capability POS device in creating a complete overwrite software image.

The foregoing functionality as well as additional functionality will now be discussed in detail.

FIG. 1A-D shows a datagraph diagram illustrating a commerce transaction according to one or more embodiments. The process commences when a customer 101 presents to clerk 105 one or more items for purchase, and clerk 105 scans the Universal Product Codes (UPCs) of the one or more items using scanner 105 (phase 131), and/or makes one or more keyboard entries regarding such items using point of sale (POS) keyboard 109 (phase 133). As examples, such POS keyboard entries might involve entries of one or more UPCs of those items (e.g., in the case where the scanner fails to capture an item's code, for instance in the case where an item's code is obscured by condensation) and/or entries regarding purchased item quantity. It is noted that the term UPC as employed herein includes also International Article Number (EAN), Japanese Article Number (JAN), and/or the like, the term "UPC" being employed herein to facilitate discussion.

The UPC codes captured using the scanner may be dispatched by the scanner (phase 135) and/or that which is entered using the POS keyboard may be dispatched by the POS keyboard (phase 137). Such dispatches may, in a first aspect, be received by conventional POS software 113. Such conventional POS software may, for instance, be software which allows a computer (e.g., a Macintosh) to act as a cash register, including performance of operations such as receiving scanner and keyboard input regarding items being purchased, communicating with a remote or local store to receive Stock Keeping Units (SKUs) and/or pricing information regarding items being purchased, receiving information from a payment card capture unit (e.g., a magstripe, smartcard and/or contactless smartcard reader), communicating with a payment gateway with regard to card authorization, and/or communicating with a printer to print a receipt. It is noted that although for the sake of compact disclosure and of illustration by way of example the scenario of communication with a payment gateway is discussed, such is for illustrative purposes only and other possibilities exist. For instance, at junctures herein where communication with a payment gateway is discussed, such communication may alternately and/or additionally, in an analogous fashion, be performed with respect to a payment processor and/or an acquirer.

In a second aspect the scanner and/or POS keyboard dispatches may be captured by keyscan sipper 111. The operations which are performed by the keyscan sipper (phase 139) are discussed in greater detail herein below in connection with FIG. 6.

As is discussed in greater detail herein with respect to the keyscan sipper, scanner 107 may employ scancode values (e.g., expressed in hexadecimal) to convey the UPC numbers of barcodes read via the scanner. In keeping with this, the dispatch of phase 135 may involve scancode data in line with the following:

09 09 06 0A 0B 0A 06 0A 0A 07 09 05, with the above scancode example conveying the UPC 885909599684 in view of scancode 05 corresponding to the character 4, scancode 06 corresponding to the character 5, scancode 07 corresponding to the character 6, scancode 09 corresponding to the character 8, scancode 0A corresponding to the character 9, and scancode 0B corresponding to the character 0.

As is also discussed in greater detail herein with respect to the keyscan sipper, POS keyboard 109 may employ scancode values (e.g., expressed in hexadecimal) to convey keys pressed on the POS keyboard including keyed in UPC numbers (e.g., keyed in by a POS operator where scanning fails) and/or presses of a POS quantity key along with entry of a numerical quantity-described value (e.g., rather than scanning each of three identical purchased products, a POS operator may scan only one of the products and then press the POS keyboard's quantity key followed by the "3" key). In keeping with this, the dispatch of phase 137 may involve scancode data in line with the following:

41 03, with the above scancode example conveying the pressing of a POS quantity key—with keyboard key F7 being employed as the quantity key—and then keyboard key "2" so as to convey the purchase of two of an item, where scancode 41 corresponds to the F7 key and scancode 03 corresponds to the "2" key.

Having completed scanning and/or performing keyboard entry regarding the to-be-purchased items, clerk 105 may make an indication of such to the POS software 113 (e.g., by pressing a physical and/or GUI button labeled "scanning complete," "total," "complete sale," and/or similar) and then may instruct customer 101 to swipe her payment card (e.g., credit card or debit card). Responsive to the clerk's request, customer 101 may employ card reader 103 (e.g., a magstripe, smartcard and/or contactless smartcard reader) in swiping or tapping her payment card (phase 141). The data read from the card may then be dispatched by the card reader (phase 143) and received by the conventional POS software. Such read data may include track 1 data, track 2, data, track 3 data, account number, expiration data, cardholder name, and/or other information.

The POS software may then formulate and dispatch an authorization request (phase 145) which is received by compliance authorization assistant 115. Having received the authorization request, the compliance authorization assistant may perform one or more operations which are discussed in greater detail hereinbelow in connection with FIG. 7 (phase 147). As is discussed in greater detail in connection with FIG. 7, among such operations performed by the compliance authorization assistant is sending to compliance authorization master 121 a dispatch (phase 149) regarding having the compliance authorization master perform operations concerning checking the compliance of the transaction and/or perform operations concerning communicating with a payment gateway to seek an authorization response as to whether or not the transaction may be completed using the customer's card.

Taking the at-hand merchant ID to be held in a variable theMerchantID, the at-hand terminal ID to be held in a variable theTerminalID, the at-hand card number to be held in a variable theCardNumber, the at-hand card PIN to be held in a variable theCardPin, the at-hand card expiration date to be held in a variable theCardExpiry, the at-hand purchase amount to be held in a variable thePurchaseAmount, and the at-hand UPCs to be held in a variable theUpcs, and bearing in mind that which is discussed herein with respect to butler objects and that which is discussed herein with respect to the compliance authorization master, the dispatch of phase 149 may involve an Extensible Markup Language (XML) Simple Object Access Protocol (SOAP) request in line with the following:

As is discussed in greater detail hereinbelow in connection with FIG. 8, where the operations performed by the compliance authorization master find the transaction to fail the compliance check, the compliance authorization master may return a response conveying this to the compliance authorization assistant (phase 155).

As also discussed in greater detail hereinbelow in connection with FIG. 8, where the operations performed by the compliance authorization master find the transaction to pass the compliance check, the compliance authorization master may formulate an authorization request and dispatch it to payment gateway 125 (phase 157).

Taking the at-hand login to be held in a variable theLogin, the at-hand password to be held in a variable thePassword, the at-hand merchant ID to be held in a variable theMerchantID, the at-hand terminal ID to be held in a variable theTerminalID, the at-hand card number to be held in a variable theCardNumber, the at-hand card PIN to be held in a variable theCardPin, the at-hand card expiration date to be held in a variable theCardExpiry, and the at-hand purchase amount to be held in a variable thePurchaseAmount, and bearing in mind that which is discussed herein with respect to the compliance authorization master, the dispatch of phase 157 may involve an Extensible Markup Language (XML) Simple Object Access Protocol (SOAP) request in line with the following:

```
POST /CardAuth HTTP/1.1
Host: www.example.com
Content-Type: application/soap+xml; charset=utf-8
```

```
POST /ReceivingButlerForComplianceAuthAssistant HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
    <soap:Body>
        <ComplyCheckAndAuth xmlns="http://www.example.com/complycheckandauth>
            <MerchantId> \(theMerchantID) </MerchantId>
            <TerminalId> \(theTerminalID) </TerminalId>
            <CardNumber>\(theCardNumber)</CardNumber>
            <CardPin>\(theCardPin)</CardPin>
            <CardExpiry>\(theCardExpiry)</CardExpiry>
            <PurchaseAmount>\(thePurchaseAmount)</PurchaseAmount>
            <Upcs>\(theUpcs)</Upcs>
        </ComplyCheckAndAuth>
    </soap:Body>
</soap:Envelope>
``` where the employ of a backslash and parentheses in connection with a variable name serves to insert the value of that variable into the XML string.

Having received the dispatch of phase 149, the compliance authorization master may perform one or more operations which are discussed in greater detail hereinbelow in connection with FIG. 8 (phase 151). As is discussed in greater detail in connection with FIG. 8, among such operations performed by the compliance authorization master is communicating with one or more stores 123 (phase 153) in connection with compliance checking the transaction. With reference to that which is discussed in greater detail herein, the card employed by customer 101 may, as one illustration, be a corporate credit card for which certain purchases (e.g., alcohol) are disallowed. As such, continuing with the illustration compliance checking the transaction may include taking into account information received from stores 123 and other information to check the at-hand transaction for compliance with the no alcohol purchase rule.

-continued

```
<?xml version="1.0"?>
<soap:Envelope
xmlns:soap="http://www.w3.org/2003/05/soap-envelope">
    <soap:Header>
        <Authentication xmlns="http://www.example.com/cardauth">
            <Login> \(theLogin) </Login>
            <Password> \(thePassword) </Password>
        </Authentication>
    </soap:Header>
    <soap:Body>
        <DoCardAuth xmlns="http://www.example.com/cardauth">
            <MerchantId> \(theMerchantId) </MerchantId>
            <TerminalId> \(theTerminalId) </TerminalId>
            <CardNumber> \(theCardNumber) </CardNumber>
            <CardPin> \(theCardPin) </CardPin>
            <CardExpiry> \(theCardExpiry) </CardExpiry>
            <PurchaseAmount> \(thePurchaseAmount)
            </PurchaseAmount>
```

```
    </DoCardAuth>
  </soap:Body>
</soap:Envelope>
``` where the employ of a backslash and parentheses in connection with a variable name serves to insert the value of that variable into the XML string.

In response to this, payment gateway may dispatch an authorization response to compliance authorization master 121 (phase 159). Such authorization response may convey card issuer approval or denial of the transaction. The compliance authorization master may, in response to receipt of the authorization response from the payment gateway, dispatch to the compliance authorization assistant an indication regarding the gateway's authorization response (phase 161).

Figure 7:
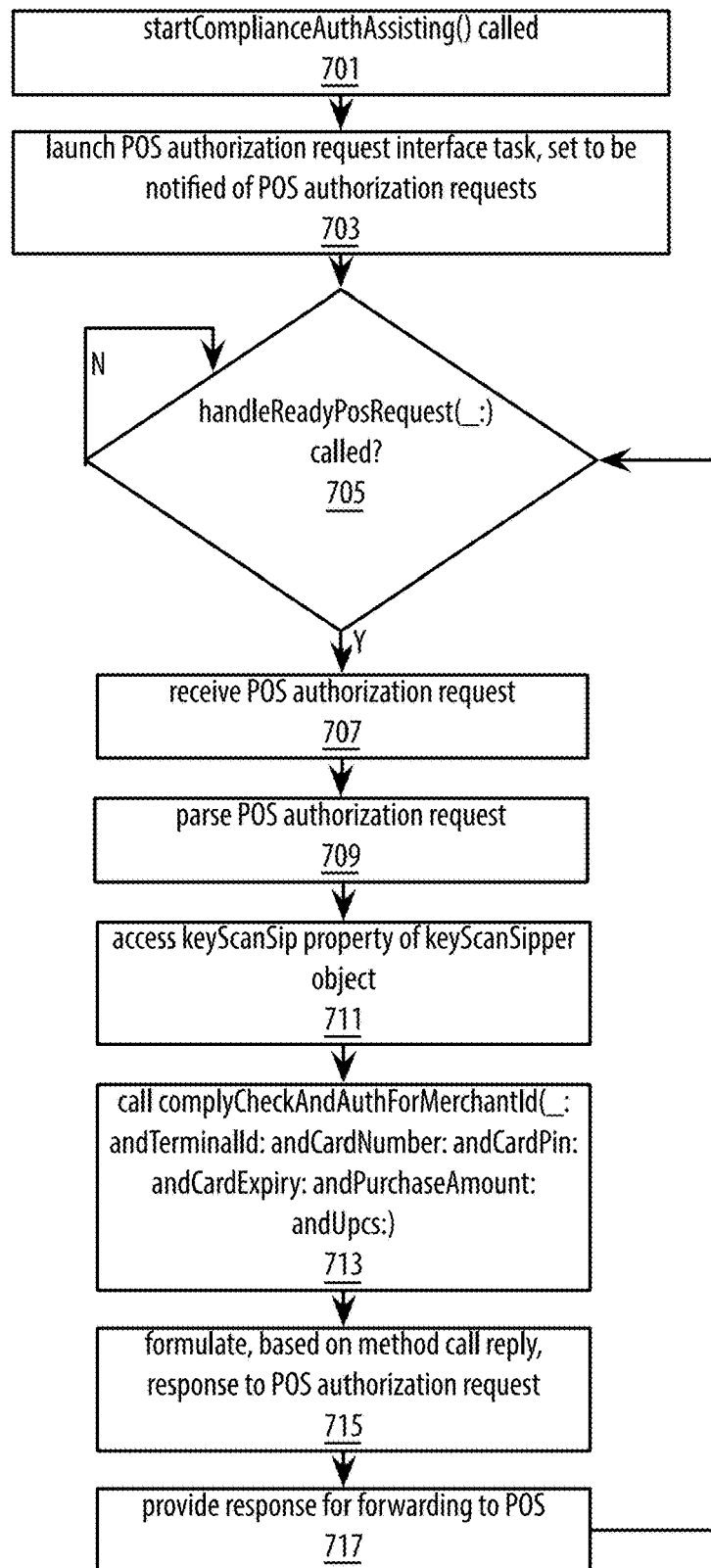
FIG. 7 shows a logic flow diagram illustrating embodiments for the POSAMS of a POS-performed process by which a POS-dispatched card authorization request regarding a commerce transaction may—without code alteration of already-installed POS software—be augmented so that check may be made as to whether or not the transaction includes one or more disallowed entities.

As is discussed in greater detail herein in connection with FIG. 7, responsive to either of the indication of phase 155 conveying compliance check failure or the indication of phase 161 conveying the payment gateway's authorization response, the compliance authorization assistant may act to return to the POS software 113 a response to the POS's authorization request, such response conveying the indication of compliance check failure or the indication of the payment gateway's authorization response (phase 163).

Taking the authorization code to be employed in responding to the POS authorization request to be held in the index 0 element of an array variable authCodeResponseCode and the response code to be employed in responding to the POS authorization request to be held in the index 1 element of the array variable authCodeResponseCode, and bearing in mind that which is discussed herein with respect to the compliance authorization assistant, the dispatch of phase 163 may involve XML in line with the following which is passed by a method of the compliance authorization assistant to a discussed herein script, thus causing the XML response to be provided to the POS in reply to its authorization request:

```
"<authorizationCode> \(authCodeResponseCode[0])
</authorizationCode>
<responseCode> \(authCodeResponseCode[1]) </responseCode>
``` where the employ of a backslash and parentheses in connection with a variable name serves to insert the value of that variable into the XML string.

Having received via phase 163 the response to its authorization request, the conventional POS software may—where the response to its authorization request indicates approval of the customer's card for the commerce transaction rather than conveying compliance check failure or a payment gateway authorization response that the customer's card has been declined for the commerce transaction—provide to printer 119 a data dispatch so as to print a receipt for the commerce transaction (phase 165).

As is discussed in greater detail herein with respect to the print sipper, print jobs intended for a POS printer may first be dispatched to a print spool directory as pdf format files. In keeping with this, the dispatch of phase 165 may involve pdf format data in line with the following:

```
%PDF-1.4
1 0 obj
<</Type /Catalog /Pages 2 0 R>>
endobj
2 0 obj
<</Type /Pages /Kids [3 0 R] /Count 1>>
endobj
3 0 obj
<</Type /Page /Parent 2 0 R /MediaBox [0 0 500 500] /Contents 5 0 R
/Resources
<</ProcSet [/PDF /Text] /Font <</F1 4 0 R>> >>
>>
endobj
4 0 obj
<</Type /Font /Subtype /Type1 /Name /F1 /BaseFont /Helvetica
/Encoding/MacRomanEncoding >>
endobj
5 0 obj
<</Length 53 >>
stream
BT
/F1 20 Tf
0 25 Td
(PAID CREDIT THANK YOU!) Tj
0 50 Td
(Grand Total $3.13) Tj
0 25 Td
(City Tax $0.15) Tj
0 25 Td
(Sub-total $2.98) Tj
0 50 Td
(New Day Hammer AC-123 $1.99) Tj
0 25 Td
(Strike True Nails AC-456 $0.99) Tj
0 50 Td
(Pacifica, CA) Tj
0 25 Td
(Wilson Hardware) Tj
ET
endstream
endobj
xref
trailer
<</Size 6 /Root 1 0 R>>
startxref
502
    %%EOF
```

Such receipt print dispatch may, in a first aspect, be received by printer 119. It is noted that according to one or more embodiments the print dispatch (e.g., as pdf format data) a may undergo a conversion in connection with being received by the printer (e.g., a conversion from pdf format to Postscript format or Printer Control Language (PCL) format). Such receipt print dispatch may, in a second aspect, be captured by print sipper 117. The operations which are performed by the print sipper (phase 167) are discussed in greater detail hereinbelow in connection with FIG. 9. As is discussed in greater detail in connection with FIG. 9, among such operations performed by the printer sipper is sending to archivist 127 a dispatch (phase 169) regarding having the archivist perform operations concerning creating an omnibus record which includes both data regarding the commerce transaction captured by the keyscan sipper (e.g., data regarding UPCs scanned by scanner 107) and data regarding the commerce transaction captured by the print sipper (e.g., data set forth on the receipt).

Taking the at-hand keyscan sip to be accessible via a property keyScanSipper.keyScanSip and the at-hand print sip to be accessible via pdfDocument.string( ) and bearing in mind that which is discussed herein with respect to butler objects and that which is discussed herein with respect to the archivist, the dispatch of phase 169 may involve an XML SOAP request in line with the following:

```
POST /ReceivingButlerForArchivist HTTP/1.1
Host: www.example.com
Content-Type: application/soap+xml; charset=utf-8
<?xml version="1.0"?>
<soap:Envelope
xmlns:soap="http://www.w3.org/2003/05/soap-envelope">
    <soap:Body>
        <CreateOmnibus
        xmlns="http://www.example.com/createomnibus>
            <KeyScanSip> \(keyScanSipper.keyScanSip)
            </KeyScanSip>
            <PrintSip> \(pdfDocument.string( )) </PrintSip>
        </CreateOmnibus>
    </soap:Body>
</soap:Envelope>
``` where the employ of a backslash and parentheses in connection with a variable name serves to insert the value of that variable into the XML string.

Having received the dispatch of phase 169, archivist 127 may perform one or more omnibus record creation operations which are discussed in greater detail in connection with FIG. 10A-B (phase 171). As noted in connection with FIG. 10A-B, among such operations is communicating with one or more stores 129 regarding rules for applying tagging (e.g., XML tagging) in connection with the creation of the omnibus record (phase 173). As also noted in connection with FIG. 10A-B, further among such operations is providing to print sipper 117 a Universally Unique Identifier (UUID) a corresponding to the omnibus record that archivist 127 has created for the commerce transaction (phase 175). Having received the dispatch of 175, print sipper 117 may send to archivist 127 a dispatch (phase 177) regarding having the archivist vend coupons with respect to the commerce transaction.

Having received the dispatch of phase 177, archivist 127 may perform one or more coupon vending operations which are discussed in greater detail in connection with FIG. 11 (phase 179). As noted in connection with FIG. 11, among such operations is communicating with one or more stores 129 so as to access the omnibus record corresponding to the at-hand omnibus record UUID (phase 181). As also noted in connection with FIG. 11, further among such operations is communicating with one or more stores 129 so as to access eligibility and content information regarding coupons (phase 183). As additionally noted in connection with FIG. 11, still further among such operations is providing to print sipper 117 a coupon-bearing dispatch (phase 185). Having received the dispatch of 185, print sipper 117 may send to printer 119 a data dispatch so as to perform a coupon print reflecting the coupon information set forth by the dispatch of phase 185 (phase 187).

It is noted that conventional POS software 113 may run on a computer acting as a cash register, and that keyscan sipper 111, compliance authorization assistant 115, and print sipper 117 may run (e.g., as components or objects) on such computer acting as a cash register but apart from conventional POS software 113. It is further noted that compliance authorization master 121 and archivist 127 may run (e.g., as components or objects) on one or more computers apart from the computer acting as a cash register (e.g., on one or more servers).

FIG. 2A-D shows a datagraph diagram illustrating POS capabilities of a user device (e.g., a smartphone) being configured with respect to a particular commerce location, and further illustrating those user device POS capabilities being employed in making a payment at that commerce location. The process commences when customer 101 indicates to settings for current commerce location concierge 205 of her user device (e.g., via a GUI of her user device) a desire to have the POS capabilities of her user device configured with respect to the commerce location in which her device is presently situated (phase 221). Having received the request of phase 221, settings for current commerce location concierge 205 may perform one or more operations which are discussed in greater detail hereinbelow in connection with FIG. 4 (phase 223).

As is discussed in greater detail in connection with FIG. 4A-D, among such operations performed by the settings for current commerce location concierge is sending to autolocation conductor or interactive-location conductor 207 a dispatch (phase 225) regarding having an autolocation-based or interactive-location-based determination of the current commerce location of the user device be performed. As is discussed in greater detail herein in connection with FIG. 4A-D, such autolocation-based determination of the current commerce location may include a beacon-based (e.g., Bluetooth beacon-based) and/or Global Positioning System (GPS)-based determination of the commerce location in which the user device is situated. As is also discussed in greater detail herein in connection with FIG. 4a-d, such interactive-location-based determination of the current commerce location may include having the user employ her user device in capturing a panorama of the current commerce location, having the user employ her user device in capturing a Quick Response (QR) code, and/or having the user employ her user device in providing a self-penned description of her current commerce location.

With reference to that which it is set forth in connection with FIG. 4A-D it is noted that under the circumstance where autolocation-based determination of the current commerce location is being pursued element 207 may be an autolocation conductor and phase 225 may involve the sending of a dispatch regarding having an autolocation-based determination of the current commerce location of the user device be performed. With further reference to that which is set forth in connection with FIG. 4A-D it is noted that under the circumstance where interactive-location-based determination of the current commerce location is being pursued element 207 may be an interactive-location conductor and phase 225 may involve the sending of a dispatch regarding having an interactive-location-based determination of the current commerce location of the user device be performed.

Having received the dispatch of phase 225, the autolocation conductor or interactive-location conductor may perform one or more operations which are discussed in greater detail hereinbelow in connection with FIG. 4 (phase 227). As is discussed in greater detail in connection with FIG. 4A-D, among such operations performed by the autolocation conductor or interactive-location conductor is sending to settings for current commerce location concierge 205 (phase 229) autolocator data or interactive-locator data which arises from its operations. As is discussed in greater detail in connection with FIG. 4A-D, under the circumstance of autolocation-based determination of the current commerce location being pursued such data may, for instance, include data read from a beacon or GPS coordinates. As is also discussed in greater detail in connection with FIG. 4A-D, under the circumstance of interactive-location-based determination of the current commerce location being pursued such data may, for instance, include captured panorama images or a string corresponding to a captured QR code.

Having received the data of phase 229, settings for current commerce location concierge 205 send to settings vendor concierge 209 a dispatch (phase 231) regarding having determination be made of POS settings which correspond to the commerce location reflected by the at-hand autolocator data or the at-hand interactive-locator data. Having received the dispatch of phase 231, the settings vendor concierge 209 may perform one or more operations which are discussed in greater detail hereinbelow in connection with FIG. 5A-C (phase 233). As is discussed in greater detail in connection with FIG. 5A-C, among such operations performed by the settings vendor concierge is sending to commerce location UUID determiner 211 a dispatch (phase 235) regarding having determination be made of a commerce location UUID which corresponds to the commerce location reflected by the at-hand autolocator data or the at-hand interactive-locator data.

Having received the dispatch of phase 235, the commerce location UUID determiner may perform one or more operations which are discussed in greater detail hereinbelow in connection with FIG. 5A-C (phase 237). As is discussed in greater detail in connection with FIG. 5A-C, among such operations performed by the commerce location UUID determiner is communicating with one or more stores 213 (phase 239) in connection with determining a commerce location UUID which corresponds to the at-hand autolocator data or the at-hand interactive-locator data. As is also discussed in greater detail in connection with FIG. 5A-C, among such operations performed by the commerce location UUID determiner additionally is sending to settings vendor concierge 209 (phase 241) an indication of a commerce location UUID which corresponds to the commerce location in which the user device is presently situated.

Having received the indication of phase 241, the settings vendor concierge may send a dispatch (phase 243) to POS settings determiner 215 regarding having POS settings which correspond to the at-hand commerce location UUID be determined. Having received the dispatch of phase 243, POS settings determiner 215 may perform one or more operations which are discussed in greater detail hereinbelow in connection with FIG. 5A-C (phase 245). As is discussed in greater detail in connection with FIG. 5A-C, among such operations performed by the POS settings determiner is communicating with one or more stores 217 (phase 247) in connection with determining POS settings which correspond to the at-hand commerce location UUID. As is also discussed in greater detail in connection with FIG. 5, among such operations performed by the POS settings determiner additionally is sending to settings vendor concierge 209 (phase 249) an indication of POS settings which correspond to the commerce location in which the user device is presently situated.

Having received the indication of phase 249, the settings vendor concierge may send, to settings for current commerce location concierge 205, an indication (phase 251) of the POS settings which correspond to the commerce location in which the user device is presently situated. Settings for current commerce location concierge 205 may, in response to the indication of phase 251, send a dispatch (phase 253) to POS transactor 203 regarding having the at-hand POS settings be set such that they are employable in having the user device make a payment at the commerce location in which it is situated.

Figure 16:
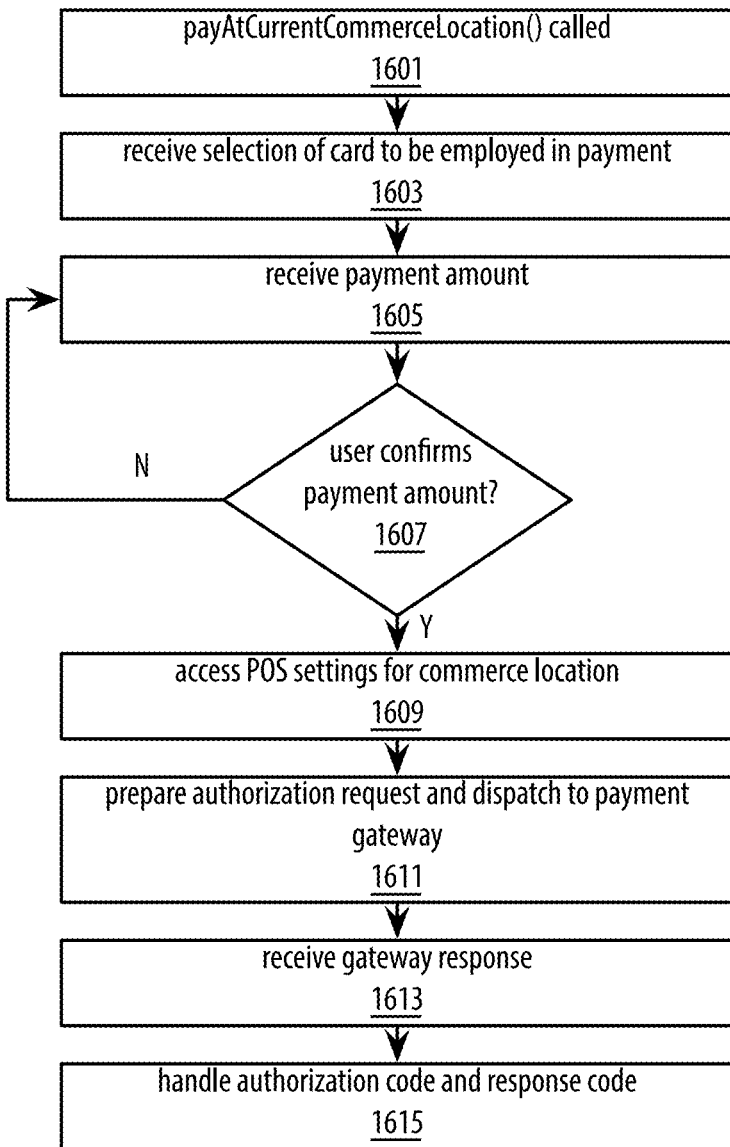
FIG. 16 shows a logic flow diagram illustrating embodiments for the POSAMS of a user device-performed process by which the user device may be employed in making payments at a commerce location using POS configuration data corresponding to that commerce location.

At phase 255 customer 101 may indicate to POS transactor 203 of her user device (e.g., via a GUI of her user device) a desire to employ the POS capabilities of her user device to make a payment at the commerce location in which her device is presently situated. POS transactor 203 may, in response, query (e.g., via a GUI of the user device) the user as to information regarding the payment card (e.g., credit card or debit card) to be employed and further with regard to the amount to be paid (phase 257). At phase 259 the user may provide a corresponding reply to POS transactor 203. With reference to FIG. 16, is noted that ways in which POS transactor 203 may learn of the amount which is to be paid include user entry of the amount via a GUI, reading of a QR which conveys the amount due, and optical character recognition (OCR).

POS transactor 203 may at phase 261 dispatch an authorization request to payment gateway 219 so as to seek an authorization response as to whether or not the commerce transaction may be completed using the at-hand card. Payment gateway 219 may, in response, dispatch (phase 263) an authorization response to POS transactor 203. Such authorization response may convey card issuer approval or denial of the transaction. At phase 265 POS transactor 203 may, as is discussed in greater detail in connection with FIG. 16, handle the authorization response.

It is noted that the POS transactor, the settings for current commerce location concierge, the autolocation conductor, and the interactive-location conductor may run (e.g., as components or objects) on the user device. It is further noted that the settings vendor concierge, the commerce location UUID determiner, and the POS settings determiner may run (e.g., as components or objects) on one or more computers apart from the user device (e.g., on one or more servers).

Figure 3A:
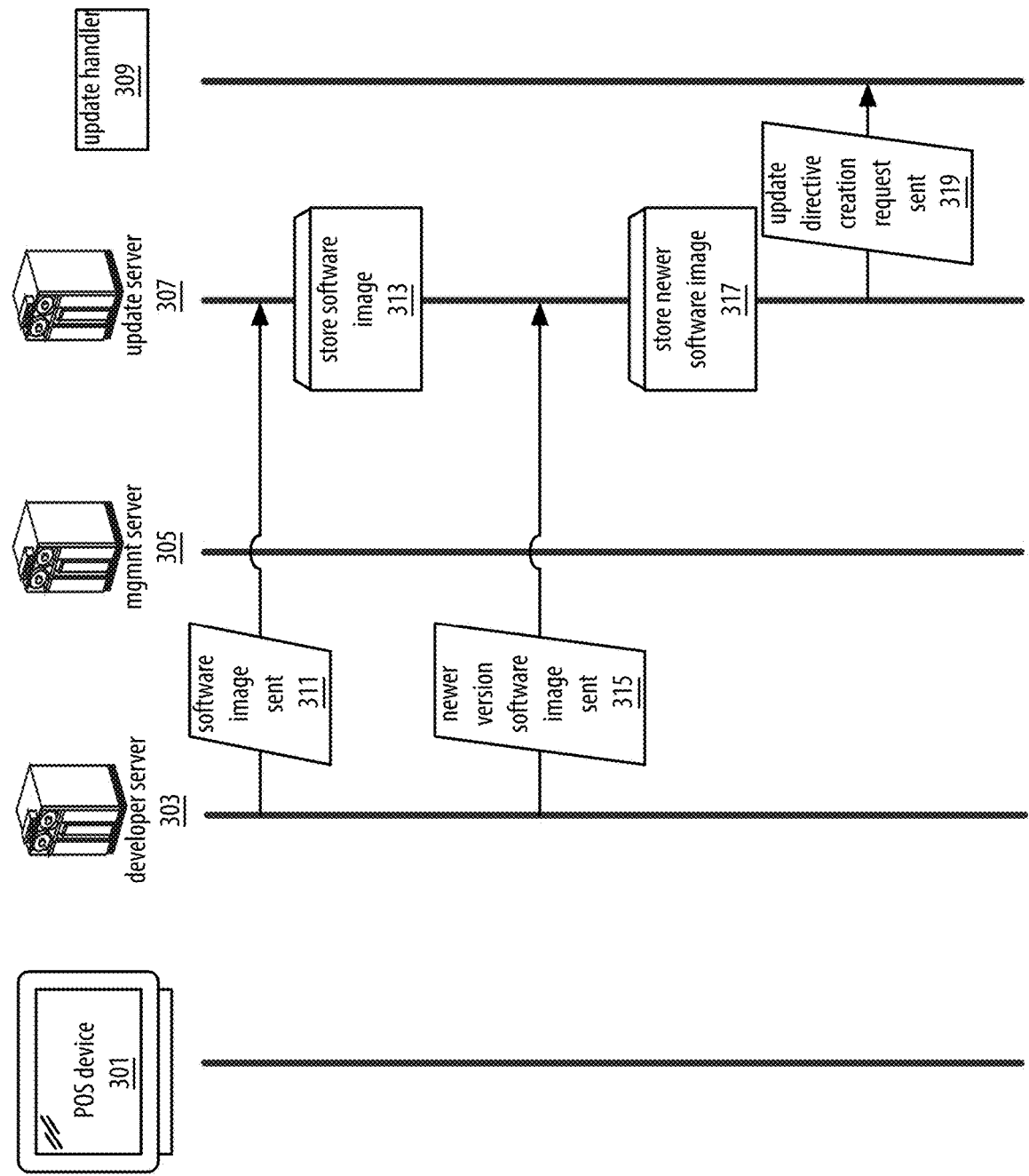
FIG. 3A-C shows a datagraph diagram illustrating embodiments for the POSAMS of a software update approach applicable to limited-capability POS devices.
Figure 3B:
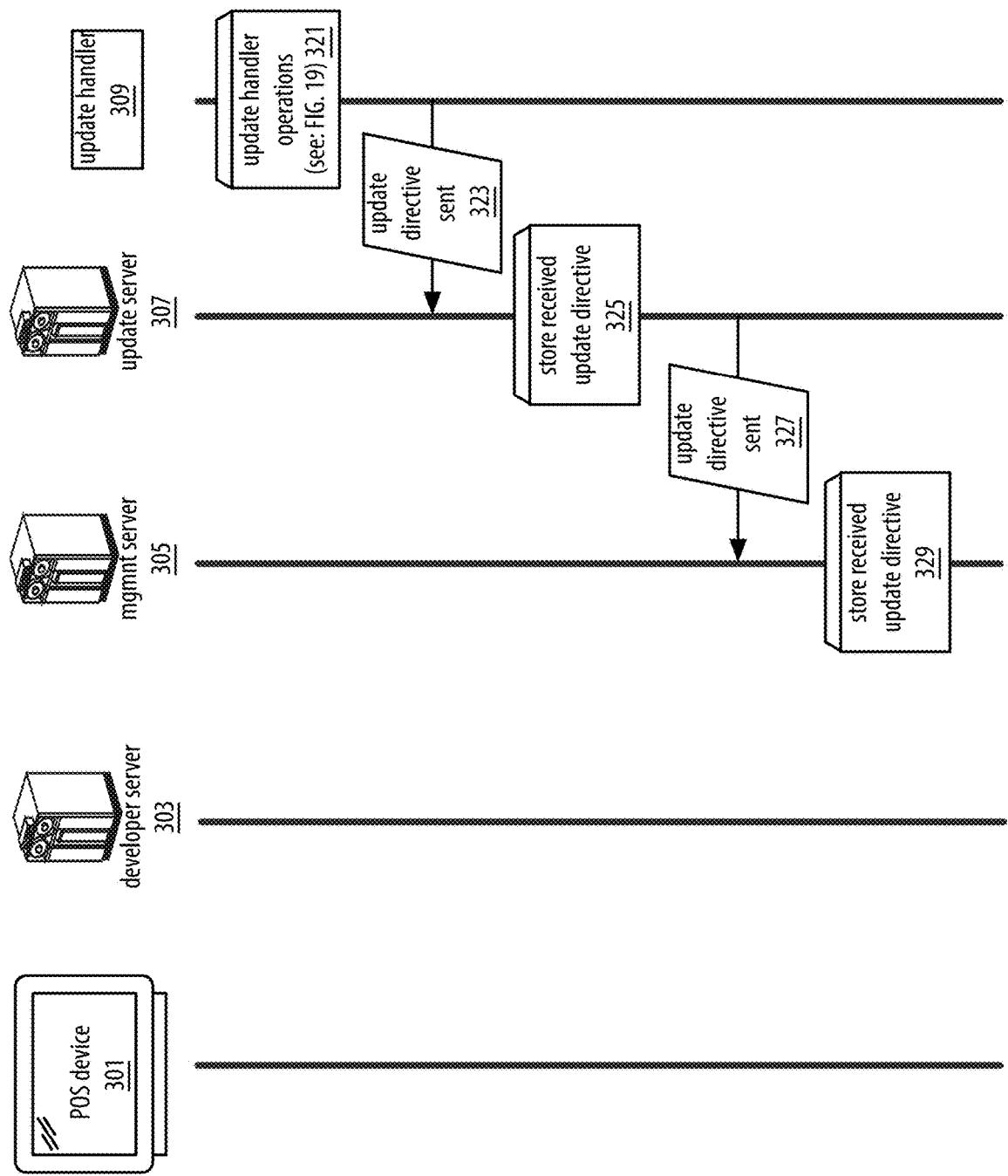
Figure 3C:
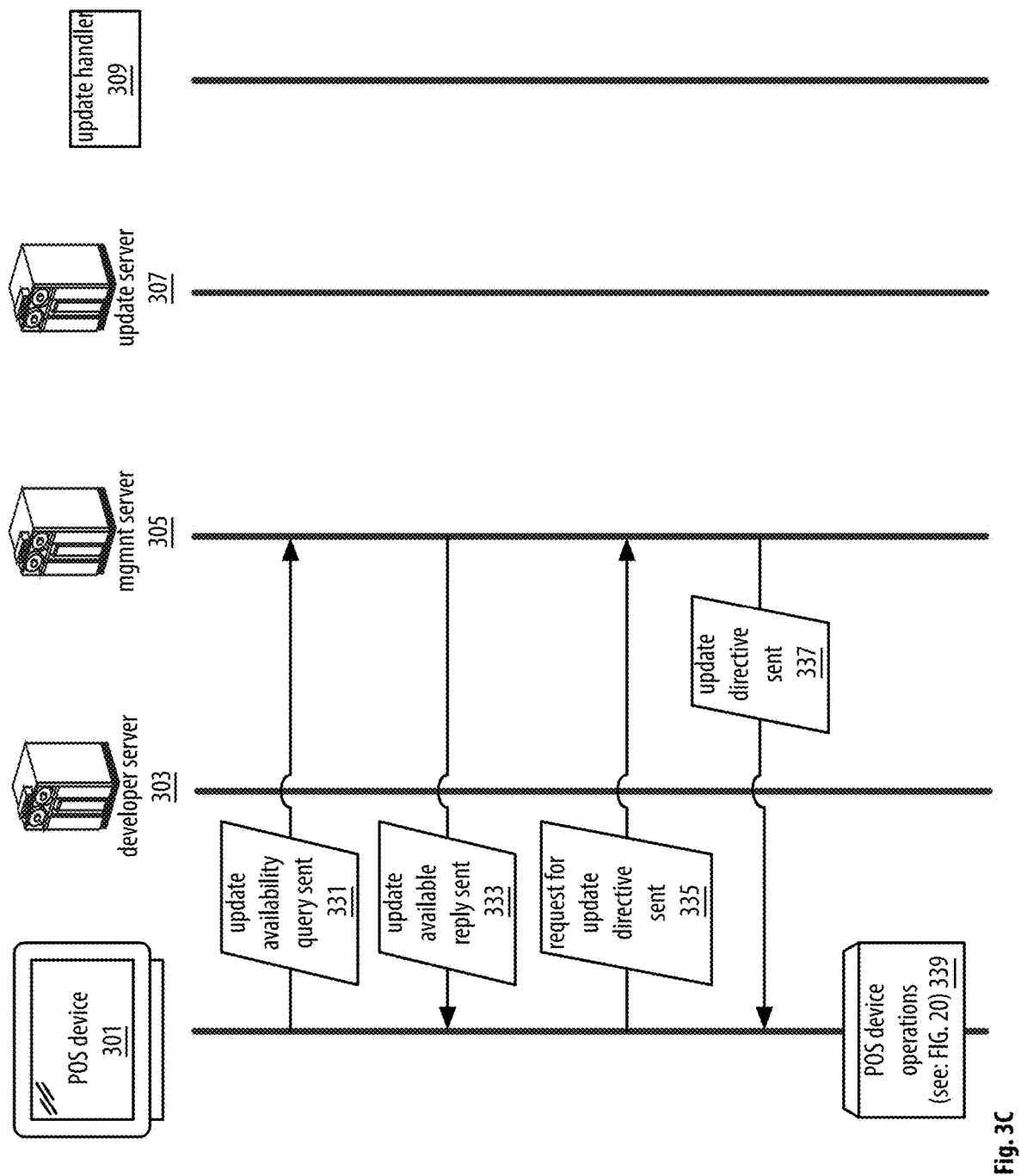
Figure 4A:
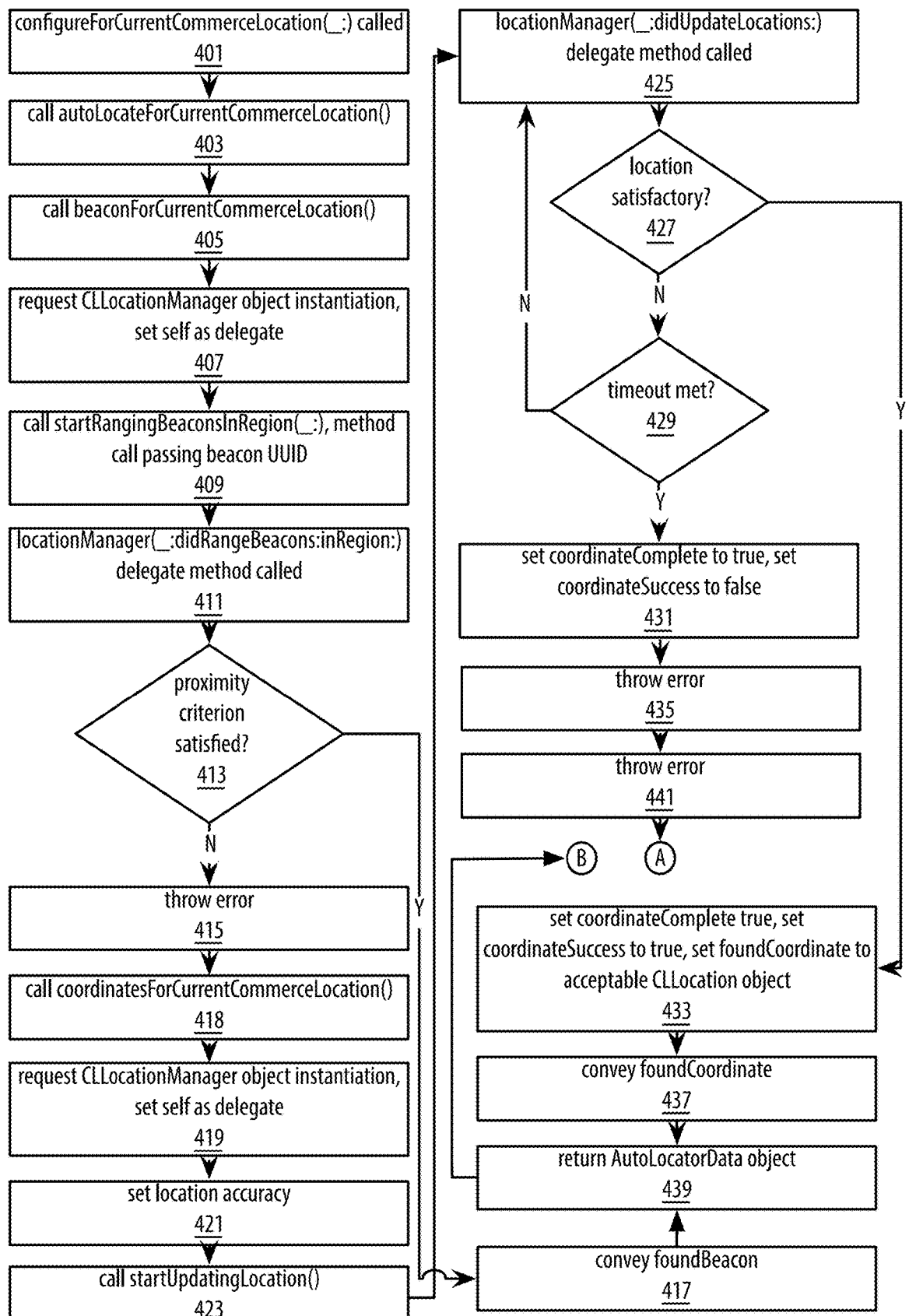
FIG. 4A-D shows a logic flow diagram illustrating embodiments for the POSAMS of a user device-performed process by which POS capabilities of a user device are configured with respect to a particular commerce location so that the POS capabilities of the user device may be employed in making payments at that commerce location.
Figure 4B:
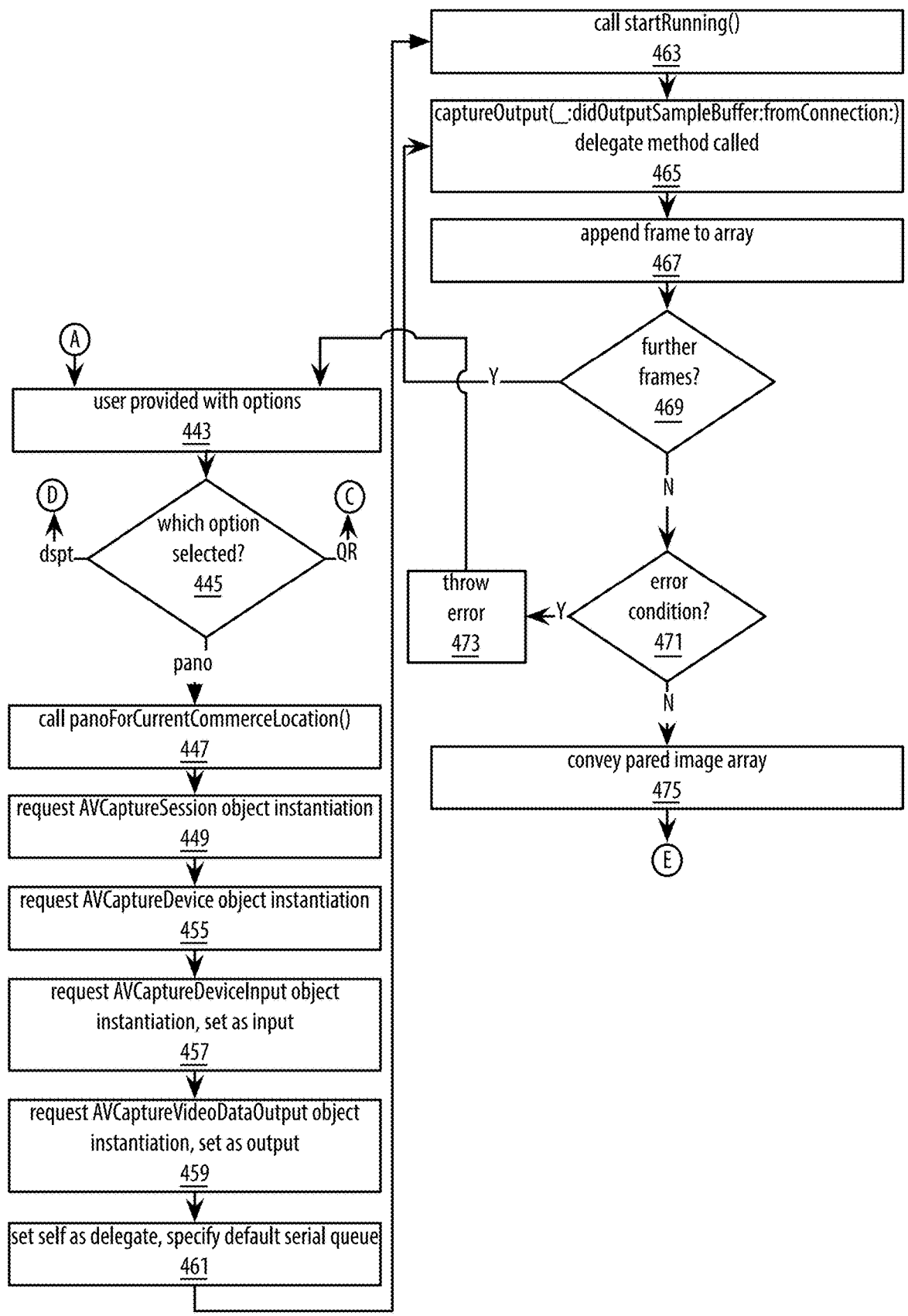
Figure 4C:
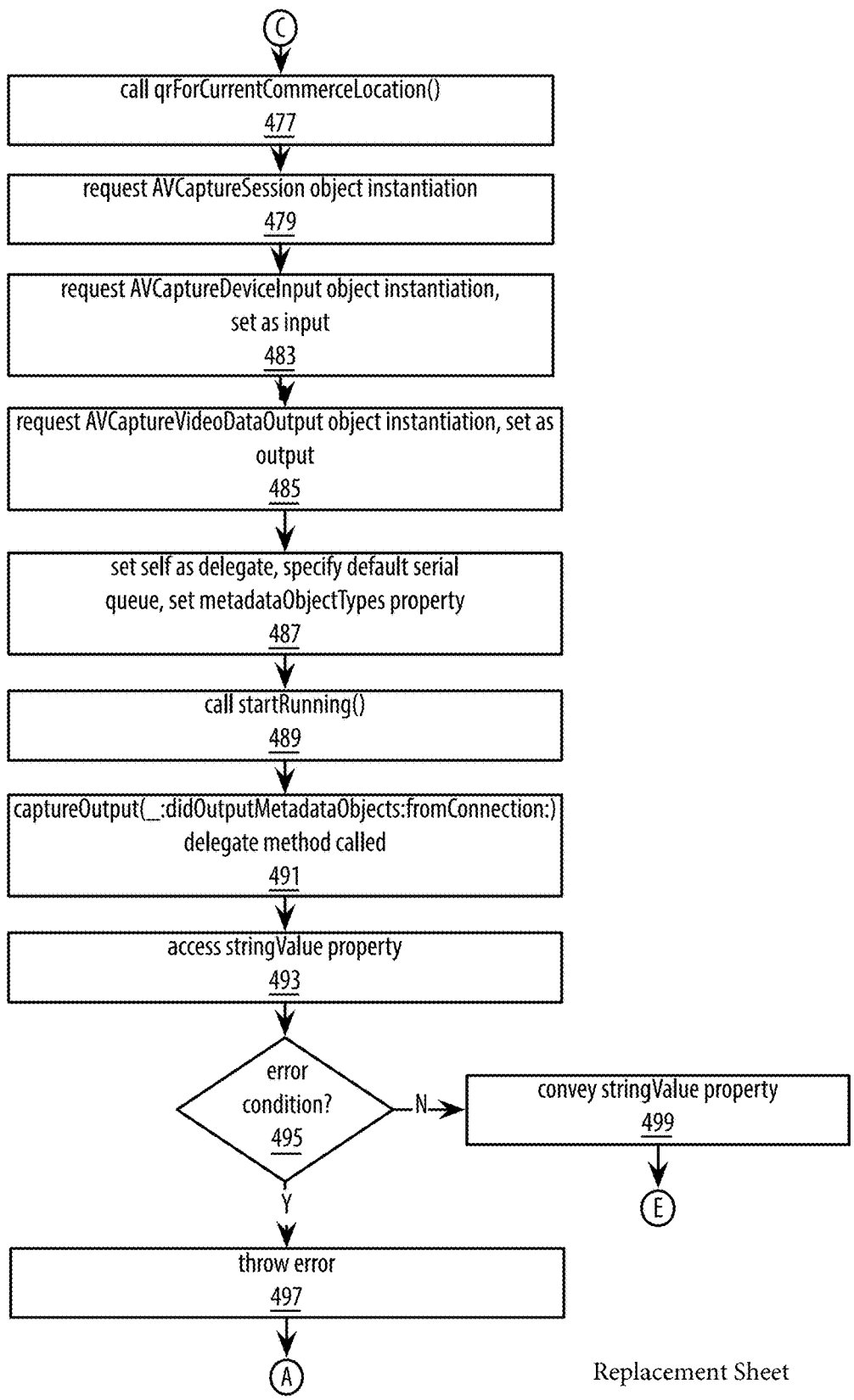
Figure 4D:
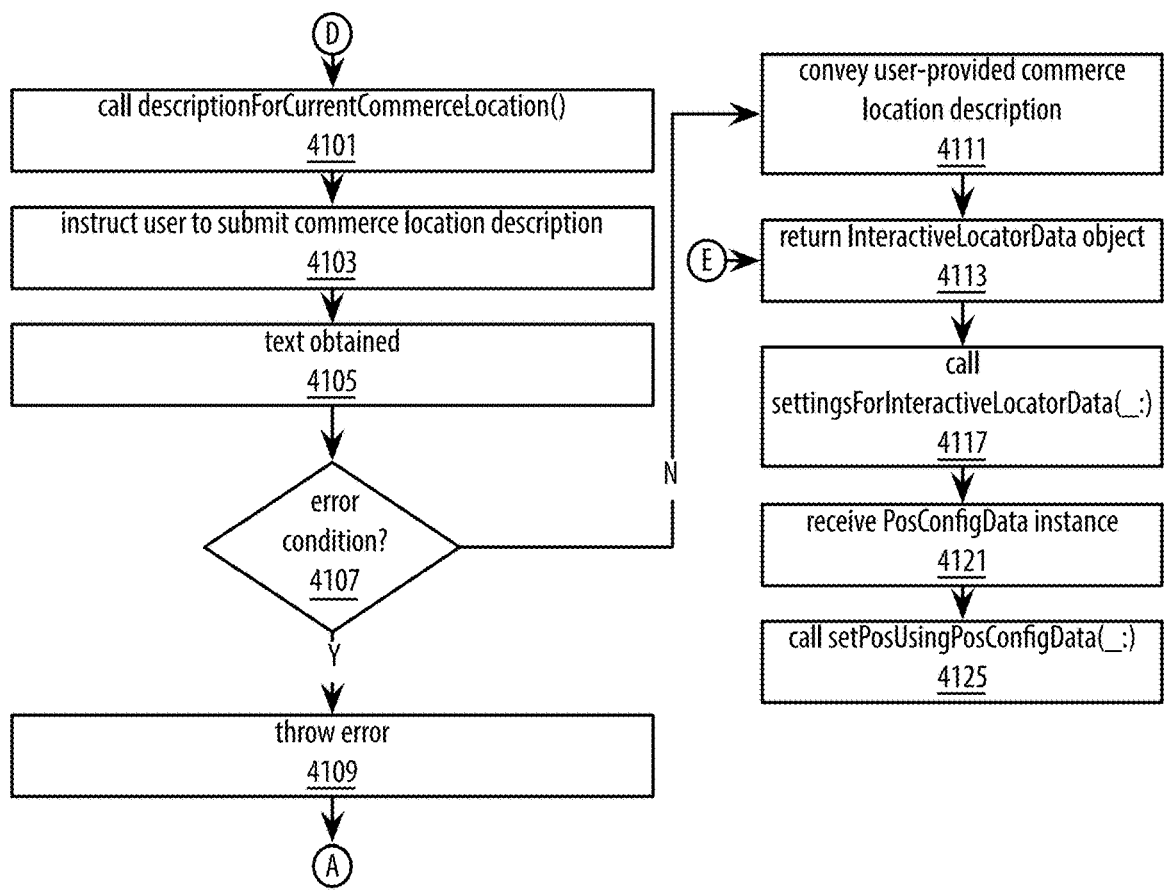
Figure 4D:
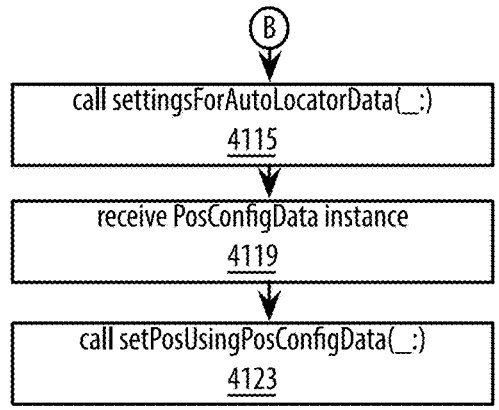

FIG. 3A-C shows a datagraph diagram illustrating a software update approach applicable to limited-capability POS devices. Such limited-capability POS devices may be ones possessing software memory (e.g., flash memory) which does not allow for alteration of individual portions thereof but instead only for complete overwrite. Such limited-capability POS devices may moreover be ones whose data links are of limited bandwidth and/or high cost. The software update approach includes creating an update directive which is of smaller size than a complete-overwrite software image and employ of that update directive at a limited-capability POS device in creating a complete overwrite software image.

The process commences when a server of a developer of software for limited-capability POS devices (303) sends to update directive server 307 an image of limited-capability POS software (phase 311). In response to the send of phase 311 update directive server 307 may store the received software image (phase 313). Then at phase 315 software developer server 303 may send to update directive server 307 a newer version image of the limited-capability POS software (phase 315). In response to the send of phase 315 update directive server 307 may store the received newer software image (phase 317).

Next, at phase 319 update directive server 307 may send to limited POS update handler 309 a request for creation of an update directive corresponding to the old software image and the new software image. Having received the request of phase 319, limited POS update handler 309 may perform one or more operations which are discussed in greater detail hereinbelow in connection with FIG. 19 (phase 321). As is discussed in greater detail in connection with FIG. 19, among such operations performed by limited POS update handler 309 is creating update directive. At phase 323 limited POS update handler 309 sends the created update directive to update directive server 307. At phase 325 update directive server 307 stores the update directive. Then at phase 327 update directive server 307 sends the update directive to management server for limited-capability POS devices 305. Management server 305 stores this update directive at phase 329.

At phase 331 limited-capability POS device 301 may send to management server 305 a query as to whether or not a software update is available. At phase 333 management server 305 sends a corresponding reply to the limited-capability POS device. Such reply may, as appropriate, indicate either that an update is available or that no update is available. So as to illustrate by way of example, it will be taken to be the case for FIG. 3 that the reply of phase 333 indicates that an update is available.

At phase 335 limited-capability POS device 301 may send to management server 305 a request for the update directive. In response management server 305 may at phase 337 send the update directive to the limited-capability POS device. Having received the update directive of phase 337, the limited-capability POS device may at phase 339 perform one or more operations which are discussed in greater detail hereinbelow in connection with FIG. 20, such operations including loading an image of the POS device's current software into a copy location (e.g., into an array), altering the copy as per the received update directive, and replacing the POS's software memory with the altered copy. It is noted that limited POS update handler 309 may run (e.g., as components or objects) on one or more servers.

FIG. 4A-D shows a logic flow diagram illustrating embodiments of a user device-performed process by which POS capabilities of a user device are configured with respect to a particular commerce location so that the POS capabilities of the user device may be employed in making payments at that commerce location. To facilitate discussion, the process of FIG. 4A-D may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 4A-D may be performed by a smaller or larger quantity of objects than as discussed, and/or may be performed by a smaller or larger quantity of methods than those discussed. It is noted that the term "component" as discussed herein-throughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 401, a configureForCurrentCommerceLocation(_:) method of a settingsForCurrentCommerceLocationConcierge object may be called. The method may have the declaration:

func configureForCurrentCommerceLocation(_ sender: AnyObject), where the declaration indicates that method may take a single parameter of type AnyObject, the single parameter having a local parameter name, which is used in the implementation of the method, "sender," the single parameter, as indicated by the underscore ("_"), having no external parameter name. Had the parameter had an external parameter name, such would have been employed in labeling the passing of the parameter to the method. The declaration indicates that the method has no return value. Had the method had a return value, such would have been conveyed by the placement of a "->" followed by the type of the return value. Moreover, the declaration does not indicate the method to be capable of throwing an error. Had the method been capable of throwing an error such would have been indicated by the inclusion of "throws."

The calling of the method may be in response to a user indicating a desire to have the POS capabilities of her device configured for the commerce location in which she is presently situated. As an example, the user might so indicate by activating a corresponding GUI button of her device. In such implementation the method may be applied as an action method, with the passed parameter serving to point to the corresponding button object (e.g., an NSButton or UIButton).

At 403 the configureForCurrentCommerceLocation(_:) method may call an autoLocateForCurrentCommerceLocation( ) method of a autoLocationConductor object. The autoLocateForCurrentCommerceLocation( ) method may have the declaration:

func autoLocateForCurrentCommerceLocation( ) throws→AutoLocatorData, where the declaration indicates that the method may take no parameters, indicates, by the inclusion of the keyword "throws," that the method may be capable of throwing an error, and indicates that the method may have a return value of type AutoLocatorData.

The AutoLocatorData type may be defined as a struct:

```
struct AutoLocatorData {
    var autoInfoKind: AutoInfoKind
    var beaconData: CLBeacon
    var geoCoordinates: CLLocation
}.
```

As such, the struct may include a property autoInfoKind of type AutoInfoKind, an enum which will be discussed momentarily. The struct may also include a property geoCoordinates of type CLLocation. According to the Swift/Apple frameworks-based pseudocode employed herein, CLLocation may provide functionality including storage of geographical location data (e.g., geographical coordinate information). As will be discussed in greater detail herein, geoCoordinates may be employed in storing global positioning coordinates ascertained for a commerce location.

The struct may further include a property beaconData of type CLBeacon. According to the Swift/Apple frameworks-based pseudocode employed herein, the type CLBeacon may be capable of holding data including beacon UUID, beacon major value, and beacon minor value As will be discussed in greater detail hereinbelow, beaconData may be employed in storing data drawn from a Bluetooth beacon found at a commerce location.

Returning to AutoInfoKind, AutoInfoKind may be defined as an enum:

```
enum AutoInfoKind {
    case Coord
    case Beacon
    case Zero
},
``` such that an instantiated AutoInfoKind object may hold the value AutoInfoKind.Coord, AutoInfoKind.Beacon, or AutoInfoKind.Zero.

As is discussed in greater detail herein, this enum type may be employed in connection with an instance of an AutoLocatorData struct to indicate the data held by the struct instance. For instance, the autoInfoKind variable of an AutoLocatorData struct instance may be set to AutoInfoKind.Coord where the struct instance has been loaded with global positioning data, or AutoInfoKind.Beacon where the struct instance has been loaded with beacon data. The autoInfoKind property of an AutoLocatorData struct instance may be set to AutoInfoKind.Zero should the need arise for there to be an AutoLocatorData struct instance which holds neither global positioning data nor beacon data (e.g., an AutoLocatorData struct instance which may hold no or zero-value data while awaiting data acquisition and/or under the circumstance where data acquisition is not successful).

At 405, the autoLocateForCurrentCommerceLocation( ) method of the autoLocationConductor object may call a beaconForCurrentCommerceLocation( ) method of a beaconLocator object. The beaconForCurrentCommerceLocation( ) method may have the declaration:

func   beaconForCurrentCommerceLocation(   )  throws→CLBeacon, where the declaration indicates that the method may take no parameters, indicates, by the inclusion of the keyword "throws," that the method may be capable of throwing an error, and indicates that the method may have a return value of type CLBeacon.

At 407, the beaconForCurrentCommerceLocation( ) method may request instantiation of a CLLocationManager object. According to the Swift/Apple frameworks-based pseudocode employed herein, an instantiated CLLocationManager object may provide functionality including interacting with user device Bluetooth hardware in order to detect Bluetooth beacons for which the user device is in radio reception range, and receiving therefrom UUID data, major value data, and minor value data. Such beacons may be Bluetooth Low Energy (LE) beacons.

Further at 407, the beaconForCurrentCommerceLocation( ) method may set the beaconLocator object to be a delegate object for the instantiated CLLocationManager object. As a delegate object for the instantiated CLLocationManager object, the beaconLocator object may have certain of its methods called by the instantiated CLLocationManager object when certain events transpire. As an example, as discussed further hereinbelow once the instantiated CLLocationManager object has detected one or more beacons and retrieved data therefrom, the object may call a locationManager(_:didRangeBeacons:inRegion:) delegate method of the beaconLocator object.

At 409, the beaconForCurrentCommerceLocation( ) method may call a startRangingBeaconsInRegion(_:) method on the instantiated CLLocationManager object. The method call may include the passing of a CLBeaconRegion object. The CLBeaconRegion object may specify a UUID. As per the Swift/Apple frameworks-based pseudocode employed herein, such method call may serve to instruct the instantiated CLLocationManager object to commence receiving transmissions from beacons broadcasting the specified UUID. According to one or more embodiments, all beacons of interest may broadcast the same UUID but differ from one another in terms of the major and/or minor values which they broadcast.

At 411, the locationManager(_:didRangeBeacons:inRegion:) delegate method of the beaconLocator object may be called by the instantiated CLLocationManager object. As per the Swift/Apple frameworks-based pseudocode employed herein, in so doing the instantiated CLLocationManager object may pass to the delegate method an array of CLBeacon objects. The array may order the CLBeacon objects thereof in distance order with the closest beacon listed first. As such the delegate method may access this first object of the array.

At 413, the delegate method of the beaconLocator object may determine whether such closest beacon satisfies a proximity criterion. The delegate method may access the CLProximity variable of the CLBeacon object for the closest beacon. In the case where the CLProximity variable holds the value of CLProximity.Near or CLProximity.Immediate the delegate method may consider the found closest beacon to have met the proximity criterion. In the case where the CLProximity variable holds the value of CLProximity Unknown or CLProximity. Far the delegate method may consider the closest beacon to have not met the proximity criterion.

Having made a determination as to satisfaction or non-satisfaction of the criterion, the delegate method of the beaconLocator object may set a Boolean property rangingComplete of the beaconLocator object to true.

Where the criterion is not met, the delegate method may additionally set a Boolean property rangingSuccess of the beaconLocator object to false. Where the criterion is met, the delegate method may additionally set the rangingSuccess property to true and further may set a CLBeacon property foundBeacon to convey the noted first object of the CLBeacon array passed by the instantiated CLLocationManager object.

The beaconForCurrentCommerceLocation( ) method may employ a while statement which checks on the value of the rangingComplete property. In particular, the while statement may, so long as rangingComplete is false, update a GUI of the user device to convey that beacon ranging is being attempted. With rangingComplete turning true the while statement may be exited.

Exiting the while statement, the beaconForCurrentCommerceLocation( ) method may check the rangingSuccess property. Where the rangingSuccess property is false, the beaconForCurrentCommerceLocation( ) method may throw an error to the autoLocateForCurrentCommerceLocation( ) method of the autoLocationConductor object (415). Where the rangingSuccess property is true, the beaconForCurrentCommerceLocation( ) method may convey the CLBeacon property foundBeacon to the autoLocateForCurrentCommerceLocation( ) method of the autoLocationConductor object (417).

It is noted that, in one or more embodiments, in the case where the locationManager(_:didRangeBeacons:inRegion:) delegate method of the beaconLocator object is called by the instantiated CLLocationManager object but the array is empty, the delegate method of the beaconLocator object may set rangingComplete to true and may set rangingSuccess to false. Moreover, where the instantiated CLLocationManager object has experienced an error in attempting to detect beacons, the object may call a further delegate method of the beaconLocator object—locationManager(_:monitoringDidFailForRegion:withError:). This further delegate method, when called, may act to set rangingComplete to true and may set rangingSuccess to false. Still further, the noted while statement of the beaconForCurrentCommerceLocation( ) method may keep track of the number of times it has looped, the elapsed time for which looping has occurred, or similar. Where the number of loops performed or the elapsed time rises above a selected value, the while statement may set rangingComplete to true and may set rangingSuccess to false and then ply a break statement to exit the loop. The selected value might be chosen with an eye towards user experience. For instance, the value might be chosen such that the loop ends after fifteen seconds without beacon-finding success.

Responsive to the thrown error of 415, At 418, the autoLocateForCurrentCommerceLocation( ) method of the autoLocationConductor object may call a coordinatesForCurrentCommerceLocation( ) method of a coordinateLocator object. The coordinatesForCurrentCommerceLocation( ) method may have the declaration:

func coordinatesForCurrentCommerceLocation( ) throws→CLLocation, where the declaration indicates that the method may take no parameters, indicates, by the inclusion of the keyword "throws," that the method may be capable of throwing an error, and indicates that the method may have a return value of type CLLocation.

At 419, the coordinatesForCurrentCommerceLocation( ) method may request instantiation of a CLLocationManager object. According to the Swift/Apple frameworks-based pseudocode employed herein, an instantiated CLLocationManager object may provide functionality including interacting with one or more of user device GPS hardware, user device WiFi hardware, and user device cellular hardware in order to determine user device location.

Further at 419, the coordinatesForCurrentCommerceLocation( ) method may set the coordinateLocator object to be a delegate object for the instantiated CLLocationManager object. As a delegate object for the instantiated CLLocationManager object, the coordinateLocator object may have certain of its methods called by the instantiated CLLocationManager object when certain events transpire. As an example, as discussed further hereinbelow once the instantiated CLLocationManager object has device location data available, the object may call a locationManager(_:didUpdateLocations:) delegate method of the coordinateLocator object.

At 421, the coordinatesForCurrentCommerceLocation( ) method may set a desiredAccuracy property of the instantiated CLLocationManager object. According to the Swift/Apple frameworks-based pseudocode employed herein, accuracy choices may include within-three-kilometers accuracy, within-one-kilometer accuracy, within-100-meters accuracy, within-ten-meters accuracy, highest level of accuracy without additional sensor data (e.g., without accelerometer data), and highest level of accuracy plus additional sensor data (e.g., plus accelerometer data). According to one or more embodiments, at 421 the desiredAccuracy property may be set to highest level of accuracy without additional sensor data from the vantage point that a lower accuracy selection might incorrectly declare the user device to not be in the commerce location within which it is actually situated but instead within a nearby commerce location (e.g., a store adjoining the actual store), while a higher accuracy selection might tend overexert the user device's energy source (e.g., the device's battery).

At 423, the coordinatesForCurrentCommerceLocation( ) method may call a startUpdatingLocation( ) method on the instantiated CLLocationManager object. As per the Swift/Apple frameworks-based pseudocode employed herein, such method call may serve to instruct the instantiated CLLocationManager object to commence determination of the user device location.

At 425, the locationManager(_:didUpdateLocations:) delegate method of the coordinateLocator object may be called by the instantiated CLLocationManager object. As per the Swift/Apple frameworks-based pseudocode employed herein, in so doing the instantiated CLLocationManager object may pass to the delegate method an array of CLLocation objects. The array may order the CLLocation objects thereof in newness order with the most recent CLLocation object listed last.

According to the Swift/Apple frameworks-based pseudocode employed herein, that which is provided by a CLLocation object may include CLLocationCoordinate2D coordinate information which includes latitude and longitude information, location uncertainty information (e.g., specified as a measured-in-meters radius of inaccuracy), and timestamp information. It is noted that, as per the Swift/Apple frameworks-based pseudocode employed herein, the array of CLLocation objects will not be empty. Instead the array will contain at least one CLLocation object, although such object's location uncertainty information may indicate high uncertainty and/or such object's timestamp information may convey outdated information. At 427 the locationManager(_:didUpdateLocations:) delegate method may access the last CLLocation object of the array so as to retrieve the newest CLLocation object. The delegate method may then access and evaluate either or both of the noted uncertainty information and the noted timestamp information in order to ascertain whether or not that newest CLLocation object provides satisfactory information. As one example, the information might be considered unsatisfactory where the an uncertainty radius of ten meters or greater is indicated out of concern that such information might not accurately place the user device in the commerce location in which it is actually located. Alternately or additionally, the information might be considered unsatisfactory where the timestamp information conveys that the data is more than one minute old out of concern that the data may reflect a prior location of the user device rather than the current location.

Where the locationManager(_:didUpdateLocations:) delegate method finds the location information to be unsatisfactory, it may await being called again with updated location information (a return to 425). The coordinateLocator object may possess a variable property of type Integer called coordinateAttempts which holds a value of zero at the time of instantiation of the object.

When, at 427, being called and finding the coordinate information to be unsatisfactory, the delegate method may at 429 compare coordinateAttempts to a timeout reference value. Where the reference value has not yet been met, the delegate method may increment coordinateAttempts and, as referenced, await being called again with updated information (a return to 425). Where the reference value has been met, the delegate method may set a Boolean property coordinateComplete of the coordinateLocator object to true and may further set a Boolean property coordinateSuccess of the coordinateLocator object to false (431). The reference value may be selected in consideration of user experience.

For instance, the value might be chosen such that the reference value is met upon on order of fifteen seconds of lack of location information being satisfactory (e.g., where the locationManager(_:didUpdateLocations:) delegate method was found to be called approximately every five seconds with updated location information, the reference value might be set to two.

Where the locationManager(_:didUpdateLocations:) delegate method finds the location information to be satisfactory, the delegate method may at 433 set coordinateComplete to true, may set coordinateSuccess to true, and may set a coordinateLocator object property foundCoordinate to convey the array-provided CLLocation object which was found to be acceptable.

The coordinatesForCurrentCommerceLocation( ) method may employ a while statement which checks on the value of the coordinateComplete property. The while statement may, so long as coordinateComplete is false, update a GUI of the user device to convey that geographical location determination is being attempted for the user device. With coordinateComplete turning true the while statement may be exited.

Exiting the while statement, the coordinatesForCurrentCommerceLocation( ) method may check the coordinateSuccess property. Where coordinateSuccess is false, the coordinatesForCurrentCommerceLocation( ) method may throw an error to the autoLocateForCurrentCommerceLocation( ) method of the autoLocationConductor object (435). Where coordinateSuccess is true, the coordinatesForCurrentCommerceLocation( ) method may convey the foundCoordinate property to the autoLocateForCurrentCommerceLocation( ) method of the autoLocationConductor object (437).

Although the employ of an instantiated CLLocationManager object and a locationManager(_: didUpdateLocations:) delegate method have been discussed, other approaches may be followed. For instance a Gpsd daemon may be employed in connection with a cgps command line program. The daemon and command line program, working together, may interact with device GPS hardware and provide to stdout GPS information including latitudinal and longitudinal coordinates. An NSTask object may be instantiated. The instantiated NSTask object's launchPath property may be set to a string specifying the path (including executable name) for launching cgps (e.g., /usr/bin/cgps), the instantiated NSTask object's standardOutput property may be set to an instantiated NSPipe object, and the instantiated NSTask object's launch( ) method may be called. The fileHandleForReading property of the instantiated NSPipe object may be accessed and the readDataToEndOfFile( ) method thereof may be called, with the NSData output thereof being saved to an instantiated NSData object. An NSString object may then be created from the instantiated NSData object, and the and the created NSString object may be parsed and/or have one or more substring objects created therefrom so as to extract GPS data (e.g., latitudinal and longitudinal coordinates) sent to stdout by cgps. A CLLocation object holding such extracted GPS information may be instantiated, and the instantiated CLLocation object may be employed in a manner analogous to a CLLocation object yielded via the CLLocationManager/locationManager(_:didUpdateLocations:) delegate method approach discussed above.

Where the beaconForCurrentCommerceLocation( ) is successful, at 417 the method may, as noted, convey the corresponding CLBeacon information to the autoLocateForCurrentCommerceLocation( ) method of the autoLocationConductor object. Likewise, where the coordinatesForCurrentCommerceLocation( ) method is successful, at the method may, as noted, convey the corresponding CLLocation information to the autoLocateForCurrentCommerceLocation( ) method of the autoLocationConductor object.

In response, the autoLocateForCurrentCommerceLocation( ) method of the autoLocationConductor object may instantiate a corresponding AutoLocatorData object and return it to the configureForCurrentCommerceLocation(_:) method of the settingsForCurrentCommerceLocationConcierge object (439).

With reference to the above-provided description of the AutoLocatorData type, under the circumstance of CLBeacon information (i.e., where 439 is reached via 417), the AutoLocatorData object may have its autoInfoKind property set to AutoInfoKind.Beacon, its beaconData property set to hold the CLBeacon data yielded by the beaconForCurrentCommerceLocation( ) method, and its geoCoordinates property set via employ of CLLocation.init( ) (e.g., causing the geoCoordinates property to hold zeroed-out latitude and longitude information). Likewise, under the circumstance of CLLocation information (i.e., where 439 is reached via 437), the AutoLocatorData object may have its autoInfoKind property set to AutoInfoKind.Coord, its geoCoordinates property set to hold the CLLocation data yielded by the coordinatesForCurrentCommerceLocation( ) method, and its beaconData property set via employ of CLBeacon.init( ).

As discussed where the beaconForCurrentCommerceLocation( ) is unsuccessful, coordinatesForCurrentCommerceLocation( ) is attempted. Where coordinatesForCurrentCommerceLocation( ) is also unsuccessful coordinatesForCurrentCommerceLocation( ) may throw an error to the autoLocateForCurrentCommerceLocation( ) method of the autoLocationConductor object (435). In response, the autoLocateForCurrentCommerceLocation( ) method of the autoLocationConductor object may throw an error to the configureForCurrentCommerceLocation(_:) method of the settingsForCurrentCommerceLocationConcierge object (441).

In response to catching the error thrown in 441, the configureForCurrentCommerceLocation(_:) method of the settingsForCurrentCommerceLocationConcierge object may call an interactiveLocateForCurrentCommerceLocation( ) method of a interactiveLocationConductor object. The interactiveLocateForCurrentCommerceLocation( ) method may have the declaration:

```
func interactiveLocateForCurrentCommerceLocation( ) throws ->
    InteractiveLocatorData
``` where the declaration indicates that the method may take no parameters, indicates, by the inclusion of the keyword "throws," that the method may be capable of throwing an error, and indicates that the method may have a return type of InteractiveLocatorData.

The InteractiveLocatorData type may be defined as a struct:

```
struct InteractiveLocatorData {
    var interactiveInfoKind: InteractiveInfoKind
    var panorama: [UIImage]
    var qrCode: String
    var userFreeTextDescription: String
}.
```

As such, the struct may include a property interactiveInfoKind of type InteractiveInfoKind, an enum which will be discussed momentarily. The struct may also include a property panorama of type [UIImage] (i.e., array of UIImage objects). According to the Swift/Apple frameworks-based pseudocode employed herein, UIImage may provide functionality including storage and management of image data. The struct may also include a property qrCode of type String, and a property userFreeTextDescription of type String. As is discussed in further detail hereinbelow, the panorama property may be employed to store images of a commerce location captured by a user device, the qrCode property may be employed to store data read by a user device from a QR code situated at a commerce location, and the userFreeTextDescription property may be employed to store user-entered text providing a user-penned description of a commerce location.

Returning to InteractiveInfoKind, InteractiveInfoKind may be defined as an enum:

```
enum InteractiveInfoKind {
    case Pano
    case QR
    case Descript
    case Zero
},
``` such that an instantiated InteractiveInfoKind object may hold the value InteractiveInfoKind.Pano, InteractiveInfoKind.QR, InteractiveInfoKind.Descript, or InteractiveInfoKind.Zero.

As is discussed in greater detail herein, this enum type may be employed in connection with an instance of an InteractiveLocatorData struct to indicate the data held by the struct instance. For instance, the interactiveInfoKind variable of an AutoLocatorData struct instance may be set to InteractiveInfoKind.Pano where the struct instance has been loaded with commerce location images, InteractiveInfoKind.QR where the struct instance has been loaded QR code data, or InteractiveInfoKind.Descript where the struct instance has been loaded with commerce location descriptive textual data. The interactiveInfoKind property of an InteractiveLocatorData struct instance may be set to InteractiveInfoKind.Zero should the need arise for there to be an InteractiveLocatorData struct instance which holds neither image data, QR data, nor textual data (e.g., an InteractiveLocatorData struct instance which may hold no or zero-value data while awaiting data acquisition and/or under the circumstance where data acquisition is not successful).

At 443, the interactiveLocateForCurrentCommerceLocation( ) method of the interactiveLocationConductor object may cause a GUI to display to the user choices for determining the identity of the commerce location in which her device is currently situated (e.g., a GUI button may be provided for each option). In particular the user may be presented with the options of employing her device to capture a panorama of the commerce location, employing her device to read a QR code at the commerce location, or employing her device to provide a description of the commerce location. According to one or more embodiments, the user may be able to describe the commerce location via either or both of text entry (e.g., via employ of an on-screen or physical keyboard) and voice (e.g., with text-to-speech functionality being employed to convert the user's spoken words to text).

Where the user employs the GUI to select panorama capture, the interactiveLocateForCurrentCommerceLocation( ) method of the interactiveLocationConductor object may call a panoForCurrentCommerceLocation( ) method of a panoCapture object (445, 447). Where the user employs the GUI to select QR code reading, the interactiveLocateForCurrentCommerceLocation( ) method may call a qrForCurrentCommerceLocation( ) method of a qrCapture object (445, 477). Where the user employs the GUI to select provision of a commerce location description, the interactiveLocateForCurrentCommerceLocation( ) method may call a descriptionForCurrentCommerceLocation( ) method of a descriptionCapture object (445, 4101).

The panoForCurrentCommerceLocation( ) method may have the declaration:

func panoForCurrentCommerceLocation( ) method throws→[UIImage], where the declaration indicates that the method may take no parameters, indicates, by the inclusion of the keyword "throws," that the method may be capable of throwing an error, and indicates that the method may have a return value of type [UIImage].

The qrForCurrentCommerceLocation( ) method may have the declaration:

func qrForCurrentCommerceLocation( ) method throws→String, where the declaration indicates that the method may take no parameters, indicates, by the inclusion of the keyword "throws," that the method may be capable of throwing an error, and indicates that the method may have a return value of type String.

The descriptionForCurrentCommerceLocation( ) method may have the declaration:

func descriptionForCurrentCommerceLocation( ) method throws→String, where the declaration indicates that the method may take no parameters, indicates, by the inclusion of the keyword "throws," that the method may be capable of throwing an error, and indicates that the method may have a return value of type String.

The circumstance where the user selects panorama capture will now be discussed in greater detail. As noted, where the user selects panorama capture at 445, flow may proceed to 447 where the panoForCurrentCommerceLocation( ) method of the panoCapture object is called. The called panoForCurrentCommerceLocation( ) method may, via a GUI of the user device, instruct the user to hold up her device while turning her body so that the panorama may be captured. It is noted that during capture the GUI may present to the user an active display of that which is being captured along with the capability of canceling capture (e.g., via a GUI button for requesting capture cancel). At 449 the called panoForCurrentCommerceLocation( ) method may request instantiation of an AVCaptureSession object. According to the Swift/Apple frameworks-based pseudocode employed herein, an instantiated AVCaptureSession object may provide functionality including coordinating data flow from AV-type inputs (e.g., video/image inputs) to AV-type outputs (e.g., outputs regarding storing and/or processing of video).

At 455, the panoForCurrentCommerceLocation( ) method may request instantiation of an AVCaptureDevice object which represents a camera of the user device (e.g., allowing for receipt of image data produced by the camera). For instance, such instantiation may involve calling AVCaptureDevice.defaultDeviceWithMediaType(AVMediaTypeVideo) so as to yield a instantiated AVCaptureDevice object which corresponds to the user device's default video-capable camera.

At 457, the panoForCurrentCommerceLocation( ) method may request instantiation of a AVCaptureDeviceInput object corresponding to the instantiated AVCaptureDevice object. The resultant AVCaptureDeviceInput object may allow the user device camera to act as an input to the noted instantiated AVCaptureSession object. Where, for instance, the instantiated AVCaptureDevice object has the name userCamera, AVCaptureDeviceInput.deviceInputWithDevice(device: userCamera) might be called. Because as per the Swift/Apple frameworks pseudocode employed herein such calling may throw an error, the calling may be implemented such that a thrown error is addressed. Further at 457 the instantiated AVCaptureDeviceInput object may, by the panoForCurrentCommerceLocation( ) method, be set as an input of the instantiated AVCaptureSession object.

At 459 the panoForCurrentCommerceLocation( ) method may request instantiation of an AVCaptureVideoDataOutput object. As per the Swift/Apple frameworks pseudocode employed herein, an instantiated AVCaptureVideoDataOutput object may direct video frames from an instantiated AVCaptureSession object to a called captureOutput(_:didOutputSampleBuffer:fromConnection:) delegate method. Further at 459 the instantiated AVCaptureVideoDataOutput object may, by the panoForCurrentCommerceLocation( ) method, be set as an output of the instantiated AVCaptureSession object.

At 461, the panoForCurrentCommerceLocation( ) method may set the panoCapture object to be a delegate object for the instantiated AVCaptureVideoDataOutput object. In connection with so setting the panoCapture object to be the delegate object, the default serial queue may be specified. The panoCapture object may implement the noted captureOutput(_:didOutputSampleBuffer:fromConnection:) delegate method. As a delegate object for the instantiated AVCaptureVideoDataOutput object, the panoCapture object may have this delegate method called by the instantiated AVCaptureVideoDataOutput object when a device-captured video frame becomes available.

At 463, the panoForCurrentCommerceLocation( ) method may call a startRunning( ) method on the instantiated AVCaptureSession object. As per the Swift/Apple frameworks-based pseudocode employed herein, such method call may serve to instruct the instantiated AVCaptureSession object to initiate capture of video frames using the device camera by starting data flow from the input of the instantiated AVCaptureSession object to the output of the instantiated AVCaptureSession object.

At 465, the captureOutput(_:didOutputSampleBuffer:fromConnection:) delegate method of the panoCapture object may be called by the instantiated AVCaptureVideoDataOutput object. Such call may provide to the delegate method, in the form of a CMSampleBuffer object, a device-captured video frame which has become available. At 467 the delegate method may act to append the video frame to a UIImage array property of the panoCapture object. In performing such appending, the delegate method may act to obtain the CVImageBuffer corresponding to the received CMSampleBuffer object, create a Core Graphics (CG) bitmap graphics context corresponding to the CVImageBuffer, create a Quartz image corresponding to the bitmap graphics context, instantiate a UIImage object corresponding to the Quartz image, and add that UIImage object to the panoCapture object's UIImage array property.

With respect to 469 it is noted that where further device captured video frames become available flow may return to 465. Further video frames may become available where a stopRunning( ) method of the instantiated AVCaptureSession object has not been called. Where further device captured video frames do not become available flow may proceed to 471. Such may transpire where the stopRunning ( ) method is called on the instantiated AVCaptureSession object.

The noted UIImage array property of the panoCapture object may include in its declaration a didSet observer which fires when the array changes (e.g., when an element is added to the array). In particular, the didSet observer may be configured to compare the length of the array to an array target length value and to call stopRunning( ) on the instantiated AVCaptureSession object if the array's length is equal to the set target length. For instance, in the case where the UIImage array property of the panoCapture object has the name panoArray, the instantiated AVCaptureSession object has the name session, and the noted array target length is stored in an integer named targetLength, code in keeping with the following pseudocode may be employed:

```
var panoArray: [UIImage] = [UIImage]( ) {
    didSet {
        if panoArray.count == targetLength
            { session.stopRunning( )
            }
    }
}
```

As another example, a GUI presented to the user might provide an option to cancel panorama capture (e.g., a corresponding GUI button may be provided). The user indicating a desire to cancel frame capture (e.g., by activating the corresponding GUI button) may cause stopRunning ( ) to be called on the AVCaptureSession object.

The noted array target length might, as examples, be selected in order to acquire a certain number of seconds of video frames and/or to obtain a certain number of kilobytes or megabytes of video frames. The selection might take into account frame rate and/or capture resolution. For instance, where the noted value to which the length of the array is compared is selected with the goal of obtaining ten seconds of video and the video frame rate is 60 frames per second (FPS), the array target length may be set to 600.

The panoForCurrentCommerceLocation( ) method may pare down the quantity of frames corresponding to the UIImage array property of the panoCapture object (e.g., from the vantage point that the goal is a panorama collection of still images rather than a cine). Such paring down may involve keeping only every nth frame. Implementation may involve producing an array which contains only those elements of the UIImage array property for which (index number+1) is evenly divisible by the selected value of n.

As an illustration, suppose the above-discussed array target length value is, where the frame rate is 60 FPS, chosen to be 600 so as to yield ten seconds of frames. At 60 FPS such ten second of video may map to 600 frames. Then, turning towards the paring down, it might be desired to pare down to six frames. As such the noted value of n may be 100 such that the paring down involves keeping only every 100th frame. In keeping with this, the produced pared-down array might contain only those elements of the UIImage array property for which (index number+1) is evenly divisible by 100. As such, the produced pared-down array might contain from the UIImage array property the frames corresponding to each of the array indices 99, 199, 299, 399, 499, and 599.

At 471 the panoForCurrentCommerceLocation( ) method of the panoCapture object may ascertain whether or not an error condition exists. An error condition may exist, for instance, where the user has elected to cancel frame capture in accordance with the above-discussed. Where an error condition exists the panoForCurrentCommerceLocation( ) method may throw an error to the interactiveLocateForCurrentCommerceLocation( ) method of the interactiveLocationConductor object (473). Responsive to the thrown error the interactiveLocateForCurrentCommerceLocation( ) method may inform the user of the error via the user device's GUI. Then flow may return to 443 such that the user is re-presented with the choices for determining the identity of the commerce location within which her device is presently situated. Where an error condition does not exist the panoForCurrentCommerceLocation( ) method may convey the pared down UIImage array to the interactiveLocateForCurrentCommerceLocation( ) method (475).

The circumstance where the user selects QR code reading will now be discussed in greater detail. As noted, where the user selects QR code reading at 445, flow may proceed to where the qrForCurrentCommerceLocation( ) method of the qrCapture object is called. The called qrForCurrentCommerceLocation( ) method may, via a GUI of the user device, instruct the user to identify at the commerce location a QR code intended to help user devices identity the commerce location—e.g., a QR code including the text label "Want to pay using your device? Scan this QR code when your device asks you to do so." or similar—and to aim her device's camera at that QR code. It is noted that during QR code reading the user device may present to the user via a GUI an active display of that which is being captured by her device's camera along with the capability of canceling QR reading (e.g., via a GUI button for requesting QR reading cancellation). At 479 the called qrForCurrentCommerceLocation( ) method may request instantiation of an AVCaptureSession object of the sort discussed above.

At 481, the qrForCurrentCommerceLocation( ) method may request instantiation of an AVCaptureDevice object which represents a camera of the user device. For instance, such instantiation may involve calling AVCaptureDevice.defaultDeviceWithMediaType(AVMediaTypeVideo) so as to yield a instantiated AVCaptureDevice object which corresponds to the user device's default video-capable camera.

At 483, the qrForCurrentCommerceLocation( ) method may request instantiation of a AVCaptureDeviceInput object corresponding to the instantiated AVCaptureDevice object. With reference to that which is discussed in connection with panorama capture it is noted that the resultant AVCaptureDeviceInput object may allow the user device camera to act as an input to the noted instantiated AVCaptureSession object. Where, for instance, the instantiated AVCaptureDevice object has the name userCamera, AVCaptureDeviceInput.deviceInputWithDevice(device: userCamera) might be called. Because as per the Swift/Apple frameworks pseudocode employed herein such calling may throw an error, the calling may be implemented such that a thrown error is addressed. Also at 483 the instantiated AVCaptureDeviceInput object may, by the qrForCurrentCommerceLocation( ) method, be set as an input of the instantiated AVCaptureSession object.

At 485 the qrForCurrentCommerceLocation( ) method may request instantiation of an AVCaptureMetadataOutput object. As per the Swift/Apple frameworks pseudocode employed herein, an instantiated AVCaptureMetadataOutput object may direct video frames from an instantiated AVCaptureSession object to a called captureOutput(_:didOutputMetadataObjects:fromConnection:) delegate method. Further at the instantiated AVCaptureMetadataOutput object may, by the qrForCurrentCommerceLocation( ) method, be set as an output of the instantiated AVCaptureSession object.

At 487, the qrForCurrentCommerceLocation( ) method may set the qrCapture object to be a delegate object for the instantiated AVCaptureMetadataOutput object. In connection with so setting the qrCapture object to be the delegate object, the default serial queue may be specified. Also at 487 the metadataObjectTypes property of the instantiated AVCaptureMetadataOutput object may be set to indicate that the metadata of interest is metadata providing a decode of a QR code captured by the user device camera. As such the property may be set to the single-item array [AVMetadataObjectTypeQRCode].

The qrCapture object may implement the noted captureOutput(_:didOutputMetadataObjects:fromConnection:) delegate method. As a delegate object for the instantiated AVCaptureMetadataOutput object, the qrCapture object may have this delegate method called by the instantiated AVCaptureMetadataOutput object when metadata corresponding to device-captured video—in this case due to the above-noted setting of the metadataObjectTypes property metadata which provides a decode of a QR code captured by the user device camera—becomes available.

At 489, the qrForCurrentCommerceLocation( ) method may call a startRunning( ) method on the instantiated AVCaptureSession object. As per the Swift/Apple frameworks-based pseudocode employed herein, such method call may serve to instruct the instantiated AVCaptureSession object to initiate QR reading using the device camera by starting data flow from the input of the instantiated AVCaptureSession object to the output of the instantiated AVCaptureSession object.

At 491, the captureOutput(_:didOutputMetadataObjects:fromConnection:) delegate method of the qrCapture object may be called by the instantiated AVCaptureMetadataOutput object. Such call may provide to the delegate method, in the form of an array of AVMetadataObject objects, QR code metadata which has become available. At 493 the delegate method may act to access the stringValue property of the first element of the array.

At 495 the qrForCurrentCommerceLocation( ) method of the qrCapture object may ascertain whether or not an error condition exists. An error condition may exist, for instance, where the user has elected to cancel QR reading in accordance with the above-discussed. It is noted that the user so selecting cancellation may cause the qrForCurrentCommerceLocation( ) method to call a stopRunning( ) method on the instantiated AVCaptureSession object. Where an error condition exists the qrForCurrentCommerceLocation( ) method may throw an error to the interactiveLocateForCurrentCommerceLocation( ) method of the interactiveLocationConductor object (497). Responsive to the thrown error the interactiveLocateForCurrentCommerceLocation( ) method may inform the user of the error via the user device's GUI. Then flow may return to 443 such that the user is re-presented with the choices for determining the identity of the commerce location within which her device is presently situated. Where an error condition does not exist the qrForCurrentCommerceLocation( ) method may convey the noted accessed stringValue property to the interactiveLocateForCurrentCommerceLocation( ) method (499).

The circumstance where the user selects provision of a commerce location description will now be discussed in greater detail. As noted, where the user selects providing a commerce location description at 445, flow may proceed to 4101 where the descriptionForCurrentCommerceLocation( ) method of the descriptionCapture object is called.

At 4103 the called descriptionForCurrentCommerceLocation( ) method may, via a GUI of the user device, instruct the user to provide a textual description of the commerce location in which her user device is presently situated. Further at 4103 the descriptionForCurrentCommerceLocation( ) method may provide a GUI element which allows the user to submit such description. It is noted that further provided to the user may be the ability to cancel providing a commerce location textual description (e.g., a GUI button may be provided for requesting textual description provision cancellation).

The user instructions may, as examples, be provided via an instantiated UILabel or NSLabel object, and/or the element which allows the user to submit her description may be implemented via an instantiated UITextField or NSTextField object.

As an illustration, the user instructions provided to the user might state "Please describe in your own words the commerce location (e.g., store or restaurant) in which you stand and to which you desire to make a payment. For example, you might state 'Han's Crabs, Pacifica Calif.' or 'Han's Crabs, Paulson St, Pacifica Calif.' Increased detail in your description may make it easier for us to identify your commerce location."

At 4105 the user may provide her commerce location description response (e.g., via an on-screen or physical keyboard of the device) and descriptionForCurrentCommerceLocation( ) method may gather the corresponding text. Continuing with the example where an instantiated UITextField or NSTextfield object is plied to obtain the user's response, the descriptionForCurrentCommerceLocation( ) method may act to access the text property of the instantiated UITextField object or the stringValue property of the instantiated NSTextfield object.

At 4107 the descriptionForCurrentCommerceLocation( ) method of the descriptionCapture object may ascertain whether or not an error condition exists. An error condition may exist, for instance, where the user has elected to cancel textual description provision in accordance with the above-discussed. Where an error condition exists the descriptionForCurrentCommerceLocation( ) method may throw an error to the interactiveLocateForCurrentCommerceLocation( ) method of the interactiveLocationConductor object (4109). Responsive to the thrown error the interactiveLocateForCurrentCommerceLocation( ) method may inform the user of the error via the user device's GUI. Then flow may return to 443 such that the user is re-presented with the choices for determining the identity of the commerce location within which her device is presently situated. Where an error condition does not exist the descriptionForCurrentCommerceLocation( ) method may convey the noted gathered text corresponding to the user-provided commerce location description (e.g., the noted accessed stringValue property) to the interactiveLocateForCurrentCommerceLocation( ) method (4111).

Where the panoForCurrentCommerceLocation( ) is successful, at 475 the method may, as noted, convey the pared down UIImage array to the interactiveLocateForCurrentCommerceLocation( ) method of the interactiveLocationConductor object. Likewise, where the qrForCurrentCommerceLocation( ) method is successful, at 499 the method may, as noted, convey the discussed accessed stringValue property to the interactiveLocateForCurrentCommerceLocation( ) method of the interactiveLocationConductor object. Further likewise, where the descriptionForCurrentCommerceLocation( ) method is successful, at 4111 the method may, as noted, convey the discussed gathered text corresponding to the user-provided commerce location description to the interactiveLocateForCurrentCommerceLocation( ) method of the interactiveLocationConductor object.

In response, the interactiveLocateForCurrentCommerceLocation( ) method of the interactiveLocationConductor object may instantiate a corresponding InteractiveLocatorData object and return it to the configureForCurrentCommerceLocation(_:) method of the settingsForCurrentCommerceLocationConcierge object (4113).

With reference to the above-provided description of the InteractiveLocatorData type, under the circumstance of pared down UIImage array (i.e., where 4113 is reached via 475), the InteractiveLocatorData object may have its interactiveInfoKind property set to InteractiveInfoKind.Pano, its panorama property set to hold the pared down UIImage array yielded by the panoForCurrentCommerceLocation( ) method, each of its qrCode property and its userFreeTextDescription property set via employ of String( ) (e.g., causing each of these properties to hold an empty string). Likewise, under the circumstance of the discussed accessed stringValue property relating to QR code (i.e., where 4113 is reached via 499), the InteractiveLocatorData object may have its interactiveInfoKind property set to InteractiveInfoKind.QR, its qrCode property set to hold the stringValue property data relating to QR code yielded by the qrForCurrentCommerceLocation( ) method, its panorama property set via employ of [UIImage]( ) (e.g., causing the property to hold an empty array), and its userFreeTextDescription property set via employ of String( ) (i.e., causing the property to hold an empty string). Further likewise, under the circumstance of the discussed gathered text corresponding to the user-provided commerce location description (i.e., where 4113 is reached via 4111), the InteractiveLocatorData object may have its interactiveInfoKind property set to InteractiveInfoKind.Descript, its userFreeTextDescription property set to hold the gathered text corresponding to the user-provided description yielded by the descriptionForCurrentCommerceLocation( ) method, its panorama property set via employ of [UIImage]( ) (e.g., causing the property to hold an empty array). and its qrCode property set via employ of String( ) (e.g., causing the property to hold an empty string).

As per the foregoing, the configureForCurrentCommerceLocation(_:) method of the settingsForCurrentCommerceLocationConcierge object may possess either an AutoLocatorData object (i.e., where either of beaconForCurrentCommerceLocation( ) or coordinatesForCurrentCommerceLocation( ) is successful), or an InteractiveLocatorData object (i.e., where one of panoForCurrentCommerceLocation( ) qrForCurrentCommerceLocation( ) or descriptionForCurrentCommerceLocation( ) is employed). As referenced, where neither of beaconForCurrentCommerceLocation( ) nor coordinatesForCurrentCommerceLocation( ) is successful and autoLocateForCurrentCommerceLocation( ) throws an error, interactiveLocateForCurrentCommerceLocation( ) is called. In absence of the user electing cancelation via the GUI, at least panoForCurrentCommerceLocation( ) or descriptionForCurrentCommerceLocation( ) may be expected to succeed with the user capturing some frames or entering some text. The circumstance of captured frames or entered text being insufficient to yield commerce location determination is dealt with later hereinbelow.

Returning to 439, the configureForCurrentCommerceLocation(_:) method of the settingsForCurrentCommerceLocationConcierge object may in response to receipt of the AutoLocatorData object call a settingsForAutoLocatorData (_:)method of a settingsVendorConcierge object, passing as the parameter for the method call the AutoLocatorData object which it has received (4115). The functionalities of such settingsForAutoLocatorData(_:) method and such settingsVendorConcierge object are discussed in greater detail hereinbelow in connection with FIG. 5.

Returning to 4113, the configureForCurrentCommerceLocation(_:) method of the settingsForCurrentCommerceLocationConcierge object may in response to receipt of the InteractiveLocatorData object call a settingsForInteractiveLocatorData(_:)method of a settingsVendorConcierge object, passing as the parameter for the method call the InteractiveLocatorData object which it has received (4117). The functionalities of such settingsForInteractiveLocatorData(_:) method and such settingsVendorConcierge object are discussed in greater detail hereinbelow in connection with FIG. 5.

From 4115 flow may proceed to 4119 where the configureForCurrentCommerceLocation(_:) method, in reply to its call to the settingsForAutoLocatorData(_:) method, may receive a PosConfigData instance. In like vein, from 4117 flow may proceed to 4121 where the configureForCurrentCommerceLocation(_:) method, in reply to its call to the settingsForInteractiveLocatorData(_:) method, may receive a PosConfigData instance.

The PosConfigData type may be defined as a struct:

```
struct PosConfigData {
    var merchantID: Int
    var terminalID: String
    var gateway: NSURL
}.
```

As such, the struct may include a property merchantID of type Int, a property terminalID of type String, and a property gateway of type NSURL. According to the Swift/Apple frameworks-based pseudocode employed herein, NSURL may provide functionality including providing for storage of and access to URLs and components thereof. As is discussed in greater detail hereinbelow, the merchantID, terminalID, and gateway properties may be employed to convey, respectively, the merchant ID, terminal ID, and payment gateway URL which the user device should employ in exercising POS functionality for the commerce location in which the user device is presently situated.

From 4119 flow may proceed to 4123 where the configureForCurrentCommerceLocation(_:) method may call a setPosUsingPosConfigData(_:) method of a posTransactor object, passing as the sole parameter the received PosConfigData instance. In like vein, from 4121 flow may proceed to 4125 where the configureForCurrentCommerceLocation (_:) method may call a setPosUsingPosConfigData(_:) method of a posTransactor object, passing as the sole parameter the received PosConfigData instance.

The setPosUsingPosConfigData(_:) method may have the declaration:
  func setPosUsingPosConfigData(_ thePosConfigData: PosConfigData) throws,
where the declaration indicates that the method make take a single parameter of type PosConfigData, the single parameter having the local parameter name "thePosConfigData," that the single parameter may have no external parameter name, and that the method may be capable of throwing an error.

The setPosUsingPosConfigData(_:) method may respond to being called by accessing the merchant ID, terminal ID, and gateway information of thePosConfigData via code in line with the following pseudocode:

```
thePosConfigData.merchantID
thePosConfigData.terminalID
thePosConfigData.gateway.
```

The setPosUsingPosConfigData(_:) method may employ such accessed POS configuration in setting one or more properties of the posTransactor object. The posTransactor object may access such one or more properties in accessing a payment gateway responsive to a request from a device user to employ the device in making a payment at the commerce location in which her device is situated. For instance, a method of the posTransactor object may dispatch request to the payment gateway via the gateway URL, including in the request, among other items, the merchant ID and the terminal ID. Further details of such functionality are discussed in greater detail hereinbelow.

It is noted that the POS configuration data received by the user device has been discussed as being made up of merchant ID, terminal ID, and gateway URL. However, such set of data is for illustrative purposes only and such data set may include fewer items or a greater number of items. As examples, such data set might not include a terminal ID, might further include a login identifier for accessing the payment gateway, and/or might further include a password for accessing the payment gateway.

It is further noted that although the foregoing has discussed the scenario of first attempting an autolocation approach and attempting an interactive-location approach in the case where the autolocation approach is unsuccessful, such is for illustrative purposes only and other scenarios may be implemented. As one example, the interactive-location approach may first be attempted and the autolocation approach may then be attempted where the interactive-location approach fails. As another example only one of the autolocation approach or the interactive location approach may be pursued. As yet another example, a user may be given the choice of which of the autolocation approach and the interactive-location approach is to be pursued, and/or be given the choice as to which of these approaches should be attempted first and which of these approached should be attempted in the case where the first approach fails. Such user selection might be obtained via a GUI of the user device.

Figure 5A:
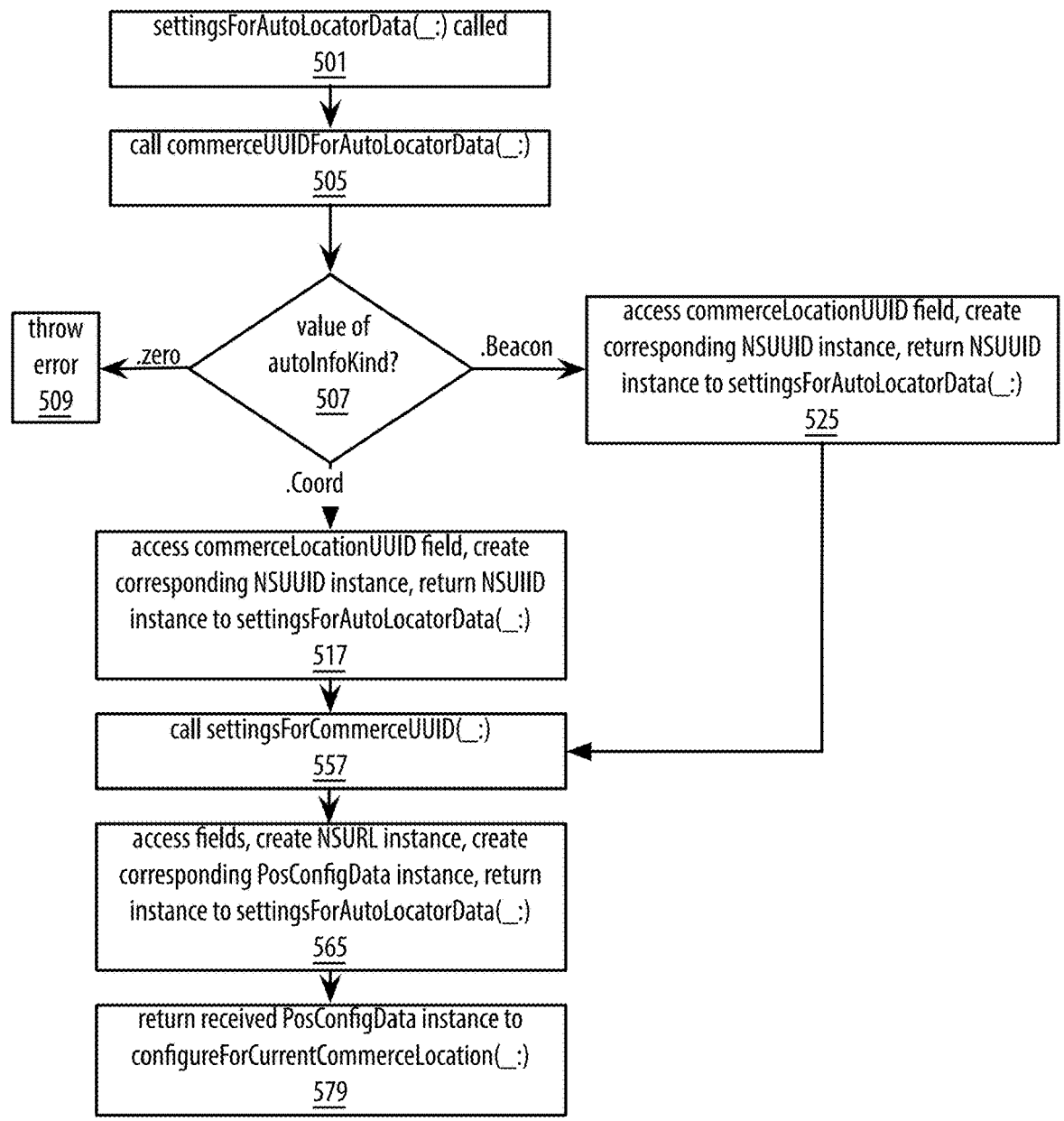
FIG. 5A-C shows a logic flow diagram illustrating embodiments for the POSAMS of a server-performed process by which settings which configure POS capabilities of a user device with respect to a particular commerce location are vended.
Figure 5B:
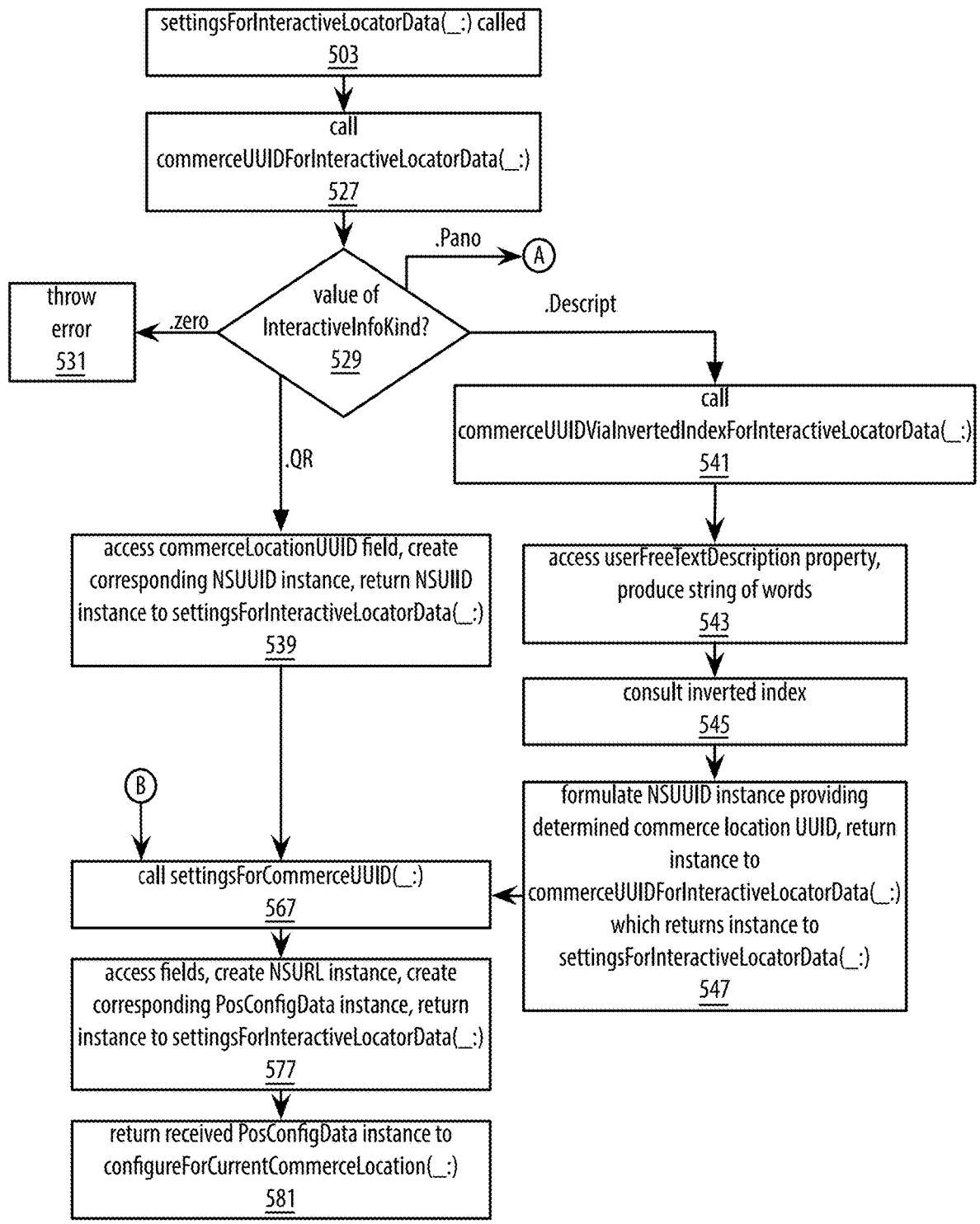
Figure 5C:
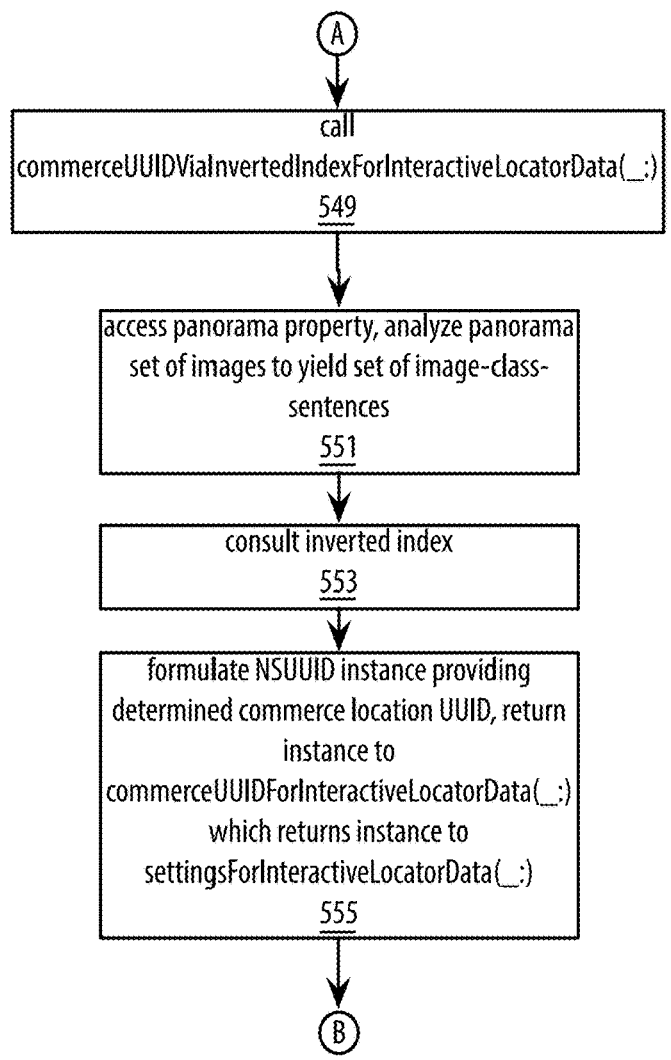

FIG. 5A-C shows a logic flow diagram illustrating embodiments of a server-performed process by which settings which configure POS capabilities of a user device with respect to a particular commerce location are vended. To facilitate discussion, the process of FIG. 5A-C may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 5*a-c* may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 501, a settingsForAutoLocatorData(_:) method of a settingsVendorConcierge object may be called. The method may have the declaration:

func settingsForAutoLocatorData(_ theAutoLocatorData: AutoLocatorData) throws→PosConfigData, where the declaration indicates that the method may take a single parameter of type AutoLocatorData, the single parameter having a local parameter name, which is used in the implementation of the method, "theAutoLocatorData," the single parameter, as indicated by the underscore ("_"), having no external parameter name. The declaration indicates, by the inclusion of the keyword "throws," that the method may be capable of throwing an error, and indicates that the method may have a return type of PosConfigData. The PosConfigData type will be discussed momentarily.

As discussed above, the configureForCurrentCommerceLocation(_:) method of the settingsForCurrentCommerceLocationConcierge object may receive an AutoLocatorData object. Such configureForCurrentCommerceLocation(_:) method may, in response to such receipt, call the settingsForAutoLocatorData(_:)method, passing as the parameter for the method call the AutoLocatorData object which it has received.

At 503, a settingsForInteractiveLocatorData(_:) method of the settingsVendorConcierge object may be called. The method may have the declaration:

func settingsForInteractiveLocatorData(_ theInteractiveLocatorData: InteractiveLocatorData) throws -> PosConfigData, where the declaration indicates that the method may take a single parameter of type InteractiveLocatorData, the single parameter having a local parameter name "theInteractiveLocatorData." The declaration indicates, by the inclusion of the keyword "throws," that the method may be capable of throwing an error, and indicates that the method may have a return type of PosConfigData which will be discussed momentarily.

As discussed above, the configureForCurrentCommerceLocation(_:) method of the settingsForCurrentCommerceLocationConcierge object may receive an InteractiveLocatorData object. Such configureForCurrentCommerceLocation(_:) method may, in response to such receipt, call the settingsForInteractiveLocatorData(_:)method, passing as the parameter for the method call the InteractiveLocatorData object which it has received.

Turning to the circumstance of the configureForCurrentCommerceLocation(_:) method of the settingsForCurrentCommerceLocationConcierge object receiving an AutoLocatorData object and, in response, calling the settingsForAutoLocatorData(_:)method with the AutoLocatorData object which it has received set as the parameter for the method call, the called settingsForAutoLocatorData(_:) method may at 505 call a commerceUUIDForAutoLocatorData(_:) method of a commerceUUIDDeterminer object, passing as the parameter for the method call the AutoLocatorData object.

The commerceUUIDForAutoLocatorData(_:) method may have the declaration:

func commerceUUIDForAutoLocatorData(_ theAutoLocatorData: AutoLocatorData) throws -> NSUUID, where the declaration indicates that the method may take a single parameter of type AutoLocatorData, the single parameter having a local parameter name "theAutoLocatorData." The declaration indicates, by the inclusion of the keyword "throws," that the method may be capable of throwing an error, and indicates that the method may have a return type of NSUUID. According to the Swift/Apple frameworks-based pseudocode employed herein, NSUUID may provide functionality including providing for storage of and access to UUIDs.

At 507 the commerceUUIDForAutoLocatorData(_:) method may examine the autoInfoKind property of the AutoLocatorData object which it has received, and determine whether the property holds the value AutoInfoKind.Coord, AutoInfoKind.Beacon, or AutoInfoKind.Zero. In the case where the property holds the value AutoInfoKind.Zero, flow may proceed to 509 where the commerceUUIDForAutoLocatorData(_:) method may throw an error to settingsForAutoLocatorData(_:).

In the case where the property holds the value AutoInfoKind.Coord, the commerceUUIDForAutoLocatorData(_:) method may access a store, using geographical coordinate information gleaned from the AutoLocatorData object which it has received, in order to learn of a commerce location UUID which corresponds to the geographical coordinate information. In keeping with the Swift/Apple frameworks-based pseudocode employed herein, the accessed store may be a Core Data-managed store. The Core Data-managed example store may, for example, be a database (e.g., SQLite), XML, or binary store.

Records in the Core Data-managed store (e.g., database) may be referred to as managed objects, Such a managed object may conform to an entity definition which defines one or more fields in terms of field name and field datatype. To facilitate discussion, the terms "record" and "managed object" will be used interchangeably hereinthroughout.

The records which the commerceUUIDForAutoLocatorData(_:) method will consider in learning of an appropriate commerce location UUID may conform to the entity definition:

| Field Name | Data Type |
| --- | --- |
| commerceLocationUUID | String |
| qrCodeString | String |
| beaconMajor | Integer 64 |
| beaconMinor | Integer 64 |
| latCoordLo | Double |
| latCoordHi | Double |
| longCoordLo | Double |
| longCoordHi | Double. |

Such entity may, for instance, be given the name CommerceUUIDEntity. As one example, a record conforming to this entity definition may hold data in accordance with the following:

| Field Name | Value |
|---|---|
| commerceLocationUUID | 4AB940DF-0838-48D9-A635-96FD90E699ED |
| qrCodeString | Wilson_Sporting_Store_#123 |
| beaconMajor | 1234 |
| beaconMinor | 987 |
| latCoordLo | 36.461567 |
| latCoordHi | 36.462067 |
| longCoordLo | −116.866967 |
| longCoordHi | −116.866367 |

As referenced, in the case where the autoInfoKind property of the received AutoLocatorData object holds the value AutoInfoKind.Coord, the commerceUUIDForAutoLocatorData(_:) method may access the Core Data-managed store (e.g., a database) in order to learn of a commerce location UUID which corresponds to the geographical coordinate information. Further details of such access will now be discussed.

As noted, the commerceUUIDForAutoLocatorData(_:) method's local parameter name for the received AutoLocatorData object is "theAutoLocatorData." With reference to the above-discussed definition of the AutoLocatorData struct type, it is observed that it is the geoCoordinates property of theAutoLocatorData which is of the type CLLocation and which holds geographical data including geographical coordinate information. Then, in keeping with the Swift/Apple frameworks pseudocode employed herein, for the type CLLocation it is the property coordinate, of type CLLocationCoordinate2D, which holds latitude and longitude information. In particular, latitude information is held in the latitude property of the noted coordinate property, and longitude information is held in the longitude property of the noted coordinate property. Such latitude and longitude properties are each of type CLLocationDegrees, a typealias for the type Double.

Bearing the aforementioned in mind, the commerceUUIDForAutoLocatorData(_:) method may access the latitude and the longitude as per the following pseudocode for latitude and longitude respectively:

```
theAutoLocatorData.geoCoordinates.Coordinate.latitude
theAutoLocatorData.geoCoordinates.Coordinate.longitude.
```

As is discussed in greater detail hereinbelow, the commerceUUIDForAutoLocatorData(_:) method accessing the Core Data-managed store may involve the instantiation of an NSPredicate object. With an eye towards satisfying the variable substitution expectations of the Swift/Apple frameworks pseudocode employed herein with respect to NSPredicate formulation, the commerceUUIDForAutoLocatorData(_:) method may instantiate string objects corresponding to the noted latitude and longitude properties as per the following pseudocode:

```
var longitudeString: String =
  String(theAutoLocatorData.geoCoordinates.Coordinate.longitude)
var latitudeString: String =
  String(theAutoLocatorData.geoCoordinates.Coordinate.latitude).
```

In accessing the Core Data-managed store so as to obtain a commerce location UUID corresponding to the latitude and longitude information, the commerceUUIDForAutoLocatorData(_:) method may formulate an NSFetchRequest object. In keeping with the Swift/Apple frameworks pseudocode employed herein, an instantiated NSFetchRequest object may provide functionality including specifying retrieval criteria for obtaining data from a Core Data-managed store (e.g., a database). As noted, a managed object record may conform to an entity definition. An entityName property of an NSFetchRequest object may be employed to specify the entity definition to which retrieved managed object records should conform. A predicate property of an instantiated NSFetchRequest object may be employed to provide one or more logical conditions which retrieved managed object records should meet. As such, the predicate property of an NSFetchRequest object may serve to further constrain, beyond that which is specified by the NSFetchRequest object's entityName property, criteria which retrieved managed objects should meet.

So as to indicate that obtained managed object records should conform to the above-discussed CommerceUUIDEntity entity the commerceUUIDForAutoLocatorData(_:) method may, via code in line with the following pseudocode, instantiate an NSFetchRequest having its entityName property set to specify the CommerceUUIDEntity entity:

```
var commerceUUIDFetchRequest = NSFetchRequest(entityName:
  "CommerceUUIDEntity").
```

It is noted that such serves to name the instantiated NSFetchRequest object "commerceUUIDFetchRequest."

As referenced, the AutoLocatorData.geoCoordinates.Coordinate.latitude and the AutoLocatorData.geoCoordinates.Coordinate.longitude may contain determined geographical coordinate information regarding the commerce location in which the user device is situated. Moreover, the discussed CommerceUUIDEntity contains the fields latCoordLo, latCoordHi, longCoordLo, and longCoordHi. Such fields may serve to indicate the latitude and longitude ranges within which user device-obtained commerce location coordinates should fall in order for that commerce location to be considered a match for the commerce location UUID specified by the record. Such latCoordLo, latCoordHi, longCoordLo, and longCoordHi fields might be thought of as specifying a geographical box.

Accordingly, and bearing in mind the above-discussed longitudeString and latitudeString string objects, at the commerceUUIDForAutoLocatorData(_:) method may, via code in line with the following pseudocode, set the predicate property of commerceUUIDFetchRequest to be an NSPredicate object specifying logical conditions which indicate that, in order for a record to be considered matching, the at-hand user device geographical coordinates should fall within the coordinate ranges indicated by the record:

```
commerceUUIDFetchRequest.predicate = NSPredicate(format: "%@ >=
LatCoordLo AND %@ <= LatCoordHi AND %@ >= LongCoordLo
AND %@ <= LongCoordHi", latitudeString, latitudeString,
longitudeString, longitudeString).
```

According to the Swift/Apple frameworks-based pseudocode employed herein, an NSManagedObjectContext instance allows for access to and modification of Core Data records. Taking such an instance to have the name managedObjectContext, the commerceUUIDForAutoLocatorData
(_:) method may make a method call as per the following
pseudocode to receive an array of managed object records
matching the above-constructed commerceUUIDFetchRequest:

```
var fetchResult =
    managedObjectContext.executeFetchRequest(commerceUUIDFetchRequest).
```

It is noted that "var fetchResult=" may serve to assign the array outputted by the method call to fetchResult. It is further noted that as such method call may, in keeping with the Swift/Apple frameworks-based pseudocode, throw an error, the call may be performed in a manner capable of handling an error which may be thrown.

As the set of records is expected to be such that there is no inter-record overlap among record-specified geographical regions (i.e., the regions specified by the latCoordLo, latCoordHi, longCoordLo, and longCoordHi fields), it is expected that the result array will contain only a single record, the single record being accessible via the zeroth index of the array. Then, with reference to the above-discussed definition of the CommerceUUIDEntity, it is the commerceLocationUUID field thereof which is of interest. As such the commerceLocationUUID field of interest may, at 517, be accessed as per the following Swift/Apple frameworks-based pseudocode:
fetchResult[0].valueForKey("commerceLocationUUID"),
yielding a string as per the discussed CommerceUUIDEntity specification. Further at 517 the commerceUUIDForAutoLocatorData(_:) method may, using NSUUID's init (UUIDString:) init method, create an NSUUID instance based on the string and return it to settingsForAutoLocatorData(_:).

In the case where the autoInfoKind property of the received AutoLocatorData object holds the value AutoInfoKind.Beacon, the commerceUUIDForAutoLocatorData(_:) method may access the discussed store (e.g., a Core Data-managed database) in order to learn of a commerce location UUID which corresponds to the beacon information. Further details of such access will now be discussed.

As noted, the commerceUUIDForAutoLocatorData(_:) method's local parameter name for the received AutoLocatorData object is "theAutoLocatorData." With reference to the above-discussed definition of the AutoLocatorData struct type, it is observed that it is the beaconData property of theAutoLocatorData which is of the type CLBeacon and which holds beacon data including beacon major value and beacon minor value. With reference to that which is discussed hereinabove, it is noted that theAutoLocatorData, under the circumstance of AutoInfoKind.Beacon being specified, reflects the CLLocation instance having been instructed to receive transmissions from beacons broadcasting a UUID which was specified to that instance. As such the major and minor values of the AutoLocatorData will correspond to that beacon UUID.

Then, in keeping with the Swift/Apple frameworks pseudocode employed herein, for the type CLBeacon it is the properties major and minor, both of type NSNumber, which, respectively, hold beacon major and beacon minor information. According to the Swift/Apple frameworks-based pseudocode employed herein an NSNumber instance may possess capabilities including providing a held value in the form of a desired C numeric type (e.g., as an int, double, or bool).

Bearing the aforementioned in mind, the commerceUUIDForAutoLocatorData(_:) method may access the beacon major and minor values as per the following pseudocode for major and minor respectively:

```
theAutoLocatorData.beaconData.major
theAutoLocatorData.beaconData.minor.
```

With an eye towards satisfying the variable substitution expectations of the Swift/Apple frameworks pseudocode employed herein with respect to NSPredicate formulation, the commerceUUIDForAutoLocatorData(_:) method may instantiate string objects corresponding to the noted major and minor properties as per the following Swift/Apple frameworks-based pseudocode:

```
var majorString: String = String(theAutoLocatorData.beaconData.major)
var minorString: String = String(theAutoLocatorData.beaconData.minor).
```

In accessing the Core Data-managed store so as to obtain a commerce location UUID corresponding to the major and minor information, the commerceUUIDForAutoLocatorData(_:) method may formulate an NSFetchRequest object.

So as to indicate that obtained managed object records should conform to the above-discussed CommerceUUIDEntity entity the commerceUUIDForAutoLocatorData(_:) method may, at 519 via code in line with the following pseudocode, instantiate an NSFetchRequest having its entityName property set to specify the CommerceUUIDEntity entity:

```
var commerceUUIDFetchRequest = NSFetchRequest(entityName:
    "CommerceUUIDEntity").
```

As discussed, theAutoLocatorData.beaconData.major and the AutoLocatorData.beaconData minor may contain major and minor beacon data received from a beacon located at the commerce location in which the user device is situated. Moreover, the discussed CommerceUUIDEntity contains the fields beaconMajor and beaconMinor. Such fields may serve to indicate the beacon major and minor values which should be received by a user device at a commerce location in order for that commerce location to be considered a match for the commerce location UUID specified by the record.

Accordingly, and bearing in mind the above-discussed majorString and minorString string objects, at 521 the commerceUUIDForAutoLocatorData(_:) method may, via code in line with the following pseudocode, set the predicate property of commerceUUIDFetchRequest to be an NSPredicate object specifying logical conditions which indicate that, in order for a record to be considered matching, the user device-received major and minor beacon values should match the beacon major and minor values indicated by the record:

```
commerceUUIDFetchRequest.predicate = NSPredicate(format:
   "%@ == beaconMajor AND %@ == beaconMinor",
   majorString, minorString).
```

Then taking the NSManagedObjectContext instance to have the name managedObjectContext, the commerceUUIDForAutoLocatorData(_:) method may, at 523, make a method call as per the following pseudocode to receive an array of managed object records matching the noted commerceUUIDFetchRequest:

```
var fetchResult =
   managedObjectContext.executeFetchRequest
   (commerceUUIDFetchRequest).
```

As such method call may, in keeping with the Swift/Apple frameworks-based pseudocode, throw an error, the call may be performed in a manner capable of handling an error which may be thrown.

As the set of records is expected to be such that a given beacon major/minor pair is only specified by a single record, it is expected that the result array will contain only one record, the one record being accessible via the zeroth index of the array. Then, with reference to the above-discussed definition of the CommerceUUIDEntity, it is the commerceLocationUUID field thereof which is of interest. As such the commerceLocationUUID field of interest may, at 525, be accessed as per the following Swift/Apple frameworks-based pseudocode:

fetchResult[0].valueForKey("commerceLocationUUID"), yielding a string as per the discussed CommerceUUIDEntity specification. Further at 525 the commerceUUIDForAutoLocatorData(_:) method may, using NSUUID's init (UUIDString:) init method, create an NSUUID instance based on the string and return it to settingsForAutoLocatorData(_:).

Although so as to facilitate discussion regarding the circumstance of the interactiveInfoKind property holding the value AutoInfoKind.Beacon has concerned finding a record setting forth beacon major and minor values matching those received from a commerce-location situated beacon, other possibilities exist. For instance, rather than major and minor values being the criteria for record matching, the criteria for matching may be any one, two, or three of beacon UUID, beacon major value, and beacon minor value. As one illustration the criterion may, of the three, be only beacon major value. As another illustration, the criterion may, of the three, only be beacon UUID. As yet another illustration, the criteria may, of the three, be beacon UUID and beacon major value.

Turning to the circumstance of the configureForCurrentCommerceLocation(_:) method of the settingsForCurrentCommerceLocationConcierge object receiving an InteractiveLocatorData object and, in response, calling the settingsForInteractiveLocatorData(_:)method with the InteractiveLocatorData object which it has received set as the parameter for the method call, the called settingsForInteractiveLocatorData(_:) method may at 527 call a commerceUUIDForInteractiveLocatorData(_:) method of a commerceUUIDDeterminer object, passing as the parameter for the method call the InteractiveLocatorData object.

The commerceUUIDForInteractiveLocatorData(_:) method may have the declaration:

```
func commerceUUIDForInteractiveLocatorData(_
   theInteractiveLocatorData: InteractiveLocatorData) throws -> NSUUID,
``` where the declaration indicates that the method may take a single parameter of type InteractiveLocatorData, the single parameter having a local parameter name "theInteractiveLocatorData." The declaration indicates, by the inclusion of the keyword "throws," that the method may be capable of throwing an error, and indicates that the method may have a return type of NSUUID.

At 529 the commerceUUIDForInteractiveLocatorData(_:) method may examine the InteractiveInfoKind property of the InteractiveLocatorData object which it has received, and determine whether the property holds the value InteractiveInfoKind.Pano, InteractiveInfoKind.QR, InteractiveInfoKind.Descript, or InteractiveInfoKind.Zero. In the case where the property holds the value InteractiveInfoKind.Zero, flow may proceed to 531 where the commerceUUIDForAutoLocatorData(_:) method may throw an error to settingsForAutoLocatorData(_:).

In the case where the interactiveInfoKind property of the received InteractiveLocatorData object holds the value InteractiveInfoKind.QR, the commerceUUIDForInteractiveLocatorData(_:) method may access the discussed store (e.g., a Core Data-managed database) in order to learn of a commerce location UUID which corresponds to the QR code information.

As noted, the commerceUUIDForInteractiveLocatorData(_:) method's local parameter name for the received InteractiveLocatorData object is "theInteractiveLocatorData." With reference to the above-discussed definition of the InteractiveLocatorData struct type, it is observed that it is the qrCode property of theInteractiveLocatorData which holds QR code data as a string. The commerceUUIDForInteractiveLocatorData(_:) method may access the QR codes as per the following pseudocode theInteractiveLocatorData.qrCode.

In accessing the Core Data-managed store so as to obtain a commerce location UUID corresponding to the QR code information, the commerceUUIDForInteractiveLocatorData(_:) method may formulate an NSFetchRequest object.

So as to indicate that obtained managed object records should conform to the above-discussed CommerceUUIDEntity entity the commerceUUIDForInteractiveLocatorData(_:) method may, via code in line with the following pseudocode, instantiate an NSFetchRequest having its entityName property set to specify the CommerceUUIDEntity entity:

```
var commerceUUIDFetchRequest = NSFetchRequest(entityName:
   "CommerceUUIDEntity").
```

As discussed, theInteractiveLocatorData.qrCode may contain QR tag data scanned at the commerce location in which the user device is situated. Moreover, the discussed CommerceUUIDEntity contains the field qrCodeString. Such field may serve to indicate the QR tag data which should be scanned by a user device at a commerce location in order for that commerce location to be considered a match for the commerce location UUID specified by the record.

The commerceUUIDForInteractiveLocatorData(_:) method may, via code in line with the following pseudocode, set the predicate property of commerceUUIDFetchRequest to be an NSPredicate object specifying logical conditions which indicate that, in order for a record to be considered matching, the user device-scanned QR tag data should match the QR code data indicated by the record:

```
commerceUUIDFetchRequest.predicate = NSPredicate(format: "%@ == qrCodeString", theInteractiveLocatorData.qrCode).
```

Then taking the NSManagedObjectContext instance to have the name managedObjectContext, the commerceUUIDForInteractiveLocatorData(_:) method may make a method call as per the following pseudocode to receive an array of managed object records matching the noted commerceUUIDFetchRequest:

```
var fetchResult =
    managedObjectContext.executeFetchRequest
    (commerceUUIDFetchRequest).
```

As such method call may, in keeping with the Swift/Apple frameworks-based pseudocode, throw an error, the call may be performed in a manner capable of handling an error which may be thrown.

As the set of records is expected to be such that a given QR code value is only specified by a single record, it is expected that the result array will contain only one record, the one record being accessible via the zeroth index of the array. Then, with reference to the above-discussed definition of the CommerceUUIDEntity, it is the commerceLocationUUID field thereof which is of interest. As such the commerceLocationUUID field of interest may, at 539, be accessed as per the following Swift/Apple frameworks-based pseudocode:

fetchResult[0].valueForKey("commerceLocationUUID"), yielding a string as per the discussed CommerceUUIDEntity specification. Further at 539 the commerceUUIDForInteractiveLocatorData(_:) method may, using NSUUID's init (UUIDString:) init method, create an NSUUID instance based on the string and return it to settingsForInteractiveLocatorData(_:).

It is noted that although the foregoing has discussed an approach including consulting a Core Data-managed store (e.g., a database) in order to learn of a commerce location UUID in view of a scanned QR code, other possibilities exist. For instance a QR code placed at a commerce location may directly set forth as its data the commerce location UUID of the commerce location in which it is placed. The commerceUUIDForInteractiveLocatorData(_:) method may respond to settingsForInteractiveLocatorData(_:) by accessing the QR code in accordance with the pseudocode theInteractiveLocatorData.qrCode, employing the resultant string with NSUUID's init(UUID String:) to yield an NSUUID object, and then returning that NSUUID object to settingsForInteractiveLocatorData(_:).

In the case where the interactiveInfoKind property of the received InteractiveLocatorData object holds the value InteractiveInfoKind.Descript, the commerceUUIDForInteractiveLocatorData(_:) method of the commerceUUIDDeterminer object may, at 541, call a commerceUUIDViaInvertedIndexForInteractiveLocatorData(_:) method of the commerceUUIDDeterminer object, passing as the parameter for the method call the InteractiveLocatorData object which it had earlier received.

The commerceUUIDViaInvertedIndexForInteractiveLocatorData(_:) method may have the declaration:

```
func commerceUUIDViaInvertedIndexForInteractiveLocatorData(_
    theInteractiveLocatorData: InteractiveLocatorData) throws -> NSUUID,
``` where the declaration indicates that the method may take a single parameter of type InteractiveLocator Data, the single parameter having a local parameter name "theInteractiveLocatorData." The declaration indicates, by the inclusion of the keyword "throws," that the method may be capable of throwing an error, and indicates that the method may have a return type of NSUUID. Responsive to the call, the commerceUUIDViaInvertedIndexForInteractiveLocatorData(_:) method may check the value of the InteractiveInfoKind property of the InteractiveLocatorData object which it has received (i.e., of the object having the internal parameter name theInteractiveLocatorData). Bearing in mind the particular InteractiveLocatorData object which it has received, the method may find this property to have the value InteractiveInfoKind.Descript.

At 543, the method may access the userFreeTextDescription string property of theInteractiveLocatorData. Further at 543 the method may, leveraging the Swift/Apple frameworks pseudocode employed herein, call componentsSeparatedByString(_:) on the accessed string property, passing as the parameter to the method call the string corresponding to a space character. In response to the method call the commerceUUIDViaInvertedIndexForInteractiveLocatorData(_:) method may receive an array of strings, each element of the string array corresponding to one of the words of the userFreeTextDescription property. It is noted that, in one or more embodiments, the string accessed via the property may be preprocessed prior to the componentsSeparatedByString(_:) method call to, for instance, replace tab characters with space characters, compact contiguous runs of multiple space characters into a single space character and/or to remove punctuation marks.

The commerceUUIDViaInvertedIndexForInteractiveLocatorData(_:) method may have access to an inverted array which serves to relate commerce location UUIDs with strings describing these commerce locations. Such descriptive strings might, as one example, be acquired by sending individuals to commerce locations with known commerce location UUIDs and asking those users to submit self-penned descriptive strings describing the commerce locations, As another example, such descriptive stings might be acquired by, in the case where a user has plied her device in identifying the commerce UUID for her commerce location in fashion other than by her having entered text (e.g., where the commerce location UUID determination occurred via her device having received major and minor values from a beacon situated at the commerce location), requesting, via a GUI of the device, that the user provide a self-penned description of the commerce location. The GUI might encourage the user to do so by explaining that she may help to improve user experiences.

Such received descriptive strings might be grouped according to corresponding commerce location UUID. For the purposes of the inverted index, the totality of descriptive strings corresponding to a particular commerce UUID may be considered to be a document whose title is that UUID.

The construction of the inverted index may involve for each such document compiling a list of the word which appear in the document along with the number of times each word appears. Consideration of that which constitutes a word may be case-insensitive. Moreover, in one or more embodiments words which are considered to be synonyms of each other might be taken to be a single word for the purposes of the inverted index (e.g., "hamburger" and "burger" might be considered to be a single word for the purposes of the index. Alternately or additionally, in one or more embodiments singular and plural versions of a word may be considered to be a single word for the purposes of the inverted index (e.g., "burger" and "burgers" might be considered to be the same word for the purposes of the inverted index.

As an illustration, suppose that a for first commerce location UUID the corresponding document was made up of the descriptive string "smith sporting goods sf," "smith sporting goods san Francisco," "smith sporting goods Wilson street," and "smith sports sf." Further suppose that for a second commerce location UUID the corresponding document was made up of the descriptive strings "smith sporting goods los angeles," "smith sporting goods palmer street," and "smith sports la." The corresponding inverted index may then be as follows:

| word | number of occurrences for document: first commerce location UUID | number of occurrences for document: second commerce location UUID |
| --- | --- | --- |
| smith | 4 | 4 |
| sporting | 3 | 3 |
| goods | 3 | 3 |
| sf | 2 | 0 |
| sports | 1 | 1 |
| wilson | 1 | 0 |
| street | 1 | 1 |
| san | 1 | 0 |
| francisco | 1 | 0 |
| la | 0 | 2 |
| palmer | 0 | 1 |
| los | 0 | 1 |
| angeles | 0 | 1 |

The employ of such an inverted index by the commerceUUIDViaInvertedIndexForInteractiveLocatorData(_:) method will now be discussed.

The method possesses an array of strings, each element of the string corresponding to one of the words of the at-hand userFreeTextDescription property. As an illustration suppose that the userFreeTextDescription property holds the string "smith sports Wilson san Francisco," leading to the noted string array being ["smith", "sports", "wilson", "san", "francisco"].

At 545 the commerceUUIDViaInvertedIndexForInteractiveLocatorData(_:) method may consult the inverted index, with respect to each commerce UUID document of the index, to learn how many times each word of the noted string array appears within each document of the index. Then, the method may, with respect to each such document, sum the total number of word occurrences over all words. As such, continuing with the example so consulting the inverted index may yield the following:

| word | number of occurrences for document: first commerce location UUID | number of occurrences for document: second commerce location UUID |
| --- | --- | --- |
| smith | 4 | 4 |
| sports | 1 | 1 |
| wilson | 1 | 0 |
| san | 1 | 0 |
| francisco | 1 | 0 |
| SUM = | 8 | 5 |

The method may then select the document with the largest such sum as the document whose corresponding commerce UUID maps to the commerce location in which the user device is situated. It is noted that where such consideration yields a tie—say the largest such sum value was 7 but three different commerce location UUID-corresponding documents gave that sum—the method may throw an error. It is additionally noted that such a tie—and therefore such a thrown error—may correspond to the circumstance of entered text being insufficient to yield commerce location determination (e.g., entered text which is poorly worded and/or of too short a length may cause the inverted index to return insignificant results and therefore a tie).

Continuing with the illustration, the method may find that the discussed sum is 8 for the document corresponding to the first commerce location UUID and 5 for the document corresponding to the second commerce location UUID. As such the method may consider the first commerce location UUID to be the commerce location UUID for the commerce location in which the user device is situated.

At 547 the commerceUUIDViaInvertedIndexForInteractiveLocatorData(_:) may formulate an NSUUID instance conveying the UUID corresponding to the document yielding the highest noted sum, and return such NSUUID to commerceUUIDForInteractiveLocatorData(_:) which may in turn return such NSUUID to settingsForInteractiveLocatorData(_:).

In the case where the interactiveInfoKind property of the received InteractiveLocatorData object holds the value InteractiveInfoKind.Pano, the commerceUUIDForInteractiveLocatorData(_:) method of the commerceUUIDDeterminer object may, at 549, call the commerceUUIDViaInvertedIndexForInteractiveLocatorData(_:) method of the commerceUUIDDeterminer object, passing as the parameter for the method call the InteractiveLocatorData object which it had earlier received.

Responsive to the call, the commerceUUIDViaInvertedIndexForInteractiveLocatorData(_:) method may check the value of the InteractiveInfoKind property of the InteractiveLocatorData object which it has received (i.e., of the object having the internal parameter name theInteractiveLocatorData). Bearing in mind the particular InteractiveLocatorDataObject which it has received, the method may find this property to have the value InteractiveInfoKind.Pano.

At 551, the method may access the panorama property of theInteractiveLocatorData. As discussed herein above, the commerceUUIDViaInvertedIndexForInteractiveLocatorData(_:) method when employed in connection with strings providing commerce location descriptions may employ an inverted index based on per-commerce location UUID documents, the document for a particular commerce location UUID being made of up sentences describing the commerce location, each sentence being made up of words. In one or more embodiments an analogous approach may be employed with respect to panoramas. In particular, a given image of a panorama set of image may be classifiable with respect to color set (e.g., based on an analysis of which colors do and do not appear in the image and how often such colors appear). For instance an image might be classifiable into one of C color sets. Alternately or additionally, a panorama set image may be classifiable with respect to edge features (e.g., based on the application of an edge detection filter). For instance an image might be classifiable into one of E edge type sets. Further alternately or additionally a panorama set image might be classifiable with respect to dither pattern and/or other pattern features (e.g., based on the application of a dither pattern and/or other pattern recognition filter). For instance, an image might be classifiable into one of P type sets. The various set classifications might be established by applying image analysis and classification to a, perhaps large, set of test and/or other images. As an illustration, such work might yield the establishment of 256 color set classes, 256 edge classes, and 256 pattern classes.

The color set classification, edge set classification, and pattern set classification for a given might may each be considered to be a "word" of a "sentence" corresponding to that image. As an illustration, where an image was assigned to color set class 003, edge set class 129, and pattern class 133, the "sentence" for that image may be "colorSetClass003 edgeClass129 patternClass133," the words of the sentence being "colorSetClass003," "edgeClass129," and "patternClass133." As the panorama capture for a given commerce location may typically be an array of multiple images, such a panorama may lead to multiple "sentences." Such "words" and "sentences" may be employed in a manner analogous to the linguistic words and sentences discussed hereinabove in connection with the userFreeText-Description property.

As such, further at 551 the commerceUUIDViaInverted-IndexForInteractiveLocatorData(_:) method, having accessed the panorama [UIImage] array property, may act to convert each image of the array into image-class-sentences of the sort discussed above which are made up of image-class-words of the sort discussed above. As an illustration, a two image panorama may yield the two image-class sentences "colorSetClass100 edgeClass066 patternClass111" and "colorSetClass021 edgeClass222 patternClass055."

Analogous to that which is discussed in connection with the userFreeTextDescription property—with image-class-words filling the role of the discussed linguistic words and image-class-sentences filling the role of the discussed linguistic sentences—the commerceUUIDViaInvertedIndex-ForInteractiveLocatorData(_:) method may have access to an inverted index which serves to relate commerce location UUIDs with image-class-sentences describing those commerce locations. Such image-class-sentences might be collected in a manner analogous to that discussed in connection with descriptive strings (e.g., individuals might be sent to commerce locations with known commerce location UUIDs and talked with capturing panorama of which would then be transformed into image-class-sentences.

At 553 the method may in a manner analogous to that discussed hereinabove with respect to the userFreeTextDescription property consult the image-class-sentence-based inverted index to learn how many times each image-class-word of the one or more image-class-sentences corresponding to the one or more images of the panorama appears within each image-class-word-based document of the inverted index. Then the method may, with respect to each such image-class-word-based document, sum the total number of image-class-word occurrences over all image-class-words.

At 555, the method may formulate an NSUUID instance indicating the UUID corresponding to the image-class-word-based document yielding the highest noted sum, and return such NSUUID to commerceUUIDForInteractiveLocatorData(_:) which may in turn pass such NSUUID to settingsForInteractiveLocatorData(_:).

As an illustration in line with the foregoing, suppose the following example inverted index relating to two image-class-word-based documents:

| Image-class-word | number of occurrences for document: first commerce location UUID | number of occurrences for document: second commerce location UUID |
|---|---|---|
| colorSetClass007 | 4 | 4 |
| colorSetClass089 | 3 | 3 |
| edgeClass123 | 3 | 3 |
| edgeClass106 | 2 | 0 |
| patternClass129 | 1 | 1 |
| edgeClass222 | 1 | 0 |
| edgeClass202 | 1 | 1 |
| colorSetClass199 | 1 | 0 |
| patternClass101 | 1 | 0 |
| patternClass196 | 0 | 2 |
| edgeClass219 | 0 | 1 |
| colorSetClass213 | 0 | 1 |
| patternClass211 | 0 | 1 |

Further according to the illustration, suppose that the at-hand panorama is made up of two frames, the first frame yielding the image-class-sentence "colorSetClass007 patternClass129 edgeClass222" and the second frame yielding the image-class sentence "colorSetClass199 patternClass101 edgeClass202." In keeping with this the commerceUUIDViaInvertedIndexForInteractiveLocatorData(_:) method may consult the inverted index, with respect to each commerce UUID image-class-word-based document of the index, to learn how many time each image-class-word of the two image-class-sentences of the two frames taken together appears within each image-class-word-based document of the inverted index. Then the commerceUUIDViaInvertedIndexForInteractiveLocatorData(_:) method may, with respect to each such document, sum the total number of image-class-word occurrences over all image-class-words. As such, continuing with the illustration, so consulting the inverted index may yield the following:

| Image-class-word | number of occurrences for document: first commerce location UUID | number of occurrences for document: second commerce location UUID |
|---|---|---|
| colorSetClass007 | 4 | 4 |
| patternClass129 | 1 | 1 |
| edgeClass222 | 1 | 0 |
| colorSetClass199 | 1 | 0 |
| patternClass101 | 1 | 0 |
| edgeClass202 | 1 | 1 |
| SUM = | 9 | 6 |

The method may then select the image-class-word-based document with the largest such sum as the document whose corresponding commerce UUID is the commerce UUID for the commerce location in which the user device is situated. As such, continuing with the illustration the commerceUUIDViaInvertedIndexForInteractiveLocatorData(_:) method may consider the first commerce location UUID to be the commerce location UUID for the commerce location in which the user device is situated. It is noted that where such consideration yields a tie the method may throw an error. It is additionally noted that such a tie—and therefore such a thrown error—may correspond to the circumstance of captured frames being insufficient to yield commerce location determination (e.g., captured frames which are poorly imaged may cause the inverted index to return insignificant results and therefore a tie).

Although the operation of commerceUUIDViaInvertedIndexForInteractiveLocatorData(_:) has been discussed in terms of inverted index employ, other possibilities exist. For example, neural network and/or machine learning approach may be employed. Under such circumstance the commerceUUIDViaInvertedIndexForInteractiveLocatorData(_:) method may instead be named commerceUUIDViaLearningForInteractiveLocatorData(_:). Turning to the user-penned commerce location textual descriptions, training of the neural network or other machine learning entity may involve collected descriptive strings as discussed above (e.g., sending individuals to locations with known commerce location UUIDs and asking them to submit self-penned descriptive strings) and providing to such neural network or other machine learning entity collected descriptive strings along with specification of the commerce location UUID to which each descriptive string corresponds. The neural network or other machine learning entity, thusly trained, the commerceUUIDViaLearningForInteractiveLocatorData(_:) method may receive a descriptive string via the userFreeTextDescription Property of a received InteractiveLocatorData object, pas the string to the neural network or other machine learning entity, and receive from the neural network or other machine learning entity an indication of a commerce location UUID for the descriptive string.

The commerceUUIDViaLearningForInteractiveLocatorData(_:) method then formulate an NSUUID instance conveying the UUID and return that NSUUID instance to commerceUUIDforInteractiveLocatorData(_:) which may in turn return such NSUUID instance to settingsForInteractiveLocatorData(_:).

Turning to user device-captured panoramas, training of the neural network or other machine learning entity may involve colleting panoramas in a manner in-line with the above discussed (e.g., sending individuals to locations with known commerce location UUIDs and asking them to employ their user devices to collect panoramas), providing to such neural network or other machine learning entity the collected panoramas along with specification of the commerce location UUID to which each panorama corresponds. The neural network or other machine learning entity thusly trained, commerceUUIDViaLearningForInteractiveLocatorData(_:) may receive a panorama via the panorama property of a received interactiveLocatorData object, pass the panorama (e.g., as UIImages) to the neural network or other machine learning entity, and receive from the neural network or other machine learning entity an indication of a commerce location UUID for the panorama.

The commerceUUIDViaLearningForInteractiveLocatorData(_:) method may then formulate an NSUUID instance conveying the UUID and return that NSUUID instance to commerceUUIDforInteractiveLocatorData(_:), which may in turn return such NSUUID instance to settingsForInteractiveLocatorData(_:).

Having received from commerceUUIDForAutoLocatorData(_:), via one or 517 and 525, an NSUUID object, settingsForAutoLocatorData(_:) may, at 557, call a settingsForCommerceUUID(_:) method of a settingsDeterminer object, passing as the parameter for the method call the NSUUID object.

The settingsForCommerceUUID(_:) method may have the declaration:

```
func settingsForCommerceUUID (_ theCommerceUUID: NSUUID)
throws -> PosConfigData,
``` where the declaration indicates that the method may take a single parameter of type NSUUID, the single parameter having a local parameter name "theCommerceUUID." The declaration indicates, by the inclusion of the keyword "throws," that the method may be capable of throwing an error, and indicates that the method may have a return type of PosConfigData.

The called settingsForCommerceUUID(_:) method may access a store of the sort discussed above (e.g., a Core Data-managed database) using the commerce location UUID gleaned from the NSUUID object which it has received in order to learn of POS configuration settings which correspond to the commerce location UUID.

The records which the settingsForCommerceUUID(_:) method will consider in learning of appropriate POS configuration settings may conform to the entity definition:

| Field Name | Data Type |
| --- | --- |
| merchantID | Integer 64 |
| terminalID | String |
| gateway | String |
| terminalIDCheckedOut | Integer 16 |
| commerceLocationUUID | String. |

Such entity may, for instance, be given the name PosSettingsEntity. It is noted that such merchant ID, terminal ID, and/or gateway information corresponding to a particular commerce location UUID may, for instance, be provided by the commerce location to which that UUID corresponds during a setup procedure. As one illustration such a setup procedure might involve the commerce location employing client software and/or a web portal to provide the information such that it is ultimately placed in the noted store.

As referenced, the settingsForCommerceUUID(_:) method may access the Core Data-managed store (e.g., a database) in order to learn of POS configuration settings which correspond to the commerce location UUID. Further details of such access will now be discussed.

As noted the settingsForCommerceUUID(_:) method's local parameter name for the received NSUUID object is "theCommerceUUID." With an eye towards satisfying the variable substitution expectations of the Swift/Apple frameworks pseudocode employed herein with respect to NSPredicate formulation, the settingsForCommerceUUID (_:) method may instantiate a string object corresponding to theCommerceUUID as per the following Swift/Apple frameworks-based pseudocode:

var commerceUUIDString=theCommerceUUID.UUIDString.

In accessing the Core Data-managed store so as to obtain the desired POS configuration settings, the settingsForCommerceUUID(_:) method may formulate an NSFetchRequest object.

So as to indicate that obtained managed object records should conform to the above-discussed PosSettingsEntity entity the settingsForCommerceUUID(_:) method may, via code in line with the following pseudocode, instantiate an NSFetchRequest having its entityName property set to specify the PosSettingsEntity entity:

var posSettingsFetchRequest=NSFetchRequest(entityName: "PosSettingsEntity").

As referenced, theCommerceUUID may contain the ascertained commerce location UUID for the commerce location in which the user device is situated. Moreover, the discussed PosSettingsEntity contains the field commerceLocationUUID. Such field may serve to indicate the commerce location UUID which should be ascertained with respect to a user device at a commerce location in order for that determined commerce location UUID to be considered a match for the POS configuration settings specified by the record.

Accordingly, and bearing in mind the above-discussed commerceUUIDString string object, the settingsForCommerceUUID(_:) method may, via code in line with the following pseudocode, set the predicate property of posSettingsFetchRequest to be an NSPredicate object specifying logical conditions which indicate that, in order for a record to be considered matching, the commerce location UUID ascertained for the commerce location in which the user device is situated should match the commerce location UUID indicated by the record:

posSettingsFetchRequest. Predicate = NSPredicate(format: "%@ == commerceLocationUUID", commerceUUIDString).

Then taking the NSManagedObjectContext instance to have the name managedObjectContext, the commerceUUIDForAutoLocatorData(_:) method may make a method call as per the following pseudocode to receive an array of managed object records matching the noted posSettingsFetchRequest:

var fetchResult =
managedObjectContext.executeFetchRequest(posSettingsFetchRequest).

As such method call may, in keeping with the Swift/Apple frameworks-based pseudocode, throw an error, the call may be performed in a manner capable of handling an error which may be thrown.

In one or more embodiments, the set of records is expected to be such that a given commerce location UUID is specified by more than one record. In particular, with respect to a given commerce locationUUID there may be a pool of terminal IDs such that while all records specifying a given commerce locationUUID may specify the same Merchant ID and gateway, the may specify different terminal IDs, the terminal IDs being drawn from the pool. Moreover, the terminalIDCheckedOut field of such a record may convey whether or not the pool-drawn terminal set forth by that record is in use by a user device. The settingsForCommerceUUID(_:) method, when examining retrieved records corresponding to a determined commerce location UUID, may examine the terminalIDCheckedOut field of these records. The method may select a record indicating—by setting forth a 0 (zero) rather than a 1 (one)—that its terminal ID is not in use. The method may, for the record whose terminal ID it has selected, alter the record—by changing the value for the terminalIDCheckedOut field to 1 (one)—to convey that the terminal ID is in use. Then, when the terminal ID is no longer needed (e.g., after the corresponding user device has employed it in communicating with a payment gateway) the value of the field may be altered—by changing the value for the terminalIDCheckedOut field to 0—to convey that the terminal ID is no longer in use.

As an illustration, for the circumstance of a pool of two terminal IDs there may be the following two records, the first indicating that its set forth terminal ID is not in use, the second indicating that its sets forth terminal ID is in use:

| Field Name | Value |
| --- | --- |
| merchantID | 677078008 |
| terminalID | T91328043 |
| gateway | http://www.example.com/paymentgateway/pay.asmx?op=pay |
| terminalIDCheckedOut | 0 |
| commerceLocationUUID | 4AB940DF-0838-48D9-A635-96FD90E699ED |
| merchantID | 677078008 |
| terminalID | T60214444 |
| gateway | http://www.example.com/paymentgateway/pay.asmx?op=pay |
| terminalIDCheckedOut | 1 |
| commerceLocationUUID | 4AB940DF-0838-48D9-A635-96FD90E699ED |

Bearing in mind the foregoing, settingsForCommerceUUID(_:) may, for instance via employ of a for-in loop, access each of the records held by fetchResult. The for-in loop may be configured to find the first instance of a record of the array indicating that its set forth terminal ID is not in use. The loop may provide to code outside the loop the index of the array element setting forth such record. For that that record settingsForCommerceUUID(_:) may alter the record to indicate the terminal to be in use. Taking the array index for such record to be held in indexForAvailableTerminalID (e.g., via action of the for-in loop), settingsForCommerceUUID(_:) may achieve such alteration via code in line with the following pseudocode:

fetchResult[indexForAvailableTerminalID].setValue(1, forkey: "terminalIDCheckedOut")
managedObjectContext.save( )

As the save( ) call may receive a thrown error, the call may be performed in a fashion capable of handling that error.

At 565 settingsForCommerceUUID(_:) may, further with respect to such record, access the merchantID, TerminalID, and gateway values thereof as per the following pseudocode:

fetchResult[indexForAvailableTerminalID].valueForKey("merchantID")
fetchResult[indexForAvailableTerminalID].valueForKey("terminalID")
fetchResult[indexForAvailableTerminalID].valueForKey("gateway").

Further at 565, settingsForCommerceUUID(_:) may instantiate a NSURL object corresponding to the noted gateway value via NSURL's init(string:) init method.

Still further at 565, settingsForCommerceUUID(_:) may instantiate a PosConfigData instance which sets forth the merchantID value, the terminalID value, and the instantiated NSURL object, and return the PosConfigData instance to settingsForAutoLocatorData(_:).

In like vein, having received from commerceUUIDForInteractiveLocatorData(_:), via one of 539, 547, and 555, an NSUUID object, settingsForInteractiveLocatorData(_:) may at 567, in a manner analogous to that discussed hereinabove in connection with settingsForAutoLocatorData(_:) and 557, call settingsForCommerceUUID(_:). The settingsForCommerceUUID(_:) method may then act in a manner analogous to that discussed hereinabove, instantiating an NSFetchRequest having its entityName property set to specify the PosSettingsEntity, setting the predicate property of the fetch request as per NSPredicate(format: "%@==commerceLocationUUID", commerceUUIDString), making a fetch execution method call so as to receive an array of objects matching the fetch request, and—at 577—performing field access subsequent to finding a record result indicating an available terminal ID and then altering that record to convey terminal ID checkout, instantiating an appropriate NSURL object, and instantiating a PosConfigData instance which sets forth the appropriate merchantID value, the appropriate terminalID value, and the NSURL object, and returning the PosConfigData instance to settingsForInteractiveLocatorData(_:).

Returning to 565, recall that settingsForAutoLocatorData(_:) may receive a PosConfigData instance. At 579 settingsForAutoLocatorData(_:) may provide, to the calling configureForCurrentCommerceLocation(_:) method of the settingsForCurrentCommerceLocationConcierge object, such received PosConfigData instance.

In like vein, returning to 577 recall that settingsForInteractiveLocatorData(_:) may receive a PosConfigData instance. At 581 settingsForInteractiveLocatorData(_:) may provide, to the calling configureForCurrentCommerceLocation(_:) method of the settingsForCurrentCommerceLocationConcierge object, such received PosConfigData instance.

It is noted that although the foregoing has discussed configuration of the user device to make commerce location payments via POS settings in the vein of, for instance, merchant ID, terminal ID, and gateway URL, such is for illustrative purposes only and other implementation possibilities exist. For instance, a virtual machine hypervisor could run on the user device, and vended by the user device configuration functionality discussed herein may be—as an alternative to and/or in addition that which has been discussed as vended—a virtual machine image providing POS functionality appropriately configured for the at-hand commerce location (e.g., POS functionality appropriately configured for the at-hand commerce location in terms of merchant ID, terminal ID, and/or gateway). As such, the user device may apply the received virtual machine image to its hypervisor to realize the discussed-herein functionality for making user device-based payments at a commerce location.

As discussed hereinabove, commerceUUIDForAutoLocatorData(_:) and commerceUUIDForInteractiveLocatorData(_:) are both capable of throwing errors. As an example, an error might be thrown by one of these methods in the case where no commerce location UUID can be determined by that method. Such might transpire, for instance, where the user device is situated at a location where payment using the device is not possible (e.g., where the commerce location has not, say, provided commerce ID, terminal ID, and/or gateway information which would allow for user device-based payment). As an illustration, a user device might determine geographical coordinates for the location at which it is situated, but due to that location being a commerce location which has not provided information of the sort noted which would allow for payment, store lookup to find a commerce location UUID corresponding to those geographical coordinates may yield no hits. Where both of the noted methods thusly throw an error (i.e., where neither method is able to determine a commerce location UUID), the user device might make the user aware of this. For instance, the user device might employ a GUI thereof to indicate to the user that she cannot use her device to make payments at the device's present location.

Figure 6:
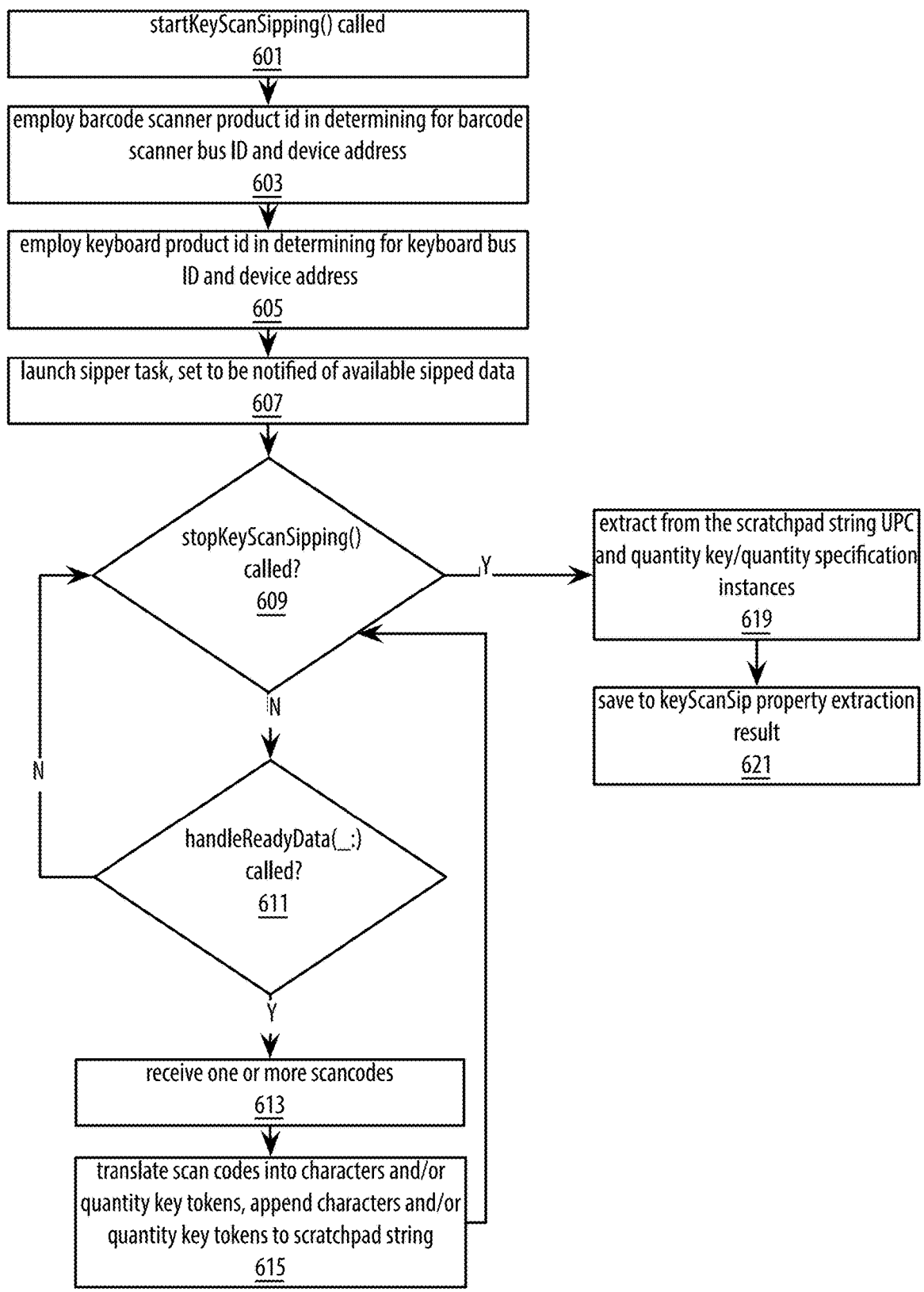
FIG. 6 shows a logic flow diagram illustrating embodiments for the POSAMS of a POS-performed process by which Universal Product Codes (UPCs) scanned by a POS barcode scanner, UPCs entered via a POS keyboard, and/or quantity instructions entered via a POS keyboard may be captured without code alternation of already-installed POS software.

FIG. 6 shows a logic flow diagram illustrating embodiments of a POS-performed process by which UPCs scanned by a POS barcode scanner, UPCs entered via a POS keyboard, and/or quantity instructions entered via a POS keyboard may be captured without code alternation of already-installed POS software. To facilitate discussion, the process of FIG. 6 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 6 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

A keyScanSipper object may provide three methods—startKeyScanSipping( ), stopKeyScanSipping( ) and handleReadyData(_:). These methods are discussed in greater detail hereinbelow. At 601, the startKeyScanSipping( ) method of the keyScanSipper object may be called. The method may, as one example, be called with POS startup. For instance, an application setting forth the keyScanSipper object may be set to launch at POS startup (e.g., via a startup script and/or due do being plied in a startup items folder) and may, in keeping with the Swift/Apple frameworks pseudocode employed herein, implement an applicationDidFinishLoading(_:) method which is called with the application's startup, and may have that applicationDidFinishLoading(_:) method, when called, call startKeyScanSipping( ). As another example, startKeyScanSipping( ) may be called by a method of a printSipper object in response to determination that the POS has printed a receipt and should therefore ready itself for a subsequent commence transaction. The startKeyScanSipping( ) method may have the declaration:

func startKeyScanSipping( ) throws, where the declaration indicates that the method may take no parameters, that the method may be capable of throwing an error, and that the method may have no return value.

At 603 the startKeyScanSipping( ) method may employ a known USB product ID of the scanner to determine the USB bus ID and USB device address of the scanner. Such a USB product ID may be known via product documentation corresponding to the scanner and/or via running code which provides such information (e.g., lsusb and/or ioreg). It is further noted that while the USB bus ID and USB device address of the scanner may vary—say due to the device being plugged into a different USB port of the POS and/or due to the POS changing the bus ID and/or USB device ID for the scanner (e.g., changing such values at device boot)—the USB product ID is expected to not change (e.g., due to being set in ROM). Such USB product ID may be known as a hexadecimal (e.g., AB4F) and/or decimal number, and/or as a corresponding string (e.g., "xyz hand scanner"). In doing so the method may in one aspect make use of an ioreg or lsusb command line program which provides information for attached USB devices including vendor ID and associated string, product ID and associated string, bus ID, and device address.

An NSTask object may be instantiated. The instantiated NSTask object's launchPath property may be set to a string specifying the path (including executable name) for launching ioreg (e.g., /usr/sbin/ioreg) or to the path (including executable name) for launching lsusb (e.g., /usr/bin/lsusb). The instantiated NSTask object's standardOutput property may be set to an instantiated NSPipe object, and the instantiated NSTask object's launch( ) method may be called. The fileHandleForReading property of the instantiated NSPipe object may be accessed and the readDataToEndOfFile( ) method thereof may be called, with the NSData output thereof being saved to an instantiated NSData object. An NSString object may then be created from the instantiated NSData object. Performing a search of the string yielded by lsusb or ioreg may, in keeping with the Swift/Apple frameworks pseudocode employed herein, involve instantiating a first NSRegularExpression object whose pattern property is set to hold a regular expression string which is formulated, in view of known output format of the employed one of lsusb or ioreg, to return the USB bus ID which the command line program indicates corresponds to the USB product ID of the scanner, and whose options property is set to an empty array to indicate that no options are desired. The method matchesInString(_: options: range:) may then be called on the instantiated NSRegularExpression object with the first parameter of the call being set to specify the string yielded by the use of ioreg or lsusb, the options parameter of the call being set to an empty array to specify that no options are desired, and the range parameter set to specify an instantiated NSMakeRange object for which the range runs from zero to a value equal to the length of the string yielded by the use of ioreg or lsusb. In keeping with the Swift/Apple frameworks pseudocode employed herein, the result of the method call may be an array specifying the hits of the search, wherein each hit of the search is specified by an element of the array, and each such element specifies its particular hit in terms of a character range within the text which was searched (i.e., within the string yielded by the use of ioreg or lsusb). Such results array may be converted into a string array of hits wherein each element specifies, as a string, a hit resulting from the search by, for each element of the results array, fetching the range specified by that results array element, extracting from the string yielded by the use of ioreg or lsusb a substring corresponding to the fetched range, and then appending that substring to the string array of hits.

In view of the foregoing, there may be a string array of hits corresponding to the search, of the string yielded by the use of ioreg or lsusb, performed with respect to the regular expression which acts to return the USB bus ID which corresponds to the product ID of the scanner. As the product ID of the scanner is expected to be listed only once in the ioreg or lsusb output, the string array of hits is expected to have a single element. As such the desired bus ID corresponding to the product ID of the scanner may be accessed via the zeroth index of the array.

Via an analogous approach, returned may be the USB device address which the command line program indicates corresponds to the USB product ID of the scanner. Such analog approach may involve acting as discussed above but substituting for the discussed first NSRegularExpression object a second NSRegularExpression object whose pattern property is instead formulated, in view of the known output format of the employed one of lsusb or ioreg, to return the USB device address which the command line program indicates corresponds to the USB product ID of the scanner. As such, by accessing the zeroth index of the analogous string array of hits yielded by such analogous approach, the desired USB device address may be obtained.

As such, exiting 603 startKeyScanSipping( ) will possess the USB bus ID and device address for the scanner. From 603 flow may proceed to 605 where startKeyScanSipping( ) may employ a known USB product ID of the POS keyboard to determine the USB bus ID and USB device address of the POS keyboard. Such USB product ID may be known in a fashion analogous to that discussed hereinabove with respect to the scanner, and may, as in the case of the scanner, be known as a hexadecimal (e.g., COFF) and/or decimal number, and/or as a corresponding string (e.g., "abc POS keyboard"). Analogously to the scanner, the USB product ID of the POS keyboard may be expected to remain constant, while the USB bus ID and/or USB device address of the scanner may change. The startKeyScanSipping( ) method may come to learn the USB bus ID of the POS keyboard in a fashion analogous to the discussed for getting the USB bus ID of the scanner, and may come to learn the USB device address of the POS keyboard in a fashion analogous to that described for getting the USB device address of the scanner.

From 605 flow may proceed to 607 where startKeyScanSipping( ) may launch a sipper task which provides, with respect to the scanner, scancode values (e.g., expressed in hexadecimal) which convey the UPC numbers of barcodes read via the scanner, and with respect to the keyboard scancode values (e.g., expressed in hexadecimal) which convey keys pressed on the POS keyboard including keyed in UPC numbers (e.g., keyed in by a POS operator where scanning fails) and/or presses of a POS quantity key along with entry of a numerical quantity-described value (e.g., rather than scanning each of three identical purchased products, a POS operator may scan only one of the products and then press the POS keyboard's quantity key followed by the "3" key).

Performance of 607 may, in one aspect, involve startKeyScanSipping( ) instantiating an NSTask object whose launchPath property is set to the path, including executable name, for the sipper. As an example the sipper may be the command line program hexinject. As another example the command line program may be tshark. So as to facilitate discussion via illustration by way of example, tshark will be employed in discussing 607. Returning to the launchPath property of the instantiated NSTask object, such may be set to a string specifying the path, including executable name, for launching the sipper tshark (e.g., "/usr/local/bin/tshark"). Moreover, the instantiated NSTask Object's arguments property may be set to a string array setting forth the arguments to be employed when loading the executable set forth by the launchPath property. As one illustration, suppose that the determined scanner device address is held in a variable scanDeviceAddress, the determined scanner bus ID is held in a variable scanBusId, the determined POS keyboard device address is held in a variable keyDeviceAddress, and the determined POS keyboard bus ID is held in a variable keyBusId. Then, continuing with the illustration, the arguments property of the instantiated NSTask object may be set to the string array ["-x", "-l", "-i", "usbmon0", "-Y", "\"(usb.device_address eq \(scanDeviceAddress) AND usb.bus_id eq\VscanBusId)) OR (usb.device_address eq \(keyDeviceAddress) AND usb.bus_id eq \(keyBusId)) \""]. The set forth arguments, which may be applied in launching the sipper tshark will now be discussed in turn.

The -x flag instructs tshark to yield hexadecimal output. The -l flag instructs tshark to flush standard output after each USB packet, the inclusion of which may aid interface with the functionality discussed herein for receiving tshark's output. The -i flag serves to specify the interface to which tshark should listen, and the specification of usbmon0 for the flag -i serves to indicate that tshark should listen to all USB buses of the POS. The -Y flag serves to specify a filer that tshark should employ. The string which follows the -Y flag sets forth the details of the filter. In particular, the string set forth above indicates that the USB packets for which tshark should yield the requested hexadecimal output should be ones for which either a) the device address is equal to scanDeviceAddress (i.e., the detected device address for the scanner) and the bus ID is equal to scanBusId (i.e., the determined bus ID of the scanner); or b) the device address is equal to keyDeviceAddress (i.e., the determined device address for the POS keyboard) and the bus ID is equal to keyBusID (i.e., the determined busID of the POS keyboard).

Further at 607, the instantiated NSTask's standardOutput property is set to an instantiated NSPipe object, and access may be gained to the default NSNotificationCenter object via the class method call NSNotificationCenter.defaultCenter( ).

Also at 607, startKeyScanSipping( ) indicates, to the noted default NSNotificationCenter object to which access was gained, that the noted handleReadyData(_:) method of the keyScanSipper object should be called when the file handle corresponding to the discussed instantiated NSPipe object is ready to offer tshark output. The startKeyScanSipping( ) method may so indicate by calling the addObserver (_: selector: name: object:) method on the default NSNotificationCenter object, where self is specified for the first parameter to indicate that it is the keyScanSipper object which should receive notifications, selector("handleReadyData:") is specified for the selector property to indicate that it is the handleReadyData(_:) method which should be called when the instantiated NSPipe object is ready to offer tshark output, NSFileHandleReadCompletionNotification is specified for the name property to indicate the sort of notifications for which notification should be received, and the object specified by the fileHandleForReading property of the noted instantiated NSPipe object is specified for the object parameter to specify that the object from whom notifications are desired is the file handle corresponding to the instantiated NSPipe object.

Further at 607, the launch( ) method may be called on the instantiated NSTask object to launch tshark, and readInBackgroundAndNotify( ) may be called on the file handle object specified by the fileHandleForReading property of the noted instantiated NSPipe object, such method call serving to instruct that file handle object to read tshark output in the background and post a notification of the desired sort when tshark output is available.

Turning to 609, determination may be made as to whether or not the stopKeyScanSipping( ) method of the keyScanSipper object has been called. Where such call is made flow may proceed to 619. Where stopKeyScanSipping( ) is not called flow may proceed to 611. It is noted that stopKeyScanSipping( ) is discussed in greater detail hereinbelow.

At 611 determination is made as to whether handleReadyData(_:) has been called. Where such call is made flow may proceed to 613. Where handleReadyData(_:) is not called flow may proceed to 609.

It is noted that the handleReadyData(_:) method may—with an eye towards that which is discussed in connection with 607—be called by the discussed file handle object when tshark output is available. The handleReadyData(_:) method may have the declaration:

func handleReadyData(_ notification: NSNotification), where the method may take a sole parameter of type NSNotification, the sole parameter having a local parameter name "notification" and no external parameter name. In line with the Swift/Apple frameworks pseudocode employed herein, a NSNotification object provides functionality including encapsulating data broadcast from one object to another object via an NSNotificationCenter object. Further instantiated by the method declaration is that the method has no return value.

At 613 the handleReadyData(_:) method may receive one or more scancodes yielded via tshark as launched as discussed above, the scancode information being received from stdout by the file handle object, dispatched by the file handle object via an NSNotification object to the discussed NSNotificationCenter object, that NSNotificationCenter object being received from that NSNotificationCenter object by the handleReadyData(_:) method. In accessing the tshark output data held by the received notification object (i.e., the object with the internal parameter name notification), the method may access the userInfo property of that received notification object. In keeping with the Swift/Apple frameworks pseudocode employed herein, the userInfo property provides a dictionary, and further in keeping with such pseudocode employed herein the tshark-provided output dispatched by the discussed file handle object may be found under the NSFileHandleNotificationDataItem key of that dictionary. As such, the handleReadyData(_:) method may access that tshark output data by requesting from the dictionary the value which corresponds to the noted key. In keeping with such pseudocode employed herein, a string may be made from the NSData object yielded by such dictionary request via the init(data: encoding:) string initializer method, where the NSData object yielded by the dictionary request is passed as the first parameter and NSUTF8StringEncoding as the second parameter.

Also at 613, as tshark data output with the -x flag may include other than hex data, the created string may be subjected to a regular-expression search, the specified regular expression being configured to return as hits hex bytes (i.e., two hex digits, for instance C0 or FF). It is noted that in view of the Swift/Apple frameworks Swift/Apple frameworks pseudocode employed herein the regular expression-based search is expected to return hits in the order in which they appear in the input. Such regular expression-based search may be implemented in a form analogous to that discussed in connection with 603 up to production of the string array of hits. Such string array of hits will provide each hexadecimal byte hit as a separate array element.

At 615, handleReadyData(_:) may act upon the string array of hex byte hits discussed in connection with 615 so as to translate the hex byte scancodes into characters (i.e., including both letters and numbers) and/or into quantity key tokens. Further at 615 handleReadyData(_:) may add such translated key characters and/or quantity key tokens to a scratchpad string. The method handleReadyData(_:) may employ in such translation a dictionary in keeping with the Swift/Apple frameworks pseudocode employed herein which has as its keys hex byte scan codes expressed as strings (e.g., the string "0A") and as its corresponding values string-expressed characters and quantity key tokens. As one illustration, such dictionary might set forth for the string key 0A the corresponding sting dictionary value "q" corresponding to the character q. It is noted that the dictionary mappings may take into account USB HID specifications.

As referenced, further to the scancode to character mappings, the dictionary may provide quantity key to token mappings. The dictionary keys for such quantity key to token mappings may be scancodes known to be employed for quantity key use. Such employed quantity key scancodes may be determined, for instance, via product literature and/or via discussions with POS owners. As an illustration, it might be determined that certain POSs employ the key F1 (scancode 3B) as a quantity key while other POSs employ F7 (scancode 41) as a quantity key. The dictionary may include such known quantity key scan codes as dictionary keys, and the to-be-employed quantity key tokens as the corresponding dictionary values. As one example, "@@" might be decided upon as a quantity key token. It is noted that where the dictionary has keys for multiple POS quantity key scan codes (e.g., due to determination that both F1 and F7 are employed as quantity keys), such dictionary keys may map to the same dictionary values. As an illustration the dictionary key for F1 (the string "3B") may have a corresponding dictionary value of the string "@@" and the dictionary key for F7 (the string "41") may likewise have a corresponding dictionary value of the string "@@."

It is additionally noted that for certain scancodes there may be no dictionary keys. For instance, scancodes which correspond to non-characters and/or which are not possible quantity keys (e.g., according to quantity key inquires of the sort noted) may have no corresponding dictionary keys. As one example, scancodes for modifier keys (e.g., the control key) may have no corresponding dictionary keys).

As such, consulting the dictionary for a string-expressed hex scancode retrieved from an element of the string array of hex byte hits will either result in a miss if there is no dictionary key for the scancode (e.g., in the case of a modifier key), or a hit in the form of a character or a quantity key token where there is a dictionary key for the scancode. Accordingly, handleReadyData(_:) may visit (e.g., via a for-in loop) each element of the string array of hex byte hits and employ the string-expressed hex byte of that element in consulting the dictionary as per the foregoing. Where such dictionary consultation leads to a string-valued hit (e.g., a character or a quantity key token) handleReadyData(_:) may add such string-valued hit to a scratchpad string. In the case where such dictionary consultation with respect to an at-hand scancode leads to a miss, handleReadyData(_:) may leave the scratchpad untouched.

As such, exiting 615 there may be a scratchpad string, including characters and quantity key tokens, which corresponds to UPC barcodes scanned by the POS scanner, UPC codes entered by the POS keyboard, and/or presses of the quantity key—along with corresponding numerical quantity designations—conveyed via the POS keyboard.

Where stopKeyScanSipping( ) is called, flow may proceed from 609 to 619. the stopKeyScanSipping( ) method may be called by a method of a complianceAuthAssist object which is discussed in greater detail hereinbelow, which calls stopKeyScanSipping( ) subsequent to the POS making a card authorization request with respect to an at-hand commerce transaction. The stopKeyScanSipping( ) method may have the declaration:

func stopKeyScanSipping( ) throws where the declaration indicates that the method may take no parameters, that the method may be capable of throwing an error, and that the method may have no return value.

Turning to 619 it is noted that stopKeyScanSipping( ) may employ searching of the scratchpad string, and extract from the scratchpad string UPC codes, and/or quantity key tokens and their corresponding quantity number specifications. The handleReadyData(_:) method may store the created scratchpad string as a property of the keyScanSipper object, and stopKeyScanSipping( ) may gain scratchpad string access via that property.

Performing the search of the scratchpad string may, in keeping with the Swift/Apple frameworks pseudocode employed herein, involve instantiating an NSRegularExpression object whose pattern property is set to hold a regular expression string which is formulated to return as hits both standalone runs of 12-13 digits and also runs of 12-13 digits followed by a quantity key token (e.g., @@) and one or more digits subsequent to that quantity key token. Such regular expression may be deployed from the viewpoints that a run of 12-13 digits is suggestive of a UPC code, and that a run of 12-13 digits followed by a quantity key token and then one or more digits is suggestive of a UPC code and a corresponding indication of a quantity of an item with that UPC code which was purchased (e.g., 12 digits followed by a quantity key token followed by the digit 6 may be taken as suggestive that there was a purchase of six of the product corresponding to a UPC code made up of those digits). Moreover for the NSRegularExpression object, the options property thereof may be set to an empty array to indicate that no options are desired. The method matchesInString(_: options: range:) may then be called on the instantiated NSRegularExpression object with the first parameter of the call being set to specify the scratchpad string, the options parameter of the call being set to an empty array to specify that no options are desired, and the range parameter set to specify an instantiated NSMakeRange object for which the range runs from zero to a value equal to the length of the scratchpad string.

In keeping with the Swift/Apple frameworks pseudocode employed herein, the result of the method call may be an array specifying the hits of the search, wherein each hit of the search is specified by an element of the array, and each such element specifies its particular hit in terms of a character range within the text which was searched (i.e., within the scratchpad string). Such results array may be converted into a string array of hits wherein each element specifies, as a string, a hit resulting from the search by, for each element of the results array, fetching the range specified by that results array element, extracting from the scratchpad string a substring corresponding to that fetched range, and then appending that substring to the string array of hits. In view of the foregoing, there may be a string array of hits corresponding to the search, of the scratchpad string, performed with respect to the discussed regular expression.

Via the foregoing, stopKeyScanSipping( ) may have possession of a string array of hits of which each element is either a run of 12-13 digits and therefore a potential UPC code, or a run of 12-13 digits followed by a quantity key and one or more digits and therefore a potential UPC code and corresponding quantity-key-based indication of quantity purchased. It is noted that the discussed employ of a regular expression in creating a string array of hits may serve to prune away captured information other than UPC codes and quantity designations. For instance, pruned away may be credit card numbers entered via the POS keyboard and/or customer personal information (e.g., name, address, and/or phone number) entered via the POS keyboard such as in connection with signing up a customer for a rewards club and/or registering with a manufacturer a purchased product.

Further at 619, stopKeyScanSipping( ) may examine each element of the string array of hits (e.g., via a for-in loop) and subject the 12-13 digits of that element to a UPC checksum operation. Where the checksum operation fails, stopKeyScanSipping( ) may remove the element from the array. It is noted that in one or more embodiments such checksum-wise consideration of the array elements might not be performed.

From 619 flow may proceed to 621 where stopKeyScanSipping( ) may create a joined string which is a single string made up of all elements of the string array of hits. It is noted that such string array of hits which is the subject of such joined string creation may or may not be pruned as per that which is discussed above depending on whether or not the at-hand embodiment employs such pruning In line with the Swift/Apple frameworks pseudocode employed herein, the joined string may be created by calling joinWithSeparator (",")—where delimited by the quote marks is a comma followed by a space character—on the string array of hits, such method call yielding the joined string. Further at 621 stopKeyScanSipping( ) may save the joined string to a property of the keyScanSipper object. Such property may, as one example, have the name keyScanSip. Still further at 621 stopKeyScanSipping( ) may call the terminate( ) method on the instantiated NSTask object so as to terminate tshark, and may further perform cleanup by setting the instantiated NSTask and NSPipe objects to nil.

It is noted that although that which has been discussed in connection with FIG. 6 has been with respect to capture of both POS barcode scanner-produced scancodes and POS keyboard-produced scancodes, such is for illustrative purposes only and other possibilities exist. As one example, capture of POS barcode scanner-produced scancodes might occur without capture of POS keyboard-produced scancodes. As another example, capture of POS keyboard-produced scancodes might occur without capture of POS barcode scanner-produced scancodes.

FIG. 7 shows a logic flow diagram illustrating embodiments of a POS-performed process by which a POS-dispatched card authorization request regarding a commerce transaction may—without code alteration of already-installed POS software—be augmented so that check may be made as to whether or not the transaction includes one or more disallowed entities. For instance, the card to which the authorization request corresponds may be a corporate credit card, and/or the disallowed entities may include alcohol and/or spendable instruments (e.g., gift cards, traveler's checks, and/or cash advances). To facilitate discussion, the process of FIG. 7 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 7 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

A complianceAuthAssist object may possess two methods-startComplianceAuthAssisting( ) and handleReadyPosRequest(_:). These methods are discussed in greater detail hereinbelow. At 701, the startComplianceAuthAssisting( ) method of the complianceAuthAssist object may be called. The method may, as one example, be called with POS startup. For instance, an application setting forth the complianceAuthAssist object may be set to launch at POS startup (e.g., via a startup script and/or due do being plied in a startup items folder) and may, in keeping with the Swift/Apple frameworks pseudocode employed herein, implement an applicationDidFinishLoading(_:) method which is called with the application's startup, and may have that applicationDidFinishLoading(_:) method, when called, call startComplianceAuthAssisting( ). The startComplianceAuthAssisting( ) method may have the declaration:

func startComplianceAuthAssisting( ) throws, where the declaration indicates that the method may take no parameters, that the method may be capable of throwing an error, and that the method may have no return value.

From 701 flow may proceed to 703 where startComplianceAuthAssisting( ) may launch a POS authorization request interface task which provides interception of a POS dispatch of a card authorization request which is formulated by the POS as if it were to be sent directly to a payment gateway, and makes available the content of that request (e.g., content in the form of SOAP-corresponding XML data regarding the authorization request). Such authorization request interface task may, for instance, be implemented via code in line with the following PHP-inspired pseudocode which listens for a card authorization request of the sort noted, extracts the content of the request, and makes that content available to standard output (stdout):

```
#!/usr/local/bin/php
<?PHP
header('Content-Type: text/plain');
// set ip address and port to listen to for incoming data
$address = '127.0.0.1';
$port = 80;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
```

```
        $input = "";
        $input = socket_read($client, 1024);
        $data .= $input;
} while($input != "");
// send data to stdout
echo "$data\n";
```

It is noted that the POS authorization request interface task may, as set forth above, be set to listen on port 80 of the localhost interface of the POS (e.g., 127.0.0.1), and that the settings of the POS for reaching a payment gateway may be set to specify such localhost interface (e.g., 127.0.0.1).

Performance of 703 may, in one aspect, involve start-ComplianceAuthAssisting( ) instantiating an NSTask object whose launchPath property is set to the path, including executable name, for the POS authorization request interface task. As an example the POS authorization request interface task may be in keeping with the php-inspired pseudocode set forth above. Returning to the launchPath property of the instantiated NSTask object, such may be set to a string specifying the path, including executable name, for launching the POS authorization request interface task (e.g., "/usr/local/bin/ari").

Further at 703, the instantiated NSTask's standardOutput property is set to an instantiated NSPipe object, and access may be gained to the default NSNotificationCenter object via the class method call NSNotificationCenter.defaultCenter( ). Also at 703, startComplianceAuthAssisting( ) indicates, to the noted default NSNotificationCenter object to which access was gained, that the noted handleReadyPosRequest(_:) method of the complianceAuthAssist object should be called when the file handle corresponding to the discussed instantiated NSPipe object is ready to offer authorization request interface output. The startComplianceAuthAssisting( ) method may so indicate by calling the addObserver(_: selector: name: object:) method on the default NSNotificationCenter object, where self is specified for the first parameter to indicate that it is the complianceAuthAssist object which should receive notifications, selector("handleReadyPosRequest:") is specified for the selector property to indicate that it is the handleReadyPosRequest(_:) method which should be called when the instantiated NSPipe object is ready to offer authorization request interface output, NSFileHandleReadCompletionNotification is specified for the name property to indicate the sort of notifications for which notification should be received, and the object specified by the fileHandleForReading property of the noted instantiated NSPipe object is specified for the object parameter to specify that the object from whom notifications are desired is the file handle corresponding to the instantiated NSPipe object.

Further at 703, the launch( ) method may be called on the instantiated NSTask object to launch the authorization request interface, and readInBackgroundAndNotify( ) may be called on the file handle object specified by the fileHandleForReading property of the noted instantiated NSPipe object, such method call serving to instruct that file handle object to read authorization request interface output in the background and post a notification of the desired sort when authorization request interface output is available.

At 705, determination is made as to whether handleReadyPosRequest(_:) has been called. Where such call is made flow may proceed to 707. Where handleReadyPosRequest(_:) is not called flow may return to 705.

The handleReadyPosRequest(_:) method may have the declaration:

func handleReadyPosRequest(_ notification: NSNotification), where the method may take a sole parameter of type NSNotification, the sole parameter having a local parameter name "notification" and no external parameter name. In line with the Swift/Apple frameworks pseudocode employed herein, a NSNotification object provides functionality including encapsulating data broadcast from one object to another object via an NSNotificationCenter object. Further instantiated by the method declaration is that the method has no return value.

At 707 the handleReadyPosRequest(_:) method may receive content (e.g., SOAP-corresponding XML data) regarding a POS-generated card authorization request, such content being yielded via the authorization request interface task which was launched as discussed above. In particular the content, having been received from stdout by the file handle object, dispatched by the file handle object via an NSNotification object to the discussed NSNotificationCenter object, that NSNotificationCenter object being received from that NSNotificationCenter object by the handleReadyPosRequest(_:) method. In accessing the authorization request interface output data held by the received notification object (i.e., the object with the internal parameter name notification), the method may access the userInfo property of that received notification object. In keeping with the Swift/Apple frameworks pseudocode employed herein, the userInfo property provides a dictionary, and further in keeping with such pseudocode employed herein the authorization request interface-provided output dispatched by the discussed file handle object may be found under the NSFileHandleNotificationDataItem key of that dictionary. As such, the handleReadyPosRequest(_:) method may access that authorization request interface output data by requesting from the dictionary the value which corresponds to the noted key. In keeping with such pseudocode employed herein, a string may be made from the NSData object yielded by such dictionary request via the init(data: encoding:) string initializer method, where the NSData object yielded by the dictionary request is passed as the first parameter and NSUTF8StringEncoding as the second parameter.

From 707, flow may proceed to 709 where handleReadyPosRequest(_:) may parse the just-discussed string which conveys the content (e.g., SOAP-corresponding XML content) regarding the POS-generated card-authorization request. As noted above, the card authorization request dispatched by the POS may be formatted by the POS as if it were to be sent directly to a payment gateway. Accordingly, for instance, SOAP-corresponding XML data regarding the authorization request may be in an XML format expected by that gateway. As such, the parsing performed at 709 make take into account that such XML format. As an illustration, suppose that the gateway-expected format for a card authorization request provides a merchant ID tag-delimited by <merchantId> and </merchantId>, a terminal ID tag-delimited by <terminalId> and </terminalId> a card number tag-delimited by <cardNumber> and </cardNumber>, a card PIN tag-delimited by <cardPin> and </cardPin>, a card expiration data delimited by <cardExpiry> and </cardExpiry>, and a purchase amount tag-delimited by <purchaseAmount> and </purchaseAmount>. Suppose further that the format may allow for an authorization request which lacks terminal ID specification (e.g., to allow for merchants who do not employ terminal IDs) and/or which lacks card PIN specification (e.g., where authorization corresponds to a debit card a PIN may be provided, but when authorization is for a credit card no PIN may be involved). As such, the string arising from the actions of 707 may provide XML-tagged information which follows the just-described tagging format. To facilitate discussion, such string will be referred to as the authorization request XML string.

So as to implement the parsing of 709, the handleReadyPosRequest(_:) method may, in keeping with the Swift/Apple Frameworks pseudocode employed herein, instantiate an NSXMLparser object, setting self for the delegate property of the NSXMLparser object. So as to further implement the parsing of 709, the complianceAuthAssist object may, in keeping with the noted pseudocode employed herein, implement a parser(_: didStartElement: namespaceURI: qualifiedName: attributes:) delegate method, and a parser(_: foundCharacters:) delegate method. Further at 709 the handleReadyPosRequest(_:) may set the authorization request XML string as the data property of the instantiated NSXMLParser object and may call the parse( ) method of the instantiated NSXMLParser object.

Responsive to the parse( ) call, the instantiated NSXMLParser object may proceed through the XML of the authorization request XML string, and when hitting a tag thereof call the parser(_: didStartElement: namespaceURI: qualifiedName: attributes:) delegate method. Such called delegate method may act to store the found tag name (e.g., in a property called currentTag). When hitting the corresponding tag-delimited data of the tag, the instantiated NSXMLParser object may call the parser(_: foundCharacters:) delegate method. Such called delegate method may, in consideration of the store tag name (e.g., in consideration of currentTag), store the delimited data in a property corresponding to the tag name. For instance, in consideration of currentTag being "<merchantId>," tag-delimited data corresponding to <merchantId> and </merchantId> tags may be stored in a property called merchantId. The two delegate methods may be configured in light of the above-discussed authorization-request-corresponding XML tags, and as such the two delegate methods may act to recognize those tags, and have corresponding properties to hold the values delimited by those tags. Accordingly, for example, the actions of the two delegate method may, for an authorization request XML string target, store the <merchantId>-</merchantId> delimited merchant ID data in a merchantId property, the <terminalId>-</terminalId> delimited terminal ID data in a terminalId property, the <cardNumber>-</cardNumber> delimited card number data in a property cardNumber, the <cardPin>-</cardPin> delimited card pin data in a cardPin property, the <cardExpiry>-</cardExpiry> delimited card expiration data in a property called cardExpiry, and the <purchaseAmount>-</purchaseAmount> delimited purchase amount data in a property called purchaseAmount.

With the data set forth by the authorization request XML string being held in properties as just described (e.g., the card number thereof being stored in a cardNumber property), flow may proceed to 711 where the handleReadyPosRequest(_:) method may access the discussed-herein keyscan sip by accessing the property of the keyScanSipper object which makes available the keyscan sip. As noted herein such property may have the name keyScanSip. As such, in keeping with the noted pseudocode employed herein, handleReadyPosRequest(_:) may gain access to such keyscan sip-providing property via code in like with the pseudocode keyScanSipper.keyScanSip.

From 711 flow may proceed to 713 where handleReadyPosRequest(_:) may call a complyCheckAndAuthForMerchantId(_: andTerminalId: andCardNumber: andCardPin: andCardExpiry: andPurchaseAmount: andUpcs:) method of a complianceAuthMaster object. It is noted that the object and method are discussed in greater detail hereinbelow. In so calling the method handleReadyPosRequest(_:) may pass as the first parameter the discussed property holding merchant ID, may pass as the second parameter the discussed property holding terminal ID, may pass as the third parameter the discussed property holding card number, may pass as the fourth parameter the discussed property holding card PIN, may pass as the fifth parameter the discussed property holding card expiration date, may pass as the sixth parameter the discussed property holding purchase amount, and may pass as the seventh parameter the accessed property corresponding to the keyscan sip. It is noted that as the just-discussed properties may be of type string, in so passing them a parameters handleReadyPosRequest(_:) may preform casting in agreement with the parameter types expected by the method call (e.g., a cast from string to Int may be performed where the called method expects an Int for a given parameter). The expected parameter types are discussed hereinbelow. It is noted that handleReadyPosRequest(_:) may formulate a variable which holds only the UPCs of the keyscan sip and pass that in the method call. Such formulation may involve, in a manner analogous to that discussed herein, application of a regular expression which yields as hits only UPCs, thus providing for a stripping away of quantity key token and corresponding quantity indications. Still further, it is noted that as the complianceAuthMaster may run on a different machine than the complianceAuthAssist object, the just-discussed method call may involve the employ of that which is discussed hereinbelow in connection with Distributed POSAMS.

From 713 flow may proceed to 715 where handleReadyPosRequest(_:) may receive a response to the method call of 713, and formulate, based on the method call response, a reply to the POS authorization request. As discussed in greater detail below, the return value of the called method may be a two element integer array where the index 0 element provides an authorization code to employ in responding to the POS authorization request, and where the index 1 element provides a response code to employ in responding to the POS authorization request. As referenced above, the card authorization request sent by the POS is formatted to match the expectations of a payment gateway with which the POS would directly communicate were it not for the functionality discussed herein. In keeping with this, handleReadyPosRequest(_:) may employ the received authorization code and response code in formulating a response to the POS's authorization request which matches an authorization response format employed by such a payment gateway with which the POS would directly communicate were it not for the functionality discussed herein. So as to explain by way of example, suppose that such payment gateway-employed format for an authorization response was to include XML-tag delimited entities: an authorization code value tag delimited by <authorizationCode> and </authorizationCode>, and a response code tag delimited by <responseCode> and </responseCode>. Suppose further that handleReadyPosRequest(_:) holds the received array in a variable array authCodeResponseCode. As such, handleReadyPosRequest(_:) might, in keeping with the Swift/Apple frameworks-based pseudocode employed herein, prepare an XML formatted response string, which matches the discussed format employed by the payment gateway for authorization response, via code in line with the following pseudocode:

```
"<authorizationCode> \(authCodeResponseCode[0]) </authorizationCode>
<responseCode> \(authCodeResponseCode[1]) </responseCode>
```

With respect to the above it is noted that, in keeping with the discussed pseudocode employed herein, \(authCodeResponseCode[0]) employs string interpolation to place in the XML response string literal a sting representation of element zero of the authCodeResponseCode array (i.e., the element conveying the authorization code), and \(authCodeResponseCode[1]) employs string interpolation to place in the string literal a string representation of the element 1 of the authCodeResponseCode array (i.e., the element conveying the response code).

From 715 flow may proceed to 717 where handleReadyPosRequest(_:) acts to provide the XML response string for forwarding to the POS as a response to the POS's authorization request. Returning to the pseudocode PHP script discussed in connection with 703, it is noted that further included in such script may be code which launches as a subprocess a second PHP script (e.g., via the function call pcntl_fork( ) followed by an include statement referencing the second script). The second script may listen for a connection from a third PHP script and may be capable of piping data between the first script (i.e., the script discussed in connection with 703) and the third script. The third script, when launched, may access the first argument passed to it (e.g., via the employ of $argv[1]), make to the second script the connection for which the second script has been listening, and provide over that connection the passed argument. The second script, receiving the passed argument from the third script, may pass it to the discussed first script. The first script may then return the argument to the POS over the accepted socket to the POS (e.g., via the employ of the socket_write function, with $client of the PHP-inspired pseudocode of 703 being the first argument of the call and the received parameter being the second argument of the call). Via the foregoing, launching the third script with an argument may cause the content of that argument to be provided to the POS in response to its authorization request. It is noted that such three script approach may allow data received by the third script to be passed out of a socket of the first script even with the first and third scripts running as separate processes.

As such, at 717 handleReadyPosRequest(_:) may launch the third script with the discussed XML response string being specified as the argument of the third script, causing the XML response to be provided to the POS in reply to its authorization request. In particular, handleReadyPosRequest (_:) may instantiate a NSTask object, set the instantiated NSTask object's launchPath property to be the path, including executable name, for launching the third script, set the NSTask's arguments property to a single element string array of which the sole element holds the XML response string, and call the launch( ) method on the NSTask object, thusly causing the XML response string to be passed to the POS in response to its authorization request. After this, flow may return to 705 so as to be ready for a subsequent POS authorization request dispatch.

Figure 8:
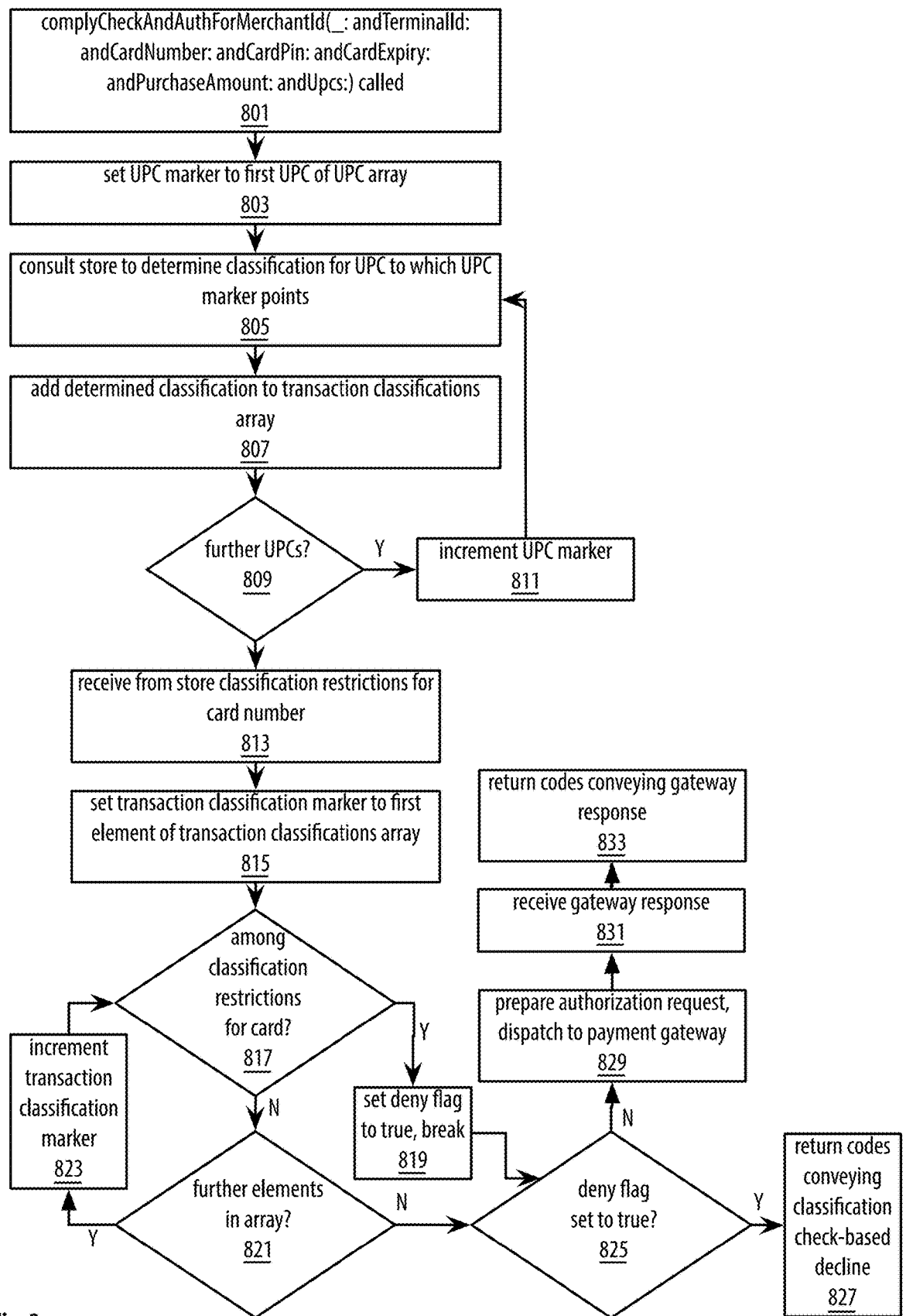
FIG. 8 shows a logic flow diagram illustrating embodiments for the POSAMS of a server-performed process by which check may be made as to whether or not a card transaction includes one or more disallowed entities.

FIG. 8 shows a logic flow diagram illustrating embodiments of a server-performed process by which check may be made as to whether or not a card transaction includes one or more disallowed entities. For instance, the card of the transaction may be a corporate credit card, and/or the disallowed entities may include alcohol and/or spendable instruments (e.g., gift cards, traveler's checks, and/or cash advances). To facilitate discussion, the process of FIG. 8 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 8 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 801, a complyCheckAndAuthForMerchantId(_: andTerminalId: andCardNumber: andCardPin: andCardExpiry: andPurchaseAmount: andUpcs:) method of an complianceAuthMaster object may be called. The method may, as one example, be called by a handleReadyPosRequest(_:) method of a complianceAuthAssist object The complyCheckAndAuthForMerchantId(_: andTerminalId: andCardNumber: andCardPin: andCardExpiry: andPurchaseAmount: andUpcs:) method may have the declaration:

```
func complyCheckAndAuthForMerchantId(_ theMerchantID: Int,
andTerminalID theTerminalID: String, andCardNumber theCardNumber:
Int, andCardPin theCardPin: Int, andCardExpiry theCardExpiry: String,
andPurchaseAmount thePurchaseAmount: Float, andUpcs theUpcs: [Int])
throws -> [Int]
``` where the declaration indicates that the method may take a first parameter of type Int, the first parameter having a local parameter name "theMerchantID" and having no external parameter name. The declaration further indicates that the method may take a second parameter of type String, the second parameter having a local parameter name "theTerminalID" and having the external parameter name "andTerminalID" The declaration also indicates that the method may take a third parameter of type Int, the third parameter having a local parameter name "theCardNumber" and having the external parameter name "andCardNumber." The declaration additionally indicates that the method may take a fourth parameter of type Int, the fourth parameter having a local parameter name "theCardPin" and having the external parameter name "andCardPin." The declaration also indicates that the method may take a fifth parameter of type string, the fifth parameter having a local parameter name "theCardExpiry" and having the external parameter name "andCardExpiry." Still further, the declaration indicates that the method may take a sixth parameter of type float, the sixth parameter having a local parameter name "thePurchaseAmount" and having the external parameter name "andPurchaseAmount." Also, the declaration indicates that the method may take a seventh parameter of type [Int] (integer array), the seventh parameter having a local parameter name "theUpcs" and having the external parameter name "and-Upcs."

Moreover, the declaration indicates that the method may be capable of throwing an error and that the method may have a return type of [Int] (integer array).

From 801 flow may proceed to 803 where complyCheckAndAuthForMerchantId(_: andTerminalId: andCardNumber: andCardPin: andCardExpiry: andPurchaseAmount: andUpcs:) may set a UPC marker to the first element of the received array of UPCs (i.e., to the first element of theUpcs). It is noted that such marker setting may occur in connection with the employ of a for-in loop. From 803 flow may proceed to 805 where the method may consult a store (e.g., a Core Data-managed database) to determine a classification for the UPC of the array of UPCs to which the UPC marker points. The store may contain a number of UPC classification records wherein each such record lists a UPC and a classification for that UPC. As one illustration, a record might list the UPC of a particular alcohol product and classification restriction indication of "alcohol." In keeping with the Swift/Apple frameworks-based pseudocode employed herein, each such record may conform to the entity definition:

| Field Name | Data Type |
| --- | --- |
| upc | Integer 64 |
| classification | String. |

Such entity may, for instance, be given the name UpcClassifierEntity. The upc field may set forth the UPC of a particular product. The classification field may set for a classification for the product indicated by the upc field. There may be a set of possible classifications, and implementation of records may be such that the classification field of a given record indicates a classification from that set of possible classifications. As examples, classifications of the set of possible classifications may include "general grocery," "alcohol," "electronics," "tools-hardware," "clothing," "jewelry," "toys," "baby care," "spendable-instrument," "cosmetic," "cleaning-supply," and "office-supply." It is noted that the foregoing constitute examples only, and that greater, fewer, and/or different classifications for the set of classifications may be chosen for a particular application. As is discussed in greater detail hereinbelow, card number classification restriction records may each set forth a credit card number along with one or more classifications, selected from the set of possible classifications, which are indicated to be disallowed for that card number. As such, selection of the elements for the set of possible classifications may be driven from the vantage point of level of granularity of control desired for credit card usage.

As one illustration, suppose a corporation that assigns credit cards to employees with each such credit card having a unique card number. As such, a particular credit card number may be indicative of a particular employee. Suppose further that such corporation desired that none of its employees be allowed to make alcohol or spendable instrument purchases using their corporate credit cards, but that only employees that are members of the IT department be allowed to make electronics purchases, and only employees in the maintenance department be allowed to purchase tools-hardware and cleaning supplies. For such a corporation, a set of possible classifications including "alcohol," "spendable-instrument," "electronics," "tools-hardware," and "cleaning-supplies" may satisfy the corporation's needs as it would allow all employee card classification records to include "alcohol" and "spendable-instruments" as disallowed, all employees other than IT department members to include "electronics" as disallowed, and all employees other than maintenance department members to include "tools-hardware" and "cleaning-supply" as disallowed.

Although discussed has been the scenario of only a single classification being listed per UPC, such is for illustrative purposes only and other possibilities exist. For instance, a UPC classifier record might list multiple classifications for a given UPC (e.g., such multiple classifications might be listed via a delimited string (e.g., a tag, space, or commadelimited string) in the classification field. Moreover, although discussed has been mapping between UPC and classification, other possibilities exist. As one example, in scenarios where level 3 data is employed in authorization requests, the above-discussed method regarding compliance checking and authorization may be implemented so as to have different and/or additional parameters to allow for the intake of level 3 data (e.g., a parameter may be added to allow for intake of level 3 item product code data and/or a parameter might be added to allow for intake of level 3 item description data). Moreover, as one example under such a level 3 implementation the above-discussed classifier record might, alternately or additionally to the noted upc field, have a level 3 product code and/or level 3 item description field. As such, level 3 product code and/or level 3 item description may be employed in a manner analogous to the discussed employ of UPCs. It is noted that although level 3 data has been mentioned, such for illustrative purposes only and analogous operations may be performed, for instance, with respect to level 2 data and/or with respect to level 4 data.

As another example, in scenarios where data drawn from prebills is employed in authorization requests, the above-discussed method regarding compliance checking and authorization may be implemented so as to have different and/or additional parameters to allow for the intake of prebill data (e.g., a parameter might be added to allow for intake item description data drawn from a prebill, for instance text describing a purchased entree or a purchased beverage). Moreover, as one example under such a prebill implementation the above-discussed classifier record might, alternately or additionally to the noted upc field, have a prebill item description field. As such, data drawn from a prebill may be employed in a manner analogous to the discussed employ of UPCs. To facilitate discussion, it is the scenario of employ of UPCs which will be discussed.

In requesting from the store, at 805, a UPC classifier record for the UPC of the array of UPCs to which the UPC marker points, the method may, in keeping with the Swift/Apple frameworks-based pseudocode employed herein, instantiate a NSFetchRequest object for which the entity property is set to "UpcClassifierEntity" and whose predicate property is set to an NSPredicate object conveying that the returned record should be one whose upc field sets forth the UPC to which the upc marker points. Further at 805 the method may call, in a manner capable of catching a thrown error, executeFetchRequest(_:) on the at-hand NSManagedObjectContent instance, passing as the sole parameter the instantiated NSFetchRequest. Responsive to such call complyCheckAndAuthForMerchantId(_: andTerminalId: andCardNumber: andCardPin: andCardExpiry: andPurchaseAmount: andUpcs:) may receive an array of UPC classifier entity records matching the fetch request. As there is expected to be only a single UPC classifier record which sets forth a given UPC, the received array is expected to be a single element array with the record corresponding to the specified UPC being the first element of the array.

From 805 flow may proceed to 807 where the method may add to a transaction classifications array the value set forth by the classification field of the record retrieved at 805. In keeping with the discussed pseudocode employed herein, the method may call valueForKey("classification") on the first element of the returned array and add the resultant classification to the transaction classifications array. From 807 flow may proceed to 809 where determination is made as to whether or not there are further UPCs in theUpcs. It is noted that such determination may be made in connection with the employ of a for-in loop. Where a determination of "yes" is made at 809 flow may proceed to 811 where the UPC marker is incremented (e.g., in connection with the employ of a for-in loop), and then flow may return to 805, with 805 being performed with respect to the as-incremented UPC marker. Where a determination of "no" is made at 809 flow may proceed to 813.

At 813 the method may retrieve from a store (e.g., a Core Data-managed database) restrictions for the received card number (i.e., for theCardNumber). The store may contain a number of card classification restriction records wherein each such record lists a credit card number and one or more purchase classifications which are restricted for that credit card number. For instance, with an eye towards the earlier-discussed example, a card classification restriction record for a certain credit card might list "alcohol," "spendable instrument," and "electronic" as restricted classes.

In keeping with the discussed pseudocode employed herein, each card classification restriction record may conform to the entity definition:

| Field Name | Data Type |
| --- | --- |
| cardNumber | Integer 64 |
| restrictedClassifications | String. |

Such entity may, for example, be given the name cardClassificationRestrictionEntity. the cardNumber field may set forth a credit card number (e.g., the number of a card assigned to a particular employee). The restrictedClassifications field may set forth as a delimited string (e.g., as a space, comma, or tag-delimited string) one or more classes which are disallowed for that credit card number. The method may, in a fashion analogous to that discussed in connection with 805, instantiate a NSFetchRequest which specifies cardClassificationRestrictionEntity for its entity property and whose predicate property is an NSPredicate object conveying that the returned records should be one whose cardNumber field sets forth the receive card number (i.e., theCardNumber). Further at 813, the method may call, in a manner capable of catching a thrown error, executeFetchRequest(_:) on the at-hand NSManagedObjectContext instance, passing as the sole parameter the instantiated NSFetchRequest. Responsive to such call, complyCheckAndAuthForMerchantId(_: andTerminalId: andCardNumber: andCardPin: andCardExpiry: andPurchaseAmount: andUpcs:) may receive a card classification restriction record array matching the fetch request. As there is expected to be only a single card classification restriction record which sets forth a given card number, the received array is expected to be a single element array with the record corresponding to the at-hand card number being at the first element of the array. Further at 813 the method may access the restrictions for the at-hand card by calling valueForKey ("restrictedClassifications") on the index zero element (i.e., first element) of the returned array. As the value for a record's restrictedClassifications field may be a delimited string setting forth one or more restricted classifications, further at 813 the method may act to produce from the delimited string a corresponding restricted classifications array for which each element of the array holds one of the classifications set forth in a delimited manner in the string. As an illustration, for a comma-delimited string which set forth two restricted classifications as "alcohol,spendable-instrument," the restricted classifications array produced by the method at 813 may be a string array setting forth "alcohol" as its first element and "spendable-instrument" as its second element. In keeping with the discussed pseudocode employed herein, such restricted classifications array may be yielded by calling componentsSeparatedByString (",") on the delimited string, where the specification of "," is in keeping with the comma delimitation employed by the string.

From 813, flow may proceed to 815 where the method sets a transaction classification marker to the first element of the transaction classifications array. Such setting may, for instance, be performed in connection with the employ of for-in loop. From 815 flow may proceed to 817 where the method determines whether the transaction classification of the transaction classifications array to which the transaction classification marker points is among the restricted classifications set forth by the restricted classifications array. It is noted that such checking may, for instance, occur within a for-in loop. In keeping with the noted pseudocode employed herein, the determination may be made by calling the contains(_:) method on the restricted classifications array, passing as the sole parameter the transaction classification to which the transaction classification marker points; in keeping with the noted pseudocode employed herein, such a call on an array may return Boolean true in the case where the array contains the passed parameter, and may return Boolean false in the case where the array does not contain the passed parameter.

Where a determination of "yes" is made at 817 flow may proceed to 819 where the complyCheckAndAuthForMerchantId(_: andTerminalId: andCardNumber: andCardPin: andCardExpiry: andPurchaseAmount: andUpcs:) method sets a deny flag to true and breaks out of the for-in loop, causing flow to proceed to 825. It is noted that such deny flag may be set to an initial value of false prior to entering the loop. Where a determination of "no" is made at 817, flow may proceed to 821 where determination is made as to whether or not there are further elements in the transaction classifications array. Where a determination of "yes" is made at 821, flow may proceed to 823 where the transaction classification marker is incremented (e.g., in connection with the employ of a for-in loop). From 823 flow may return to 817, with 817 being performed in light of the as-incremented transaction classification marker. Where a determination of "no" is made at 821, flow may proceed to 825 where check is made as to whether or not the deny flag holds a value of true. Where a determination of "yes" is made at 825 flow may proceed to 827. Where a determination of "no" is made at 825 flow may proceed to 829.

Turning first to 827, it is noted that at 827 the method may return as its result a two element integer array for which the first element of the array is employed to convey an authorization code and for which the second element of the array is employed to convey a response code, with such authorization code and response code being chosen to convey an authorization response of declined for the reason of classification check failure due to one or more of the items included in the transaction being restricted for the employed card. With an eye towards formulating such authorization response such that it may be employed in connection with already-installed POS software without code alteration of that software, the authorization code and response code chosen to indicate decline due to classification check failure may be chosen to meet POS expectations as to authorization code and response code.

Turning to authorization code, in keeping with the expectation of existing POS software that such code be a 5-6 digit code, one or more particular 5-6 digit codes may be selected to be indicative of classification check failure. For instance, one particular five or six digit code might be sent in all cases of authorization decline due to classification check failure. Moreover merchants might be informed of the code or codes that have been chosen to indicate classification check failure.

In the interest of easily conveying to a POS operator that decline is due to authorization check failure—rather than, say, due to card-issuer-initiated decline—the chosen code or codes might be ones unexpected as card-issuer-initiated authorization codes. As one illustration, it might be selected that the method return five or six nines (i.e., "99999" or "999999") for all cases of decline due to classification check failure.

Turning to response code, in keeping with the expectation of existing POS software that such code be a code selected from a bank of card-system agreed upon codes (e.g., "0" for approved, "6" for error, "33" for expired card, and "99" for duplicate transmission), it may be selected that the method return for all cases of decline due to classification check failure a selected one from the bank of codes which is deemed to be a more generic indication of negativity. As one illustration it may be selected that "6" from the bank of codes—signifying "error"—be employed for all cases of decline due to classification check failure. As an alternative more than one response code might be chosen as being indicative of classification check failure. Merchants may be made aware of the chosen code or codes.

As an illustration it may be selected that the method return an authorization code of six nines (999999) and a response code of 6 to indicate decline due to classification check failure.

At 827 the method may return an array including appropriate authorization and response code values to indicate classification check failure. For instance, where an authorization code of six nines (999999) and a response code of 6 have been chosen to indicate decline due to classification check failure, the method may at 827 return the integer array [999999, 6].

Returning to the circumstance of a determination of "no" being made at 825 in light of the deny flag being found to be set to false, as noted under such circumstance flow proceeds from 825 to 829. In keeping with 829 being reaching under the circumstance where the classification check has been passed (i.e., where none of the items included in the transaction are restricted items for the employed card), at 829 the method may formulate an authorization request and dispatch it to the appropriate payment gateway. The appropriate payment gateway may be according to the received merchant ID, with the method perhaps accessing—say in a manner analogous to that discussed herein with respect to NSFetchRequest-based access—a store which correlates merchant IDs and corresponding payment gateway access information such as URL, login identifier, and/or password.

As such, the classification check being passed, via 829 the method may act to seek card issuer approval or denial of the transaction. As an illustration, the payment gateway to be contacted for an at-hand merchant ID may expect the authorization request to be a SOAP request in the following format:

```
POST /CardAuth HTTP/1.1
Host: www.example.com
Content-Type: application/soap+xml; charset=utf-8
<?xml version="1.0"?>
<soap:Envelope xmlns:soap="http://www.w3.org/2003/05/soap-
envelope">
    <soap:Header>
        <Authentication xmlns""http://www.example.com/cardauth">
            <Login>          </Login>
            <Password>           </Password>
        </Authentication>
    </soap:Header>
    <soap:Body>
        <DoCardAuth xmlns="http://www.example.com/cardauth">
            <MerchantId>          </MerchantId>
            <TerminalId>          </TerminalId>
            <CardNumber>          </CardNumber>
            <CardPin>          </CardPin>
            <CardExpiry>          </CardExpiry>
            <PurchaseAmount>           </PurchaseAmount>
        </DoCardAuth>
    </soap:Body>
</soap:Envelope>
```

In one aspect the format sets forth that the login identifier and password for the at-hand merchant are in the request to be set forth, respectively, with the <Login> </Login> and <Password> </Password> tags. In another aspect the format sets forth that the merchant ID should be set forth between the tags <MerchantId> and </MerchantId>, that the terminal ID should be set forth between the tags <TerminalId> and </TerminalId>, that the card number should be set forth between the <CardNumber> and </CardNumber> tags, that the card PIN should be set forth between the <CardPin> and </CardPin> tags, that the card expiration date should be set forth between the <CardExpiry> and </CardExpiry> tags, and that the purchase amount should be set forth between the <PurchaseAmount> and </PurchaseAmount> tags. Specification of the terminal ID and card PIN may be considered optional by the format (e.g., certain merchants may not employ terminal IDs and/or where the card is not a debit card there may be no PIN).

The complyCheckAndAuthForMerchantId(_: andTerminalId: andCardNumber: andCardPin: andCardExpiry: andPurchaseAmount: andUpcs:) method may know the login and password for the payment gateway from consulting as store as noted. The method may know the other values from the parameters which were passed to the method (e.g., with the passed parameter having the internal name theMerchantId providing the merchant ID.

In preparing the authorization request at 829 the method may, in keeping with the noted pseudocode employed herein, perform the following. In one aspect the method may instantiate a string which sets forth the http body of an authorization request in keeping with the discussed payment gateway expected format. As such the method may instantiate a string which holds the value:

```
<?xml version=\"1.0\"?> <soap:Envelope
xmlns:soap=\"http://www.w3.org/2003/05/soap-envelope\">
<soap:Header> <Authentication xmlns=\"www.example.com/
cardauth\"> <Login> \(theLogin) </Login> <Password> \(thePassword)
</Password> </Authentication> </soap:Header> <soap:Body>
<DoCardAuth xmlns=\"http://www.example.com/cardauth\">
<MerchantId> \(theMerchantId) </MerchantId> <TerminalId>
\(theTerminalId) </TerminalId> <CardNumber> \(theCardNumber)
</CardNumber> <CardPin> \(theCardPin) </CardPin> <CardExpiry>
\(theCardExpiry) </CardExpiry> <PurchaseAmount>
\(thePurchaseAmount) </PurchaseAmount> </DoCardAuth>
</soap:Body> </soap:Envelope>
```

It is noted that the foregoing string leverages string interpolation to place the value of that which is contained within \( ) into the string (e.g., \(theCardPin) places the value of the parameter theCardPin intro the string). Also, \"—that is to say a backslash followed by a quote mark—is employed to convey a quote character into the string itself.

As set forth in the above string, string interpolation places the values of the passed-in parameters theMerchantId, theTerminalId, theCardNumber, theCardPin, theCardExpiry, and thePurchaseAmount at their appropriate tag-delimited spots. As discussed the method may (e.g., by accessing a store) come to possess the login and password for accessing the payment gateway. The above string is based on such login being held in theLogin and such password being held in thePassword.

Still further in preparing the authorization request at 829 the method may instantiate an NSURL object holding the payment gateway URL (e.g., as determined by the method as discussed above). Also, the method may instantiate an NSMutableUrlRequest having its URL property set to the NSURL object, for its content-type that which is set forth above as expected by the payment gateway, having its HTTPMethod property set to "POST" as set forth above as expected by the payment gateway, and its HTTPBody property set to the instantiated string cast as NSData.

Also at 829 the method may instantiate a NSURLConnection object having its request property set to the instantiated NSMutableUrlRequest, its delegate property set to self to indicate that the complianceAuthMaster object will implement delegate methods which the NSURLConnection object will call when the response to the authorization request arrives, and with its startImmediately property set to true. Then the complyCheckAndAuthForMerchantId(_: andTerminalId: andCardNumber: andCardPin: andCardExpiry: andPurchaseAmount: andUpcs:) method may call start( ) on the NSURLConnection object and instantiate a NSMutableData object to hold the response.

From 829 flow may proceed to 831 where the response to the authorization request arrives. Returning to the noted delegate methods, firstly implemented by complianceAuthMaster may be connection(_: didReceiveResponse:) which may be called by the NSURLConnection object when the response to the authorization request begins to arrive. This delegate method may set the length property of the NSMutableData object to be zero to ready the object to hold the incoming response data. With further regard to the delegate methods, complianceAuthMaster may implement connection(_: didReceiveData:) which may be called by the NSURLConnection object multiple times are parts of the authorization request incrementally arrive. This delegate method may append each incremental part of the response which arrives to the NSMutableData object by calling appendData(_:) on that object where the arrived incremental part of the authentication response is set as the sole parameter of the call. With still further regard to the delegate methods, complianceAuthMaster may implement connectionDidFinishLoading(_:) which may be called by the NSURLConnection object once the arrival of the response to the authorization request is complete. This delegate method may instantiate a NSXMLParser object whose data property is set to the noted NSMutableData object holding the authorization response. Still further, the delegate method may set the delegate property of the NSXMLParser object to self to indicate that it is the complianceAuthMaster object which will implement the delegate methods which the NSXMLParser object calls at it parses. Further, the connectionDidFinishLoading(_:) delegate method may call parse( ) on the NSXMLParser object to commence the parsing of the XML therein.

The format of the authorization response may conform to a format known to be employed by the at-hand payment gateway (e.g., as determined by consulting a store using the at-hand merchant ID). As an illustration, the at hand payment gateway may employ a format in which the authorization response includes an authorization code delimited by <AuthorizationCode> and </AuthorizationCode>, and a response code delimited by <ResponseCode> and </ResponseCode>. Returning to the delegate methods to be called by the NSXMLParser object as it parses the authorization response, the complianceAuthMaster may implement the parser(_: didStartElement: namespaceURI: qualifiedName: attributes:) delegate method which is called by the NSXMLParser object when it encounters a tag, and the parser(_: foundCharacters:) delegate method which is called by the NSXMLParser object when hitting tag-delimited data. Such delegate methods may be implemented in a fashion analogous to that discussed herein, but with the two delegate methods acting to recognize the tagging for authorization code and response code and store the received tag-delimited values in properties. For instance, the received tag-delimited data for authorization code may be stored in a property theAuthorizationCode and the tag-delimited data for the response code may be stored in a property theResponseCode. It is noted that these two properties may be of type integer, and storing of the received tag—delimited data may involve a cast to integer.

From 831 flow may proceed to 833 where the complyCheckAndAuthForMerchantId(_: andTerminalId: andCardNumber: andCardPin: andCardExpiry: andPurchaseAmount: andUpcs:) method may return the properties theAuthorizationCode and theResponseCode as the result of the method call by placing the values of these properties in the array which is returned by the method. As referenced during discussion of 827, the result of the method may be an integer array whose first element conveys authorization code and whose second element conveys response code. As such, returned by the method in 827 may be an integer array for which the first element holds the value of theAuthorizationCode and for which the second element holds the value of theResponseCode.

It is noted that although the foregoing has discussed payment gateway access as involving all three of a terminal ID, a login, and a password, such is for illustrative purposes only and fewer than all three of these items may be employed. As one example, neither a login identifier nor a password might be employed. And another example, as an alternative to or in addition to neither a login nor a password being employed, a terminal ID might not be employed.

Figure 9:
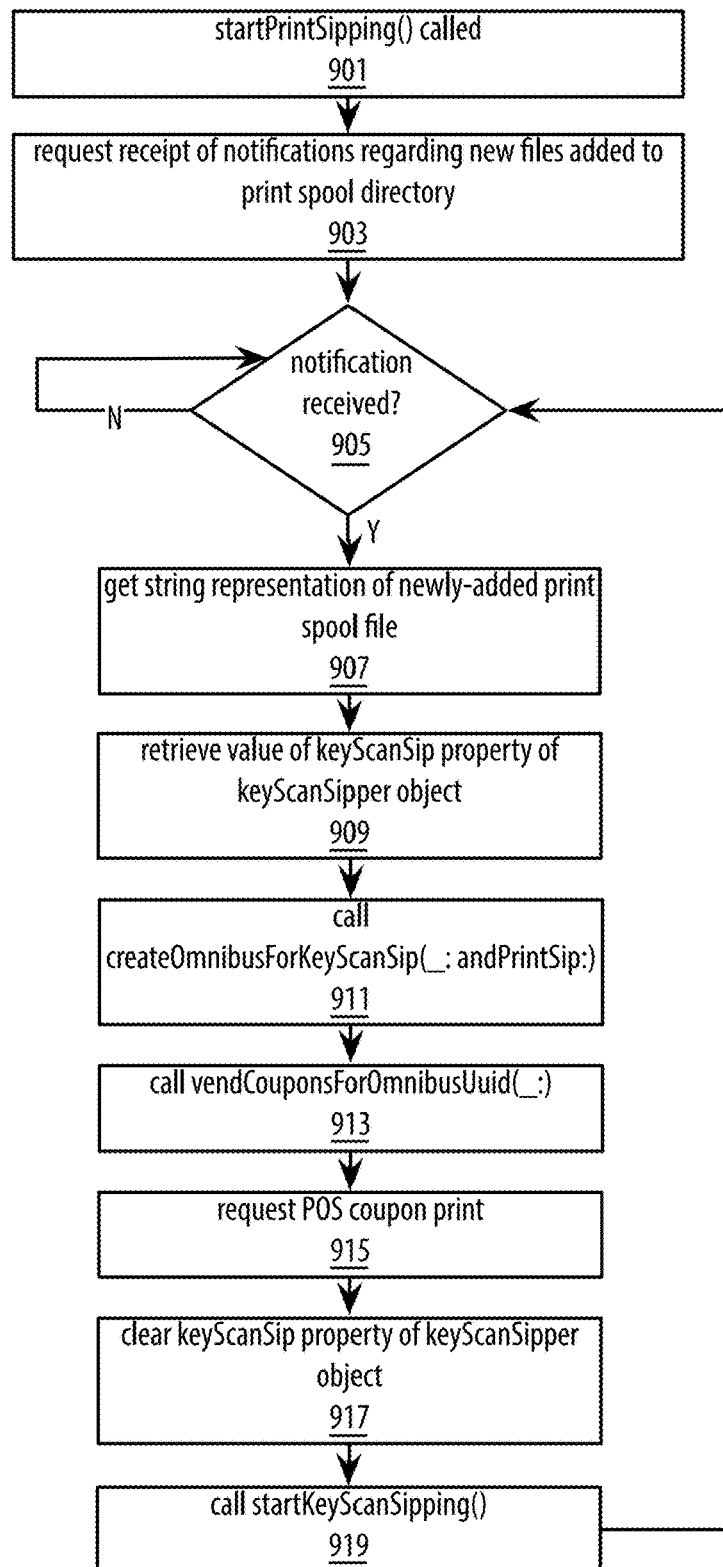
FIG. 9 shows a logic flow diagram illustrating embodiments for the POSAMS of a POS-performed process by which text printed by a POS printer may be captured, without code alteration of already-installed POS software.

FIG. 9 shows a logic flow diagram illustrating embodiments of a POS-performed process by which text printed by a POS printer may be captured, without code alteration of already-installed POS software. To facilitate discussion, the process of FIG. 9 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 9 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 901, a startPrintSipping( ) method of an printSipper object may be called. The method may, as one example, be called with POS startup. For instance, an application setting forth the printSipper object may be set to launch at POS startup (e.g., via a startup script and/or due to being placed in a startup items folder) and may, in keeping with the Swift/Apple frameworks pseudocode employed herein implement an applicationDidFinishLaunching(_:) method which is called with the application's startup, and may have applicationDidFinishLaunching(_:) call startPrintSipping( ). The startPrintSipping( ) method may have the declaration:

func startPrintSipping( ) throws, where the declaration indicates that the method may take no parameters. Moreover, the declaration indicates that the method may be capable of throwing an error and that the method may have no return value.

Turning to 903, it is noted that in keeping with the Swift/Apple frameworks pseudocode employed herein, print jobs intended for a printer of the POS may first be dispatched to a print spool directory as pdf format files. At 903 startPrintSipping( ) may, in keeping with the noted pseudocode employed herein, employ FSEvents to receive notifications of full file paths of files added to the print spool directory of the POS (e.g., a spool directory named/private/var/spool/cups).

In particular, the startPrintSipping( ) method may employ the FSEventStreamCreate function of FSEvents, indicating in doing so for the "pathsToWatch" parameter the print spool directory of the POS (e.g., /private/var/spool/cups), and for the flags parameter kFSEventStreamCreateFlagFileEvents.

From 903 flow may proceed to 905 in which startPrintSipping( ) may await an FSEvents-sourced notification indicating the a new pdf-format print spool file has been added to the POS's print spool directory. Where such a notification, which includes specification of the full file path of the added pdf-format print spool file, is received, flow may proceed to 907.

At 907 the startPrintSipping( ) method may obtain a string representation of the pdf-formatted print spool file which has been newly added to the print spool directory. The method may first, in keeping with the Swift/Apple frameworks pseudocode employed herein, instantiate a NSURL object corresponding to the new print spool file by employing the NSURL initializer method init(string:) where the full file path of the newly-added pdf-format print spool file is, cast as a string, passed to the initializer as the sole parameter. Further at 907 startPrintSipping( ) may instantiate, in keeping with the noted pseudocode employed herein, a PDFDocument object corresponding to the instantiated NSURL object—and by extension corresponding to the pdf-format print spool file represented by that NSURL object—by employing the PDFDocument initializer method init(URL:), wherein the instantiated NSURL object is passed as the sole parameter of the call. The method startPrintSipping( ) may then get, as a string, the textual content of the newly-added print spool file by, in keeping with the noted pseudocode employed herein, calling the string( ) method of the instantiated PDFDocument object.

From 907 flow may proceed to 909 where the method may access the keyscan sip discussed hereinabove by accessing the property of the keyScanSipper object which makes available the keyscan sip. As noted hereinabove, such property may have the name keyScanSip. As such, in keeping with the noted pseudocode employed herein startPrintSipping( ) may gain access to such keyscan sip-providing property via code in line with the pseudocode keyScanSipper.keyScanSip.

From 909 flow may proceed to 911 where startPrintSipping( ) calls a createOmnibusForKeyScanSip(_: andPrintSip:) method of an archivist object, passing as the first parameter the keyscan sip accessed via the discussed property of the keyScanSipper object, and passing as the second parameter the print sip, the print sip being the discussed string-represented textual content of the newly-added print spool file which is accessed by calling string( ) of the PDFDocument object.

In response to the createOmnibusForKeyScanSip(_: andPrintSip:) method call, startPrintSipping( ) may receive a UUID corresponding to an omnibus record which was created as a result of the method call. Flow may then proceed to 913 where startPrintSipping( ) calls a vendCouponsForOmnibusUuid(_:) method of the archivist object, passing as the sole parameter the UUID received via the createOmnibusForKeyScanSip(_: andPrintSip:) method call. With reference to that which is discussed herein it is noted that the createOmnibusForKeyScanSip(_: andPrintSip:) and vendCouponsForOmnibusUuid(_:) method calls may be made upon the archivist object where the archivist object runs on a different process and/or on a different machine, and an approach in keeping with that which is set forth hereinbelow in connection with Distributed POSAMS may be employed in making such method calls.

In response to the vendCouponsForOmnibusUuid(_:) method call, startPrintSipping( ) may receive an array for which each array element provides, for instance in XML format, details of a coupon. At 915 startPrintSipping( ) may request that the POS printer print the coupons provided by the received array. For instance, startPrintSipping( ) may pass the received array to a print handler object which, in keeping with the Swift/Apple frameworks-based pseudocode employed herein, has a coupon printing method which instantiates, setting "self" for the delegate property thereof, an NSXMLParser object. Such specification of "self" for the delegate property of the NSXMLParser object serves to indicate that it is the print handler object which should be the subject of delegate method calls made by the NSXMLParser object. Moreover, the print handler object implements two delegate methods callable by the NSXMLParser object: parser(_: didStartElement: namespaceURI: qualifiedName: attributes:) and parser(_: foundCharacters:). Such coupon printing method may, for instance via for-in loop, with respect to each element of the received array set the contents of such array element as the data property of the NSXML-Parser object and call the parse( ) method of that NSXML-Parser object.

Responsive to the parse( ) call the instantiated NSXML-Parser object may proceed through the XML of the at-hand array element, and when hitting a tag thereof may call the parser(_: didStartElement: namespaceURI: qualifiedName: attributes:) method of the print handler object. Such method of the print handler object may act to store the found tag name in a property (e.g., in a property called currentTag).

When hitting the corresponding tag-delimited data of the tag, the NSXMLParser object may call the parser(_: foundCharacters:) method of the print handler object. Such method of the print handler object may in consideration of the stored tag name (e.g., in consideration of currentTag) store the delimited data as an element of an array property corresponding to the tag name. As an illustration, in consideration of currentTag being "<expiration>," tag-delimited data correspond to the <expiration> and </expiration> tags may be stored in an element of an array property called expiration. The delegate methods may be configured in light of the XML tags employed by the vendCouponsForOmnibusUuid(_:) method, and as such the two delegate methods may act to recognize known tags (e.g., <expiration>) and have corresponding array properties to hold the values delimited by those tags (e.g., an array property named expiration). As such, via the actions of the instantiated NSXMLParser, the for-in loop, and the two delegate methods, the coupon printing method may come to possess, for each coupon of the received array, the various content of that coupon stored among aspect-corresponding array properties (e.g., the array property expiration for the expiration dates).

It is noted that, in one or more embodiments, should a received coupon not set forth a certain known tagable aspect—say if a coupon has no expiration data and includes neither tagging nor delimited data for <expiration> and </expiration>—the coupon printing method may set a nil element for the appropriate element number of the array property which corresponds to that coupon aspect. As an illustration, where for the at-hand coupon it is the eighth element across all array properties holding coupon information which is being filled, in the absence of expiration information in the at-hand coupon the eighth element of the array property for expiration data may be set to nil. Such action may help assure proper lineup between array properties (e.g., helping to insure that the eighth element corresponds to the same coupon across all such arrays).

Having such coupon data, the coupon printing method may, in keeping with the noted pseudocode employed herein, for each coupon (e.g., via one or more for-in loops visiting the elements of the discussed array properties) formulate an NSTextView object setting forth the contents of the at-hand coupon as per the discussed array property elements (e.g., the expiration date of the coupon as per the appropriate element of the expiration array property, and the activation details of the coupon as per the appropriate element of the activation details array property), instantiate an NSPrintOperation object whose printOperationWithView property is set to the instantiated NSTextView object and whose printInfo property is set to an instantiation of an NSPrintInfo object corresponding to default print settings (i.e., an NSPrintInfo object yielded via the class method call NSPrintInfo.sharedPrintInfo( )), and call runOperation( ) on the instantiated NSPrintOperation object to cause the at-hand coupon to print.

From 915 flow may proceed to 917 where the startPrintSipping( ) method, in interest of readying keyscan sipping for a subsequent commerce transaction, may clear (e.g., set to nil or an empty string) the property of the keyScanSipper object which makes available the keyscan sip. As noted hereinabove such property may have the name keyScanSip. As such, in keeping with the Swift/Apple frameworks pseudocode employed herein startPrintSipping( ) may perform such clearing via code in line with the pseudocode keyScanSipper.keyScanSip=. Further in interest of readying keyscan sipping for a subsequent commerce transaction, at 919 startPrintSipping( ) may call the startKeyScanSipping ( ) method of the keyScanSipper object.

Although the foregoing, for sake of illustration, has been from the point of view of a POS printing a physical receipt, it is noted that in one or more embodiments the printing of the receipt may not involve a physical printing. For instance, the receipt may be created as a pdf and stored at and/or remote from the POS but not physically printed. Under such circumstances operation may transpire in an analogous fashion to that discussed, but with the functionality accessing not a print spool directory of the POS but instead such a receipt holding store at and/or remote from the POS.

Figure 10A:
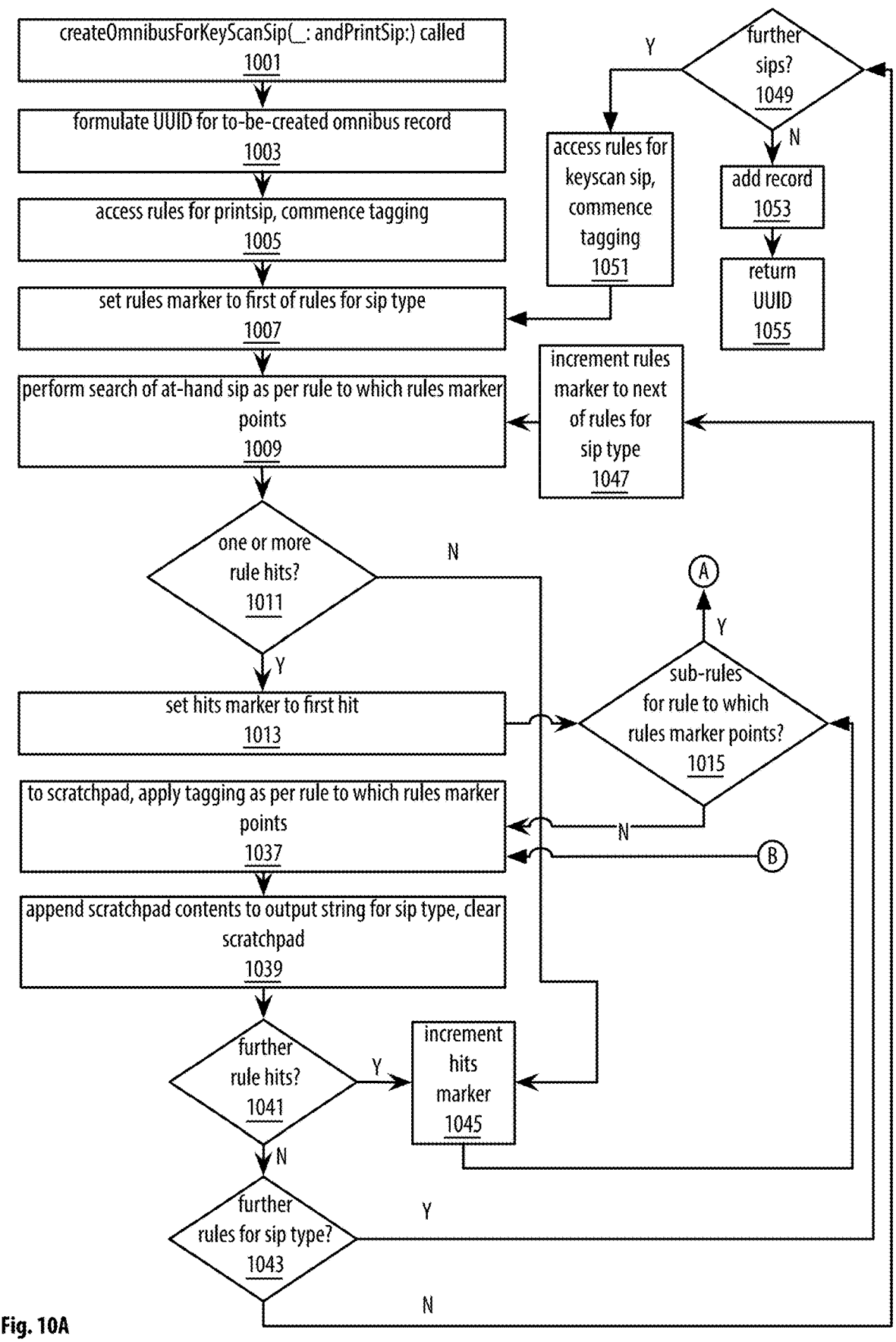
FIG. 10A-B shows a logic flow diagram illustrating embodiments for the POSAMS of a server-performed process by which a tagged omnibus record corresponding to a keyscan sip and a print sip may be created.
Figure 10B:
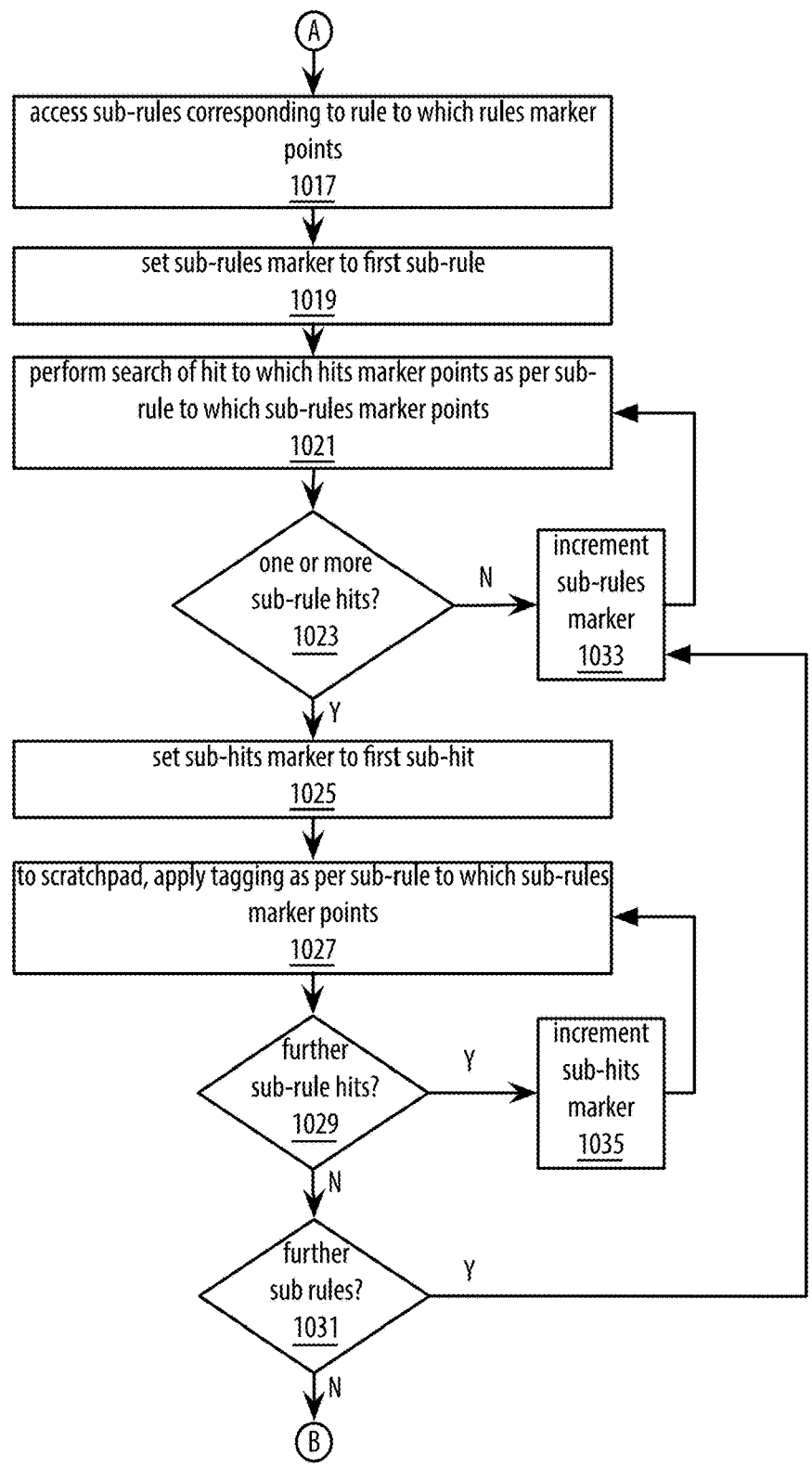

FIG. 10A-B shows a logic flow diagram illustrating embodiments of a server-performed process by which a tagged omnibus record corresponding to a keyscan sip and a print sip may be created. To facilitate discussion, the process of FIG. 10A-B may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 10A-B may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1001, a createOmnibusForKeyScanSip(_: andPrintSip:) method of an archivist object may be called. The method may, as one example, be called by a print sip creation method in response to that method creating a print-sip based on a POS printing of a receipt and, in light of that receipt printing, concluding that a corresponding commerce transaction has concluded. The createOmnibusForKeyScanSip(_: andPrintSip:) method may have the declaration:

func createOmnibusForKeyScanSip(_ theKeyScanSip: String, andPrintSip thePrintSip: String) throws→NSUUID, where the declaration indicates that the method may take a first parameter of type string, the first parameter having a local parameter name "theKeyScanSip" and having no external parameter name. The declaration further indicates that the method may take a second parameter of type string, the second parameter having a local parameter name "thePrintSip" and having the external parameter name "andPrintSip." Moreover, the declaration indicates that the method may be capable of throwing an error and that the method may have a return type of NSUUID.

At 1003, a UUID for the to-be-created omnibus record may be generated. In agreement with the Swift/Apple frameworks pseudocode employed herein, such may be achieved via code in keeping with the pseudocode NSUUID.init( ) wherein the employ of the parameterless initializer init( ) causes instantiation of an NSUUID object having as its value an autogenerated unique UUID.

At 1005 the createOmnibusForKeyScanSip(_: andPrintSip:) method may access printsip tagging rules so as to commence tagging of the printsip. Such accessing of the rules may involve requesting the rules from a store. As examples, such printsip tagging rules may be stored, for instance as records in a Core Data-managed store (e.g., a Core Data-managed database), with each such record conforming to the entity definition:

| Field Name | Data Type |
|---|---|
| ruleCriteria | String |
| openingTag | String |
| closingTag | String |
| subRulesKey | String. |

Such entity may, for instance, be given the name PrintSipRuleEntity.

The ruleCriteria field may set forth a rule which can be plied in searching the intaken printsip string thePrintSip. As one example, the ruleCriteria field may set forth the criteria as a regular expression and/or as a list of words and/or phrases for matching. It is noted that in one or more embodiments matching against a list of words and/or phrases may be achieved via regular expression. As one illustration, a ruleCriteria field might set forth a rule which, when applied to input will yield one or more prices (e.g., $1.99) contained in that input. As another example a ruleCriteria field may yield one or more two-character US state abbreviations (e.g., "CA" for California) set forth by the input. The fields openingTag and closingTag may, respectively, set forth tags to be employed in tagging a hit yielded by searching thePrintSip according to the rule set forth by ruleCriteria. As an illustration, continuing with the example of a printsip rule record having a ruleCriteria field setting forth a rule applicable in finding a two-letter state abbreviation in thePrintSip, the corresponding openingTag and closingTag fields may, respectively, set forth "<stateOfPurchase>" and "</stateOfPurchase>." The field subRulesKey may serve to indicate whether or not any sub-rules correspond to the rule set forth by the record, and where there are such sub-rules may specify a key value employable in accessing those subrules. As such this field may set forth the string "no" where no sub-rules correspond to the rule of the record, and the noted key otherwise. In one or more embodiments such set forth key may be equivalent to the value for the corresponding openTag field but without the greater than/less than characters (e.g., for a record with an openTag field value of "<invoiceLine>" a corresponding field value of "invoiceLine."

In requesting the rules from the store at 1005 createOmnibusForKeyScanSip(_: andPrintSip:) may instantiate an NSFetchRequest object for which the entityName property is set to "PrintSipRuleEntity." Further at 1005 the method may call, in a fashion capable of catching a thrown error, executeFetchRequest(_:) on the at-hand NSManagedObjectContext instance, passing as the sole parameter the instantiated NSFetchRequest object. Responsive to such call createOmnibusForKeyScanSip(_: andPrintSip:) may receive an array of rule records.

From 1005 flow may proceed to 1007 where createOmnibusForKeyScanSip(_: andPrintSip:) sets a rules marker to the first element of the rule records array received via 1005. It is noted that such marker setting may occur in connection with the employ of a for-in loop. Flow may then proceed to 1009 where createOmnibusForKeyScanSip(_: andPrintSip:) performs a search of the at-hand sip, plying in doing so the value set forth by the ruleCriteria field of the record to which the rules marker points, such field being accessible by calling.valueForKey("ruleCriteria") on an array element to which the rules marker points. With reference to 1005, it is noted that on certain performances of 1009 the at-hand sip may be the print sip, while—with reference to 1051 which is discussed in greater detail hereinbelow—on other performances of 1009 the at-hand sip may be the keyscan sip, with the rules being keyscan sip rules. Performing the search of the at-hand sip may, in keeping with the Swift/Apple frameworks pseudocode employed herein, involve instantiating an NSRegularExpression object whose pattern property is set to hold the string specified by the ruleCriteria field of the record pointed to by the rules marker and whose options property is set to an empty array to indicate that no options are desired. The method matchesInString(_: options: range:) may then be called on the instantiated NSRegularExpression object with the first parameter of the call being set to specify the at-hand sip (i.e., thePrintSip or theKeyScanSip depending on the run), the options parameter of the call being set to an empty array to specify that no options are desired, and the range parameter set to specify an instantiated NSMakeRange object for which the range runs from zero to a value equal to the length of the at-hand sip. In keeping with the Swift/Apple frameworks pseudocode employed herein, the result of the method call may be an array specifying the hits of the search, wherein each hit of the search is specified by an element of the array, and each such element specifies its particular hit in terms of a character range within the text which was searched (i.e., within the at-hand sip, either thePrintSip or theKeyScanSip depending on the run). Such results array may be converted into a string array of hits wherein each element specifies, as a string, a hit resulting from the search by, for each element of the results array, fetching the range specified by that results array element, extracting from the string for the at-hand sip a substring corresponding to that fetched range, and then appending that sub string to the string array of hits.

In view of the foregoing, departing 1009 there may be a string array of hits corresponding to the search, of the at-hand sip, performed with respect to the rule to which the rule marker points. It is noted that in the case where performance of the search of 1009 yields no hits the noted string array of hits may be an empty array.

From 1009 flow may proceed to 1011 where a determination is made as to whether or not any hits were yielded in 1009. As such, at 1011 a determination is made as to the emptiness of the string array of hits constructed in 1009. Where a determination of "yes" is made at 1011 (i.e., where it is determined that there are one or more hits), flow may proceed to 1013. Where a determination of "no" is made at 1011 (i.e., where an empty array is found) flow may proceed to 1045.

At 1013 a hits marker may be set to the first element of the noted string array of hits. As one example such hits marker setting may be performed in connection with the employ of a for-in loop.

From 1013 flow may proceed to 1015 where a determination is made as to whether or not there are any sub-rules for the rule to which the rules marker points. Such determination may be made by accessing the subRulesKey field of the rules record to which the rules marker points and seeing whether or not the string "no" is set forth. Where the string "no" is set forth flow may proceed to 1037. Where other than the string "no" is set forth flow may proceed to 1017. The value of the subRulesKey field may be accessed by calling valueForKey("subRulesKey") on the array element to which the rules marker points.

At 1017 createOmnibusForKeyScanSip(_: andPrintSip:) may access the sub-rules which correspond to the rules record to which the rules marker points. Such accessing of the sub-rules may involve requesting the sub-rules from a store. As an example the sub-rules may be stored as records in a Core Data-managed store (e.g., a Core Data-managed database), with each such sub-rule conforming to the entity definition:

| Field Name | Data Type |
| --- | --- |
| subRuleCriteria | String |
| openingTag | String |
| closingTag | String |
| subRulesLock | String. |

Such entity may, for instance, be given the name SubRuleEntity.

The subRuleCriteria field may be analogous to the above-discussed ruleCriteria field (e.g., it may set forth a regular expression), but rather than setting forth a rule to be employed in searching an entire sip (e.g., an entire print sip) it sets for a sub-rule to be employed in searching a portion of an entire sip which was found via the application of a rule which has sub-rules corresponding to it. As an illustration, suppose an invoice line rule which has corresponding sub-rules, where the invoice line rule sets forth a regular expression which, when applied via searching to a print sip may yield one or more invoice line hits, and invoice line being made up of a detailed description, an SKU, and a price. As noted a sub-rule is applicable to searching a portion of an entire sip which was found via the application of a rule. As such, for this illustration the sub-rules may be applicable to searching the portion of the sip which was found via application of the invoice line rule, and therefore applicable to searching the invoice line which is made up of a detailed description, a SKU, and a price. Continuing with the illustration, there may be three such sub-rules, one setting forth a regular expression which may yield the detailed description from the invoice line, a second such sub-rule setting forth a regular expression which may yield the SKU from the invoice line, and a third such sub-rule setting forth a regular expression which may yield the price from the invoice line.

The openingTag and ClosingTag fields may be analogous to their above-discussed counterparts but may correspond to tagging of hits yielded by application of their corresponding subRuleCriteria values. Continuing with the previous illustration, the openingTag and closingTag for the invoice line rule might specify that the entire invoice line—detailed description, SKU, and price—be tag-delimited with <invoiceLine> and </invoiceLine>, while the three sub-rules might specify, respectively, that within the just-discussed tag delimiting, the detailed description be tag delimited with <detailedDescription> and </detailedDescription>, the SKU be tag delimited with <Sku> and </Sku>, and the price be tag delimited with <price> and </price>.

Turning to the subRulesLock field, the subRulesLock field may serve as the counterpart to the above-discussed subRulesKey field. In particular, where a rule record lists in hits subRulesKey field a value other than "no," each of the sub-rule records which correspond to sub-rules of that rule record may list in its subRulesLock field that same value. As an illustration, where a rule having sub-rules lists in its subRulesKey field "invoiceLine," each of the one or more corresponding sub-rule records may list in its subRulesLock field "invoiceLine." In requesting from the store, at 1017, the sub-rules which correspond to the rule to which the rule marker points, createOmnibusForKeyScanSip(_: andPrintSip:) may instantiate an NSFetchRequest object for which the entityName property is set to "SubRuleEntity" and whose predicate property is set to be an NSPredicate object conveying that records returned via the instantiated NSFetchRequest should be ones whose subRulesLock field sets forth the value set forth by the subRulesKey field of the at-hand rule record (e.g., returned records having their subRulesLockField setting forth "invoiceLine" where the subRulesKey field of that at-hand record sets forth "invoiceLine"). As an illustration, where the value of the at-hand subRulesKey field is placed in a variable currentKey, the predicate may be instantiated via code in keeping with the pseudocode NSPredicate (format: "subRulesLock==0/0@", currentKey).

Further at 1017, createOmnibusForKeyScanSip(_: andPrintSip:) may call, in a manner capable of catching a thrown error, executeFetchRequest(_:) on the at-hand NSManagedObjectContext instance, passing as the sole parameter the instantiated NSFetchRequest. Responsive to such call createOmnibusForKeyScanSip(_: andPrintSip:) may receive an array of sub-rule records matching the fetch request. From 1017 flow may proceed to 1019 where createOmnibusForKeyScanSip(_: andPrintSip:) sets a sub-rules marker to the first element of the sub-rule records array received via 1017. It is noted that such marker setting may occur in connection with the employ of a for-in loop. Flow may then proceed to 1021 where createOmnibusForKeyScanSip(_: andPrintSip:) performs a search of the hit to which the hits marker points, such hit being a portion of the current sip, employing in doing so the value set forth by the subRuleCriteria field of the sub-rule record to which the sub-rules marker points. Performance of the search of the hit may be performed in a fashion analogous to that which is set forth in connection with 1009, but with the instantiation of the NSRegularExpression object having its pattern property set to hold the string specified by the subRuleCriteria field of the record pointed to by the sub-rules marker. The method matchesInString(_: options: range:) may then, in a fashion analogous to that set out in connection with 1009, be called on the instantiated NSRegularExpression object, but with the first parameter of the call being set to specify the hit to which the hits marker points and with the range parameter set to specify an instantiated NSMakeRange object for which the range runs from zero to a value equal to the length of the hit to which the hits marker points. Further in a fashion analogous to that discussed in connection with 1009 the character range-orientated results array arising from the method call may be converted, in a fashion analogous to that discussed hereinabove, into a string array of sub-hits wherein each element of the array specifies, as a string, a sub-hit arising from the search.

In view of the foregoing, departing 1021 there may be a string array of sub-hits corresponding to the search, of the hit to which the hits marker points, performed with respect to the sub-rule to which the sub-rules marker points. It is noted that in the case where performance of the search of 1021 yields no sub-rule hits the noted string array of sub-rule hits may be an empty array.

From 1021 flow may proceed to 1023 where a determination is made as to whether or not any sub hits were yielded in 1021. As such 1023 may make a determination as to the emptiness of the string array of sub-hits constructed in 1021. Where a determination of "yes" is made at 1021 (i.e., where it is determined that there are one or more hits) flow may proceed to 1025. Where a determination of "no" is made at 1023 (i.e., where the array is found to be empty) flow may proceed to 1033 where the sub-rules marker is incremented. Such increment may, for example, occur in connection with the employ of a for-in loop. From 1033 flow may return to 1021. At 1025 a sub-hits marker may be set to the first element of the noted string array of sub-hits. As one example such sub-hits marker setting may be performed in connection with the employ of a for-in loop.

From 1025 flow may proceed to 1027. At 1027, tagging may be applied to the sub-hit to which the sub-hits marker points, with the tagging being performed according to the openingTag and closingTag field values of the sub-rule to which the sub-rules marker points, and with the tagging result being appended to a scratchpad string variable. As an illustration, suppose that the sub-hit to which the sub-hits marker points is the string "$1.99" and that the sub-rules marker points to a sub-rule record whose openingTag field value is <price> and whose closingTag field value is </price>. Under such circumstance appended to the scratchpad variable may be the string "<price> $1.99</price>." It is observed that the tagging results (e.g., "<price> $1.99</price>" is appended to the scratchpad variable rather than overwriting the scratchpad variable. As referenced hereinabove, and as discussed in greater detail hereinbelow, such appending may allow for the building up of compound tagging sequences. As an illustration, a compound tagging sequence of "<invoiceLine> <detailedDescription> New Day Hammer </detailedDescription> <Sku> AC-123</Sku> <price> $1.99</price> </invoiceLine>" may be built up. As discussed hereinbelow, the scratchpad variable is, at an appropriate point in time, cleared by createOmnibusForKeyScanSip(_: andPrintSip:).

From 1027 flow may proceed to 1029 where a determination is made as to whether or not there are further sub-hits in the noted string array of sub-hits. Such determination may, as an example, be performed in connection with the employ of a for-in loop. In the case where a determination of "no" is made at 1029, flow may proceed to 1031. In the case where a determination of "yes" is made at 1029 flow may proceed to 1035 where the sub-hits marker is incremented. It is noted that such increment may, for instance, occur in connection with the employ of a for-in loop. From 1035 flow may return to 1027.

At 1031, determination may be made as to whether or not there are further sub-rules in the sub-rules records array. Such determination may, for example, be made in connection with the employ of a for-in loop. Where a determination of "yes" is made at 1031, flow may proceed to 1033. Where a determination of "no" is made at 1031 flow may proceed to 1037.

At 1037 tagging may be applied to the hit to which the this marker points, with the tagging being performed according to the openingTag and closingTag field values of the rule to which the rules marker points, and with the tagging result being appended to the scratchpad string variable. As one illustration suppose the hit to which the hits marker points arises from a rule for which there are no sub-rules, and that such hit is the string "San Francisco." Suppose further that the rules marker points to a rule record whose openingTag field value is <cityOfPurchase> and whose closingTag field value is </cityOfPurchase>. Under such circumstance appended to the scratchpad variable may be the string "<cityOfPurchase> San Francisco </cityOfPurchase>."

As another illustration, with an eye towards the illustration of 1037, suppose that the hit to which the this marker points arises from a rule for which there are sub-rules, and that such hit is the string "New Day Hammer AC-123 $1.99." Suppose further that via flow of createOmnibusForKeyScanSip(_: andPrintSip:) visiting 1027 multiple times the scratchpad came to hold the string "<detailedDescription> New Day Hammer </detailedDescription> <Sku> AC-123</Sku> <price> $1.99</price>." Suppose further that the rules marker points to a rule record whose openingTag field value is <invoiceLine>" and whose closingTag field value is </invoiceLine>. Under such circumstance, appended to that which is already on the scratchpad—the string "<detailedDescription> New Day Hammer </detailedDescription> <Sku> AC-123</Sku> <price> $1.99</price>"—may, as delimiters, be the tags "<invoiceLine>" and "</invoiceLine>," such that the building up results in the scratchpad holding "<invoiceLine> <detailedDescription> New Day Hammer </detailedDescription> <Sku> AC-123</Sku> <price> $1.99</price> </invoiceLine>."

From 1037 flow may proceed to 1039 where the contents of the scratchpad are appended to—depending on whether the at-hand sip is the keyscan sip or the print sip—either a keyscan sip output string or a printsip output string. Further at 1039 the scratchpad may be cleared.

From 1039 flow may proceed to 1041 where determination is made as to whether or not there are further hits in the noted string array of hits. Such determination may, as an example, be performed in connection with the employ of a for-in loop. In the case where a determination of "no" is made at 1041, flow may proceed to 1043. In the case where a determination of "yes" is made at 1041, flow may proceed to 1045 where the hits marker is incremented. As an example such increment may occur in connection with the employ of a for-in loop. From 1045 flow may proceed to 1015.

At 1043 determination may be made as to whether or not there are further rules in the received rules record array. Such determination may be made in connection with the employ of a for-in loop. As the rules were fetched with respect to either a keyscan sip or a printsip depending on the cycling of createOmnibusForKeyScanSip(_: andPrintSip:) through that which is set forth in FIG. 10*a-b*, the determination of 1043 serves to determine whether or not there are further rules to be considered with respect to that sip type. As an illustration, where 1043 is visited in connection with performance of 1015, 1043 may serve to determine whether or not there are further print sip rules to be considered.

Where a determination of "yes" is made at 1043 flow may proceed to 1047 where the rules marker is incremented. Such increment may occur in connection with the employ of a for-in loop. From 1047 flow may proceed to 1015. Where a determination of "no" is made at 1043 flow may proceed to 1049.

At 1049 determination may be made as to whether or not there are further sips to consider. Where 1049 is visited in connection with the visiting of 1005 the answer will be "yes" as the keyscan sip still remains to be considered. Where 1049 is visited in connection with the visiting of to-be-discussed 1051 both of the print sip and the keyscan sip will have been considered, and as such the answer will be "no." Where a determination of "yes" is made at 1049, flow will proceed to 1051. Where a determination of "no" is made at 1049 flow may proceed to 1053.

At 1051 createOmnibusForKeyScanSip(_: andPrintSip:) may access keyscan sip tagging rules so as to commence tagging of the keyscan sip. 1051 may be performed in a manner analogous to the performance of 1005, but with the instantiated NSFetchRequest object having its entityName property set to "KeyScanSipRuleEntity" so as to convey that it is keyscan sip rules which are desired. The entity definition for the KeyScanSipRuleEntity may be identical to that of the PrintSipRuleEntity outside of the entity name (e.g., the KeyScanSipRuleEntity definition may have ruleCriteria, openingTag, closingTag, and subRulesKey string fields), with a different entity name being employed to potentially facilitate rules fetching. From 1051 flow may proceed to 1007 so as to perform, now with respect to the keyscan sip and now building a keyscan sip output string rather than a print sip output string, operations analogous to the above-discussed of 1007 onward. Having done so, flow may return to 1049. Visiting 1049 subsequent to having considered both of the print sip and the keyscan sip, a determination of "no" may be made at 1049, prompting flow to proceed to 1053.

At 1053 createOmnibusForKeyScanSip(_: andPrintSip:) may add to the store (e.g., a Core Data-managed database) an omnibus record which involves the above-discussed generated UUID, the above-discussed built print sip output string and the above-discussed built keyscan sip output string.

The added omnibus record may conform to the entity definition:

| Field Name | Data Type |
|---|---|
| omnibusUuid | String |
| keyScanSip | String |
| printSip | String. |

Such entity may, for instance, be given the name OmnibusEntity. The omnibusUuid field may be employed in storage of the generated UUID, the keyScanSip field may be employed in storage of the keyscan sip output string, and the printSip field may be employed in storage of the print sip output string. Creation of the omnibus record may, in accordance with the Swift/Apple frameworks pseudocode employed herein, in one aspect involve instantiating an NSEntityDescription object via employ of the NSEntityDescription class method entityForName(_: inManagedObjectContext:), where the string "OmnibusEntity" is passed as the first parameter and the at-hand managed object context is passed as the second parameter. In another aspect, creation of the omnibus record may involve instantiating an NSManagedObject via the initializer method init(entity: insertIntoManagedObjectContext:), where the above-instantiated NSEntityDescription object is passed as the first parameter and the at-hand managed object context is passed as the second parameter. In a further aspect, creation of the omnibus record may involve calling the setValue(_: forKey:) method on the instantiated NSManagedObject. A first such call may pass the generated UUID cast as a string for the first parameter and "omnibusUuid" as the second parameter, and may serve to set the generated UUID as the value for the omnibusUuid field of the new omnibus record. In keeping with the Swift/Apple frameworks pseudocode employed herein, such casting the generated UUID as a string may be achieved via the UUIDString property of the NSUUID object corresponding to the generated UUID. A second call to setValue(_: forKey:) may pass the built keyscan sip output string as the first parameter and "keyScanSip" as the second parameter, and may serve to set the built keyScan sip output string as the value for the keyScanSip field of the new omnibus record. A third such call may pass the built print sip output string as the first parameter and "printSip" as the second parameter, and may serve to set the built print sip output string as the value for the printSip field of the new record. In a final aspect, creation of the omnibus record may involve calling save( ) on the at-hand managed object context. As such, a new omnibus record—hold the generated UUID, the built keyscan sip output string, and the built print sip output string—will be saved to the store by the actions of 1053.

From 1053 flow may proceed to 1055 where the generated UUID may be returned as the result of the method call.

With further regard to the above-discussed rule records and sub-rule records the following is now discussed. Print sip and keyscan sip aspects for which tagging rules and/or sub-rules may be set forth include commerce location (e.g., store or restaurant) and/or chain name, commerce location number (e.g., store number and/or restaurant number such as when part of a chain), street address of purchase (reflecting commerce location street address), city of purchase (reflecting commerce location city), state of purchase (reflecting commerce location state), zip code of purchase (reflecting commerce location zip code), area code of purchase (reflecting commerce location phone number and/or commerce location fax number), date/time of purchase, UPC, UPC with associated via-quantity-key quantity entry, invoice line, totals, and/or payment type (e.g., cash or one or more specified credit card brands). The noted invoice line aspect may have tagging sub-rules for price, detailed description, and/or SKU. The noted totals aspect may have tagging sub-rules for sub-total, discount total, federal tax, state tax, county tax, city tax, and/or grand total. It is noted that in one or more embodiments one or more aspects which are discussed herein as being handled by sub-rules may instead be handled by rules, and/or one or more aspects which are discussed herein as being handled by rules may instead be handled by sub-rules.

The tagging rules and/or tagging sub-rules may be established in a number of ways. For instance, such rules and/or sub-rules may be established by a marketing and/or data analysis expert, and/or arise from mining and/or other analysis of pools of receipts, print sips, and/or keyscan sips. Where such a marketing and/or data analysis expert is involved in establishing the rules and/or sub-rules, the expert may be aided in converting her rule and/or sub-rule goals into the called-for format. As one example an automated process (e.g., a wizard) may provide such aid. As further example another individual may provide (e.g., a regular expression expert) may provide such aid. Where rules and/or sub-rules arise from such data mining and/or other analysis, the rules and/or sub-rules may be generated automatically based on such analysis (e.g., code performing such analysis may generate one or more rules and/or sub-rules) and/or may involve input from a marketing and/or data analysis expert (e.g., such expert may view data mining and/or other analysis results and formulate rules and/or sub-rules in view of them)

So as to illustrate by way of example, with respect to certain of the above-discussed aspects corresponding rules and/or sub-rules will now be set forth. Turning to commerce location and/or chain name, a corresponding rules record may set forth rules criteria (e.g., as a regular expression) that leverages a list of commerce location and/or chain-related words and/or phrases and specifies that text including one or more instances of such words and/or phrases be considered to be text corresponding to a commerce location and/or chain name. Such a list may include general term and/or phrases (e.g., "bakery" and/or "market") and/or specific known commence location and/or chain words and/or phrases (e.g., one or more words and/or phrases corresponding to particular known commerce locations—say "Bill's Market," and/or corresponding to particular known chains—say "Big Box Member Club"). Such rules criteria may also set forth a quantity of words, characters, and/or phrases to the left or right of a matching word or phrase which should be considered to be, along with the word and/or phrase which matched, part of the commerce location and/or chain name. As an illustration, the rules criteria may indicate that where the word "bakery" is found that word and a word to the left of that word should be considered to make up the commerce location and/or chain name. Corresponding to such rules criteria may be an opening tag specification of "<commerceLocationChainName>" and a closing tag specification of "/<commerceLocationChainName>."

Turning to commerce location number, a corresponding rules record may set forth rules criteria (e.g., as a regular expression) that a series of digits—with or without an adjoining number identifier such as "#," "Nr." or the word "number"—preceded by a commerce location and/or chain name, or preceded by the word "store," "restaurant," or similar, be considered a commerce location number. As an illustration, the string "store #1234" may match such a rules criteria specification. Corresponding to such rules criteria may be an opening tag specification of "<commerceLocationNumber>" and a closing tag specification of "/<commerceLocationNumber>."

Turning to state of purchase, a corresponding rule record may set forth rules criteria (e.g., as a regular expression) that leverages a list of full names of and/or abbreviations for US states and specifies that a match to the list in input text (e.g., print sip text) be considered a state of purchase). It is noted that for the purposes of tagging regions in the vein of Puerto Rico and District of Columbia may be considered to be states. Corresponding to such rules criteria may be an opening tag specification of "<stateOfPurchase>" and a closing tag specification of "/<stateOfPurchase>."

Turning to city of purchase a corresponding rules record may set forth rules criteria (e.g., as a regular expression) that is implemented in a manner analogous to that described for state of purchase, bit with the list being a list of full names and/or abbreviations for cities (e.g., a list including "San Francisco" and "SF") rather than a list of US states. The rules criteria might specify that a match to the list in input text be considered to be a city of purchase. Corresponding to such rules criteria may be an open tag specification of "<cityOfPurchase>" and a closing tag specification of "/<cityOfPurchase>."

Turning to zip code, a corresponding rules record may set forth rules criteria (e.g., as a regular expression) that an instance of five digits falling within the inclusive range 00501-99950 in input text constitute a zip code. Corresponding to such rules criteria may be an opening tag specification of "<zipOfPurchase>" and a closing tag specification of "/<zipOfPurchase>." Turning to area code of purchase, a corresponding rules record may set forth rules criteria (e.g., as a regular expression) that an instance of three digits falling within the inclusive range 201-989 which are followed by three other digits and then four digits, where there are dashes or spaces separating the three digits ranging between 201 and 989, the three other digits, and the four digits, and where there may or may not be parentheses around the three digits ranging between 201 and 989 be considered to be an area code. Corresponding to such rules criteria may be an opening tag specification of "<areaCodeOfPurchase>" and "/<areaCodeOfPurchase>."

Turning to UPC, a corresponding rules record may set forth rules criteria (e.g., as a regular expression) that an instance of 12 or 13 digits which satisfy the UPC check digit calculation constitute a UPC. Corresponding to such rules criteria may be an opening tag specification of "<UPC>" and a closing tag specification of "/<UPC>."

Turning to invoice line, a corresponding rules record may, in one aspect, set forth a sub-rules key linking corresponding sub-rule records. The invoice line rules record may, in another aspect, set forth rules criteria (e.g., as a regular expression) that an instance of the following in input text constitute an invoice line: 1) a decimal point with two digits to the right of it and zero or more digits to the left of it with or without a dollar sign; and 2) one or more instances of words and/or other phrases from a list of words and/or phrases constituting manufacturer names, trade names, and/or general product, item, and/or service words (e.g., "hammer" and/or "casserole"); and optionally either or both of 3) a series of characters flanked on one side by that which has been set forth in connection with "1)" and on the other side by that which has been set forth in connection with "2)"; and 4) a negation sign character, the word "discount," the word "off," and/or the words "savings" along with either: a) a decimal point with two digits to the right of it and zero or more digits to the left of it without or without a dollar sign; or b) a percentage character with 1-3 characters to the left of it. Corresponding to such rules criteria may be an opening tag specification of "<invoiceLine>" and a closing tag specification of "/<invoiceLine>."

As one illustration, by way of the just-discussed the following in input text may be considered to constitute an invoice line: "United Hardware Caulk Gun 452722 $6.99." In particular, $6.99 meets the criteria of a decimal point with two digits to the right of it and zero or more digits to the left of it with or without a dollar sign, "United Hardware Caulk Gun" meets the criteria of one or more instances of words and/or phrases from a list of words and/or phrases constituting manufacturer names, trade names, and/or general product, item, and/or service words, and "452722" meets the optional criteria of a series of characters flanked on one side by that which has been discussed in connection with "1)" and that which has been discussed in connection with "2)."

As noted, a rules record for invoice line may set forth a sub-rules key linking corresponding sub-rule records. Such sub-rule records will now be discussed. In one aspect, each such sub-rule record may set forth a sub-rule lock value matching the sub-rule key value set forth by the rules record for invoice line (e.g., where the rules record for invoice line sets forth a subRulesKey value of "invoiceLine" each of the sub-rule records may set forth a subRulesLock value of "invoiceLine." A first of the sub-rule records corresponding to the invoice line may set forth sub-rules criteria (e.g., as a regular expression) that an instance of one or more instances of words and/or other phrases from a list of words and/or phrases constituting manufacturer names, trade names, and/or general product, item, and/or service words in input text constitute a detailed description. Corresponding to such sub-rules criteria may be an opening tag specification of "<detailedDescription>" and a closing tag specification of "/<detailedDescription>."

A third of the sub-rule records corresponding to invoice line may set forth sub-rules criteria (e.g., as a regular expression) that an instance of a series of characters flanked on one side by a decimal point with two digits to the right of it and zero or more digits to the left of it with or without a dollar sign, and on one side by one or more instances of words and/or other phrases from a list of words and/or phrases constituting manufacturer names, trade names, and/or general product, item, and/or service words, in input text constitute an SKU. Corresponding to such sub-rules criteria may be an opening tag specification of "<SKU>" and a closing tag specification of "/<SKU>." A fourth of the sub-rule records corresponding to invoice line may set forth sub-rules criteria (e.g., as a regular expression) that an instance of a negation sign character, the word "discount," the word "off," and/or the words "savings" along with either: a) a decimal point with two digits to the right of it and zero or more digits to the left of it without or without a dollar sign; or b) a percentage character with 1-3 characters to the left of it in input text constitute a discount. Corresponding to such sub-rules criteria may be an opening tag specification of "<discount>" and a closing tag specification of "/<discount>."

Turning to payment type, a corresponding rules record may set forth rules criteria (e.g., as a regular expression) that an instance of a word and/or phrase from a list of payment-type descriptive words and/or phrases such as "cash" and/or one or more credit card band names in input text constitute a payment type. Corresponding to such rules criteria may be an opening tag specification of "<paymentType>" and a closing tag specification of "/<paymentType>."

It is noted that according to one or more embodiments a user may be able to specify the information which she is willing to share (e.g., the information which finds is way to retained omnibus record storage).

Such sharing specification may, for instance, be executed via a GUI of the user device, and/or may occur during a setup operation—say one in which payment card information is supplied—and/or at another point in time. The information sharing options provided to the user may reflect and/or leverage the discussed herein omnibus-record-tagable aspects. As an illustration, as discussed hereinabove such omnibus-record-tagable aspects may include commerce location name, street address of purchase, city of purchase, date/time of purchase, UPC, SKU, payment type, price paid, and detailed description. As such, the sharing options presented to the user may include specification for each of such aspects as to whether or not she is willing to share that aspect (e.g., a GUI of the user device may allow the user to specify "yes" or "no" as to whether or not she is willing to share price paid information and/or UPC information).

Where a user indicates that she is unwilling to share the information of a particular tagable aspect, her wishes may be complied with, for instance, by having the above-discussed operations, when hitting a tagable aspect marked by a user as no-share, rather than tagging the corresponding information within the omnibus record as discussed, instead deleting the corresponding information from the omnibus record. It is additionally noted that according to one or more embodiments user may be able to specify the scope of sharing and/or the parties with whom particular tagable aspects may be shared. For instance, a user may be able to specify, as one aspect, whether or not the information of a tagable aspect may find its way to retained omnibus record storage, and as another aspect whether or not the information of that tagable aspect may be shared with third parties. According to one or more embodiments, as an alternative to and in addition to a customer user being able to set sharing settings, one or more other parties—say commerce locations and/or program managers overseeing the operations regarding the functionality set forth herein—may be able to set sharing settings in an analogous fashion to that discussed herein in connection with customer user specification of such. As one illustration, a commerce location (e.g., via a POS GUI and/or by accessing a web portal) may be able to specify whether or not price paid, SKU, and/or street address of purchase is shared, and/or the scope of such sharing. It is noted that omnibus record storage and/or device communications regarding such storage may be implemented in an encrypted fashion. Such also holds true for the various other stores and communications discussed hereinthroughout.

Figure 11:
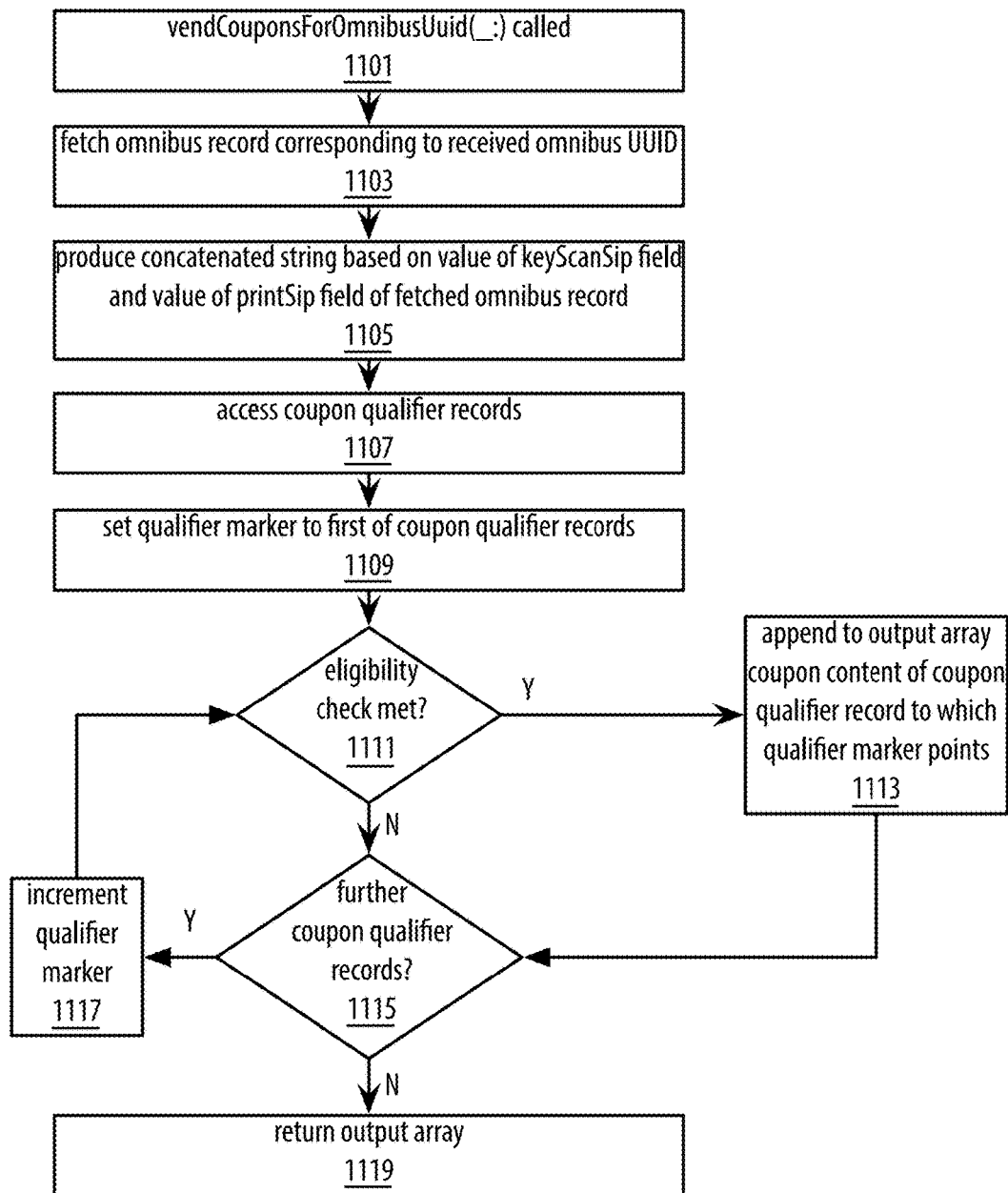
FIG. 11 shows a logic flow diagram illustrating embodiments for the POSAMS a server-performed process by which coupons for which an omnibus record qualifies may be obtained, the omnibus record corresponding to a specified Universally Unique Identifier (UUID).

FIG. 11 shows a logic flow diagram illustrating embodiments of a server-performed process by which coupons for which an omnibus record qualifies may be obtained, the omnibus record corresponding to a specified UUID. To facilitate discussion, the process of FIG. 11 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 11 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1101, a vendCouponsForOmnibusUuid(_:) method of an archivist object may be called. As is discussed in greater detail hereinbelow, the method may, as one example, be called by a print sip creation method subsequent to that method having called createOmnibusForKeyScanSip(_:

andPrintSip) and having received an omnibus UUID in response to that call. The vendCouponsForOmnibusUuid(_:) method may have the declaration:

func vendCouponsForOmnibusUuid(_ theOmnibusUuid: NSUUID) throws→[String], where the declaration indicates that the method may take a first parameter of type NSUUID, the first parameter having a local parameter name "theOmnibusUuid" and having no external parameter name. The declaration further indicates that the method may be capable of throwing an error and that the method may have a return type of [String]—an array wherein each element of the array is of type String.

At 1103 vendCouponsForOmnibusUuid(_:) may fetch, from a store (e.g., a Core Data-managed database) the omnibus record corresponding to the received omnibus record UUID. The method may, in one aspect, ready a string representation of theOmnibusUuid by accessing the UUID-String property thereof. The method may, in another aspect, instantiate an NSFetchRequest object for which the entityName property is set to specify "OmnibusEntity," and whose predicate property is set to be an NSPredicate object conveying that records returned via the instantiated NSFetchRequest should be ones whose omnibusUuid field sets forth the value set forth by the discussed UUID string representation. The entity definition for OmnibusEntity is discussed hereinabove. Further at 1103 vendCouponsForOmnibusUuid(_:) may call, in a fashion capable of catching a thrown error, executeFetchRequest(_:) on the at-hand managed object context, passing as the sole parameter the instantiated NSFetchRequest object. Responsive to such request vendCouponsForOmnibusUuid(_:) may receive an array of omnibus records matching the request. Due to the uniqueness of the omnibus record UUID passed in executing the fetch, the array may be expected to contain a single element. The vendCouponsForOmnibusUuid(_:) method may further at 1103 access this sole fetched omnibus record by accessing the zero index element of the received array.

At 1105 vendCouponsForOmnibusUuid(_:) may produce a concatenated string made up of the value of the keyScanSip field and the value of the printSip field of the fetched omnibus record. The method may, in one aspect, access the keyScanSip field value by calling valueForKey("keyScanSip") on the zero index element of the received array, and access the printSip field value by calling valueForKey("printSip") on the zero index element of the received array. To facilitate discussion, suppose that such accessed values are stored, respectively, in the variables keyScanSipString and printSipString. To further facilitate discussion, suppose that vendCouponsForOmnibusUuid(_:) endeavors to store the concatenated string in the variable keyScanPrintSips. In keeping with the Swift/Apple frameworks pseudocode employed herein, vendCouponsForOmnibusUuid(_:) may produce the concatenated string and store its value in the noted variable via code in keeping with the pseudocode:

var keyScanPrintSips=keyScanSipString+printSipString.

From 1105 flow may proceed to 1107. At 1107 vendCouponsForOmnibusUuid(_:) may access coupon qualifier records. Such records may be stored, for instance, as records in a Core Data-managed database. Each such record may conform to the entity definition:

| Field Name | Data Type |
|---|---|
| couponEligibilityChecker | String |
| couponContent | String. |

Such entity may, for instance, be given the name CouponQualifierEntity. The couponEligibilityChecker field may set forth a rule which is employable in searching a concatenated string of the sort discussed. As one example, the value set forth by the couponEligibilityChecker field may be a regular expression. In particular, the couponEligibilityChecker field value may set forth a regular expression which conveys that which the concatenated string should set forth in order to be eligible for the at-hand coupon. Coupon details such as eligibility and benefit may, for example, be set by a marketing expert and/or by an automated process.

When applied to input text, a regular expression endeavors to return one or more instances in that text which match the regular expression. As employed here, where the regular expression conveys that which the concatenated string should set forth in order to be eligible for the at-hand coupon, the concatenated string—and therefore the omnibus record to which it corresponds—may be considered to be eligible for the coupon where application of the regular expression to the concatenated string yields at least one hit. Where no hits are yielded by application of the regular expression the concatenated string may be considered ineligible for the coupon.

So as to illustrate by way of example, suppose it were desired that, in order to qualify for a certain coupon, the concatenated string would set forth a state of purchase of "CA" or "California" and an invoice line which set forth both a detailed description including "caulk gun" and a price which is greater than $5.00. A regular expression employed for the corresponding couponEligibilityChecker field may be configured such that the regular expression, when applied to input text, returns one or more instances in that text which each include both: a) "CA" or "California" delimited by the opening and closing tags "<StateOfPurchase>" and "</StateOfPurchase>"; and b) delimited by "<invoiceLine>" and "</invoiceLine>"—and therefore occurring within a single invoice line—both of: 1) text including "caulk gun" which is delimited by "<detailedDescription>" and "/<detailedDescription>" and 2) a dollar-wise value greater than $5.00 which is delimited by "<price>" and "</price>." As such, when applied to an eligible concatenated strong the regular expression may yield at least one hit constituting a portion of the concatenated string which if examined would be found to contain both: a) "CA" or "California" delimited by the opening and closing tags "<StateOfPurchase>" and "</StateOfPurchase>"; and b) delimited by "<invoiceLine>" and "</invoiceLine>"—and therefore occurring within a single invoice line—both of: 1) text including "caulk gun" which is delimited by "<detailedDescription>" and "/<detailedDescription>" and 2) a dollar-wise value greater than $5.00 which is delimited by "<price>" and "</price>." When applied to an ineligible concatenated string the regular expression may yield no hits. As such, as referenced above and as is discussed in greater detail hereinbelow, determination of coupon eligibility may involve applying, to the concatenated string, a regular expression retrieved from an at-hand couponEligibilityChecker field and counting the number of hits which are yielded. Where no hits are yielded the concatenated string—and therefore the omnibus record—may be considered ineligible for the coupon. Where at least one hit is yielded the concatenated string—and therefore the omnibus record—may be considered eligible for the coupon.

The couponContent field may set forth the content of the coupon. Coupon content may include specification of products, services, or other entities to which the coupon applies (e.g., to Strike True nails, dozen size box, UPC code 6869), expiration date (e.g., Dec. 31, 2019), activation requirement (e.g., to purchase one of the noted entity to which the coupon applies—Strike True nails, dozen size box, UPC code 6869), and that which the coupon provides (e.g., one free box of Strike True nails, dozen size box), cash value (e.g., ½0th of one cent), and/or coupon identifier (e.g., UPC or UUID). As one example, the coupon content field may set forth the content of the coupon as an XML string. It is noted that to facilitate discussion the UPC code has been set forth as having only four digits.

In requesting the coupon qualifier records from the store at 1107, vendCouponsForOmnibusUuid(_:) may instantiate an NSFetchRequest object for which the entityName property is set to "CouponQualifierEntity." Further at 1107 vendCouponsForOmnibusUuid(_:) may call, in a fashion capable of catching a thrown error, executeFetchRequest(_:) on the at-hand NSManagedObjectContext instance. Responsive to such call vendCouponsForOmnibusUuid(_:) may receive an array of coupon qualifier records. From 1107 flow may proceed to 1109 where the method sets a qualifier marker to the first element of the qualifier records array received via 1107. It is noted that such marker setting may occur in connection with the employ of a for-in loop.

From 1109 flow may proceed to 1111 where vendCouponsForOmnibusUuid(_:) may determine whether or not the concatenated keyscan sip-print sip string meets the eligibility check of the coupon qualifier record to which the qualifier marker points. As referenced hereinabove, in achieving such vendCouponsForOmnibusUuid(_:) may perform a search of the concatenated string—plying in doing so the regular expression set forth by the at-hand couponEligibilityChecker field—and count the number of hits. Where the hit count is zero the concatenated string may be found ineligible for the coupon. Where the hit count is one or greater the concatenated string may be found eligible for the coupon. In keeping with the Swift/Apple frameworks pseudocode employed herein, performing the search may involve instantiating a NSRegularExpression whose pattern property is set to hold the string specified by the qualifier marker, and whose options property is set to an empty array to indicate that no options are desired. The method numberOfMatchesInString(_: options: range:) may be called on the instantiated NSRegularExpression object with the first parameter of the call being set to specify the concatenated string, the options parameter of the call being set to specify an empty array to indicate that no options are desired, and the range parameter set to specify an instantiated NSMakeRange for which the range runs from zero to a value equal to the length of the concatenated string. In keeping with the noted pseudocode employed herein, the result of the method call may be an integer indicating the number of hits. In keeping with that which is discussed hereinabove, vendCouponsForOmnibusUuid(_:) may examine the returned integer value and determine whether or not it is zero or greater than zero. Where the value is zero—indicating no hits—the method may conclude the concatenated string to not meet the eligibility check and flow may proceed to 1115. Where the value is greater than 0—indicating one or more hits—the method may consider the concatenated string to meet the eligibility check and flow may proceed to 1113.

Turning to 1113, vendCouponsForOmnibusUuid(_:) may append to the output array the value of the couponContent field of the coupon qualifier record to which the qualifier marker points. As noted, the couponContent field may set forth coupon details (e.g., entities to which the coupon applies and expiration date), with the details perhaps being set forth via XML.

From 1113 flow may proceed to 1115. As noted, 1115 may also be reached subsequent to a determination of "no" being made at 1144. At 1115 determination may be made as to whether or not there are further coupon qualifier fields in the received array of coupon qualifier records. Such determination may be made in connection with the employ of a for-in loop. Where a determination of "yes" is made at 1115 flow may proceed to 1117 where the qualifier marker is incremented. Such increment may occur in connection with the employ of a for-in loop. From 1117 flow may return to 1109. Where a determination of "no" is made at 1115, flow may proceed to 1119 where the discussed output array may be returned as the result of the method call.

Coupon records, including the details thereof set forth in their couponEligibilityChecker fields and couponContent fields, may be established in a number of ways. For instance, such coupon details may be established by a marketing and/or data analysis expert and/or arise from data analysis (e.g., the data analysis discussed herein which provides functionality including determining convergences and correlations occurring in omnibus records). Where such a data analysis and/or marketing expert is involved in establishing coupon details, the expert may be aided in converting her coupon goals, as to that which should be set forth via couponEligibilityChecker and couponContent fields into the called for formats (e.g., a regular expression for the couponEligibilityChecker field and XML for the couponContent field). As one example an automated process (e.g., a wizard) may provide such aid. As another example, one or more other individuals may provide such aid (e.g., a regular expression expert and/or an XML expert may provide such aid). Where coupon details arise from data analysis (e.g., arise from the data analysis discussed herein which determines convergences and correlations occurring in omnibus records), coupon details (e.g., those of the sort reflected by couponEligibilityChecker and couponContent fields) may be generated automatically based on such analysis. For instance, such analysis may be coupled to coupon detail generation code which, as illustrative examples, acts to generate coupon details which reinforce convergences and correlations perceived to be positive (e.g., where a promoted cereal brand is popular in a certain city coupon details may be generated which endeavor to maintain that popularity in that city), and/or reverse convergences and/or correlations perceived to be negative (e.g., where a competitor cereal brand is popular in a certain city coupon details may be generated which endeavor to counter such popularity and instead kindle popular of a promoted cereal brand in that city). Such automated generation of coupon details may, as one example, operate independently of input of a marketing and/or data analysis expert. As another example a marketing and/or data analysis expert may guide such automated generation of coupon details. As a further example, a marketing and/or data analysis expert may view data analysis results (e.g., convergences and correlations of the sort discussed herein) and formulate coupon details in view of such analysis results.

So as to explain via illustration, examples regarding coupon details will now be discussed. As a first such example, with an eye towards the example discussed hereinabove in connection with couponEligibilityChecker field contents, it may be desired that in order to be eligible for the coupon an omnibus record, as reflected by its generated concatenated string, should set forth a state of purchase of "CA" or "California" and have an invoice line which sets forth both a detailed description including "caulk gun" and a price which is greater than $5.00. Such coupon eligibility may be set forth in the couponEligibilityChecker field of the corresponding coupon qualifier record via regular expression which when applied to input text, returns one or more instances in that text which each include both: a) "CA" or "California" delimited by the opening and closing tags "<StateOfPurchase>" and "</StateOfPurchase>"; and b) delimited by "<invoiceLine>" and "</invoiceLine>"—and therefore occurring within a single invoice line—both of: 1) text including "caulk gun" which is delimited by "<detailedDescription>" and "/<detailedDescription>" and 2) a dollar-wise value greater than $5.00 which is delimited by "<price>" and "</price>." Further for such coupon it may be desired that the coupon apply to a 10 oz. container of Smith white bathroom caulk, UPC 8080, have an expiration date of Dec. 31, 2020, have an activation requirement of purchasing one 10 oz. container of Smith white bathroom caulk, UPC 8080, provide $1.00 off, have a cash value of half a cent, and have a coupon UPC code of 1234. It is noted that to facilitate discussion the UPC code is set forth as having only four digits rather than the full 12-13 digits of a typical UPC code.

Such aspects of the coupon may be set forth in the couponContent field of the corresponding coupon qualifier record via XML in line with:

```
<appliesName> Smith bathroom Caulk 10 oz. </appliesName>
<appliesUpc> 8080 </appliesUpc>
<expiration> 10-31-2020 </expiration>
<activatorName> Smith bathroom Caulk 10 oz. </ activatorName>
<activatorUpc> 8080 </activatorUpc>
<provides> -1.00 </provides>
<cashValue> 0.005 </cashValue>
<couponUpc> 1234 </couponUpc>
```

As a second example regarding coupon details, it may be desired that in order to be eligible for the coupon an omnibus record, as reflected by its generated concatenated string, should set forth a state of purchase of "CA" or "California," a city of purchase of "LA" or "Los Angeles," and have an invoice line whose detailed description sets forth the word "cereal" and/or one or more words from a list of known cereal-descriptive words and/or phrases (e.g., a list of one or more cereal trade names), and an invoice line whose detailed description sets forth the word "milk" and/or words from a list of known milk-descriptive words and/or phrases (e.g., a list of milk trade names). Such coupon eligibility details may be set forth in the couponEligibilityChecker field of the corresponding coupon qualifier record via a regular expression which, when applied to input text, returns one or more instances in that text which each include: a) "CA" or "California" delimited by the opening and closing tags "<stateOfPurchase>" and "</stateOfPurchase>"; b) "LA" or "Los Angeles" delimited by "<cityOfPurchase>" and "</cityOfPurchase>"; c) delimited by <invoiceLine> and </invoiceLine> text, delimited by <detailedDescription> and </detailedDescription> which includes the word "cereal" and/or one or more words from the noted list; and d) delimited by <invoiceLine> and </invoiceLine> text, delimited by <detailedDescription> and </detailedDescription> which includes the word "milk" and/or one or more words from the noted list.

For such coupon it may be desired that the coupon apply to a 12-count box of Excelsior chocolate cookies, UPC 7198, have an expiration date of Dec. 31, 2018, have an activation requirement of purchasing two boxes of 12-count Excelsior chocolate cookies, UPC 7198, provide a free box of 12-count Excelsior chocolate cookies, UPC 7198, have no cash value, and have a coupon UPC code of 1212. It is noted that, to facilitate discussion, the UPC codes of the foregoing have been set forth as having only four digits each.

Such aspects of the coupon may be set forth in the couponContent field of the corresponding coupon qualifier record via XML in line with:

```
<appliesName> Excelsior chocolate cookies 12 count </appliesName>
<appliesUpc> 7198 </appliesUpc>
<expiration> 12-31-2018 </expiration>
<activatorName> Excelsior chocolate cookies 12 count </ activatorName>
<activatorQuantity> 2 </activatorQuantity>
<activatorUpc> 7198 </activatorUpc>
<provides> free Excelsior chocolate cookies 12 count </provides>
<cashValue> 0 </cashValue>
<couponUpc> 1212 </couponUpc>
```

As discussed hereinabove, the CouponQualifierEntity definition sets forth two fields, a couponEligibilityChecker field and a couponContent field. In one or more embodiments such entity definition, and/or an additional entity definition, may include one or more additional fields which act as triage fields. As one example, one such field may have the field name stateTriage and a corresponding data type of String. As another example, alternately or additionally there may be such a field with the field name upcTriage and a corresponding type of Integer 16. Where the coupon to which a coupon qualifier record applies has a state-based eligibility requirement (e.g., where a concatenated string—and by extension its corresponding omnibus record—is to set forth a state of purchase of Hawaii to be eligible for the coupon), such state may be set forth as the value for the stateTriage field (e.g., "Hawaii" or "HI" may be set forth as the field value). Where the coupon to which the coupon qualifier applies has a UPC-based eligibility requirement (e.g., where the concatenated string—and by extension its corresponding omnibus record—is to convey that the product with the UPC of 3030 be purchased in order to be eligible for the coupon), such UPC may be set forth as the value for the upcTriage field (e.g., 3030 may be set forth as the field value). It is noted that, to facilitate discussion, the UPC codes of the foregoing have been set forth as having only four digits each.

In embodiments where such triage fields are employed, the above-discussed instantiated NSFetchRequest object may additionally have its predicate property set to be an NSPredicate object conveying that records returned via the instantiated NSFetchRequest should be ones whose stateTriage field values matches the state of purchase specified by the concatenated string as determined by vendCouponsForOmnibusUuid(_:)'s inspection of that string for the appropriate tag-delimited values, and the NSPredicate object further conveying that records returned via the instantiated NSFetchRequest should be ones whose upcTriage field value matches one of the UPC values set forth in an array included in the predicate specification, such array being filled based on vendCouponsForOmnibusUuid(_:)'s inspection of the concatenated string for values delimited by the UPC tags.

Via such employ of an instantiated NSFetchRequest including such a predicate, vendCouponsForOmnibusUuid (_:) may receive in the returned array only record for which the at-hand concatenated string would be potentially eligible with respect to state of purchase and UPC, thus potentially reducing the quantity of records which the method may be called to inspect. It is noted that although the illustration had the record as setting forth, say, a single UPC and a single state for eligibility, such is for illustrative purposes and other possibilities exist. For instance, multiple states may be set forth where multiple states—say Hawaii and Alaska—meet eligibility for a certain coupon. Moreover, although triages regarding state and UPC have been set for in the interest of illustrating by way of example, other possibilities exist. For instance, a field which acts to triage based on city of purchase eligibility may be employed in a coupon qualifier record and in requesting records in a fashion analogous to that discussed hereinabove with respect to state of purchase.

As referenced, responsive to the printing of a receipt at a POS device a commerce transaction may be considered to have come to completion and createOmnibusForKeyScanSip(_: andPrintSip:) may be called on an archivist object. As also referenced, the method may in response act to store (e.g., in a Core Data-managed database) an omnibus record including the keyscan sip passed as a parameter in the method call, the print sip passed as a parameter in the method call, and a formulated corresponding UUID. As such, via a multitude of such method calls a multitude of such omnibus records may come to be held in the data store. Methods of the archivist object may perform one or more operations to draw conclusions from such records. As one illustration, conclusions may be drawn regarding mappings between SKUs and UPCs. It is noted that SKUs may be retail location-specific and/or retail chain-specific, and further noted that UPC-SKU mappings may not generally be made publically available—for instance retailers and chains may not typically publish such mappings—yet such mappings may be useful for various analytic pursuits. For instance, certain sales records may be available which specify sales information in terms of retail location-specific and/or chain-specific SKUs, and due to the retail location-specificity and/or chain-specificity of such SKUs performing cross-retail location and/or cross-chain analyses may be difficult. As an illustration, where a first chain's sales records list sales information for an SKU "ABC123" while a second chain's sales records list sales information for an SKU "SK45" it might not be known whether or not "ABC123" and "JK45" refer to the same product or not. UPCs, however, are not, say, retail location-specific or chain-specific. As such, knowing the UPC mapping for each of "ABC123" and "JK45" could allow it to be known whether or not these SKUs refer to the same product or not.

A keyscan sip, corresponding to UPC scanning and/or manual entry, may yield UPC information for a particular commerce transaction and a print sip, corresponding to a receipt, may provide SKU information for that commerce transaction. However, the order in which item UPCs are scanned in—or in case of, say, scanning failure typed in—may not match the order in which those items—and by extension their SKUs—are listed on the receipt. For instance, while item scan order may be according to the volition of a retail clerk, the receipt item order may reflect, say, one or more POS settings. As examples, such POS settings may list items on the receipt in price order (e.g., with higher prices towards the top of the receipt) or may group items by class (e.g., for a receipt reflecting the purchase of a number of electronics items, a number of food products, and a number of pharmaceutical products, the receipt may place in separate listing groups the electronic products, the food products, and the pharmaceutical products.)

To illustrate, suppose that for a particular commerce transaction the keyscan sip included the UPCs "1289," "8963," and "1568," and the print sip for that commerce transaction included the SKUs "JK-840," "CD-108," and "XR-493." It is noted that, to facilitate discussion, these example UPCs are listed as having only four digits each. Give such keyscan sip data and such print sip data, and bearing in mind that item receipt order may not match scan/entry order, it may not be known whether UPC "1289" refers to SKU "JK-840," SKU "CD-108," or SKU "XR-493." Likewise it may not be known whether UPC "8963" refers to SKU "JK-840," SKU "CD-108," or SKU "XR-493," or whether UPC "1563" refers to SKU "JK-840," SKU "CD-108," or SKU "XR-493." However, given omnibus data records providing keyscan sip and print sip data for a multitude of commerce transactions which reflect purchase of different combinations of items, UPC-SKU correlations may emerge. For instance, given a certain multitude of commerce transactions which each indicate purchase of different groups of items but which all indicate purchase of the item with UPC "1289," over the multitude of the omnibus records including keyscan sip data and print sip data UPC "1289" may tend to be found more frequently with its proper corresponding SKU than with any other SKU. Such appearing-more-frequently-with SKU may be concluded to be the SKU to which that UPC corresponds (e.g., UPC "1289" may be found to map to SKU "JK-840".) Operations performed by the archiver object in determining such UPC-SKU correlations are discussed in greater detail hereinbelow.

As another example of conclusions drawn from the omnibus records, certain convergences of certain data items drawn from the omnibus records may provide certain sales insights or other insights. As an illustration, suppose that among the information available from the omnibus records were, with respect to breakfast cereal, per-commerce transaction information on city of purchase, price paid, and cereal brand selected. Given the pull of such information from the omnibus data for a multitude of commerce transactions, certain convergences and correlations may emerge. As an illustration, such convergences and correlations might show that cereal brand A sells in higher numbers in Los Angeles when sold at a $3.99 price point rather than at a $2.99 price point, but that in San Francisco that cereal brand sells best when sold at the $2.99 price point rather than at the $3.99 price point. And that for both cities cereal brand B sells better as the price point drops and sells less well as its price rises. It is noted that in one or more embodiments price data culled from the omnibus data may be mapped to one or more price groups prior to analysis (e.g., sales prices between $1.50 and $1.99 may be considered to belong to a first price group while sales prices between $2.50 and $2.99 may be considered to belong to a second price group), and such price groups may be used in place of raw prices in analyses of the sort discussed above. Operations performed by the archiver object in seeking, in pursuit such insights, such data item convergences and correlations are discussed in greater detail hereinbelow.

It is noted that according to one or more embodiments, as an alternative to and/or in addition to that which is discussed hereinabove with respect to the calling of createOmnibusForKeyScanSip(_: andPrintSip:), such method may be called in such a fashion that only a keyscan sip is passed to it, with, say, an empty string e.g., " ")(being passed as the second parameter.

Moreover, subsequent to such a call to createOmnibusForKeyScanSip(_: andPrintSip:) passing only a keyscan skip, vendCouponsForOmnibusUuid(_:) might be called, with the passed parameter for the call being the omnibus record UUID returned in response to the call to createOmnibusForKeyScanSip(_: andPrintSip:) passing only a keyscan skip. As one illustration, such a call to createOmnibusForKeyScanSip(_: andPrintSip:) and such a call to vendCouponsForOmnibusUuid(_:) might be made at a juncture subsequent to completion of keyscan sipping but prior to printing of the receipt and printsip capture. For example, such calls might be made by handleReadyPosRequest(_:) in conjunction with handleReadyPosRequest(_:) making a call to complyCheckAndAuthForMerchantId(_: andTerminalId: andCardNumber: andCardPin: andCardExpiry: andPurchaseAmount: andUpcs:). Such a call to createOmnibusForKeyScanSip(_: andPrintSip:) may serve to ensure that keyscan sip storage occurs even if it comes to pass that no receipt is printed and consequentially there is no call of createOmnibusForKeyScanSip(_: andPrintSip:) by the printsipper. Moreover, such a call to vendCouponsForOmnibusUuid(_:) may serve to vend one or more coupons for which the keyscan sip alone is sufficient to allow for meeting of coupon qualification requirements (e.g., coupons whose qualification requirements can be met based on UPC information alone). Such coupons, for instance received in temporal vicinity of the compliance check, may be printed on the POS printer in a fashion analogous to the discussed-herein coupon printing approach. It is observed that such a call to vendCouponsForOmnibusUuid(_:) may serve to ensure that a coupon vending request occurs even if it comes to pass that no receipt is printed and consequentially there is no call of vendCouponsForOmnibusUuid(_:) by the print sipper.

Such calls to createOmnibusForKeyScanSip(_: andPrintSip:) and to vendCouponsForOmnibusUuid(_:), involving only a keyscan sip and no print sip, may be made as an alternative to and/or in addition to calls to createOmnibusForKeyScanSip(_: andPrintSip:) and vendCouponsForOmnibusUuid(_:) of the sort discussed herein which involve both a keyscan sip and a print sip. According to one or more embodiments, where a call to createOmnibusForKeyScanSip(_: andPrintSip:) involving both a keyscan sip and a print sip is made subsequent to a call to createOmnibusForKeyScanSip(_: andPrintSip:) which involves only a keyscan sip and no printsip, the call to createOmnibusForKeyScanSip(_: andPrintSip:) involving both a keyscan sip and a print sip may pass the print sip as the second parameter but, in light of the prior passing of the keyscan sip, pass as the first parameter the omnibus record UUID received in response to the initial, keyscan-sip-only call to createOmnibusForKeyScanSip(_: andPrintSip:).

The method createOmnibusForKeyScanSip(_: andPrintSip:) may in one or more embodiments be implemented such that, when receiving an omnibus record UUID as its first parameter, it fetches the omnibus record corresponding to that UUID—an omnibus record expected to, in light of an earlier keyscan-sip-only call to createOmnibusForKeyScanSip(_: andPrintSip:), possess a keyscan sip portion but no print sip portion—and appends to it the passed in print sip and performs various operations regarding createOmnibusForKeyScanSip(_: andPrintSip:) discussed herein. It is observed that such various operations regarding createOmnibusForKeyScanSip(_: andPrintSip:) discussed herein (e.g., tagging) may occur both during an initial keyscan-sip-only call to createOmnibusForKeyScanSip(_: andPrintSip:), as well as a later call to createOmnibusForKeyScanSip(_: andPrintSip:) passing the corresponding print sip. q According to one or more embodiments, where a call to createOmnibusForKeyScanSip(_: andPrintSip:) involving both a keyscan sip and a print sip is made subsequent to a call to createOmnibusForKeyScanSip(_: andPrintSip:) involving only a keyscan sip, a call to vendCouponsForOmnibusUuid(_:) might be made after either or both of the call to createOmnibusForKeyScanSip(_: andPrintSip:) involving only a keyscan sip, and the call to createOmnibusForKeyScanSip(_: andPrintSip:) involving both a keyscan sip and a print sip. Consequentially, there may, perhaps, be two requests for coupon vending.

Figure 12:
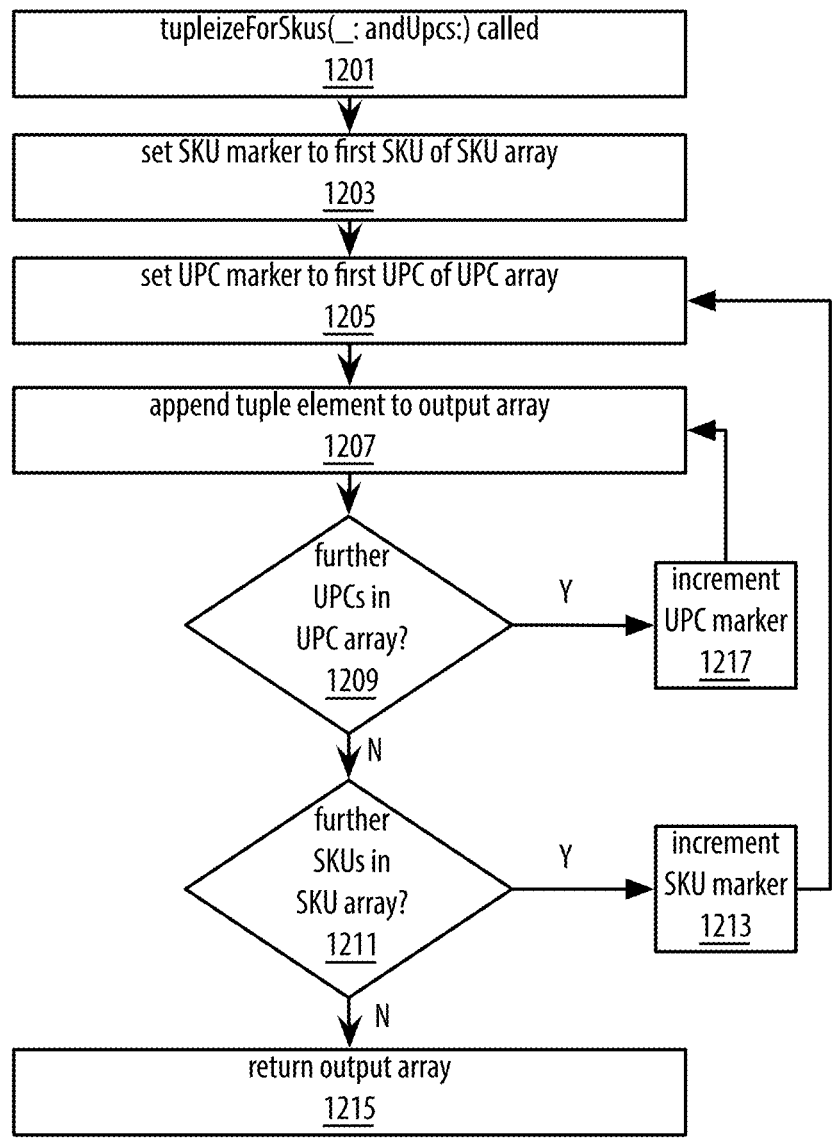
FIG. 12 shows a logic flow diagram illustrating embodiments for the POSAMS of a server-performed process by which tuples may be created out of information pulled from omnibus data of a store.

FIG. 12 shows a logic flow diagram illustrating embodiments of a server-performed process by which tuples may be created out of information pulled from omnibus data of a store (e.g., a Core Data-managed database), such tuples being employable in operations discussed in greater detail hereinbelow (e.g., in bucketizer and UPC-SKU mapping operations). To facilitate discussion, the process of FIG. 12 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 12 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1201, a tupleizeForSkus(_: andUpcs:) method of an archivist object may be called. As is discussed in greater detail hereinbelow, the method may, as one example, be called by a method which acts to determine the UPC to which a specified SKU corresponds. The tupleizeForSkus(_: andUpcs) method may have the declaration:

```
func tupleizeForSkus(_ theSkus: [String], andUPCs theUpcs: [Int])
    throws -> [(String, Int)],
``` where the declaration indicates that the method may take a first parameter of type [String] (string array), the first parameter having a local parameter name "theSkus" and having no external parameter name. The declaration further indicates that the method may take a second parameter of type [Int] (integer array), the second parameter having a local parameter name "theUpcs" and having the external parameter name "andUPCs." Moreover, the declaration indicates that the method may be capable of throwing an error and that the method may have a return type of [(String, Int)]—an array of tuples wherein each element of the array is a tuple which holds a String and an Int.

At 1203 an SKU marker may be set to the first element of the SKU array which was passed in as a parameter (i.e., to the first element of theSkus). As one example such SKU marker setting may be performed via the employ of a for-in loop. At 1205 a UPC marker may be set to the first element of the UPC array which was passed in as a parameter (i.e., to the first element of theUpcs). As an example such UPC marker setting may be performed via the employ of a for-in loop. At 1207, appended to the array to be returned by the method is a tuple element which is made up of the SKU to which the SKU marker points and the UPC to which the UPC marker points. At 1209 a determination is made is to whether or not there are further UPCs in theUpcs. In the case where there are further such UPCs—a "yes" determination at 1209—flow may proceed to 1217 where the UPC marker is incremented. As one example such increment may be performed in connection with the employ of a for-in loop. From 1217 flow returns to 1207.

In the case where a determination of "no" is made at 1209, flow may proceed to 1211 where a determination is made is to whether or not there are further SKUs in theSkus. In the case where a determination of "yes" is made at 1211, flow may proceed to 1213 where the SKU marker is incremented. As one example such increment may be performed in connection with the employ of a for-in loop. From 1213 flow may return to 1205 where the UPC marker is again set to the first element of theUpcs. It is noted that such setting of the UPC marker may, as one example, be performed in connection with the employ of a for-in loop.

Where a determination of "no" is made at 1211, flow may proceed to 1215 where the method returns the array of (SKU, UPC) tuples.

The SKUs of the SKU array passed in calling the method, and the UPCs of the UPC array passed to the method. may correspond to a one omnibus record. As such, the method may be called once with respect to each of a plurality of omnibus records, with a particular call of the method passing the SKUs and the UPCs of that at-hand omnibus record.

As an illustration, as referenced above the tupleizeForSkus(_: andUpcs) method may be called by a method which acts to determine the UPC to which a specified SKU corresponds. Such method which acts to determine the UPC to which a specified SKU corresponds may gather those omnibus records which, via their print sip portions, include the specified SKU. The method which acts to determine the UPC to which a specified SKU corresponds may then call the tupleizeForSkus(_: andUpcs) method once with respect to each of those omnibus records which were determined to include the specified SKU.

As an illustration of a particular call of tupleizeForSkus(_: andUpcs) which is performed with respect to a particular omnibus record which includes a particular of-interest SKU, suppose that passed in such method call was the SKU array ["JK-840", "CD-108", "XR-493"] and the UPC array [1289, 8963, 1568]. Returned by the called method may be the tuple array [("JK-840", 1289), ("JK-840", 8963), ("JK-840", 1568), ("CD-108", 1289), ("CD-108", 8963), ("CD-108", 1568), ("XR-493", 1289), ("XR-493", 8963), ("XR-493", 1568)].

Although the foregoing discussion of tupleizeForSkus(_: andUpcs)—in including the name of the method itself—has, in the interest of facilitating discussion has been in terms of SKUs and UPCs, the noted functionality is not limited to application to SKUs and UPCs. For instance, the noted functionality might be employed under the circumstance of seeking correlation between expanded text descriptions and shorthand text, with, say, the expanded text descriptions being applied in place of the above-discussed SKUs, and the shorthand text being applied in place of the above-discussed UPCs. Such an approach might be plied, for example, in a scenario where clerk text entry at a POS, which is captured via keyscan sip, includes shorthand text describing products (e.g., a string including "WSHR" and/or a string including "RFGR"), where receipt text, which is captured via print sip, includes expanded text descriptions (e.g., "washer" and/or "refrigerator"), and where that item receipt order may not match text entry order. By so employing the functionality discussed in connection with tupleizeForSkus(_: andUpcs) for such shorthand text and such expanded text descriptions, and by further employing functionality in-line with that discussed hereinbelow in connection with a method which acts to determine the UPC to which a specified SKU corresponds—but again with the expanded text descriptions being applied in place of the SKUs, and the shorthand text being applied in place of the UPCs—it might be ascertained that the shorthand text "WSHR" corresponds to the expanded text description "washer," and that the shorthand text "RFGR" corresponds to the expanded text description "refrigerator."

Figure 13:
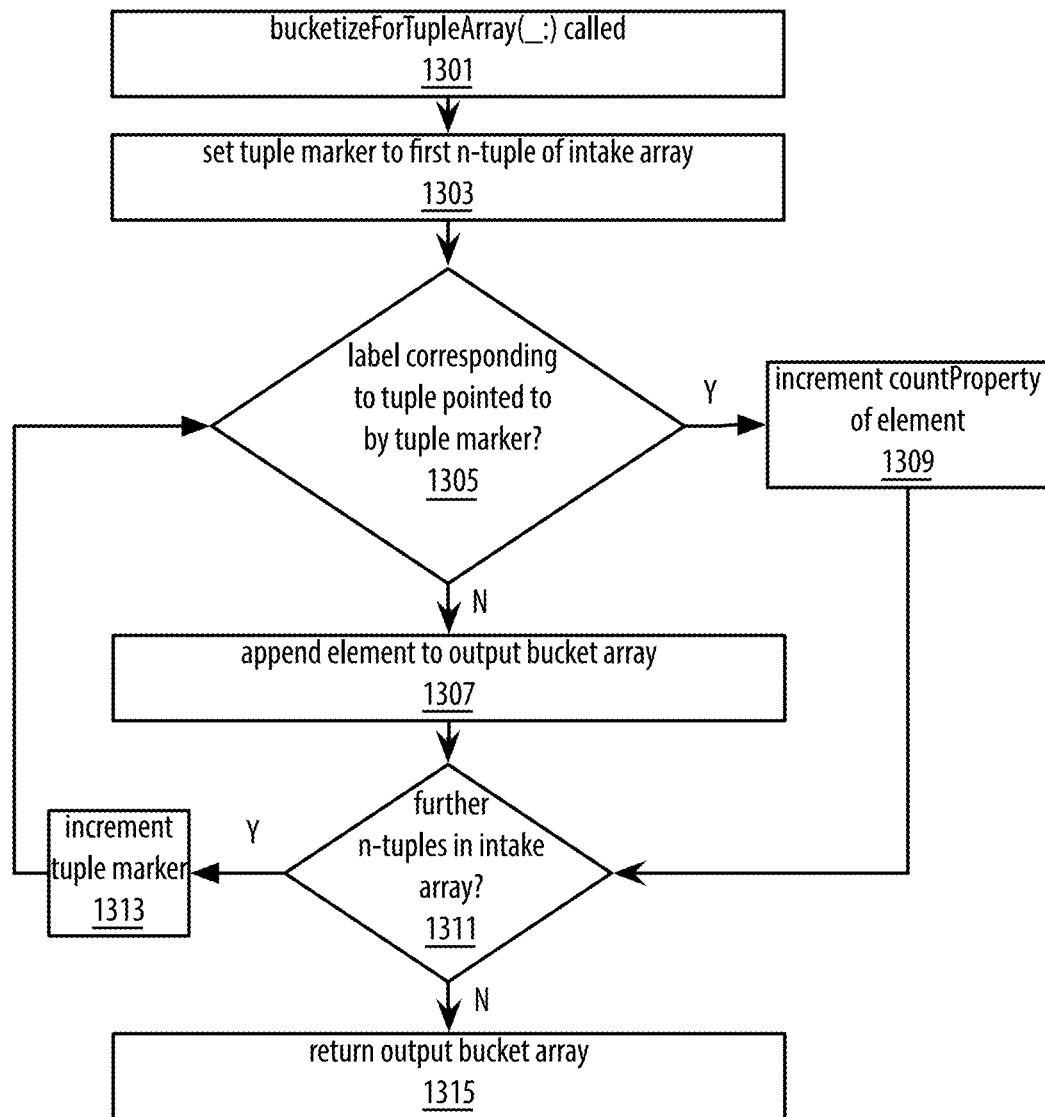
FIG. 13 shows a logic flow diagram illustrating embodiments for the POSAMS of a server-performed process by which buckets may be created from an input of tuples, wherein each bucket includes a label specifying a particular tuple value set along with a value indicating the number of times that particular tuple value set occurred in the tuple input.

FIG. 13 shows a logic flow diagram illustrating embodiments of a server-performed process by which buckets may be created from an input of tuples, wherein each bucket includes a label specifying a particular tuple value set along with a value indicating the number of times that particular tuple value set occurred in the tuple input. As an illustration, where the tuple input was the three tuples (1, 2, 3), (4, 5, 6), and (1, 2, 3), two buckets might be created. One bucket might include a label specifying the tuple value set (1, 2, 3) along with a count value of two, reflecting that the tuple (1, 2, 3) occurs twice in the tuple input. A second bucket might include a label specifying the tuple value set (4, 5, 6) along with a count value of one, reflecting that the tuple (4, 5, 6) occurs twice in the tuple input. Such buckets may be employable in operations discussed in greater detail herein below (e.g., UPC-SKU mapping operations and in correlation operations). To facilitate discussion, the process of FIG. 13 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 13 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POSAMS hereinbelow).

At 1301, a bucketizeForTupleArray(_:) method of an archivist object may be called. As is discussed in greater detail hereinbelow, the method may, as one example, be called by a method which acts to determine the UPC to which a specified SKU corresponds. As is also discussed in greater detail hereinbelow, the bucketizeForTupleArray(_:) method may, as another example, be called by a method which acts to find convergences and correlations. The bucketizeForTupleArray(_:) method may have the declaration:

func bucketizeForTupleArray(_ theTupleArray: [Any]) throws→[BucketElement], where the declaration indicates that the method may take a first parameter of type [Any], "[Any]" indicating an array whose elements may be of any type. The parameter's type is chose an [Any] to facilitate the method's acceptance of differing sorts of tuple input arrays. As one example, the employ of the type [Any] facilitates acceptance of arrays holding two-element tuples and arrays holding three-element tuples. As another example, the employ of type [Any] facilitates acceptance of arrays holding tuples having two elements, a string, and an integer, and acceptance of arrays holding tuples having two elements, both of which are strings. The first parameter has a local parameter name "theTupleArray" and has no external parameter name. The declaration also indicates that the method may be capable of throwing an error. The declaration further indicates that the method may have a return type of [BucketElement], an array whose elements are of type BucketElement.

The BucketElement type may be defined as a struct:

```
struct BucketElement {
    var tupleLabel: String
    var count: Int
}.
```

As such, the struct may include a property tupleLabel of type String and a property count of type Int. As noted hereinabove, a bucket may include a label specifying a particular tuple value set. The tupleLabel property may be employed to convey such label. In one or more embodiments, a tuple may, in accordance with the Swift/Apple frameworks pseudocode employed herein, be converted to a string via string interpolation in which the tuple to be converted to a string is included in a string literal via employ of quote marks and wrapped in parentheses preceded by a backslash. As an illustration, conversion of a tuple held in the object myTuple to a string might involve the application of "\(myTuple)". As also noted above, a bucket may indicate a value indicating the number of times that a particular tuple value set occurred in the input. the count property may be employed to convey such a number of times.

At 1303 a tuple marker may be set to the first element of the tuple array which was passed in as a parameter (i.e., to the first element of theTupleArray). As one example such tuple marker setting may be performed via the employ of a for-in loop. At 1305 the array to be returned by the method may be checked to see if any of its elements has as its tupleLabel property a label corresponding to the tuple pointed to by the tuple marker. In one or more embodiments such check may involve employing string interpolation of the sort discussed above to produce a string conveying the tuple pointed to by the tuple marker and then comparing that produced string to the tupleLabel properties of the elements of the to-be-output array to see if any of those elements have a tuple label matching the tuple pointed to by the tuple marker. Where a determination of "no" is made at 1305, flow may proceed to where appended to the array is a new BucketElement element which has its tupleLabel property set to a string yielded by applying string interpolation of the sort discussed above to the tuple pointed to by the tuple marker, and its count property set to 1.

Where a determination of "yes" is made at 1305, flow may proceed to 1309 where, for the element of the array to be returned by the method found to have its tupleLabelProperty indicating the tuple pointed to by the tuple marker, the countProperty of the element is incremented by one.

From either 1307 or 1309 flow may proceed to 1311 where determination is made as to whether or not there are further tuples in theTupleArray. In the case where there are further such tuples—a "yes" determination at 1311—flow may proceed to 1313 where the tuple marker is incremented. As one example such increment may be performed in connection with the employ of a for-in loop. From 1313 flow returns to 1305. In the case where a determination of "no" is made at 1311, flow may proceed to 1315 where the method returns the bucket array.

As an illustration of the operation of bucketizeForTupleArray(_:), suppose that passed to the method was an array of SKU-UPC tuples [("XY-120", 0103), ("XY-120", 9080), ("XY-120", 0103), ("JR-360", 1113)]. The array of BucketElements output by the method may have three elements. A first element may have its tupleLabel holding the string conveying the tuple ("XY-120", 0103) and its count property indicating a value of 2. Such count value of 2 reflects the tuple ("XY-120", 0103) occurring twice in the SKU-UPC tuples array passed to the method. A second element of the output array may have its tupleLabel holding a string conveying the tuple ("XY-120", 9080) and its count property indicating a value of 1. Such count value of 1 reflects the tuple ("XY-120", 9080) occurring once in the SKU-UPC tuples array passed to the method. A third element of the output array may have its tupleLabel having a string conveying the tuple ("XY-120", 0103) and its count property indicating a value of 1 in keeping with ("XY-120", 0103) occurring once in the SKU-UPC tuples array passed to the method. It is noted that to facilitate discussion the foregoing example has discussed UPCs as if they had only four digits rather than 12-13 digits as is typical.

As another illustration of the operation of bucketizeForTupleArray(_:), suppose that passed to the method was an array of tuples of city of purchase, detailed description for an invoice line, and price paid for that invoice line, the passed array being [("san francisco", "krispie wheat", 1.50), ("los angeles", "krispie wheat", 2.99), ("los angeles", "krispie wheat", 2.99), ("los angeles", "krispie wheat", 1.50), ("san francisco", "krispie wheat", 1.50)]. In like vein of the foregoing example, the array returned by the method might have three elements. A first element might have its tupleLabel property conveying ("san francisco", "krispie wheat", 1.50) and its count property holding the value 2. A second element of the returned array may have its tupleLabel property conveying ("los angeles", "krispie wheat", 2.99) and its count property having the value 2. A third element of the returned array may have its tupleLabel property conveying ("los angeles", "krispie wheat", 1.50) and its count property holding the value 1.

Figure 14:
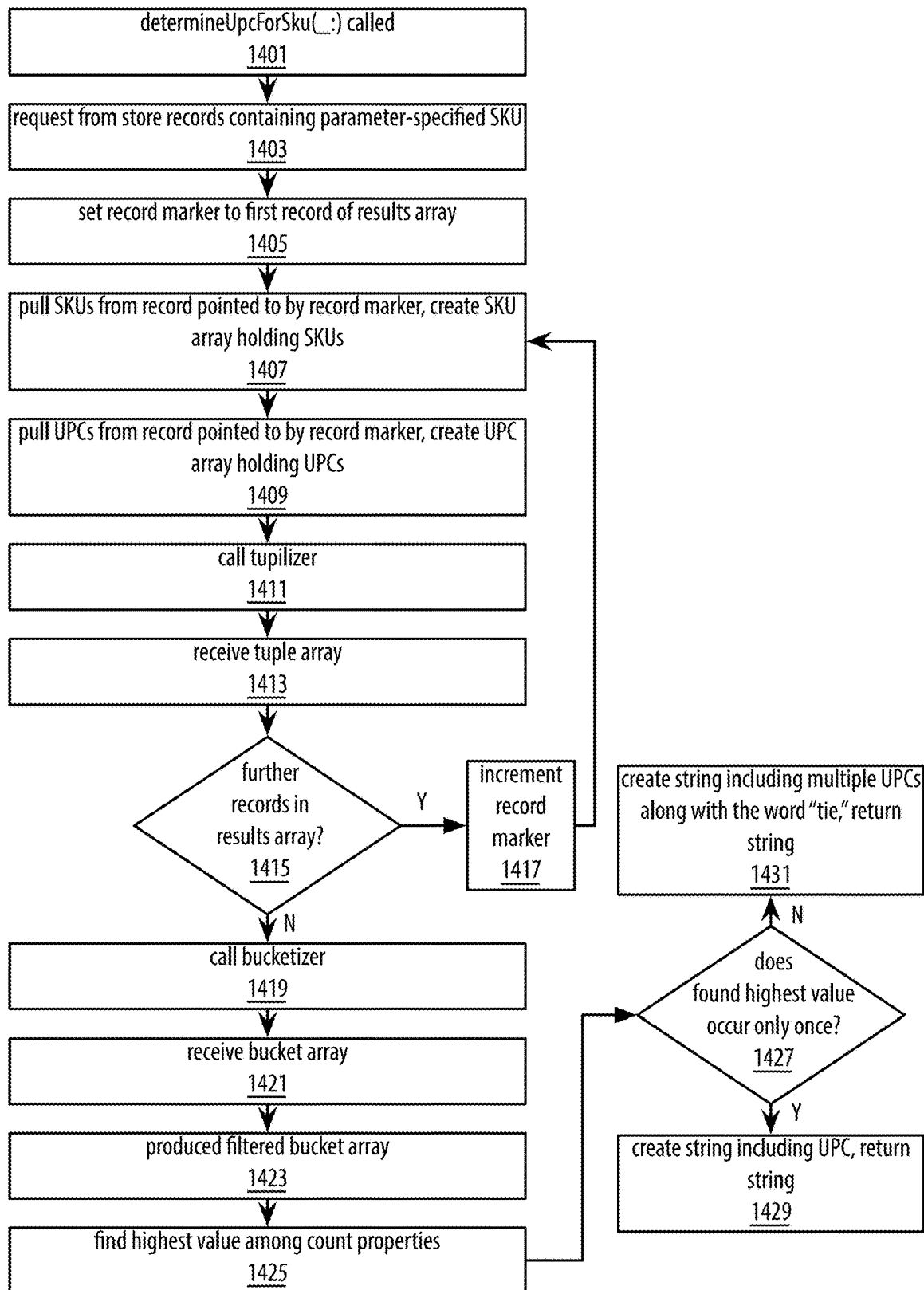
FIG. 14 shows a logic flow diagram illustrating embodiments for the POSAMS of a server-performed process by which determination may be made as to the UPC which corresponds to a specified SKU.

FIG. 14 shows a logic flow diagram illustrating embodiments of a server-performed process by which determination may be made as to the UPC which corresponds to a specified SKU. To facilitate discussion, the process of FIG. 14 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 14 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1401, a determineUpcForSku(_:) method of an archivist object may be called. The method may, as one example, be called in response to a user (e.g., a marketing analysis user) employing a GUI of her device to specify a SKU for which she wishes to learn the corresponding UPC. As another example the method may be called by an automated method (e.g., an automated method of the archivist object) which acts to search (e.g., via employ of one or more instantiated NSFetchRequests) stored (e.g., in a Core Data-managed database) omnibus records for omnibus records setting forth SKUs for which corresponding UPCs are not known (e.g., omnibus records setting forth SKUs for which no stored omnibus record indicates a corresponding SKU-UPC mapping) It is noted that where an omnibus record sets forth a SKU-UPC mapping, such mapping might, for instance be delimited by <SKU-UPC> and </SKU-UPC>. The determineUpcForSku(_:) method may have the declaration:

func  determineUpcForSku(_  theSku:  String) throws→String, where the declaration indicates that the method may take a first parameter of type String, the first parameter having a local parameter name "theSku" and having no external parameter name. The declaration further indicates that the method may be capable of throwing an error and that the method may have a return type of String.

At 1403 the method may request, from the store (e.g., a Core Data-managed database) holding omnibus records, those omnibus records which include the SKU specified by theSku. With reference to the discussion of the entity OmnibusEntity herein, the request may, in accordance with the Swift/Apple frameworks pseudocode employed herein, be via an instantiated NSFetchRequest for which the entityName property is set to specify OmnibusEntity and for which the predicate property is set to specify that the printSip field contains the SKU specified by theSku (e.g., the predicate property may be set to NSPredicate(format: "printSip CONTAINS %@", theSku). As response to the method dispatching the request (e.g., by calling executeFetchRequest(_:) on the at-hand managed object context and passing the instantiated NSFetchRequest as the sole parameter) the determineUpcForSku(_:) method may receive an array of OmnibusEntity records matching the request.

At 1405 a record marker may be set to the first element of the records array which was received in response to the request of 1403. As one example such record marker setting may be performed via the employ of a for-in loop.

From 1405 flow may proceed to 1407 where pulled from the record pointed to by the record marker may be all SKUs of that record, and where an array holding those SKUs may be created. Such pulling may involve accessing the printSip field of the pointed-to record. With the field having been, as discussed above, subjected to tagging—say with the SKUs being delimited by <SKU> and </SKU>—such parsing may, in keeping with the Swift/Apple frameworks pseudocode employed herein, involve determineUpcForSku(_:) instantiating an NSXMLParser, setting as its data property the printSip field of the record pointed to by the record marker, setting the delegate property of the instantiated NSXMLParser to self to indicate that the archivist object will provide delegate methods which the instantiated NSXMLParser will call, and calling parse( ) on the instantiated NSXMLParser. Such parsing may, further in keeping with the Swift/Apple frameworks pseudocode employed herein, involve the archivist object implementing two delegate methods which will be called by the instantiated NSXMLParser object. The first delegate method, parser(_:didStartElement:namespaceURI:qualifiedName:attributes:), may be called by the instantiated NSXMLParser when the instantiated NSXMLParser encounters an XML tag and may get as a passed in parameter the value of that tag (e.g., the value "SKU" where the tag <SKU> is met). The archivist object's implementation of this delegate method may store that tag value in a property. The second delegate method, parser(_:foundCharacters:), may be called by the instantiated NSXMLParser to provide that which is delimited via the XML tag corresponding to the preceding call to parser(_:didStartElement:namespaceURI:qualifiedName:attributes:). This second delegate method may receive as a passed in parameter the noted tag-delimited text (e.g., text providing an SKU where the delimited value tags are <SKU> and </SKU>). The archivist object's implementation of this method may first access the noted property holding the encountered tag and check to see if the value indicates that a <SKU> tag has been encountered. Where the answer is "yes," the noted passed-in tag-delimited text may be added to the SKUs array. According to the Swift/Apple frameworks pseudocode employed herein, the just-discussed calling of the two delegate methods may occur with respect to each tag encountered by the instantiated NSXMLParser in the printSip field of the record pointed to by the record marker, and as such appended to the SKUs array may be all SKUs of the printSip field.

From 1407 flow may proceed to 1409 where pulled from the record pointed to by the record marker may be all UPCs of that record, and where an array holding those UPCs may be created. Such pulling may involve accessing the keyScan sip field of the pointed-to record. The pulling may be performed in a manner analogous to that discussed in connection with 1407, with the appropriate tag delimiting being looked for (e.g., <UPC> </UPC>) and with text delimited by such proper tags taken to be a UPC and added to the UPC array.

From 1409 flow may proceed to 1411 where the discussed tupilizer method is called, with the passed parameters for the call being the arrays created in 1407 and 1409, that is to say the SKU array and UPC array corresponding to the record pointed to by the record marker. At 1413 the determineUpcForSku(_:) method may receive in response to such method call an array of tuples corresponding to the record pointed to by the record marker. Flow may then proceed to 1415 where a determination may be made as to whether or not there are further records in the results array. It is noted that such determination may, as one example, be performed in connection with a for-in loop. Where the answer is "yes," flow may proceed to 1417 where the record marker is incremented, and flow may then return to 1407. It is noted that, as one example, such increment may be performed in connection with a for-in loop. Where the answer is "no" flow may proceed to 1419.

At 1419 an array holding the totality of all tuples resulting from all calls to the tupilizer may be created, and the bucketizer may be called passing as the sole parameter that array. Next flow may proceed to 1421 where the determineUpcForSku(_:) method may, in response to the call to the bucketizer of 1419, receive a bucket array of the sort discussed herein.

At 1423 a filtered version of the bucket array may be created, the filtered bucket array including only those bucket array elements whose tupleLabel property conveys a tuple which has a SKU matching theSku. In keeping with the Swift/Apple frameworks pseudocode employed herein, such may be achieved by calling a filter method on the un-filtered bucket array, passing to the method as a parameter a closure or function which takes as its input an element of the un-filtered bucket array, checks if that bucket's tupleLabel property includes theSku (e.g., by, in keeping with the Swift/Apple frameworks pseudocode employed herein, calling the containsString method of the string of the tupleLabel property, passing at the parameter theSku), and returns true in the case where theSku is found and false otherwise. In keeping with the Swift/Apple frameworks pseudocode employed herein, the filter method called on the un-filtered bucket array may call the closure or function with respect to every element of the un-filtered array, and output an array including only those array elements which met the criterion set forth by the closure or function. As such, output by such call to the filter method will be an array containing those elements of the un-filtered array whose tupleLabel properties included theSku.

From 1423 flow may proceed to 1425 where the count properties of the filtered array are examined to find the highest value set forth among such properties as well as which element or elements of the filtered array set forth such highest count value. As an illustration, suppose that the filtered array had three elements and index 0 of the filtered array included a count property indicating 3, index 1 of the filtered array included a count property indicating 2, and index 2 of the filtered array included a count property indicating 3. 1425 would find the highest set forth count property value to be 3, and note that two elements of the filtered array set forth such property—indices 0 and 2. It is noted that where all elements set forth the same count property value such value may be considered to be "highest" by 1425.

Flow may then proceed to 1427 where a determination is made as to whether or not found the highest set forth count property value to have been found only in one element of the filtered array, or among multiple elements. As an illustration, for the example three element filtered array of 1425 a determination of "no" would be made as the highest count property value 3 is found in both element 0 and element 2. Where a determination of "yes" is made at 1425 flow may proceed to 1429. Where a determination of "no" is made at 1425 flow may proceed to 1431.

Where flow proceeds to 1429, a string may be created which includes, from the sole element of the filtered array which was found to set forth the determined highest count property value, the UPC set forth by that element's tuple label property. 1429 may further return such string as the result of the call to determineUpcForSku(_:).

Where flow proceeds to 1431 a string may be created which includes, from each element of the filtered array which was found to set forth the determined highest count property, the UPC set forth by that element's tupleLabel property along with the word "tie." As an illustration, returning to the example three element filtered array of 1425 the created sting may include the UPC set forth by the tupleLabel property of the index 0 element, the UPC set forth by the tupleLabel property of the index 2 element, and the word "tie." 1431 may further return the created string as the result of the call to determineUpcForSku(_:).

According to one or more embodiments, once a UPC-SKU mapping has been determined, records containing that SKU may be updated to note the mapping. For instance, where entity printSip fields are tagged and include <SKU></SKU> tags, the store (e.g., database) may be queried to return records possessing the SKU for which the UPC has been determined (e.g., via employ of an NSFetchRequest specifying Omnibus entity as the entityName and setting forth a predicate indicating that the keyScanSip field have as its value the SKU for which the UPC has been determined). Then, to each returned record appending (e.g., within the keyScanSip string to the left or right of the at-hand SKU and its opening and closing tags) may be a tag value set where the tags specify a SKU-UPC mapped pair (e.g., <SKU-UPC> and </SKU-UPC>) and the value sets forth the SKU and its corresponding UPC. As an illustration, where the SKU is "XY-123" and the determined corresponding UPC is "7890" the appended tag/value set may be <SKU-UPC>XY-213 7890<SKU-UPC>, where a space character serves to delimitate SKU and UPC. It is noted that to facilitate discussion the UPC has been set forth as having only four digits.

Then, according to the Swift/Apple frameworks pseudocode employed herein, such updating of the may involve creating a new string based on the string set forth by the printSip field of the at-hand record but further including the discussed new tags and new value, calling a setValue method on the at-hand record, passing the new string as the first parameter of the method call and specifying printSip for the forKey parameter of the method call, and then calling, in a fashion capable of dealing with a thrown error, save( ) on the at-hand managed object context.

As an illustration of a call to determineUpcForSku(_:), suppose that via the functionality of determineUpcForSku (_:) just discussed including the retrieval of omnibus records containing theSku, the call to the tuplizier, the call to the bucketizer, and the creation of a filter array there came to be a three element filtered array whose first element set forth the SKU of theSku (i.e., set forth the SKU passed into determineUpcForSku(_:)), the UPC 1709, and a count of 15, whose second element set forth the SKU of theSku (i.e., set forth the SKU passed into determineUpcForSku(_:)), the UPC 1980, and a count of 50, and whose third element set forth the SKU of theSku (i.e., set forth the SKU passed into determineUpcForSku(_:)), the UPC 8190, and a count of 10. The determineUpcForSku(_:) method may, in light of 50 being the highest set forth count value and such count value occurring only in connection with the second element, consider 1980 to be the UPC to which the passed in SKU corresponds, and return such UPC as the result of the method call.

Figure 15:
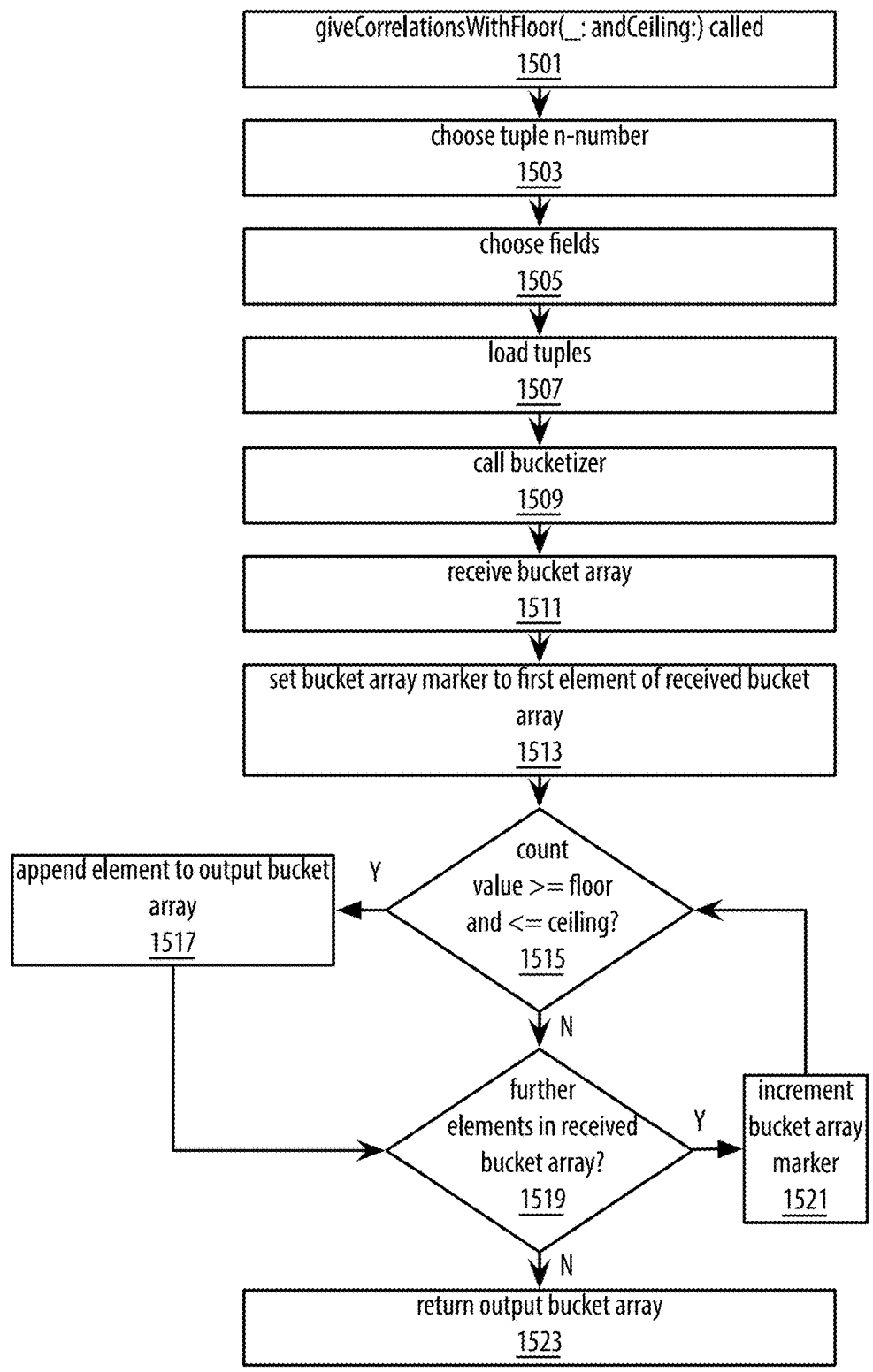
FIG. 15 shows a logic flow diagram illustrating embodiments for the POSAMS of a server-performed process by which convergences and correlations may be found among the data held by the omnibus records.

FIG. 15 shows a logic flow diagram illustrating embodiments of a server-performed process by which convergences and correlations may be found among the data held by the omnibus records. To facilitate discussion, the process of FIG. 15 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 15 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1501, a giveCorrelationsWithFloor(_: andCeiling:) method of an archivist object may be called. The method may, as one example, be called in response to a user (e.g., a marketing analysis user) employing a GUI of her device to indicate a desire to receive convergences and correlations emerging from the collected omnibus records. In so indicating a desire to receive such convergences and correlations the user may (e.g., via the GUI of her device) specify floor and ceiling values. With reference to that which is discussed hereinbelow, such specified floor and ceiling values may be passed as parameters in calling the method. Moreover, the user may be able to specify (e.g., via the GUI of the device) that there be no floor and/or be no ceiling. User indication of no floor may cause a value of zero to be passed for the corresponding parameter in the method call. User indication of no ceiling may, in keeping with the Swift/Apple frameworks pseudocode employed herein, cause Int.max (i.e., maximum allowable integer size) to be passed for the corresponding parameter in the method call.

As another example, the giveCorrelationsWithFloor(_: andCeiling:) method may be called by an automated method (e.g., by an automated method of the archivist object) which endeavors to stimulate the emergence of differing convergences and correlations from the collected omnibus records. In keeping with such a goal of stimulating the emergence of differing convergences and correlations, the automated method may call the giveCorrelationsWithFloor(_: andCeiling:) method multiple times, providing differing floor and ceiling specifications—including indication of no floor and/or no ceiling—among the different calls. The other method may take one of a number of approaches as to what floor and/or ceiling, if any, should be specified in a given call to giveCorrelationsWithFloor(_: andCeiling:). As one example, the automated method may employ a randomization approach in deciding what floor and/or ceiling, if any, should be specified for a given call.

As is discussed in greater detail herein, the floor value employed by the giveCorrelationsWithFloor(_: andCeiling:) method may serve to dictate the minimum value that the count property of an element of a considered bucket array should possess in order for that element to be included in a bucket array outputted by the method. In like vein, the ceiling value employed by the giveCorrelationsWithFloor(_: andCeiling:) method may serve to dictate the maximum value that the count property of an element of the considered bucket array may possess in order to be permitted inclusion in the bucket array outputted by the method.

The giveCorrelationsWithFloor(_: andCeiling:) method may have the declaration:

```
func giveCorrelationsWithFloor(_ theFloor: Int, andCeiling theCeiling: Int) throws -> [BucketElement],
``` where the declaration indicates that the method may take a first parameter of type Int, the first parameter having a local parameter name "theFloor" and having no external parameter name. The declaration further indicates that the method may take a second parameter of type Int, the second parameter having a local parameter name "theCeiling" and having the external parameter name "andCeiling." Moreover, the declaration indicates that the method may be capable of throwing an error and that the method may have a return type of [BucketElement]—an array of the type BucketElement, a type discussed hereinabove.

From 1501 flow may proceed to 1503 where the giveCorrelationsWithFloor(_: andCeiling:) method may choose a tuple n-number. For a particular call of the method, the method may select the tuple size to be employed for the at-hand run. Such selection may be through of as changing the tuple n-number. Illustratively, a choice of n=3 may correspond to a three item tuple. As an example, choice of a tuple size of three might allow each tuple to hold the value for a city of purchase of a particular omnibus record, the value for an invoice line product description field of that particular omnibus record, and an invoice line price field of that particular omnibus record, where the product description field and price fields are, say, for the same invoice line.

A number of factors may come into play in terms of tuple n-number selection. For instance, one or more directives may be provided (e.g., via a marketer user employing the method specifying fields of interest for finding correlations. Performance of choosing the tuple n-number may include drawing one of the presented directives for employ. For instance, one such provided directive might specify a desire to find correlations involving city of purchase field, invoice line product description field, and corresponding invoice line price field. Cycling through the provided directives in the interest of performing a correlations run with respect to each and drawing such directive, the method may chose a tuple n-size of three. As an alternative to and/or in addition to there being provided directives of the sort discussed, the method may itself select a n-tuple number. Such choice may have a random aspect to it so that various n-tuple sizes are with multiple calls of giveCorrelationsWithFloor(_: andCeiling:) ultimately selected. Such may serve to promote data analysis as different n-tuple classes may tend to allow different convergences and correlations to emerge. In one or more embodiments the method's choice of tuple n-number may be constrained by set factors such as upper limit to tuple n-number. Such an upper limit to tuple n-number might, for instance, be chosen (e.g., by the action of a user and/or in an automated fashion) with an eye towards conserving processor time and/or a consideration of the maximum number of field data items that an omnibus record may tend to provide, bearing in mind that while certain possible fields (e.g., store name and/or city of purchase) may be constant in quantity among omnibus records (e.g., an omnibus record may include a single store name value and a single city of purchase value), other possible fields may vary in quantity among omnibus records (e.g., depending on the number of items purchases as reflected by an omnibus record, the quantity of invoice line product description value and the quantity of invoice line price values may vary).

From 1503 flow may proceed to 1505 where the fields whose values will be employed in loading the tuples may be chosen. The number of fields chosen may match the tuple n-number of the tuple (e.g., for n=3 and three item tuples, three fields may be chosen). The fields may be chosen in a number of ways. For example, as discussed the method may draw from provided directives. As such the chosen fields may agree with those of the drawn directive. As such, continuing with the example directives the chosen fields may be city of purchase field, invoice line product description field, and corresponding invoice line price field. As another example, as discussed the method may select the tuple n-number (e.g., in a manner employing randomness). Under such circumstance the method may employ randomness in selecting, from the available fields, n fields whose values will be employed in loading the tuples. Such employ of randomness may allow for diversity in fields ultimately selected to grow with multiple calls to the method. As such, and with an eye towards the foregoing, exiting 1505 the method may have chosen the n fields whose values will be employed in loading the tuples.

At 1507, the method may act to load tuples such that each loaded tuples holds values, drawn from a given omnibus record, for the chosen fields. As an illustration, where the chosen fields are city of purchase field, invoice line product description field, and corresponding invoice line price field each loaded tuple may hold the value of that omnibus record's city of purchase field, the value of that omnibus record's product description field of an invoice line, and the value of that omnibus record's price field of that invoice line. As such the method may access the store (e.g., a Core Data-managed database) holding omnibus records, the method plying an NSFetchRequest indicating that records of the entity type OmnibusEntity be returned. The applied fetch may return an array of omnibus records. The giveCorrelationsWithFloor(_: andCeiling:) method may visit each omnibus record of the array (e.g., with a for-in loop), drawing from each the called-for field values and for each creating a corresponding tuple. As such, exiting 1505 the method may have loaded a tuple for each returned omnibus record.

At 1509 the method may formulate an array which includes as its elements the tuples created in 1507. Further in 1509 the method may call bucketizeForTupleArray(_:), passing as the single parameter the formulated array. At 1511, the giveCorrelationsWithFloor(_: andCeiling:) method may receive, as a response to the method call of 1509, a bucket array.

At 1513 a bucket array marker may be set to the first element of the bucket array which was received at 1511. As one example such bucket array marker setting may be performed via the employ of a for-in loop. At 1515 a determination may be made as to whether or not the value specified by the count property of the element of the received array pointed to by the marker is greater than or equal to theFloor and less than or equal to theCeiling. As noted theFloor may be zero and/or theCeiling may be Int.max. Where a determination of "yes: is made at 1515 flow may proceed to 1517. Where a determination of "no" is made at 1515 flow may proceed to 1519. At 1517, appended to the bucket array to be returned by the method is the element of the received array to which the marker points. Flow may then proceed from 1517 to 1519. At 1519 a determination is made is to whether or not there are further elements in the received bucket array. In the case where there are further such elements—a "yes" determination at 1519—flow may proceed to 1521 where the bucket array marker is incremented. As one example such increment may be performed in connection with the employ of a for-in loop. From 1521 flow returns to 1515.

In the case where a determination of "no" is made at 1519, flow may proceed to 1523 where the method returns the bucket array which has been constructed by the giveCorrelationsWithFloor(_: andCeiling:) method.

As an illustration of a call to the giveCorrelationsWithFloor(_: andCeiling:) method, suppose that, via the functionality of giveCorrelationsWithFloor(_: andCeiling:) just discussed—including the method choosing a tuple n-number, the method choosing fields, the method calling the bucketizer and receiving in response to that call a bucket array, and the method in view of theFloor and theCeiling producing an output bucket array to be returned by the method—the method came to have produced an output bucket array reflecting the method having chosen as the fields city of purchase, invoice line detailed description, and invoice line price paid for that same invoice line. Suppose that among the buckets of the output bucket array was a first bucket having a tuple label conveying cereal brand A, a price paid of $3.99, and a city of purchase of Los Angeles, and having a count specifying a first value. Suppose that further among the buckets of the output array was a second bucket having a tuple label conveying cereal brand A, a price paid of $2.99, and a city of purchase of Los Angeles, and having a count specifying a second value which is lower than the first value. The two buckets, considered together, may convey that cereal brand A sells in higher numbers in Los Angeles when sold at a $3.99 price point rather than at a $2.99 price point. Suppose that further among the buckets of the output array was a third bucket having a tuple label conveying cereal brand A, a price paid of $2.99, and a city of purchase of San Francisco, and having a count specifying a third value. Suppose that still further among the buckets of the output array was a fourth bucket having a tuple label conveying cereal brand A, a price paid of $3.99, and a city of purchase of San Francisco, and having a count specifying a fourth value which is lower than the third value. The third and fourth buckets, considered together, may convey that in San Francisco cereal brand A sells better when sold at the $2.99 price point rather than at the $3.99 price point.

It is noted that for certain commerce location scenarios (e.g., restaurants) there may on one hand be neither scanning nor entry of UPC codes, but on the other hand there may be a printed prebill. Moreover, there may be commerce location scenarios for which there is both scanning and/or entry of UPC codes, and also a pre-bill.

As an illustration, such a prebill may be the "check" which is brought to a restaurant patron by a member of the restaurant's waitstaff, the patron perhaps responding to such pre-bill check by returning, along with her payment card, the pre-bill check to the waitstaff member, the patron perhaps writing a tip amount on the prebill check or otherwise specifying a tip amount prior to handing the prebill back.

Where that which is discussed herein is deployed at such a commerce location, in place of and/or in addition to the discussed keyscan sipper may be an object which, from one point of view, includes certain functionality of the discussed keyscan sipper and certain functionality of the discussed print sipper. Such object will be referred to as the prebillSipper object.

The prebill sipper may in one aspect act in the fashion of the discussed printsipper to monitor the print spool directory of the at-hand POS for the addition of new pdf-format print spool files and to access string representations thereof. The prebill sipper may inspect such string so as to determine whether or not it corresponds to a prebill print job (e.g., as opposed to a final receipt print job). Such determination may be made, as one illustration, by inspecting the string for one or more particular words and/or phrases. For instance, where deployed at a commerce location where prebills include the text "your check," the prebill sipper might inspect the string for inclusion of the text "your check" and consider the print job to correspond to a prebill check where such phrase is included. So finding the accessed string to reflect the printing of a prebill check, the prebill sipper may store the string in a property of the prebill sipper. As one example. such property of the prebill sipper may, for such a deployment scenario, be accessed by the printsipper at the juncture discussed herein where the printsipper accesses the keyscan sipper's stored property in connection with the print sipper requesting omnibus record creation and then coupon vending, but with the print sipper accessing and employing the prebill sipper's property in lieu of the discussed keyscan sipper's property. As such, for the at-hand deployment scenario the functionality of the print sipper is generally analogous to that discussed hereinabove, with the noted behavioral alterations occurring. In like vein, various functionality discussed herein with respect to the keyscan sip— for instance omnibus record creation including tagging (e.g., with the omnibus field keyScanSip being employed to alternatively or additionally hold prebill sip data, and/or with the OmnibusEntity definition including a string field prebillSip as an alternative to and/or in addition to the keyScanSip field), compliance checking, and convergences/ correlations determination—may be performed in a fashion analogous to that discussed above, but alternately or additionally with the noted string representation of the spool file for the prebill print and the noted property of the prebill sipper taking the place of the UPC codes and/or quantity indications arising from keyscan sipping and the noted property of the print sipper. In keeping with this, there may be an entity definition PrebillSipRuleEntity which may be identical to that of the KeyScanSipRuleEntity and PrintSipRuleEntity definitions outside of the entity name (e.g., the KeyScanSipRuleEntity definition may have ruleCriteria, openingTag, closingTag, and subRulesKey string fields).

As discussed, the prebill sipper may inspect the noted string representation of the prebill print spool file for one or more particular words and/or phrases (e.g., "your check") in determining whether or not to consider the string representation to correspond to a prebill and to handle it as discussed. In like vein, under such a deployment scenario the print sipper may analogously inspect the string representation of the receipt print spool file for one or more particular words and/or phrases (e.g., "thank you for dining with us" or "your final bill") in determining whether or not to consider the string representation to correspond to a receipt and to handle it as discussed hereinabove.

FIG. 16 shows a logic flow diagram illustrating embodiments of a user device-performed process by which the user device may be employed in making payments at a commerce location using POS configuration data corresponding to that commerce location. Such POS configuration data may, for instance, be POS configuration data received via that which is set forth in connection with FIG. 4. To facilitate discussion, the process of FIG. 16 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 16 may be performed by a smaller or larger quantity of objects than as discussed, and/or may be performed by a smaller or larger quantity of methods than those discussed. It is noted that the term "component," as discussed herein-throughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1601 a payAtCurrentCommerceLocation( ) method of the posTransactor object may be called. The method may have the declaration func payAtCurrentCommerceLocation( ) throws, where the declaration indicates that the method may take no parameters, indicates, by the inclusion of the keyword "throws," that the method may be capable of throwing an error, and indicates that the method may have no return value.

The calling of the method may be subsequent to a user indicating a desire to employ the POS capabilities of her device to make a payment at the commerce location in which she is presently situated. As an example the user might so indicate by activing a corresponding GUI button of her device (e.g., an instantiated NSButton or UIButton object).

From 1601 flow may proceed to 1603 where payAtCurrentCommerceLocation( ) queries the user for selection of a card to be employed in making the payment. The method may cause one or more cards (e.g., credit cards and/or debit cards) to be presented to the user and have the user select one of these cards for payment. As one illustration, payAtCurrentCommerceLocation( ) may cause to be displayed to the user an instantiated NSTableView or UITableView which presents one or more cards to the user and allows for one of these cards to be selected.

The cards presented to the user for selection (e.g., the cards that populate the NSTableView or UITableView object) may be ones known to the method. For instance a store (e.g., a Core Data-managed store) accessible to the user device may hold information, such as card number, expiration date, and/or PIN for one or more cards. Such store may be located on the user device and/or remote from the user device. Moreover, such store may be encrypted.

The cards may come to be known by the device and stored as discussed in a number of ways. The cards thusly coming to be known by the device and stored may be considered to constitute a setup operation and/or a portion thereof. As one example, a user may perform provision of the card information. For example, the user may enter the card information (e.g., card number, PIN, and/or expiration date) via a GUI of her device. As another example, the provision of the card information (e.g., card number, PIN, and/or expiration date) may be performed by other than the user and/or not directly by the user. For instance, the provision of card information may be performed by a bank and/or other financial institution. As one illustration, a user might visit and/or contact a bank and or other financial institution, indicate to the bank and/or financial institution the one or more cards she wishes to be accessible to her device, and the bank and/or financial institution may act in the provision of the card information. Such provision of the card information might, as one example, involve a worker of the bank and/or financial institution a accessing a secure GUI of the user device—useable for entry of card information—which is not available to individuals other than approved bank and/or financial institution workers. For example, access to such secure GUI may be password protected, require that a contactless smartcard bank and/or financial institution worker employee card be presented to a contactless smartcard reader of the user device, and/or require on-demand activation by a remote server that acts only at bank and/or financial institution behest. As another illustration, a user might visit and/or contact a bank and/or financial institution, indicate the one or more cards she wishes to be available to her device, and the bank and/or financial institution may cause a server to remotely load the card information onto the user device via a secure connection. As yet another example, the provision of the card information (e.g., card number, PIN, and/or expiration date) may be achieved via a POS situated at a commerce location, with the POS obtaining information from a given card (e.g., card number and/or expiration date) by reading that card via a card reader of the POS. Where there is a PIN associated with the card the user may provide such PIN to the POS (e.g., via a secure keypad). Moreover, under a circumstance where the POS reads from the card the card number but not its expiration date (e.g., due to limitations of the POS and/or card reader), the user and/or a clerk operating the POS may provide the expiration date to the POS (e.g., via a secure keypad). Subsequent to so reading and receiving the card information, the POS may act to cause a server to remotely load the card information onto the user device via a secure connection. Such card reading by the POS might occur in connection with the user making a purchase with that card and/or might occur without the user making a purchase with the card (e.g., the user might elect to visit the commerce location not to make a purchase but instead only so that the noted provision of card information may occur). It is noted that, according to various embodiments, a user may be asked to provide a password in connection with the setup operation. For such embodiments the user might be called upon to provide that password (e.g., via a GUI of her device) in order to perform one or more of the operations discussed herein (e.g., the user might need to enter the password before executing a payment with her device).

It is noted that the cards of the user for which the information thereof is loaded in connection with the user device may, for instance, include magstripe cards, smartcards (e.g., EMV smartcards), and contactless smartcards. Moreover, with such load having occurred with respect to a particular card the user may be able to employ her device to make a payment which leverages that card even if the card is not physically with her (e.g., in the case where she has left the card at home and/or in a safe location). As such, from one point of view one might view her device as "emulating" that card. Moreover, as such ability to ply her card in payment without having it physically with her occurs without her device employing Host Card Emulation (HCE), one might view her device as further taking the place of—or "emulating"—HCE. What is more, as a user may load in connection with her user device a smartcard and/or a contactless smartcard, and proceed to ply that card in payment at a commerce location without having the card physically with her, the commerce location at which she pays need not have hardware for reading actual smartcards and/or contactless smartcards. As such, the commerce location finds itself able to, when users employ their devices as discussed herein, in effect be able to accept smartcard and/or contactless smartcards despite lacking the corresponding reader hardware for doing so.

With the user having selected (e.g., via a NSTableView or UITableView) a card to be employed in making the at-hand payment, the method may access the corresponding card information (e.g., card number, PIN, and/or expiration date) from the store. As such, with performance of 1603 the method may have at hand the card information for the user-selected card. With the method having the card information at hand, flow may proceed to 1605.

At 1605 the method may come to learn the amount which is to be disbursed in connection with making the payment at the commerce location. The method may so come to learn in a number of ways. As one example, the user may employ a GUI of her device to enter the payment amount. As one illustration, an instantiated NSTextField or UITextField may be employed via which the user can enter the payment amount (e.g., via an onscreen keyboard). As another illustration, an instantiated UIPickerView may allow the user to enter the payment amount using spinning slot machine-type wheels.

As a another example of the method coming to learn of the payment amount, an infrastructure POS located at the commerce location—that is to say a device such as a computer-based (e.g., Macintosh-based) cash register located at the commerce location as opposed to the POS capabilities of the user device—may present on a user-viewable screen a QR code which conveys a string indicating the amount due. Such QR code might be displayed next to a human-readable display of the amount due (e.g., a display of one or more digits). In a manner analogous to that which is discussed herein in connection with the qrForCurrentCommeceLocation method, the user device may act to ascertain the string to which the presented QR code corresponds and to take that string to indicate the amount which is to be paid at the commerce location via the user device.

As another example of payAtCurrentCommerceLocation ( ) learning of the amount to be paid at the commerce location via the user device, optical character recognition (OCR) may be employed with respect to a payment amount displayed at the commerce location (e.g., on the screen of an infrastructure POS, and/or as printed and/or written down on a check or bill) such that payAtCurrentCommerceLocation ( ) may come to learn of the amount which is to be paid at the commerce location via the user device.

Such OCR may be achieved in a number of ways. For instance, in a manner analogous to that which is discussed hereinabove with respect to panorama capture, the user may be instructed (e.g., via a device GUI) to point her device at the payment amount and, in a fashion analogous to that discussed herein above with respect to panorama capture, an array of images (e.g., a UIImage array) reflecting images of the payment amount may be captured. The image array may be passed to a method (e.g., a method running on a remote server) which performs OCR with respect to the payment amount depicted by the images and returns an indication (e.g., as a float and/or as a string) of the amount to be paid. It is noted that the image array providing multiple images of the payment amount to be subjected to OCR may improve OCR accuracy.

As one example, the OCR technique employed by the method which intakes the image array and returns an indication of the amount to be paid might be based on a neural network trained with inputs of images of payments amounts and corresponding float and/or string versions of those payment amounts. As another example, at least for the circumstance of the payment amount not being handwritten, the method which performs the OCR may make use of the Tesseract OCR framework.

As such, with performance of 1605 payAtCurrentCommerceLocation( ) may have at hand the amount to be paid at the commerce location via the user device. From 1605 flow may proceed to 1607.

At 1607 the user may be asked to confirm the payment amount. For instance, a GUI of the user device may display to the user that which the method understands to be the amount to be paid and present to the user GUI elements (e.g., UIButton or NSButton objects) for confirming or disagreeing with the payment amount. So having the user confirm the payment amount may aid, for instance, in addressing user entry errors, QR code interpretation errors, and/or OCR errors. Where the user confirms the payment amount flow may proceed to 1609. Where the user indicates the payment amount to be incorrect, flow may return to 1605 for reperformance of that which is discussed in connection with 1605, thus allowing, for instance, the user to reattempt GUI-based payment entry, QR-based determination of payment amount, and/or OCR-based determination of payment amount.

At 1609 payAtCurrentCommerceLocation( ) may access the POS settings for the at-hand commerce location. As discussed herein such settings may be held as properties of the posTransactor object via one or more of the approaches discussed herein for determining the user device POS settings for an at-hand commerce location (e.g., a beacon-based or GPS-based approach). As discussed herein, such property-stored POS settings may include merchant ID, terminal ID, payment gateway URL, payment gateway login, and/or payment gateway password. As such, at 1609 payAtCurrentCommerceLocation( ) may access such posTransactor object properties.

From 1609, flow may proceed to 1611 where payAtCurrentCommerceLocation( ) acts to prepare an authorization request and dispatch it to the payment gateway. In the interest of compact disclosure, it is noted that 1611 may be performed in a manner analogous to that discussed in connection with FIG. 8, but with the employed card information (e.g., card number and/or expiration date) being those obtained in connection with performance of 1603, the payment amount being that obtained in connection with performance of 1605, and the POS settings (e.g., merchant ID, payment gateway URL, payment gateway login, and/or payment gateway password) being those obtained in connection with performance of 1609. It is noted that payAtCurrentCommerceLocation( ) may become aware of the format (e.g., SOAP-XML format) to be employed in dispatching the authorization request to the at-hand gateway, for instance, by consulting a remote and/or local store (e.g., a Core-Data Managed store) which correlates merchant IDs with the formats employed by the payment gateways used by the corresponding merchants.

From 1611 flow may proceed to 1613 where payAtCurrentCommerceLocation( ) acts to receive the authorization response from the payment gateway and extract therefrom the authorization code and response code conveyed by the authorization response. In the interest of compact disclosure it is noted that 1613 may be performed in a manner analogous to that which is discussed in connection with FIG. 8, but with the extracted authorization code and response code not being returned as the result of payAtCurrentCommerceLocation( ) but instead with the extracted authorization code and response code being handled as discussed in connection with 1615. It is noted that payAtCurrentCommerceLocation( ) may become aware of the format (e.g., SOAP XML format) to be employed in interpreting the authorization response, for instance, by consulting a remote and/or local store (e.g., a Core Data-managed store) which correlates merchant identifiers with the formats employed by the payment gateways used by the corresponding merchants.

At 1615 payAtCurrentCommerceLocation( ) may handle the authorization code and response code. Such may be performed in a number of ways. As one example payAtCurrentCommerceLocation( ) may display the received authorization code and response code on a GUI of the user device, and/or may store those codes at a local and/or remote store. In one or more embodiments, in presenting the codes to the user the method may, for instance via the GUI, suggest that the user show and/or say the codes to the at-hand clerk at the commerce location. A clerk so learning of the codes might act (e.g., in accordance with instructions provided to her by the commerce location) to enter the codes onto her infrastructure POS and/or to otherwise make a record of the codes. Such clerk entry of the codes at the infrastructure POS may cause the codes to be stored at the infrastructure POS, at a local store, and/or at a remote store (e.g., a Core Data-managed store).

As an alternative to and/or in addition to the just mentioned approach for allowing the clerk to become aware of the codes, payAtCurrentCommerceLocation( ) may cause on the user device GUI display of a QR code and/or barcode encoded to convey the codes. The GUI might instruct the user to ask the clerk to capture the QR code and/or barcode using a camera and/or scanner of her infrastructure POS. Such scanning and/or camera use may, with appropriate QR code and/or barcode interpretation being performed at the infrastructure POS, cause the codes to be stored at the infrastructure POS, at a local store, and/or at a remote store (e.g., a Core Data-managed store).

As yet another example, payAtCurrentCommerceLocation( ) may, alternately or additionally, act to send the codes to a store (e.g., a Core Data-managed store) associated with the commerce location (e.g., a data store located at or remote from the commerce location).

As discussed herein there may be a bank of terminal IDs to be employed by user devices making user-device-based payments at a commerce location. In keeping with this, the user device may act to pass the authorization code and response code to a method (e.g., a method running on a server at or remote from the commerce location), the method call perhaps also including the merchant ID, terminal ID, payment amount and/or time of day in the method call. The called method may cause one or more of these values to be sent to some or all of the infrastructure POSs at the commerce location corresponding to the merchant ID. As such, for instance, one or more of the infrastructure POSs at a commerce location might show on its clerk-oriented display a GUI window and/or other display venue listing recently-performed device-based payments made at the commerce location. For instance, for each such transaction might be listed one or more of the data items passed by payAtCurrentCommerceLocation( ) (e.g., the time of day, amount paid, authorization code, and/or response code might be listed). As such, the clerk, perhaps in connection with getting certain information from the paying user (e.g., the time when the payment was made and/or the payment amount), may be able to find the user's payment among displayed recently-performed device-based payments made at the commerce location. In the vein of the above, such authorization code, response code, and/or other displayed information may be stored.

It is noted that where the infrastructure POS and/or the clerk comes to possess the authorization code and/or response code, the clerk and/or infrastructure POS may act to confirm the authenticities of the codes. For instance, a financial instruction server may—via a function of the infrastructure POS—be passed one or more of the codes and be asked to return—say to the POS—a confirmation or disapproval of the codes. Alternately or additionally, such codes may be confirmed in another way (e.g., via a telephone call to a financial institution).

As discussed herein, the terminal ID employed by the at hand user device may be checked out from a bank of such codes, with the store holding the codes (e.g., a Core Data-managed database) making a checked out (e.g., in use) notation for the terminal ID being employed by the at-hand user device. In keeping with this, at 1615 payAtCurrentCommerceLocation( ) may act (e.g., via a call to a method—say one running a at a remote device—and/or via accessing the store holding such terminal IDs) to have the store reflect (e.g., by clearing the in-use flag) that the terminal ID is available once again for use (e.g., by another user device). Moreover at 1615 payAtCurrentCommerceLocation( ) may perhaps clear the properties holding POS settings.

A card of the user which is loaded in connection with her device may, for example, be associated with a conventional and/or existing payment card network (e.g., having been issued by an issuer affiliated with the Visa or MasterCard payment card network). As another example such a card may be associated with a nonconventional and/or not-already-existing payment network (e.g., having been issued by an issuer affiliated with such nonconventional and/or not-already-existing payment network).

Where the card plied via the functionality discussed herein for user-device-based payment is associated with a conventional and/or already-existing payment network, when payment is made via the user device plying that card the payment gateway contacted by the user device may be associated with a conventional and/or already-existing payment network (e.g., the payment gateway may be associated with the Visa or MasterCard payment network).

Where the card plied via the functionality discussed herein for user-device-based payment is associated with a nonconventional and/or not-already-existing payment network, when payment is made via the user device plying that card the payment gateway contacted by the user device may be associated with a nonconventional and/or not-already-existing payment network rather than any conventional and/or existing card payment network (e.g., rather than the Visa or MasterCard payment network). The nonconventional and/or not-already-existing payment network may employ routing apart from a conventional and/or existing card payment network (e.g., routing apart from the Visa or MasterCard payment network). As one illustration, such routing apart from a conventional and/or existing payment network may leverage Automated Clearing House (ACH) transfer.

Still further, according to one or more embodiments a nonconventional and/or not-already-existing payment network and/or issuer may be formulated specifically for and/or for the exclusive use of the functionality discussed herein, and/or an auction (e.g., an automated auction) might be held to determine the issuer and/or payment network—be it a conventional/existing one or otherwise—to handle all and/or any particular payment performed via that which is set forth herein (e.g., an on-the-fly automated auction might occur in response to the user device applying her user device to make a payment at a commerce location, the outcome of such automated auction determining which issuer and/or payment network will handle her transaction).

It is additionally noted that, according to one or more embodiments, one or more escrow parties may be involved in the transactions discussed herein. For instance, payments made via a user device may be held in escrow by one or more parties before being made available to the ultimate desired payment target (e.g., before being made available to a commerce location). Such escrow hold may persist until one or more requirements are fulfilled. Such requirements may, for example, be specified by a customer user (e.g., via a GUI of her user device) and/or by a commerce location (e.g., via a POS GUI). As an illustration, a customer user purchasing an expensive item may specify that payment be withheld until she has specified (e.g., via a GUI of her device) that she has inspected the item and has found it to be undamaged. Incentives (e.g., funds, coupons, and/or other consideration) may be made available to one or more parties participating in escrow (e.g., to purchaser users, commerce locations, and/or escrowers).

It is noted that the user device functionality discussed herein—for instance the discussed functionality regarding configuring the user device to make a payment at a commerce location and the discussed functionality regarding execution of a payment via the user device—may be appended to the user device via one or more downloads. As one illustration, the user device may make such one or more downloads during an initial setup operation and/or in connection with the above-discussed provision of payment card information. As another illustration such one or more downloads may occur at another time.

Figure 17:
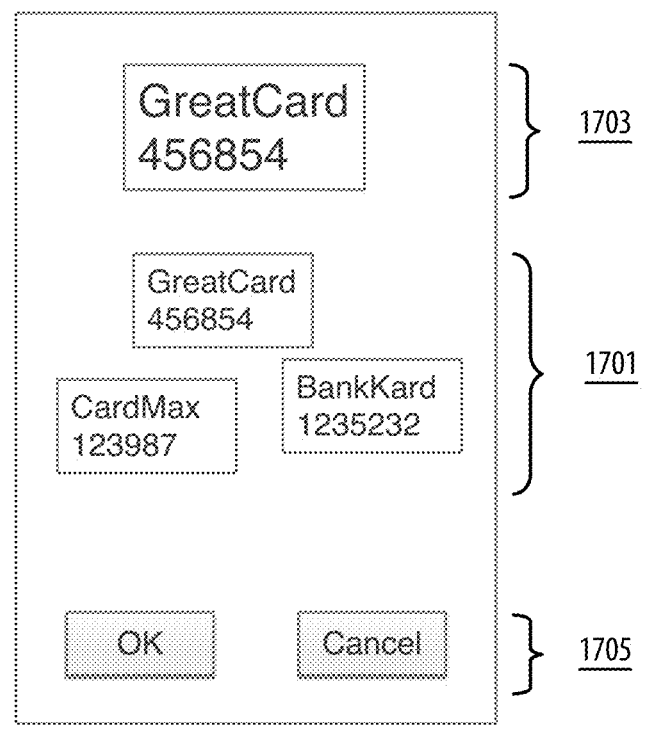
FIG. 17 shows, for various embodiments of the POSAMS, an example user interface regarding payment card selection for the POSAMS.

FIG. 17 shows an example user interface according to one or more embodiments. As noted herein in connection with phase 1603 of FIG. 16, a user may be queried for selection of a card to be employed in making payment. Depicted in FIG. 17 is an illustrative touchscreen interface of a user device of the sort discussed herein. The interface allows a user to perform an initial selection of one of cards 1701 via a single tap of the desired card (e.g., with each selectable card corresponding to an instantiated NSImageView or UIImageView with which a tap gesture is associated). Such causes a preview display of the initially-selected card as per 1703 and the presentation of GUI buttons "OK" and "Cancel" as per 1705 (e.g., with each button corresponding to an instantiated NSButton or UIButton). The user may then tap the "OK" button to accept her initial card selection as her final selection, or tap "Cancel" to reattempt an initial selection of one of the cards of 1701.

Figure 18:
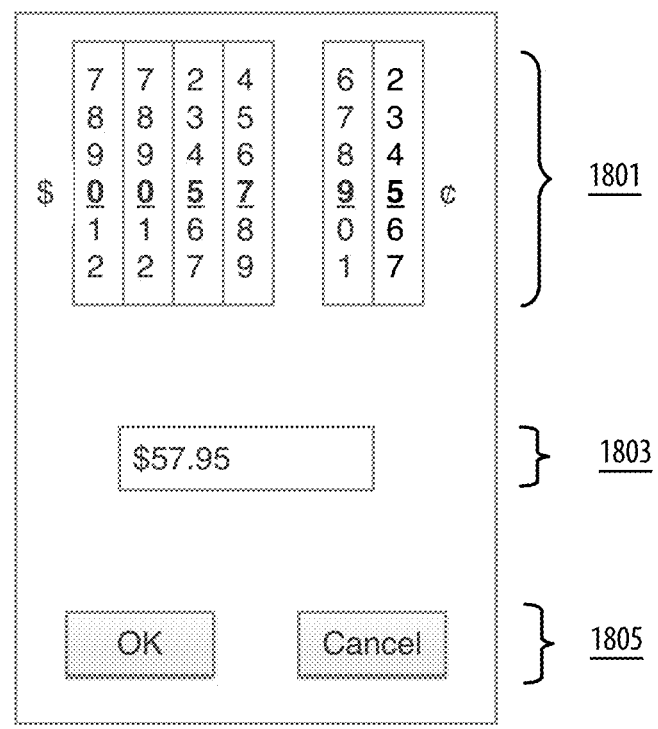
FIG. 18 shows, for various embodiments of the POSAMS, an example user interface regarding payment amount selection for the POSAMS.

FIG. 18 shows a further example user interface according to one or more embodiments. As noted herein in connection with phase 1605 of FIG. 16, a user may employ a GUI of her device to select the amount to be disbursed in connection with making a payment at a commerce location via her device. Depicted in FIG. 18 is an illustrative touchscreen interface of a user device of the sort discussed herein. Via the touchscreen interface of FIG. 18, the user may employ spinning slot machine-type wheels (e.g., corresponding to an instantiated UIPickerView) to initially select a payment amount, the initially-selected payment amount being previewed as per GUI element 1803. The user may proceed to confirm the payment amount by tapping the "OK" button (e.g., corresponding to an instantiated NSButton or UIButton) of 1805, or instead tap the "Cancel" button (e.g., corresponding to an instantiated NSButton or UIButton) of 1805 to reattempt initial payment amount selection using the spinning wheels.

It is noted that in one or more embodiments the discussed keyscan sipping, the discussed prebill sipping, and/or the discussed print sipping—as well as discussed-herein operations which make use of such sipping including, for instance, compliance check operations, omnibus record creation and tagging operations, coupon vending operations, UPC-SKU mapping operations, and/or convergence/correlation operations—may be employed in conjunction with discussed-herein operations in which an individual employs her user device to make a payment at a commerce location.

Turning to compliance check, that which is discussed herein in connection with a user device communicating with a payment gateway may be augmented by having the user device implement functionality in line with that which is discussed herein in connection with FIG. 7 including, for instance, the employ of a complianceAuthAssist object and code in line with the discussed PHP-inspired pseudocode, as well as having payment gateway settings of the user device directed to localhost, such that the functionality discussed herein in connection with FIG. 7, now running on the user device, may perform the discussed compliance checking and payment gateway operations of FIG. 7. It is noted that such user device-performed payment gateway communication operations in the vein of that which is discussed in connection with FIG. 7 may involve fetching from the posTransactor object of the user device (e.g., via the noted property thereof) the appropriate configuration settings (e.g., merchant ID, terminal ID, payment gateway URL, payment gateway login, and/or payment gateway password).

Alternately or additionally, performance of compliance check where the user device is employed in making payment may be implemented by having the complianceAuthMaster object alternately or additionally implement a method in the vein of complyCheckAndAuthForMerchantId(_: andTerminalId: andCardNumber: andCardPin: andCardExpiry: andPurchaseAmount: andUpcs:), but which takes in only the discussed UPCs parameter and which performs compliance checking as discussed, but not the discussed communicating with a payment gateway in the case of compliance check success, the method instead returning a—perhaps Boolean—response as to whether or not compliance check is passed. As such, the user device might, prior to performing the payment gateway communication operations discussed herein in connection with FIG. 16, pass to such method the UPCs for the at-hand transaction and await the method's response as to the results of the compliance check. Where the compliance check fails (e.g., where the proposed purchase includes one or more prohibited items)—for instance with the user device receiving a Boolean false as the reply to the method call the user device may convey such compliance check failure to its user (e.g., via a GUI message) and not proceed to communicate with the payment gateway. Where the user device's call to the method returns an indication that the compliance check has been passed (e.g., where the proposed purchase includes no prohibited items)—for instance with the user device receiving a Boolean true in response to its method call the user device may proceed with the payment gateway communications discussed herein in connection with FIG. 16. It is noted that, in one or more embodiments, an approach such as this, employing the just-noted further method of complianceAuthMaster to query such method for an authorization check result (e.g., a Boolean true or false) and then contacting the payment gateway directly in the case of compliance check passage, may be plied by an infrastructure POS device (e.g., under a circumstance where the possibility of altering and/or replacing already extant POS code exists).

With further regard to compliance check under the scenario of the user device being employed for payment, it is noted that the foregoing speaks in terms of the UPCs for the at-hand transaction being possessed by the user device. The user device may come to possess such UPCs in a number of ways. As one example, such UPCs may be conveyed by the infrastructure POS to the user device via a QR code in a manner analogous to that discussed herein in connection with an infrastructure POS-generated QR code being displayed to convey price to be paid. As one illustration, the discussed price-conveying QR code might be augmented such that its set forth string may, in addition to the price to be paid, indicate the at-hand UPCs, and/or access information (e.g., a URL, password, and/or login) for accessing the UPCs at a location at which they have been placed by the infrastructure POS. As another illustration, such UPC-conveying functionality may be set forth via one or more QR codes in addition to the price-conveying QR code. As another example of the user device coming to possess the UPCs for the at-hand commerce transaction, the user device may employ functionality in line with that discussed herein with respect to QR code capture to ply a camera of the user device to read the UPC codes from the items desired for purchase. Under such an implementation the user device may, perhaps, warn its user (e.g., via a GUI) that the accuracy of the compliance check may be dependent upon the user's diligence in properly scanning all of the UPCs for the commerce transaction. It is noted that although the foregoing has discussed compliance check with respect to UPCs, with reference to that which is discussed herein it is noted that an analogous approach may be alternately or additionally followed with respect to, say, level 3 data and/or prebill data and compliance check under the scenario of the user device being employed in payment.

Turning to the referenced operations other than compliance check (e.g., omnibus creation and tagging operations, coupon vending operations, UPC-SKU mapping operations, and/or convergence/compliance operations) under the scenario of the user device being employed for payment, it is noted that under such circumstance an infrastructure POS device may still, for instance, scan UPC codes and/or print a prebill, and/or print a receipt (e.g., an infrastructure POS might be employed to scan items and to inform a shopper of the amount due, but the shopper might pay the amount using her device, and then the infrastructure POS might print a corresponding receipt). As such, the discussed keyscan sipping, prebill sipping, and/or print sipping operations may still be performed by the infrastructure POS under the circumstance of the user device being employed for payment. In view of this, discussed operations flowing from sipping (e.g., omnibus record creation and tagging operations, coupon vending operations, UPC-SKU mapping operations, and/or convergence/correlation determination operations) may be performed in agreement with that which is discussed herein in connection with such operations also under the scenario of the user device being employed in payment.

Figure 19:
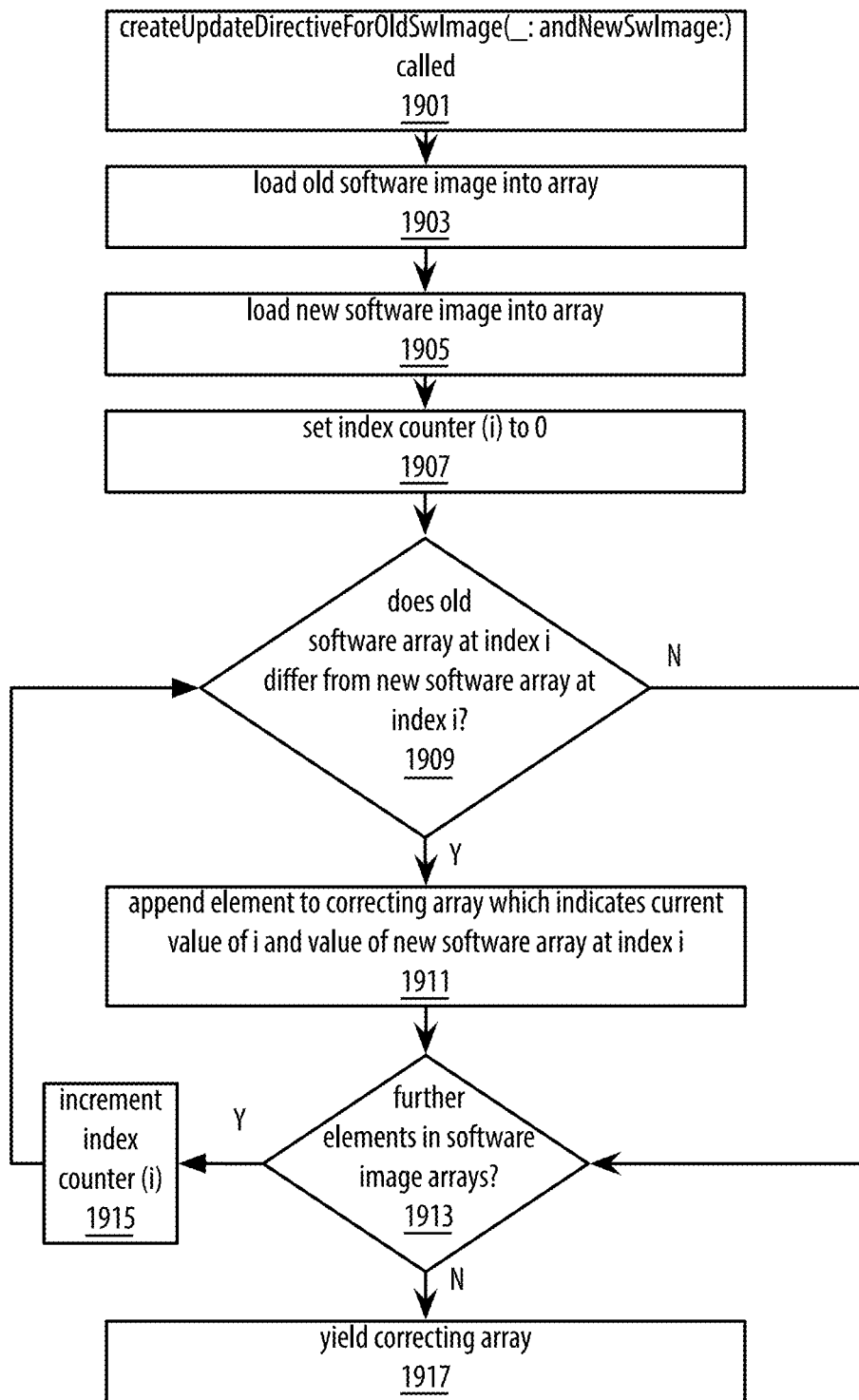
FIG. 19 shows a logic flow diagram illustrating embodiments for the POSAMS of a server-performed process by which prepared may be directive employable at a limited-capability POS device (e.g., a cellular link card machine) for updating software of that limited-capability POS device.

FIG. 19 shows a logic flow diagram illustrating embodiments of a server-performed process by which prepared may be directive employable at a limited-capability POS device (e.g., a cellular link card machine) for updating software of that limited-capability POS device. To facilitate discussion, the process of FIG. 19 may be discussed in terms of certain specified methods and certain specified objects (e.g., with each such object being an instantiation of a class, struct, or enum). It is stressed, however, that such attribution of functionality is for illustrative purposes and that functionality may be otherwise assigned. For instance, operations discussed hereinbelow with respect to a particular object and a particular method may instead be performed by a different object and/or a different method. As such, for example, the operations discussed hereinbelow in connection with FIG. 19 may be performed by a smaller or larger quantity of objects than as discussed, and/or may be performed by a smaller or larger quantity of methods than those discussed. It is noted that the term "component," as discussed hereinthroughout may correspond to an object (e.g., an instantiated class, struct, or enum).

It is further noted that, to facilitate discussion, certain method calls discussed in connection with the figure may be described using pseudocode in keeping with a call made to an object which runs within the same process and/or on the same machine as the object which makes the call (e.g., pseudocode in the form of myObject.myMethod( )). It is observed, however, that such discussed calls may, alternately or additionally, be made to an object which runs within a different process and/or on a different machine than the object which makes the call (e.g., see Distributed POS-AMS hereinbelow).

At 1901, a createUpdateDirectiveForOldSwImage(_: andNewSwImage:) method of a limitedPosUpdateHandler object may be called. The method may, as one example, be called by an automated method which has access to old and new versions of software images for one or more models and/or versions of limited-capability POS devices. Such an automated method might, for instance, periodically receive from software developers updated versions of software images for limited-capability POS devices. Such automated method may, when receiving such an updated software image (e.g., one corresponding to a newest version) save it in a store (e.g., in a Core Data-managed store) holding, with respect to one or more models and/or versions of limited-capability POS device, one or more corresponding software images. The automated method may then locate in the store an older version (e.g., the penultimate version) of the software image which it has just received from the software developer. The automated method may then call createUpdateDirectiveForOldSwImage(_: andNewSwImage:), passing as the first parameter the old software image and passing as the second parameter the new software image. It is noted that such parameters of createUpdateDirectiveForOldSwImage(_: andNewSwImage:) are discussed in greater detail hereinbelow.

As another example, createUpdateDirectiveForOldSwImage(_: andNewSwImage:) may be called by a user-directed method in which a user employs a GUI of her device to select a new version image (e.g., newest version) of limited-capability POS software and also an old version image (e.g., penultimate version) of limited-capability POS software. As one example, in keeping with the discussed Swift/Apple frameworks pseudocode employed herein, one or more instantiated NSOpenPanel objects may be employed in allowing the user to select the software images. With the user having selected the limited-capability POS device software images, the method may call createUpdateDirectiveForOldSwImage(_: andNewSwImage:) passing as the first parameter the older software image selected by the user and passing as the second parameter the newer software image selected by the user The createUpdateDirectiveForOldSwImage(_: andNewSwImage:) method may have the declaration:

```
func createUpdateDirectiveForOldSwImage(_ theOldImage: NSData,
    andNewSwImage theNewImage: NSData) throws -> [Correction]?,
``` where the declaration indicates that the method may take a first parameter of type NSData, the first parameter having a local parameter name "theOldImage" and having no external parameter name. The declaration further indicates that the method may take a second parameter of type NSData, the second parameter having a local parameter name "theNewImage" and having the external parameter name "andNewSwImage." Moreover, the declaration indicates that the method may be capable of throwing an error and that the method may have a return type of [Correction]?, an array of struct objects of type Correction, a type which will be discussed momentarily. It is noted that the inclusion of the question mark indicates that the returned [Correction] object may be set to nil.

The correction type may be defined as a struct:

```
struct Correction {
    var toChangeIndex: Int
    var newVal: Int
}
```

As discussed herein, an instantiated Correction object provides an instruction for performing a specified alteration to a specified portion of limited-capability POS software, an array of correction objects providing multiple such alteration corrections.

At 1903, createUpdateDirectiveForOldSwImage(_: andNewSwImage:) may load the received old software image (i.e., theOldImage) into an array. The received old software image and the received new software image each may represent a series of bytes making up a software image. From a hexadecimal point of view, each byte may be thought of as two hex digits ranging from 00-FF. In loading theOldImage into an [Int] array for which each element holds one byte of theOldImage, an approach in keeping with the Swift/Apple frameworks pseudocode employed herein involving calling getBytes(_: length:) on the NSData object theOldImage so as to fill the integer array may be used. The integer array so created via 1903 might be named oldSw. At 1905 the method may, in a fashion analogous to that discussed in connection with 1903 load the received new software image (i.e., theNewImage) into an integer array. The integer array so created via 1905 might be named newSw.

From 1905 flow may proceed to 1907 where the method sets an index counter i to zero and then to 1909 where the method compares the old software array at index i (i.e., oldSw[i]) to the new software array at index i (i.e., newSw[i]) and determines whether or not the values of such indices differ. In the case where such values do differ flow may proceed to 1911. In the case where such values do not differ flow may proceed to 1913.

At 1911, reached in a determination of "yes" at 1909 (i.e., a determination that a difference exists), the method may append to an array of type [Correction]?—the question mark indicating the possibility of conveying a value of nil—an instantiated Correction object for which the toChangeIndex property thereof is set to the current value of the index counter i, and for which the newVal property thereof is set to the value of the new software array at index i (i.e., to newSw[i]). It is noted that where the array of type [Correction]? is found to have a nil value at performance of 1911, the discussed appending to the array may involve overwriting of the nil value. It is further noted that the array of type [Correction]? may be instantiated left with a nil value prior to performance of 1907.

From 1913 the method may determine whether or not there are further elements in the old and new software arrays. Where a determination of "yes" is made at 1913 flow may proceed to 1915 where index i is incremented, and flow may then return to 1909 with the updated value of i. Where a determination of "no" is made at 1913 flow may proceed to 1917. With an eye towards the determination made at 1913 it is noted that the array oldSw and the array newSw are expected to be of the same length, such stemming from it being the case that the old software image and the new software image are expected to be of the same length. Such follows from it being that the software images are crafted to be employed in completely overwriting a fixed size memory (e.g., a fixed size flash memory) of a limited-capability POS device, wherein the size of a software image is set to match such fixed memory size of the limited-capability POS device. In the case where the functional code to be employed for the software takes up less than the totality of such a POS's fixed size memory, the software image may be filled with one or more stuff bytes so as to raise the image size to the full size of the fixed size memory.

At 1917 the correcting array—that is to say the discussed array of type [Correction]?—may be returned as the result of createUpdateDirectiveForOldSwImage(_: andNewSwImage:). The array returned by the method may be available, for example, for dispatch to an appropriate limited-capability-POS device (e.g., over a cellular and/or low speed link) It is noted that in certain embodiments a nil-valued such correcting array might not be sent to a limited-capability POS device, such lack of sending being from the vantage point that there is no actual software change to be made at the limited-capability POS device. On the other hand, in one or more other embodiments such a nil-valued correcting array might nevertheless be sent to a limited-capability POS device, such sending being done from the point of view that the sending of a nil-valued correcting array may take up little bandwidth (e.g., little cellular bandwidth) yet may make explicit that no software changes is required. It is further noted that performance of 1917 may include a check as to whether or not the correcting array has a nil value and making a log notation the case of such nilness. Such a log entry might, for instance, be viewable, by a system administrator.

It is also noted that in one or more embodiments a checksum hash may be calculated with respect to the new version image, and a limited-capability POS device receiving the update directive may also receive the checksum hash value. The limited-capability POS, subsequent to building at itself a complete overwrite software image using the received correcting array, may calculate a checksum hash value for the complete overwrite software image which it has built. The limited-capability POS device may then compare the two checksum hash values and consider its built image to be valid in the case where the two checksum hashes match.

As one illustration, that which has been set forth in connection with FIG. 19 may involve code in line with the following pseudocode:

```
var correctingArray : [Correction]?
for var i = 0; i <= (oldSw.count - 1); i++ {
    if oldSw[i] != newSw[i] {
        if correctingArray == nil {
            correctingArray = [Correction(toChangeIndex: i, newVal:
              newSw[i])]
        }
        else {
            correctingArray?.append(Correction(toChangeIndex: i,
    newVal: newSw[i]))
        }
    }
}
```

That which has been set forth in connection with the discussion of FIG. 19 may, for instance, be a applicable in connection with providing software update directive to limited-capability POS devices having software-holding memory (e.g., flash memory) which does not allow for alteration of individual bytes or other portions thereof, but instead only for overwriting of the entirety of the memory. In keeping with this, software updates may be conventionally sent to such limited-capability POS devices in the form of images to be employed in totally overwriting such memory. Changes-only updates may not be conventionally sent from the vantage point that, as noted, the memory of such POS devices does not allow for the changing of individual bytes or other portions thereof. However, such sending of such images to be employed in totally overwriting such POS device memory increases bandwidth use, an issue compounded by it being the case that such limited-capability POS devices often receive their updates via a limited bandwidth and/or high cost link such as cellular.

On the other hand, and as discussed in greater detail in connection with FIG. 20, the correcting array yielded via the performance of that which has been discussed in connection with FIG. 19 provides a correcting array that allows a limited-capability device to build at the POS device a replacement software image which is employable in entirely overwriting the software memory (e.g., flash) of the POS device.

Yet such array—stemming from it only including elements of the noted Correction type for those portions of the POS's current software which call for alteration—calls for less bandwidth in its sending than a complete-overwrite software image of the sort discussed.

Figure 20:
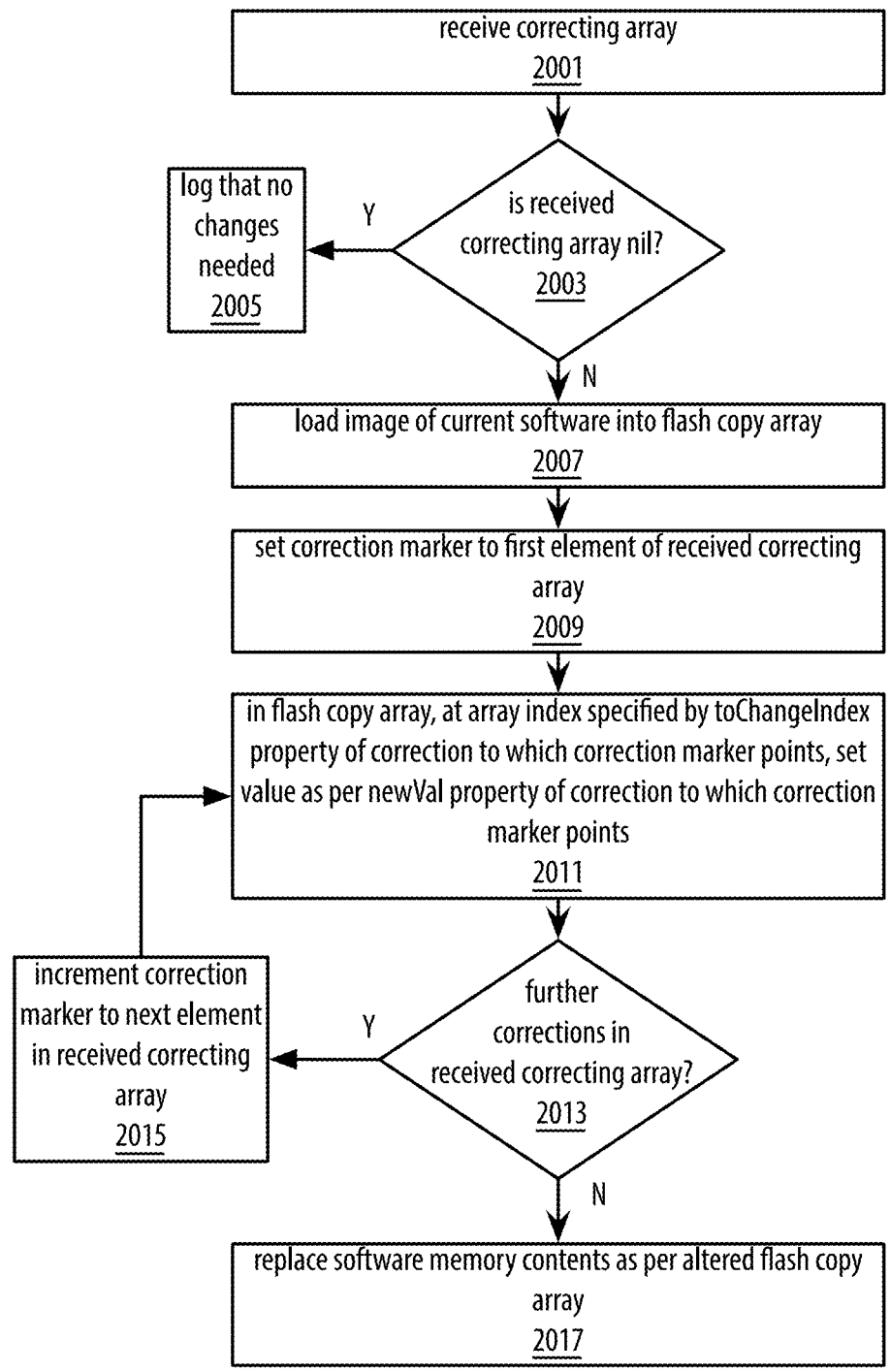
FIG. 20 shows a logic flow diagram illustrating embodiments for the POSAMS of a limited-capability-POS-device-performed process by which such POS device may employ received directive in creating, at the POS device itself, a complete overwrite software image.

FIG. 20 shows a logic flow diagram illustrating embodiments of a limited-capability-POS-device-performed process by which such POS device may employ received directive in creating, at the POS device itself, a complete overwrite software image. Such limited-capability POS device (e.g., a card machine) may possess a software memory (e.g., flash memory) which does not allow for alteration of individual bytes or other portions thereof but instead only for complete overwrite. The limited-capability POS device may moreover be one whose data link is of limited bandwidth and/or high cost (e.g., a cellular link). The received directive may be obtained by the limited-capability POS device over such link, and may be of smaller size than that which would be called for by a complete-overwrite software image.

Turning to 2001, the limited-capability POS device may receive over a link of the sort discussed (e.g., a cellular link) update directive in the form of a correcting array of the sort discussed in connection with FIG. 19. From 2001 flow may proceed to 2003 where the limited-capability POS device determines whether or not the received correcting array is of a nil value. Where the correcting array is found to have a nil value—a determination of "yes" being made at 2003—flow may proceed to 2005 where the device may log that no changes to the device's software are called for by the received correcting array. As one example such message might be stored to a log memory of the device, such log memory perhaps being viewable (e.g., on a monochrome dot matrix display of the device) via employ of one or more administrative menus of the device which allow one to request log viewing. Alternately or additionally, such log message may be presented on a display of the device (e.g., a monochrome dot matrix display) following the message's creation without there being an explicit request for display of the message.

Where a determination of "no" is made at 2003, flow may proceed to 2007 where the POS device may load an image of the current software held in the device's software memory (e.g., flash memory) into an array (e.g., an integer array). Such array may, as one example, be held in RAM (e.g., workspace RAM) of the limited-capability POS device. Having thusly, loaded into the array the image of the contents of software memory, flow may proceed to 2009. Such array might be given the name flashCopySw. To facilitate discussion, the array may at various junctures be referred to as the flash copy array.

At 2009 the device may set a correction marker to the first element of the received correction array. Such setting may, for instance, occur in connection with the employ of a for-in loop. From 2009 flow may proceed to 2011 where the device—in the flash copy array—at the index specified by the toChangeIndex property of the correction—of the received correcting array—to which the correction pointer points, set the value thereof as per the newVal property of the correction to which the correction pointer points. It is reminded that such toChangeIndex and newVal properties are discussed in greater detail in connection with FIG. 19 where the creation of the correcting array received at 2001 is discussed.

From 2011 flow may proceed to 2017 where determination is made as to whether or not there are further corrections in the received correcting array. It is noted that such determination may, for instance, be made in connection with the employ of a for-in loop. Where a determination of "yes" is made at 2013, flow may proceed to 2015 where the correction marker (e.g., in connection with the employ of a for-in loop) may be incremented to the next element of the received correcting array.

Where a determination of "no" is made at 2013, flow may proceed to 2017 where the limited-capability POS device may replace the contents of its software memory (e.g., flash memory) according to the contents of the flash copy array. The discussed—for instance multiple performances of 2011 in connection with multiple passages through 2013 and 2015—may cause the flash copy array to be altered so as to reflect a complete overwrite software image of updated software for the limited-capability POS. As such, at 2017 the device may appropriately write into its software memory (e.g., flash memory) that which is specified by the as-altered flash copy array.

As such, via that which has been discussed in connection with FIG. 20, the limited-capability POS device—instead of receiving a complete overwrite software image—has built at itself a complete overwrite software image using the received correcting array.

As one illustration, that which has been set forth in connection with FIG. 20 may involve code in line with the following pseudocode:

```
if receivedCorrectingArray == nil {
    print("log: +no+ changes needed.")
}
else {
    for correction in receivedCorrectingArray! {
        flashCopySw[correction.toChangeIndex] = correction.newVal
    }
}.
```

Figure 21:
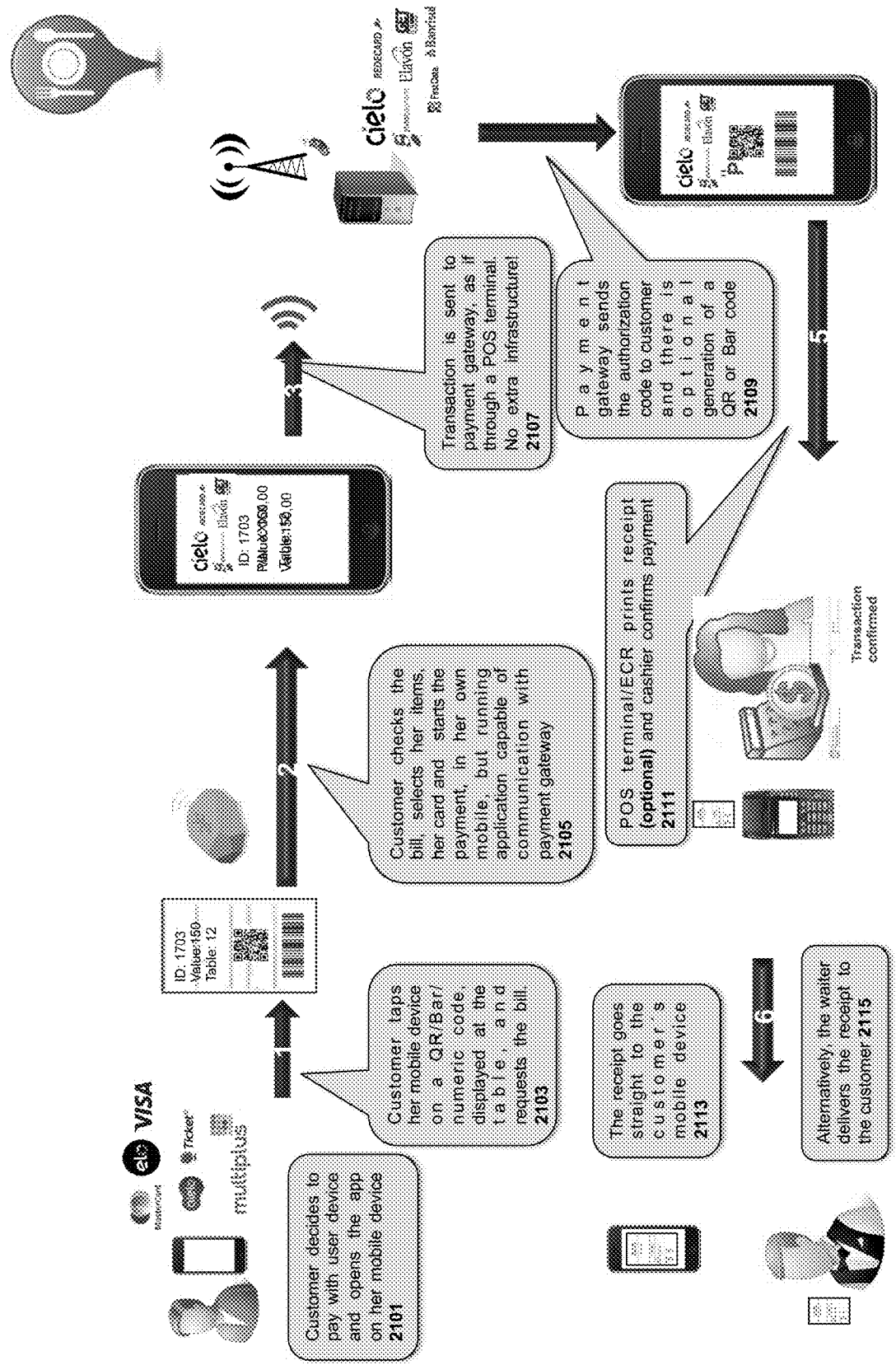
FIG. 21 shows an operational example according to various embodiments of the POSAMS.

FIG. 21 shows an operational example leveraging various of the functionality discussed herein. That which is set forth in connection with FIG. 21 may, for instance, occur within the context of a restaurant commerce location. At 2101 a customer user decides to pay with her device in keeping with the functionality discussed herein. At 2103 the user requests display at her device of the prebill (i.e., the "check"). Such request may be made in a number of ways. For instance, the user may employ her device to enter a numeric code displayed at her table, employ her device to scan a barcode displayed at her table, and/or employ her device to read a QR code displayed at her table.

Such codes may be table specific and/or may map to indications of storage locations (e.g., such a QR code may convey a URL string and/or access credentials therefor). In keeping with this, the infrastructure POS may have made the customer's prebill accessible at the storage location specified by the code at the table. In response to the user's request the user device may access the appropriate storage location—as say specified by a QR code—for the user's table, access the prebill stored there, and display that prebill to the device user.

At 2105 the user checks the prebill check for accuracy and, if satisfied, indicates to her device a desire to pay the bill via her device. Such functionality may transpire as discussed hereinabove with, for instance, the user device considering the amount to be paid that which is specified by the received prebill (e.g., with the user device extracting the value from the prebill), plus perhaps a tip amount specified by the user via a device GUI. According to one or more embodiments, where the user is desirous of receiving an emailed copy of the to-be-created receipt, the user may (e.g., via a device GUI) provide indication of such along with perhaps a specification of the email address to which the receipt should be sent.

At 2107 the user device dispatches the authorization request to the payment gateway in keeping with that which is discussed hereinabove. At 2109 the user device, in keeping with that which is discussed hereinabove, receives the authorization response. Moreover at 2109 the user device may, perhaps, create and display a QR and/or barcode conveying the authorization response (e.g., conveying the authorization and response codes thereof) for display to a clerk.

At 2111 the infrastructure POS may, in keeping with that which is discussed hereinabove, print a receipt corresponding to the transaction and/or confirm payment (e.g., confirming the authorization code and/or response code as discussed hereinabove). It is noted that in one or more embodiments the printing of the receipt may, as noted above, not involve a physical printing (e.g., the receipt may be printed only to a store).

At 2113 an electronic version of the receipt of 2109 is made available to the user device. Such functionality may, as one example, be implemented by having the infrastructure POS place the electronic receipt (e.g., in pdf form) at the same location where the prebill check was placed, and having the user device also access that same location, obtain the receipt therefrom, and display it to the user. As another example, the receipt may be emailed to the user (e.g., where the user has so requested as discussed in connection with 2105.). At 2115, as an alternative to and/or in addition to the functionality of 2113, a printed version of the receipt may be presented to the user by a waitstaff member.

Figure 22:
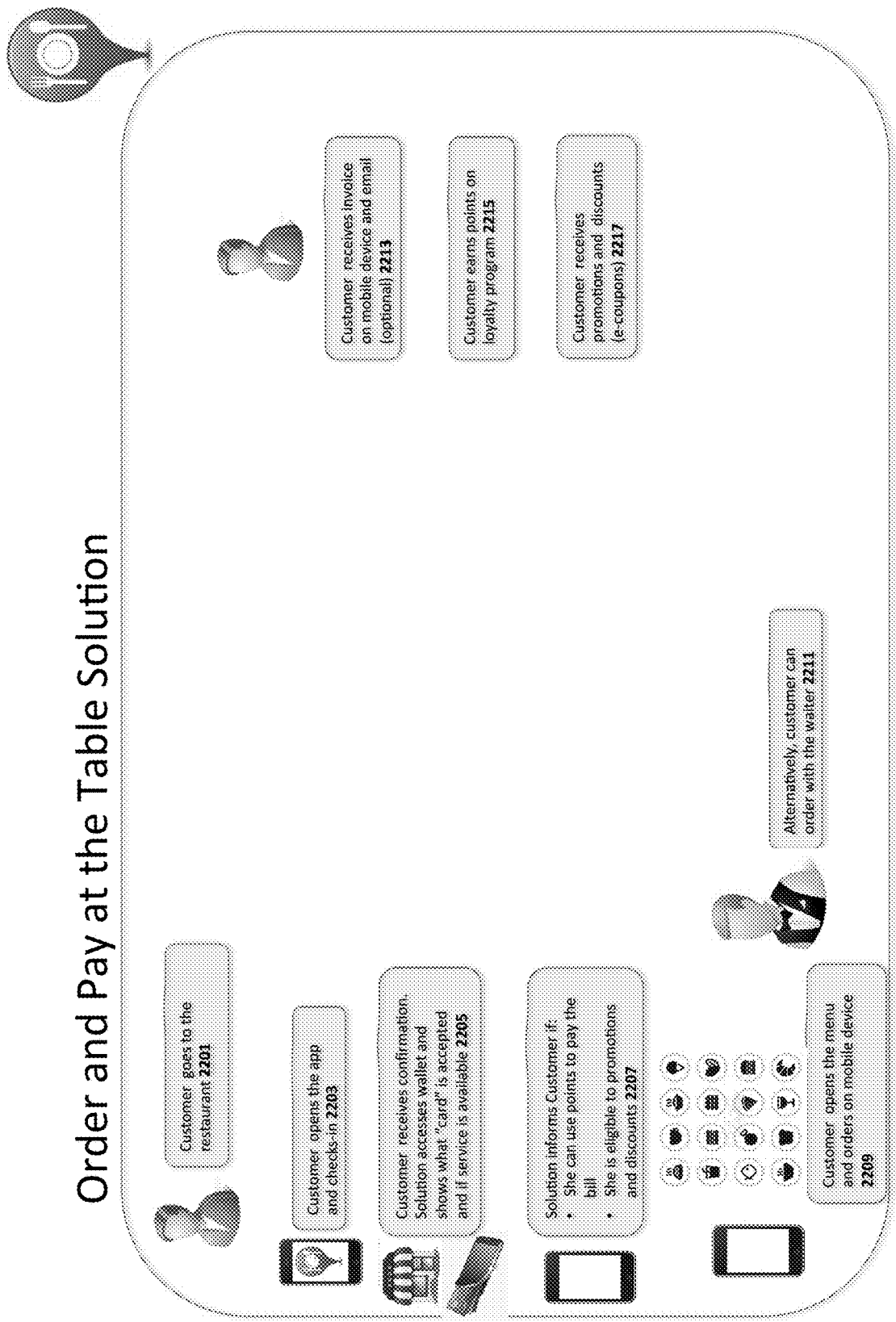
FIG. 22 shows a further operational example according to various embodiments of the POSAMS.

FIG. 22 shows a further operational example leveraging various of the functionality discussed herein In particular, depicted in connection with FIG. 22 is a customer user ordering at a restaurant using her device and also paying at the restaurant using her device. At 2201 the customer user goes to the restaurant and, at 2203, checks in using her device. Such checking in may involve the user indicating via a GUI of her device a desire to perform check-in and her device, in response thereto, accessing a server and indicating thereto that the user has arrived at the restaurant. In so specifying arrival to the server, the user device may indicate the restaurant in terms of its commerce UUID, with the user device determining such commerce UUID as discussed hereinabove.

At 2205 the user device may (e.g., via a GUI thereof) specify to its user which of the user's cards (e.g., which of those cards stored in connection with the user device as discussed above) are accepted at the restaurant. As one example, the user device may receive such cards-accepted information from the server in connection with contacting that server at 2203. In one or more embodiments, should it be the case that one cannot pay at the at-hand restaurant via user device—say where, as discussed hereinabove, both of commerceUUIDForAutoLocatorData(_:) and commerceUUIDForInteractiveLocatorData(_:) throw an error—the user might be made aware of this (e.g., via a GUI of the user device).

At 2207 the user device may (e.g., via a GUI thereof) inform the user as to whether or not she can employ points and/or rewards to pay at the restaurant, and/or may inform the user as to whether or not she is eligible for promotions and/or discounts (e.g., coupons) in connection with dining at the restaurant. As one example, the user device may receive such information regarding points, rewards, promotions, and/or discounts from the server in connection with contacting that server at 2203.

At 2209 the user may employ her device to view the menu of the restaurant (e.g., via a device GUI) and/or to place an order at the restaurant (e.g., via a device GUI). As one example, the user device may receive menu display data (e.g., in the form of XML data) from the server in connection with contacting that server at 2203. Where the user orders via her device, her order choices may be conveyed to a server which is monitored by the restaurant—say via one or more infrastructure POSs thereof—for incoming orders. The server to which such an order should be conveyed (e.g., the URL corresponding thereto) may be indicated to the user device, as one example, in connection with the user device's server contact of 2203. As an alternative to and/or in addition to user device-based ordering, ordering may occur via a waitstaff member as depicted at 2211. At 2213 the user may receive a copy of the receipt. Such may occur in a fashion analogous to that discussed in connection with 2113.

At 2215 the user may come to earn loyalty program points and/or rewards in connection with her dining experience (e.g., with the user being informed of such via a GUI of her device). In like vein at 2217 the user may come to receive promotions and/or discounts (e.g., coupons) in connection with her dining experience (e.g., with the user being informed of such via a GUI of her device). Such promotions and/or discounts may be determined in agreement with that which is discussed hereinabove with respect to coupons.

Figure 23:
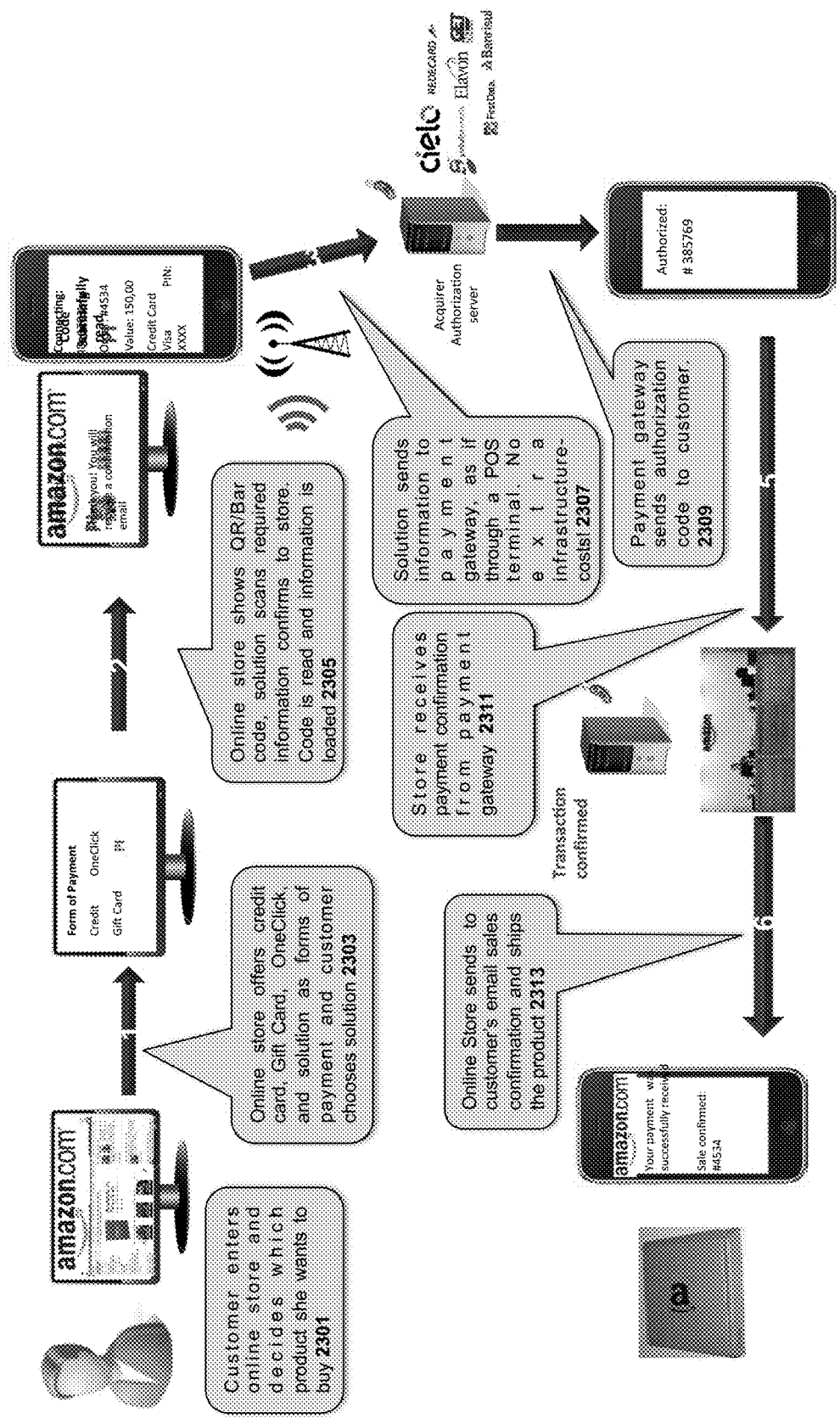
FIG. 23 shows an additional operational example according to various embodiments of the POSAMS.

FIG. 23 shows an additional operational example leveraging various of the functionality discussed herein In particular, depicted in connection with FIG. 23 is a customer user placing an online order at an online store using her device and also paying for that order using her device. At 2301 a customer user employs her device to browse an online store and to select one or more items for purchase. The user may do so, for instance, via a web browser of her device and/or via a standalone app for her device (e.g., an app corresponding to the at-hand online store). At 2303 the online store (e.g., via the web browser and/or via the app) may inform the user of one or more modes of payment. Among these choices may be paying via the user device in a fashion in agreement with that which is set forth herein. As such the user may at 2303 elect (e.g., via the web browser and/or via the app) such via-user device payment.

At 2305 the online store may (e.g., via the web browser and/or via the app) present to the user a QR code and/or a barcode. Such QR code and/or barcode may, in a first aspect, act in the vein of the discussed-herein QR code which may be employed by the user device in order to be configured to make a payment at a commerce location. As such the user device, reading such a QR code and/or barcode may act in agreement with that which is discussed herein to ascertain the POS settings called for to make a payment to the online store. The QR code and/or barcode may, in a second aspect, act in the vein of the discussed-herein QR code which conveys the amount due. As such the user device, reading such a QR code and/or barcode may additionally act in agreement with that which is discussed herein to become aware of the amount to be disbursed.

At 2307 the user device dispatches the authorization request to the payment gateway in keeping with that which is discussed hereinabove. At 2309 the user device, in keeping with that which is discussed hereinabove, receives the authorization response.

At 2311 the online store may receive from the payment gateway a communication conveying the authorization response (e.g., conveying the authorization and response codes thereof). Such communication (e.g., an XML-formatted communication) may be sent to a particular server associated with the online store (e.g., with the server being accessible via a certain URL). The gateway may determine where to said the authorization-response-conveying communication (e.g., the URL for the appropriate server associated with the online store) by accessing a store (e.g., a Core Data-managed database) which correlates merchant IDs and authorization-response-conveying communication targets (e.g., URLs of the sort noted), the payment gateway having received the merchant ID via the authorization request dispatched by the user device.

As depicted at 2313, the online store may (e.g., in response to receipt of the authorization-response-conveying communication of 2311) ship the ordered product. The online store may also perhaps email an order confirmation to the user (e.g., with the online store knowing the email address of the user via the user having logged into the online store in connection with placing the order, the login allowing for retrieval of a user email address which was provided during an initial signup with the online store).

Figure 24:
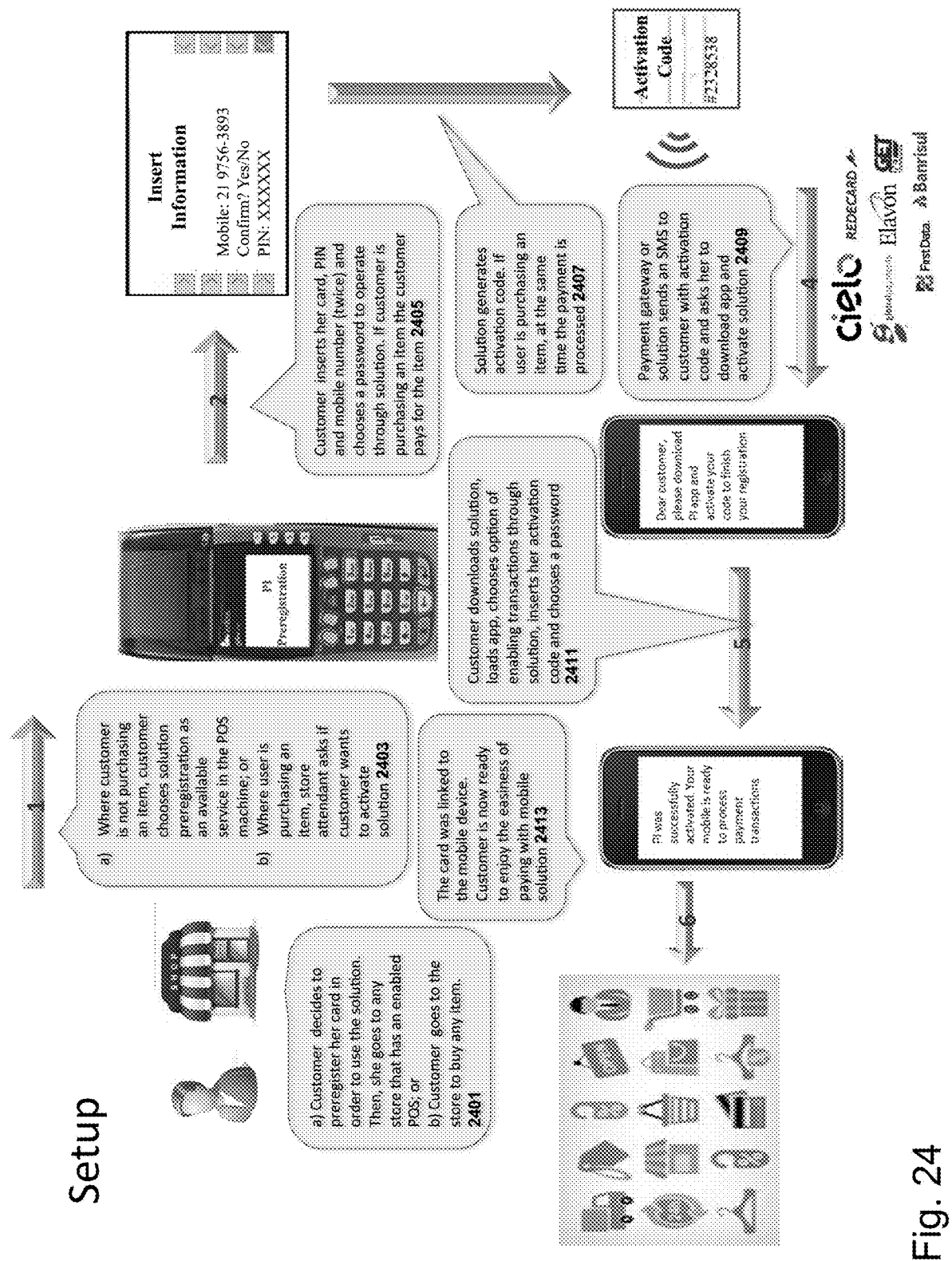
FIG. 24 shows another operational example according to various embodiments of the POSAMS.

FIG. 24 shows another operational example leveraging various of the functionality discussed herein. In particular, depicted in connection with FIG. 24 is a customer user participating in a setup operation which results in her being able to employ her user device to make device-based payments as discussed herein, including loading the information of one or more of her payment cards as discussed herein. At 2401 the customer may decide to participate in setup of the sort just noted. As such the user may visit a commerce location which has a POS which is capable of allowing the user to participate in such an setup operation. The user may or may not opt to make a purchase at the same time.

At 2403, the customer may—either directly and/or with the assistance of a clerk operating the POS—indicate to the POS a desire to participate in the setup operation. In one or more embodiments a user making a purchase without conveying a desire to participate in the setup operation may receive an invitation to do so from the clerk.

At 2405 the user may have her card read by the POS (e.g., via a card reader of the POS). It is noted that where an item is being purchased the card reading may occur in conjunction with the card being read in order to pay for the item. Where there is a PIN associated with the card the user may provide such PIN to the POS (e.g., via a secure keypad). According to various embodiments, the user may be asked to select a password and to enter it (e.g., via a keyboard and/or keypad of the POS). As noted above, for such embodiments the user might be called upon to provide that password (e.g., via a GUI of her device) in order to perform one or more of the operations discussed herein (e.g., the user might need to enter the password before executing a payment with her device). Still further at 2405 the user may be asked to enter (e.g., via a keyboard and/or keypad of the POS) the telephone number of her user device. The user may, perhaps, be called upon to enter the telephone number twice to ensure proper entry.

At 2407 an activation code may be generated (e.g., by the action of a server). Then at 2409 the activation code may (e.g., via the action of the server) be dispatched—for instance via Short Message Service (SMS) or via Multimedia Messaging Service (MMS)—to the user device. Included in the dispatch along with the activation code may be an instruction requesting that the user download to her user device software which allows it to perform one or more of the operations discussed herein (e.g., making device-based payments). Included with such instruction may be a URL and/or a link to an app store that can be plied in downloading the user device software. The user may in one or more embodiments be called upon to enter the received activation code in order to download the software and/or in order to make the software operational (e.g., the downloaded software might sit in an inoperative state until the activation code is provided to the software, say via a GUI provided by the software).

At 2411 the user may, in agreement with that which was discussed in connection with 2409 download the software and/or enter the received activation code. Further at 2411 the user may be asked to enter (e.g., via GUI of the downloaded software) the password which she provided in connection with 2405. According to one or more embodiments the user may be given the opportunity to change the password (e.g., where the user chose the password in haste in connection with performance of 2405, and desires to reselect a password under potentially more comfortable conditions).

At 2413 the user device stands able to make device-based payments in agreement with that which is set forth herein. It is noted, for instance, that the card of the user read in connection with performance of 2405 may be available to her device for making such device-based payments.

POSAMS Controller

Figure 25:
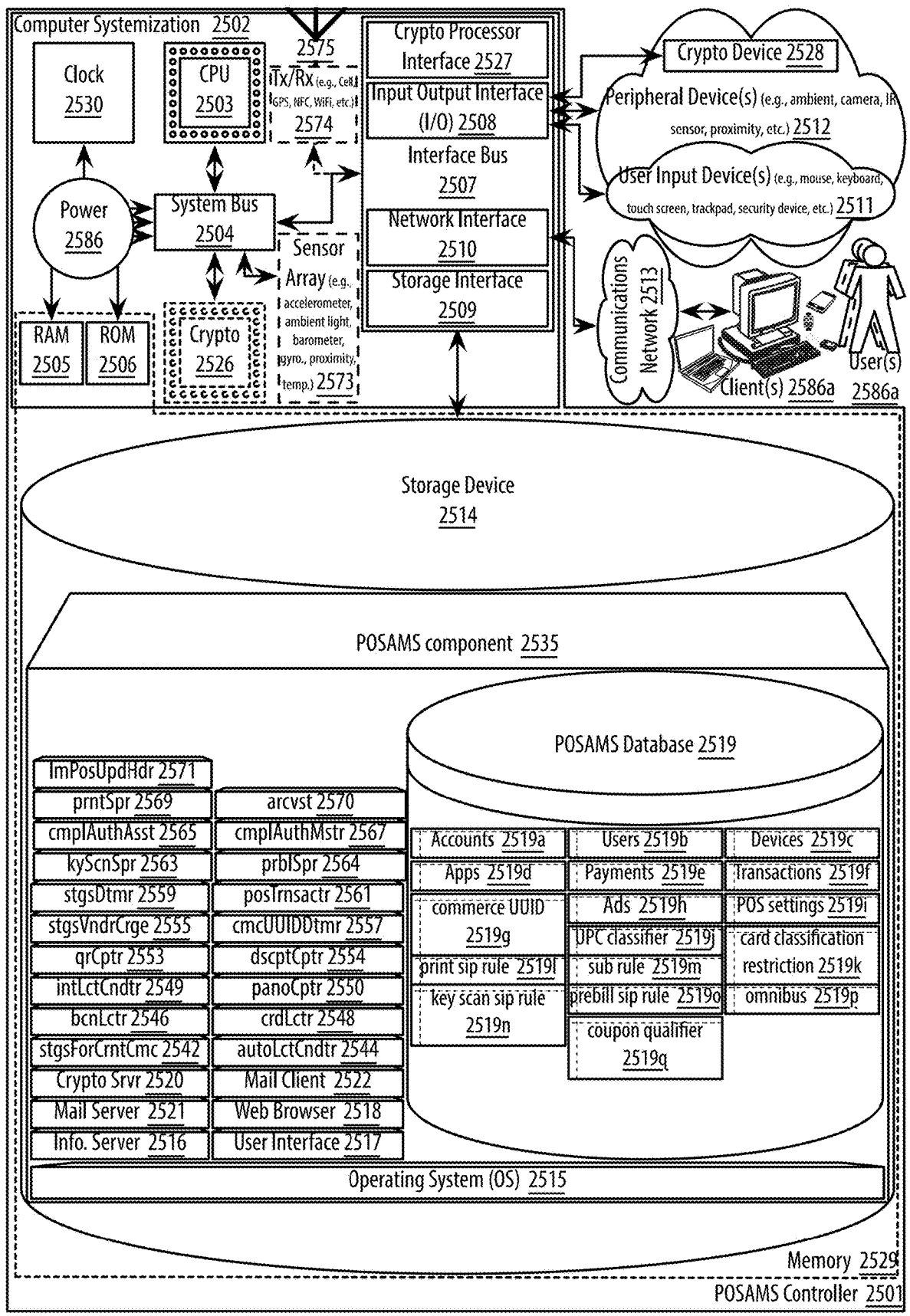
FIG. 25 shows a block diagram illustrating embodiments of a POSAMS controller.

FIG. 25 shows a block diagram illustrating embodiments of a POSAMS controller. In this embodiment, the POSAMS controller 2501 may serve to aggregate, process, store, search, serve, identify, instruct, generate, match, and/or facilitate interactions with a computer through Electronic Communications technologies, and/or other related data.

Typically, users, which may be people and/or other systems, may engage information technology systems (e.g., computers) to facilitate information processing. In turn, computers employ processors to process information; such processors 2503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the POSAMS controller 2501 may be connected to and/or communicate with entities such as, but not limited to: one or more users from peripheral devices 2512 (e.g., user input devices 2511); an optional cryptographic processor device 2528; and/or a communications network 2513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The POSAMS controller 2501 may be based on computer systems that may comprise, but are not limited to, components such as: a computer systemization 2502 connected to memory 2529.

Computer Systemization

A computer systemization 2502 may comprise a clock 2530, central processing unit ("CPU(s)" and/or "processor(s)" (these terms are used interchangeable throughout the disclosure unless noted to the contrary)) 2503, a memory 2529 (e.g., a read only memory (ROM) 2506, a random access memory (RAM) 2505, etc.), and/or an interface bus 2507, and most frequently, although not necessarily, are all interconnected and/or communicating through a system bus 2504 on one or more (mother)board(s) 2502 having conductive and/or otherwise transportive circuit pathways through which instructions (e.g., binary encoded signals) may travel to effectuate communications, operations, storage, etc. The computer systemization may be connected to a power source 2586; e.g., optionally the power source may be internal. Optionally, a cryptographic processor 2526 may be connected to the system bus. In another embodiment, the cryptographic processor, transceivers (e.g., ICs) 2574, and/or sensor array (e.g., accelerometer, altimeter, ambient light, barometer, global positioning system (GPS) (thereby allowing POSAMS controller to determine its location), gyroscope, magnetometer, pedometer, proximity, ultra-violet sensor, etc.) 2573 may be connected as either internal and/or external peripheral devices 2512 via the interface bus I/O 2508 (not pictured) and/or directly via the interface bus 2507. In turn, the transceivers may be connected to antenna(s) 2575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80×86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the POSAMS controller and beyond through various interfaces. Should processing requirements dictate a greater amount speed and/or capacity, distributed processors (e.g., see Distributed POSAMS below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the POSAMS may be achieved by implementing a microcontroller such as CAST's R8051XC2 microcontroller; Intel's MCS 51 (i.e., 8051 microcontroller); and/or the like. Also, to implement certain features of the POSAMS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the POSAMS component collection (distributed or otherwise) and/or features may be implemented via the microprocessor and/or via embedded components; e.g., via ASIC, coprocessor, DSP, FPGA, and/or the like. Alternately, some implementations of the POSAMS may be implemented with embedded components that are configured and used to achieve a variety of features or signal processing.

Depending on the particular implementation, the embedded components may include software solutions, hardware solutions, and/or some combination of both hardware/software solutions. For example, POSAMS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the POSAMS features. A hierarchy of programmable interconnects allow logic blocks to be interconnected as needed by the POSAMS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the POSAMS may be developed on regular FPGAs and then migrated into a fixed version that more resembles ASIC implementations. Alternate or coordinating implementations may migrate POSAMS controller features to a final ASIC instead of or in addition to FPGAs. Depending on the implementation all of the aforementioned embedded components and microprocessors may be considered the "CPU" and/or "processor" for the POSAMS.

Power Source

The power source 2586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2586 is connected to at least one of the interconnected subsequent components of the POSAMS thereby providing an electric current to all subsequent components. In one example, the power source 2586 is connected to the system bus component 2504. In an alternative embodiment, an outside power source 2586 is provided through a connection across the I/O 2508 interface. For example, a USB and/or IEEE 1394 connection carries both data and power across the connection and is therefore a suitable source of power.

Interface Adapters

Interface bus(ses) 2507 may accept, connect, and/or communicate to a number of interface adapters, conventionally although not necessarily in the form of adapter cards, such as but not limited to: input output interfaces (I/O) 2508, storage interfaces 2509, network interfaces 2510, and/or the like. Optionally, cryptographic processor interfaces 2527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2509 may accept, communicate, and/or connect to a number of storage devices such as, but not limited to: storage devices 2514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2510 may accept, communicate, and/or connect to a communications network 2513. Through a communications network 2513, the POSAMS controller is accessible through remote clients 2533b (e.g., computers with web browsers) by users 2533a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed POSAMS below), architectures may similarly be employed to pool, load balance, and/or otherwise decrease/increase the communicative bandwidth required by the POSAMS controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2510 may be used to engage with various communications network types 2513. For example, multiple network interfaces may be employed to allow for the communication over broadcast, multicast, and/or unicast networks.

Input Output interfaces (I/O) 2508 may accept, communicate, and/or connect to user, peripheral devices 2512 (e.g., input devices 2511), cryptographic processor devices 2528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2512 may be connected and/or communicate to I/O and/or other facilities of the like such as network interfaces, storage interfaces, directly to the interface bus, system bus, the CPU, and/or the like. Peripheral devices may be external, internal and/or part of the POSAMS controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2511 often are a type of peripheral device 2512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the POSAMS controller may be embodied as an embedded, dedicated, and/or monitor-less (i.e., headless) device, wherein access would be provided over a network interface connection.

Cryptographic units such as, but not limited to, microcontrollers, processors 2526, interfaces 2527, and/or devices 2528 may be attached, and/or communicate with the POSAMS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2529. However, memory is a fungible technology and resource, thus, any number of memory embodiments may be employed in lieu of or in concert with one another. It is to be understood that the POSAMS controller and/or a computer systemization may employ various forms of memory 2529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2529 will include ROM 2506, RAM 2505, and a storage device 2514. A storage device 2514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2529 may contain a collection of program and/or database components and/or data such as, but not limited to: operating system component(s) 2515 (operating system); information server component(s) 2516 (information server); user interface component(s) 2517 (user interface); Web browser component(s) 2518 (Web browser); database(s) 2519; mail server component(s) 2521; mail client component(s) 2522; cryptographic server component(s) 2520 (cryptographic server); the POSAMS component(s) 2535; and/or the like (i.e., collectively a component collection). These components may be stored and accessed from the storage devices and/or from storage devices accessible through an interface bus. Although non-conventional program components such as those in the component collection, typically, are stored in a local storage device 2514, they may also be loaded and/or stored in memory such as: peripheral devices, RAM, remote storage facilities through a communications network, ROM, various forms of memory, and/or the like.

Operating System

The operating system component 2515 is an executable program component facilitating the operation of the POS- AMS controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the POSAMS controller to communicate with other entities through a communications network 2513. Various communication protocols may be used by the POSAMS controller as a subcarrier transport mechanism for interaction, such as, but not limited to: multicast, TCP/IP, UDP, unicast, and/or the like.

Information Server

An information server component 2516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the POSAMS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the POSAMS database 2519, operating systems, other program components, user interfaces, Web browsers, and/or the like.

Access to the POSAMS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the POSAMS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the POSAMS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the POSAMS enabled nodes. The combined application may be nugatory on systems employing standard Web browsers.

Mail Server

A mail server component 2521 is a stored program component that is executed by a CPU 2503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the POSAMS. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the POSAMS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2522 is a stored program component that is executed by a CPU 2503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2520 is a stored program component that is executed by a CPU 2503, cryptographic processor 2526, cryptographic processor interface 2527, cryptographic processor device 2528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the POSAMS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the POSAMS component to engage in secure transactions if so desired. The cryptographic component facilitates the secure accessing of resources on the POSAMS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The POSAMS Database

The POSAMS database component 2519 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the POSAMS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the POSAMS database is implemented as a data-structure, the use of the POSAMS database may be integrated into another component such as the POSAMS component 2535. Also, the database may be implemented as a mix of data structures, objects, and relational structures. Databases may be consolidated and/or distributed in countless variations (e.g., see Distributed POSAMS below). Portions of databases, e.g., tables, may be exported and/or imported and thus decentralized and/or integrated.

In one embodiment, the database component 2519 includes several tables 2519*a-q*:

An accounts table 2519*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2519*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a POSAMS);

A devices table 2519*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2519d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

A payments table 2519e includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2519f includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

A commerce UUID table 2519g may correspond to the above-discussed entity definition CommerceUUIDEntity and include fields such as, but not limited to: commerceLocationUUID, qrCodeString, beaconMajor, beaconMinor, latCoordLo, latCoordHi, longCoordLo, longCoordHi, and/or the like;

An ads table 2519h includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A POS settings table 2519i may correspond to the above-discussed entity definition PosSettingsEntity and include fields such as, but not limited to: merchantID, terminalID, gateway, terminalIDCheckedOut, commerceLocationUUID, and/or the like;

A UPC classifier table 2519j may correspond to the above-discussed entity definition UpcClassifierEntity and include fields such as, but not limited to: upc, classification, and/or the like;

A card classification restriction table 2519k may correspond to the above-discussed entity definition cardClassificationRestrictionEntity and include fields such as, but not limited to: cardNumber, restrictedClassifications, and/or the like;

A print sip rule table 2519l may correspond to the above-discussed entity definition PrintSipRuleEntity and include fields such as, but not limited to: ruleCriteria, openingTag, closingTag, subRulesKey, and/or the like;

A sub rule table 2519m may correspond to the above-discussed entity definition SubRuleEntity and include fields such as, but not limited to: subRuleCriteria, openingTag, closingTag, subRulesLock, and/or the like;

A key scan sip rule table 2519n may correspond to the above-discussed entity definition KeyScanSipRuleEntity and include fields such as, but not limited to: ruleCriteria, openingTag, closingTag, subRulesKey, and/or the like;

A prebill sip rule table 2519o may correspond to the above-discussed entity definition PrebillSipRuleEntity and include fields such as, but not limited to: ruleCriteria, openingTag, closingTag, subRulesKey, and/or the like;

An omnibus table 2519p may correspond to the above-discussed entity definition OmnibusEntity and include fields such as, but not limited to: omnibusUuid, keyScanSip, printSip, and/or the like;

A coupon qualifier table 2519q may correspond to the above-discussed entity definition CouponQualifierEntity and include fields such as, but not limited to: couponEligibilityChecker, couponContent, and/or the like.

Although the discussed tables (e.g., tables 2519g and 2519i-2519q) are together depicted in the figure, it is noted that, in agreement with that which is discussed herein, these tables may be exist among one or more machines (e.g., among one or more user devices, one or more POS devices, and/or one or more servers).

In one embodiment, the POSAMS database may interact with other database systems. For example, employing a distributed database system, queries and data access by search POSAMS component may treat the combination of the POSAMS database, an integrated data security layer database as a single database entity (e.g., see Distributed POSAMS below).

In one embodiment, user programs may contain various user interface primitives, which may serve to update the POSAMS. Also, various accounts may require custom database tables depending upon the environments and the types of clients the POSAMS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2519a-q. The POSAMS may be configured to keep track of various settings, inputs, and parameters via database controllers.

The POSAMS database may communicate to and/or with other components in a component collection, including itself, and/or facilities of the like. Most frequently, the POSAMS database communicates with the POSAMS component, other program components, and/or the like. The database may contain, retain, and provide information regarding other nodes and data.

The POSAMSs

The POSAMS component 2535 is a stored program component that is executed by a CPU. In one embodiment, the POSAMS component incorporates any and/or all combinations of the aspects of the POSAMS that was discussed in the previous figures. As such, the POSAMS affects accessing, obtaining and the provision of information, services, transactions, and/or the like across various communications networks. The features and embodiments of the POSAMS discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the POSAMS's features and facilities, and in many cases reduce the costs, energy consumption/requirements, and extend the life of POSAMS's underlying infrastructure; this has the added benefit of making the POSAMS more reliable. Similarly, many of the features and mechanisms are designed to be easier for users to use and access, thereby broadening the audience that may enjoy/employ and exploit the feature sets of the POSAMS; such ease of use also helps to increase the reliability of the POSAMS. In addition, the feature sets include heightened security as noted via the Cryptographic components 2520, 2526, 2528 and throughout, making access to the features and data more reliable and secure In a first aspect, POSAMS transforms inputs including beacon inputs, Global Positioning System (GPS) inputs, captured panorama inputs, user-penned descriptive inputs, and payment-amount-specifying inputs, via POSAMS components (e.g., the settingsForCurrentCommerceLocationConcierge Component 2542, the autoLocationConductor Component 2544, the interactiveLocationConductor Component 2549, the settingsVendorConcierge Component 2555, the commerceUUIDDeterminer Component 2557, and the settingsDeterminer Component 2559), into outputs including user device POS configuration setting outputs and/or payment-gateway-directed authorization request outputs.

In a second aspect, POSAMS transforms inputs including POS scanner inputs, POS keyboard inputs, and/or POS printer-directed inputs, via POSAMS components (e.g., the keyScanSipper Component 2563, the prebillSipper Component 2564, the complianceAuthAssist Component 2565, the complianceAuthMaster Component 2567, the printSipper Component 2569, and the archivist Component 2570), into outputs including compliance check outputs, tagged omnibus record outputs, SKU-UPC mapping outputs, and/or convergence/correlation outputs.

In a third aspect, POSAMS transforms inputs including older limited-capability POS software image inputs and/or newer limited-capability POS software image inputs, via POSAMS components (e.g., the limitedPosUpdateHandler Component 2571), into outputs including update directive outputs.

The POSAMS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the POSAMS server employs a cryptographic server to encrypt and decrypt communications. The POSAMS component may communicate to and/or with other components in a component collection, including itself, and/or facilities of the like. Most frequently, the POSAMS component communicates with the POSAMS database, operating systems, other program components, and/or the like. The POSAMS may contain, communicate, generate, obtain, and/or provide program component, system, user, and/or data communications, requests, and/or responses.

The POSAMS Server 2501 may have the following exemplary programmed components, the functions of which have been described herein above: settingsForCurrentCommerceLocationConcierge Component 2542, autoLocationConductor Component 2544, beaconLocator Component 2546, coordinateLocator Component 2548, interactiveLocationConductor Component 2549, panoCapture Component 2550, qrCapture Component 2553, descriptionCapture Component 2554, settingsVendorConcierge Component 2555, commerceUUIDDeterminer Component 2557, settingsDeterminer Component 2559, posTransactor Component 2561, keyScanSipper Component 2563, prebillSipper Component 2564, complianceAuthAssist Component 2565, complianceAuthMaster Component 2567, printSipper Component 2569, archivist Component 2570, and limitedPosUpdateHandler Component 2571.

Although the discussed components (e.g., components 2542-2571) are together depicted in the figure, it is noted that, in agreement with that which is discussed herein, these components may be running among one or more machines (e.g., among one or more user devices, one or more POS devices, and/or one or more servers).

Distributed POSAMSs

The structure and/or operation of any of the POSAMS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the POSAMS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for POSAMS controller and/or POSAMS component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the POSAMS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

As an example, butler objects may be employed. Via the employ of such butler objects, method calls using pseudo-code in keeping with a call made to an object which runs within the same process and/or on the same machine as an object making the call (e.g., pseudocode in the form of myObject.myMethod( )) may, alternately or additionally, be made to an object which runs within a different process and/or on a different machine than the object which makes the call. In particular, such interprocess and/or intermachine method calls may include a sending butler object which runs within the same process and/or on the same machine as the calling object, and a counterpart receiving butler object which runs within the same process and/or on the same machine as an ultimate target object. Returning to the noted example pseudocode in the form of myObject.myMethod( ) it is noted that where such butler objects are employed such pseudocode may be substituted with sendingButlerForMyObject.myMethod( ).

So as to illustrate by way of example, in keeping with the Swift/Apple frameworks pseudocode employed herein, suppose that an object schoolRegistrar implements a method calculateAverageForGrade1(_: andGrade2: andGrade3:), such method having the declaration:

```
func calculateAverageForGrade1(_ theGrade1: Int, andGrade2 theGrade2: Int, andGrade3 theGrade3: Int) -> Int
``` where the declaration indicates that the method may take a first parameter of type Int, the first parameter having the local parameter name "theGrade1" and having no external parameter name. The declaration further indicates that the method may take a second parameter of type Int, the second parameter having a local parameter name "theGrade2" and having the external parameter name "andGrade2." The declaration also indicates that the method may take a third parameter of type Int, the third parameter having a local parameter name "theGrade3" and having the external parameter name "andGrade3." Moreover, the declaration indicates that the method may have a return type of Int. Suppose that the method takes in three integer-specified test scores and returns the average of those scores.

Suppose that a method running on a first machine and/or within a first process wishes to call such method of the schoolRegistrar object and that schoolRegistrar is running on a second machine and/or within a second process. To facilitate discussion, it is the scenario of running on a second machine which will be discussed. It is noted however that that which will be discussed is analogously applicable to the scenario of running in a second process.

Running on the first machine may be an object sendingButlerForSchoolRegistrar which implements a method which has the same name and declaration as the noted calculateAverageForGrade1(_: andGrade2: andGrade3:), but which rather than returning the average of the three integers passed to it dispatches, to an endpoint URL associated with a to-be-discussed receiving butler object receivingButlerForSchoolRegistrar running on a second machine, a SOAP request:

```
POST /ReceivingButlerForSchoolRegistrar HTTP/1.1
Host: www.example.com
Content-Type: application/soap+xml; charset=utf-8
<?xml version="1.0"?>
<soap:Envelope xmlns:soap="http://www.w3.org/2003/05/soap-envelope">
  <soap:Body>
    <CalculateAverageForGrade1andGrade2andGrade3 xmlns="http://www.example.com/calculateaverageforgrade1andgrade2andgrade3>
      <Grade1> \(theGrade1) </Grade1>
      <AndGrade2> \(theGrade2) </AndGrade2>
      <AndGrade3>\(theGrade3)</AndGrade3>
```

```
    </CalculateAverageForGrade1andGrade2andGrade3>
  </soap:Body>
</soap:Envelope>
``` wherein the use of a backslash and parentheses around a variable applies string interpolation to place that variable in the SOAP string, and as such in the above sendingButlerForSchoolRegistrar includes its received parameters at the appropriate locations in the SOAP string.

Turning to the second machine where the object schoolRegistrar runs, intermediate code (e.g., PHP-based intermediate code) running at the second machine (e.g., in connection with the noted endpoint) may listen for SOAP XML request dispatches of the sort noted, extract the SOAP string thereof, and make it available to a method of the receiving butler object running on the second machine. The method of receivingButlerForSchoolRegistrar may then—via employ of a NSXMLParser object and implementation of appropriate delegate methods therefor, along with being set to recognize the SOAP format employed by the sending butler object—come to interpret the SOAP string to, via specification of "CalculateAverageForGrade1andGrade2andGrade3" indicate a desire to make a call to the method calculateAverageForGrade1(_: andGrade2: andGrade3:) of the schoolRegistrar running on the second machine, and the SOAP string to further specify via the tag delimited <Grade1>-</Grade1>, <AndGrade2>-</AndGrade2>, and <AndGrade3>-</AndGrade3> the three parameters for that method call.

As such, receivingButlerForSchoolRegistrar may, via for instance operation in line with the noted employ of an NSXMLParser object, extract the noted three tag-delimited parameters, make a call to the noted method of schoolRegistrar, as running on the second machine, passing those three extracted parameters, and receive the result of the method call. The receiving butler may then formulate an XML response string conveying the integer return result of the made call to schoolRegistrar. Taking the receiving butler object to hold the integer return result in a variable resultFromSchoolRegistrar, the receiving butler object may prepare an XML formatted response string via code in line with the following pseudocode:

```
"<ResultofCalculateAverageForGrade1andGrade2andGrade3>
  \(resultFromSchoolRegistrar)
</ResultofCalculateAverageForGrade1andGrade2andGrade3>"
``` where the backslash and parentheses employ string interpolation to place the value of resultFromSchoolRegistrar into the XML string.

The receiving butler may then pass the prepared XML-formatted response string to intermediate code (e.g., PHP-based intermediate code) which returns the XML string as the reply to the SOAP message dispatched by the sending machine.

Intermediate code (e.g., PHP-based intermediate code) running on the sending machine may receive the prepared XML-formatted response string and make it available to the method of the sending butler object of that machine. The method of sendingButlerForSchoolRegistrar may then—for instance via employ of an NSXMLParser object and implementation of appropriate delegate methods, along with being set to recognize the XML format employed by the receiving butler object—interpret the XML string, via specification of <ResultofCalculateAverageForGrade1andGrade2andGrade3>\ (resultFromSchoolRegistrar)</ResultofCalculateAverageForGrade1andGrade2andGrade3> to convey the result solicited via the SOAP request string formulated by the sending butler object. As such the sending butler object may, for instance via operation in line with the noted employ of an NSXMLParser object, extract the method call result conveyed by the received XML reply. The sending butler object may then return, to the method by which it was called, the result contained in the received XML reply, the method of the sending butler object perhaps implementing such return so as to cast the result to integer in keeping with the return type of calculateAverageForGrade1(_: andGrade2: andGrade3:).

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. An apparatus, comprising:
a memory;
a component collection in the memory, including:
a keyscan sipper component,
a compliance authorization assistant component, and
a print sipper component;
a processor disposed in communication with the memory, and configured to issue a plurality of processing instructions from the component collection stored in the memory,
wherein the processor issues instructions from the keyscan sipper component, stored in the memory, to:
receive one or more point of sale device-directed barcode scanner-generated scancodes,
access one or more scancode-character correlations,
produce a character listing, wherein the character listing reflects one or more translations performed using the received scancodes and the scancode correlations, and
produce a universal product code list, wherein the production takes as input the character listing;
wherein the processor issues instructions from the compliance authorization assistant component, stored in the memory, to:
receive a payment gateway-formatted point of sale device-generated card authorization request,
parse the payment gateway-formatted authorization request, wherein one or more authorization request elements are extracted from the authorization request,
receive the universal product code list from the keyscan sipper component,
dispatch a compliance authorization master component-directed authorization-compliance check request, wherein the authorization-compliance check request includes authorization request elements extracted via the parsing, wherein the authorization-compliance check request further includes the received universal product code list, and
formulate a point of sale device-directed reply to the received authorization request, wherein the formulation takes into account a received reply to the authorization-compliance check request;
wherein the processor issues instructions from the print sipper component, stored in the memory, to:
receive printer-directed point of sale device-generated receipt data,
extract, from the received receipt data, textual data,
receive the universal product code list from the keyscan sipper component,
dispatch an archivist component-directed omnibus record creation request, wherein the omnibus record creation request includes the received universal product code list, wherein the list further includes the textual receipt data, and
receive, in reply to the omnibus record creation request, an archivist component dispatch providing an identifier corresponding to a generated omnibus record, wherein the generated omnibus record reflects the universal product code list, and wherein the generated omnibus record further reflects the textual receipt data.

2. The apparatus of embodiment 1, wherein the processor issues further instructions from the print sipper component to:
send an archivist component-directed coupon vending request, wherein the coupon vending request includes the omnibus record identifier provided via the archivist component identifier dispatch,
receive, in reply to the coupon vending request, an archivist component dispatch providing coupon data, wherein the coupon data reflects one or more of the universal product code list or the textual receipt data,
parse the coupon data, wherein one or more content aspects are extracted from the coupon data,
formulate, based on the extracted coupon content aspects, coupon print content, and cause point of dale printer print of the coupon print content.

3. The apparatus of embodiment 1, wherein the processor issues further instructions from the keyscan sipper component to:
receive one or more point of sale device-directed keyboard-generated scancodes,
access one or more of one or more scancode-character correlations or one or more scancode-quantity key token correlations,
produce one or more of a character listing, wherein the character listing reflects one or more translations performed using the received scancodes and the scancode-character correlations or a quantity key token listing, wherein the token listing reflects one or more translations performed using the received scancodes and the scancode-quantity key token correlations, and
produce one or more of a universal product code list reflecting point of sale keyboard-entered universal product codes wherein the production takes as input the character listing or a quantity key press-corresponding quantity designation list wherein the production takes as input one or more of the character listing or the token listing.

4. An apparatus, comprising:

a memory;

a component collection in the memory, including:

a compliance authorization master component;

a processor disposed in communication with the memory, and configured to issue a plurality of processing instructions from the component collection stored in the memory, wherein the processor issues instructions from the compliance authorization master component, stored in the memory, to:

receive compliance authorization assistant component dispatch of an authorization-compliance check request wherein the authorization-compliance check request includes one or more elements extracted from a point of sale device-generated authorization request, wherein the authorization-compliance check request further includes a universal product code list reflecting one or more of point of sale scanner-scanned universal product codes or point of sale keyboard-entered universal product codes, determine, with respect to each of one or more universal product codes of the universal product code list, a classification, wherein the classification determination involves accessing a classification store, determine, with respect to a payment card number of the extracted authorization request elements, one or more restrictions, wherein the restriction determination involves accessing a restriction store, compare one or more of the determined universal product code classifications and one or more of the determined payment card number restrictions, make, based on the comparison, a determination regarding classification check-based decline, and dispatch a compliance authorization assistant component-directed code indication, wherein the code indication reflects the made determination regarding classification check-based decline.

5. The apparatus of embodiment 4, the component collection in memory further including an archivist component, wherein the processor issues instructions from the archivist component to:

receive print sipper component dispatch of an omnibus record creation request, wherein the omnibus record creation request includes the universal product code list, wherein the omnibus record creation request further includes textual receipt data extracted from point of sale printer-directed receipt print data, generate an omnibus record identifier, apply tagging with respect to the received textual receipt data, wherein the receipt data tagging involves accessing a receipt data tagging rules store, apply tagging with respect to the received universal product code list, wherein the universal product code list tagging involves accessing a universal product code list tagging rules store, create an omnibus record, wherein the omnibus record includes the tagged textual receipt data, wherein the omnibus record includes the tagged universal product code list, and wherein the omnibus record includes the generated omnibus record identifier, add the created omnibus record to a store, and dispatch a print sipper component-directed indication of the generated omnibus record identifier.

6. The apparatus of embodiment 5, wherein the processor issues further instructions from the archivist component to:

receive print sipper component dispatch of a coupon vending request, wherein the coupon vending request includes the generated omnibus record identifier, fetch, from an omnibus store, an omnibus record corresponding to the omnibus record identifier, perform one or more coupon eligibility checks, wherein each said coupon eligibility check applies a coupon qualifier record to one or more of textual receipt data of the fetched omnibus record or universal product codes of the fetched omnibus record, wherein the coupon qualifier records are retrieved from a store, and send a print sipper component-directed dispatch providing coupon data, wherein the coupon data corresponds to one or more of said coupon qualifier records for which coupon eligibility check was met.

7. The apparatus of embodiment 4, the component collection in memory further including an archivist component, wherein the processor issues instructions from the archivist component to:

receive dispatch of a universal product code for stock keeping unit request, wherein said request includes a stock keeping unit indication, fetch, from an omnibus store, one or more omnibus records which set forth the indicated stock keeping unit, send a tupleization request, wherein the tupleization request includes one or more stock keeping units drawn from the fetched omnibus records and one or more universal product codes drawn from the fetched omnibus records, receive, in reply to the tupleization request, one or more tuples, send a bucketization request, wherein the bucketization request includes the received tuples, receive, in reply to the bucketization request, one or more buckets, apply filtering to the received buckets, wherein the filtering removes received buckets which do not correspond to the stock keeping unit included in the universal product code for stock keeping unit request, perform a highest value determination with respect to values set forth by buckets which remain after said filtering, and dispatch, in reply to the universal product code for stock keeping unit request, a universal product code indication, wherein the universal product code indication corresponds to the highest value determination.

8. The apparatus of embodiment 4, the component collection in memory further including an archivist component, wherein the processor issues instructions from the archivist component to:

receive dispatch of a correlations request, select a tuple n-number, wherein the tuple n-number selection is based on one or more of one or more provided directives or automatic selection, perform field selection, wherein selected field quantity matches the selected tuple n-number, and wherein identities of the selected fields are based on one or more of one or more provided directives or automatic selection, send a bucketization request, wherein the bucketization request includes one or more tuples loaded with respect to said selected fields, receive, in reply to the bucketization request, one or more buckets, and dispatch, in reply to the correlations request, the one or more buckets.

9. The apparatus of embodiment 8, wherein the correlations request includes one or more of a floor indication or a ceiling indication, and wherein the buckets dispatched in reply to the correlations request satisfy said indications included in the correlations request.

10. An apparatus, comprising:
a memory;
a component collection in the memory, including:
a settings for current commerce location concierge component, and
a point of sale transactor component;
a processor disposed in communication with the memory, and configured to issue a plurality of processing instructions from the component collection stored in the memory,
wherein the processor issues instructions from the settings for current commerce location concierge component, stored in the memory, to:
receive a user request that user device point of sale capabilities be configured with respect to a user device-situated commerce location,
send a location conductor component-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
dispatch a settings vendor concierge component-directed point of sale settings request, wherein the settings request includes the received locator data, and
receive, in reply to the point of sale settings request, user device point of sale capability configuration settings,
wherein the processor issues instructions from the point of sale transactor component, stored in the memory, to:
receive a user request that the user device point of sale capabilities be employed to make a payment at the user device-situated commerce location,
access the received user device point of sale capability configuration settings, and
dispatch an authorization request, wherein the authorization request conveys the payment, wherein the authorization request is payment gateway-directed in agreement with a payment gateway specification of the user device point of sale capability configuration settings, and wherein the authorization request includes one or more of a merchant identifier specified by the user device point of sale capability configuration settings or a terminal identifier specified by the user device point of sale capability configuration settings.

11. The apparatus of embodiment 10, the component collection in memory further including a location conductor component, wherein the processor issues instructions from the location conductor component to:
receive, from the settings for current commerce location concierge component, the locate for current commerce location request,
effect one or more of receipt of the beacon data, ascertaining of the geographical coordinate data, capture of the panorama images, determining of the quick response data, or receipt of the user-penned description, and
send a settings for current commerce location concierge-directed dispatch providing said locator data received by the settings for current commerce location concierge.

12. The apparatus of embodiment 10, wherein the processor issues further instructions from the point of sale transactor component to:
receive, in reply to the authorization request, payment gateway dispatch of an authorization response,
parse the authorization response, wherein one or more of an authorization code or a response code are extracted from the authorization response, and
performing one or more of:
displaying said one or more of the authorization code or the response code on a user device interface,
generating one or more of a quick response code or a barcode, wherein said generated one or more of the quick response code or the barcode conveys said one or more of the authorization code or the response code, or
sending said one or more of the authorization code or the response code to a storage location.

13. The apparatus of embodiment 12, wherein said one or more of the authorization code or the response code is displayed on a infrastructure point of sale device of the user device-situated commerce location.

14. The apparatus of embodiment 10, wherein the processor issues further instructions from the point of sale transactor component to receive one or more of user selection of a payment card to be employed in making the payment, or user selection of an amount to be disbursed in making the payment.

15. The apparatus of embodiment 10, wherein the processor issues further instructions from the point of sale transactor component to:
dispatch a compliance authorization master component-directed compliance check request, wherein the compliance check request includes one or more universal product codes,
receive a compliance authorization master component-dispatched reply to the compliance check request, and
perform one or more operations in view of the content of said compliance check reply.

16. The apparatus of embodiment 15, wherein the user device receives the universal product codes via one or more of a quick response code conveying the universal product codes, or user device-performed universal product code reading with respect to one or more products.

17. A limited-capability point of sale apparatus, comprising:
a memory;
program code stored in the memory;
a processor disposed in communication with the memory, and configured to issue a plurality of processing instructions from the program code stored in the memory to:
receive, at the limited-capability point of sale apparatus, one or more alteration indications, wherein each said alteration indication provides instruction for performing a specified alteration to a specified portion of point of sale software, wherein the limited-capability point of sale apparatus possesses a complete-overwrite-only software memory, and wherein the receipt of the alteration indications is over a data link which is one or more of limited bandwidth or high cost;
copy by the limited-capability point of sale apparatus, into random access memory of the limited-capability point of sale apparatus, point of sale software held in said software memory of the limited-capability point of sale apparatus;
alter, by the limited-capability point of sale apparatus, in accordance with the alteration indications, said random access memory-held copy of the point of sale software; and overwrite, by the limited-capability point of sale apparatus, the software memory with said altered copy of the point of sale software.

18. The apparatus of embodiment 17, wherein the processor issues further instructions from the program code stored in the memory to:
receive, at the limited-capability point of sale apparatus over the data link, a checksum hash;
calculate, by the limited-capability point of sale apparatus, a checksum hash of said altered copy of the point of sale software; and
compare, by the limited-capability point of sale apparatus, the received checksum hash with the calculated checksum hash.

19. The apparatus of embodiment 17, wherein one or more of:
said limited-capability point of sale apparatus is a card machine,
said data link is a cellular link, or
said software memory is flash memory.

20. A processor-implemented system, comprising:
a keyscan sipper means to:
receive one or more point of sale device-directed barcode scanner-generated scancodes, access one or more scancode-character correlations,
produce a character listing, wherein the character listing reflects one or more translations performed using the received scancodes and the scancode correlations, and
produce a universal product code list, wherein the production takes as input the character listing;
a compliance authorization assistant means to:
receive a payment gateway-formatted point of sale device-generated card authorization request,
parse the payment gateway-formatted authorization request, wherein one or more authorization request elements are extracted from the authorization request,
receive the universal product code list from the keyscan sipper means,
dispatch a compliance authorization master means-directed authorization-compliance check request, wherein the authorization-compliance check request includes authorization request elements extracted via the parsing, wherein the authorization-compliance check request further includes the received universal product code list, and
formulate a point of sale device-directed reply to the received authorization request, wherein the formulation takes into account a received reply to the authorization-compliance check request;
a print sipper means to:
receive printer-directed point of sale device-generated receipt data,
extract, from the received receipt data, textual data,
receive the universal product code list from the keyscan sipper means,
dispatch an archivist means-directed omnibus record creation request, wherein the omnibus record creation request includes the received universal product code list, wherein the list further includes the textual receipt data, and
receive, in reply to the omnibus record creation request, an archivist means dispatch providing an identifier corresponding to a generated omnibus record, wherein the generated omnibus record reflects the universal product code list, and wherein the generated omnibus record further reflects the textual receipt data.

21. The system of embodiment 20, the print sipper means further to:
send an archivist means-directed coupon vending request, wherein the coupon vending request includes the omnibus record identifier provided via the archivist means identifier dispatch,
receive, in reply to the coupon vending request, an archivist means dispatch providing coupon data, wherein the coupon data reflects one or more of the universal product code list or the textual receipt data,
parse the coupon data, wherein one or more content aspects are extracted from the coupon data,
formulate, based on the extracted coupon content aspects, coupon print content, and cause point of dale printer print of the coupon print content.

22. The system of embodiment 20, the keyscan sipper means further to:
receive one or more point of sale device-directed keyboard-generated scancodes,
access one or more of one or more scancode-character correlations or one or more scancode-quantity key token correlations,
produce one or more of a character listing, wherein the character listing reflects one or more translations performed using the received scancodes and the scancode-character correlations or a quantity key token listing, wherein the token listing reflects one or more translations performed using the received scancodes and the scancode-quantity key token correlations, and
produce one or more of a universal product code list reflecting point of sale keyboard-entered universal product codes wherein the production takes as input the character listing or a quantity key press-corresponding quantity designation list wherein the production takes as input one or more of the character listing or the token listing.

23. A processor-implemented system, comprising:
a compliance authorization master means to:
receive compliance authorization assistant means dispatch of an authorization-compliance check request wherein the authorization-compliance check request includes one or more elements extracted from a point of sale device-generated authorization request, wherein the authorization-compliance check request further includes a universal product code list reflecting one or more of point of sale scanner-scanned universal product codes or point of sale keyboard-entered universal product codes,
determine, with respect to each of one or more universal product codes of the universal product code list, a classification, wherein the classification determination involves accessing a classification store,
determine, with respect to a payment card number of the extracted authorization request elements, one or more restrictions, wherein the restriction determination involves accessing a restriction store,
compare one or more of the determined universal product code classifications and one or more of the determined payment card number restrictions,
make, based on the comparison, a determination regarding classification check-based decline, and
dispatch a compliance authorization assistant means-directed code indication, wherein the code indication reflects the made determination regarding classification check-based decline.

24. The system of embodiment 23, further comprising an archivist means to:
receive print sipper means dispatch of an omnibus record creation request, wherein the omnibus record creation request includes the universal product code list, wherein the omnibus record creation request further includes textual receipt data extracted from point of sale printer-directed receipt print data,
generate an omnibus record identifier,
apply tagging with respect to the received textual receipt data, wherein the receipt data tagging involves accessing a receipt data tagging rules store,
apply tagging with respect to the received universal product code list, wherein the universal product code list tagging involves accessing a universal product code list tagging rules store,
create an omnibus record, wherein the omnibus record includes the tagged textual receipt data, wherein the omnibus record includes the tagged universal product code list, and wherein the omnibus record includes the generated omnibus record identifier,
add the created omnibus record to a store, and
dispatch a print sipper means-directed indication of the generated omnibus record identifier.

25. The system of embodiment 24, the archivist means further to:
receive print sipper means dispatch of a coupon vending request, wherein the coupon vending request includes the generated omnibus record identifier,
fetch, from an omnibus store, an omnibus record corresponding to the omnibus record identifier,
perform one or more coupon eligibility checks, wherein each said coupon eligibility check applies a coupon qualifier record to one or more of textual receipt data of the fetched omnibus record or universal product codes of the fetched omnibus record, wherein the coupon qualifier records are retrieved from a store, and
send a print sipper means-directed dispatch providing coupon data, wherein the coupon data corresponds to one or more of said coupon qualifier records for which coupon eligibility check was met.

26. The system of embodiment 23, further comprising an archivist means to:
receive dispatch of a universal product code for stock keeping unit request, wherein said request includes a stock keeping unit indication,
fetch, from an omnibus store, one or more omnibus records which set forth the indicated stock keeping unit,
send a tupleization request, wherein the tupleization request includes one or more stock keeping units drawn from the fetched omnibus records and one or more universal product codes drawn from the fetched omnibus records,
receive, in reply to the tupleization request, one or more tuples,
send a bucketization request, wherein the bucketization request includes the received tuples,
receive, in reply to the bucketization request, one or more buckets,
apply filtering to the received buckets, wherein the filtering removes received buckets which do not correspond to the stock keeping unit included in the universal product code for stock keeping unit request,
perform a highest value determination with respect to values set forth by buckets which remain after said filtering, and
dispatch, in reply to the universal product code for stock keeping unit request, a universal product code indication, wherein the universal product code indication corresponds to the highest value determination.

27. The system of embodiment 23, further comprising an archivist means to:
receive dispatch of a correlations request,
select a tuple n-number, wherein the tuple n-number selection is based on one or more of one or more provided directives or automatic selection,
perform field selection, wherein selected field quantity matches the selected tuple n-number, and wherein identities of the selected fields are based on one or more of one or more provided directives or automatic selection,
send a bucketization request, wherein the bucketization request includes one or more tuples loaded with respect to said selected fields,
receive, in reply to the bucketization request, one or more buckets, and
dispatch, in reply to the correlations request, the one or more buckets.

28. The system of embodiment 27, wherein the correlations request includes one or more of a floor indication or a ceiling indication, and wherein the buckets dispatched in reply to the correlations request satisfy said indications included in the correlations request.

29. A processor-implemented system, comprising:
a settings for current commerce location concierge means to:
receive a user request that user device point of sale capabilities be configured with respect to a user device-situated commerce location,
send a location conductor means-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
dispatch a settings vendor concierge means-directed point of sale settings request, wherein the settings request includes the received locator data, and
receive, in reply to the point of sale settings request, user device point of sale capability configuration settings,
a point of sale transactor means to:
receive a user request that the user device point of sale capabilities be employed to make a payment at the user device-situated commerce location,
access the received user device point of sale capability configuration settings, and
dispatch an authorization request, wherein the authorization request conveys the payment, wherein the authorization request is payment gateway-directed in agreement with a payment gateway specification of the user device point of sale capability configuration settings, and wherein the authorization request includes one or more of a merchant identifier specified by the user device point of sale capability configuration settings or a terminal identifier specified by the user device point of sale capability configuration settings.

30. The system of embodiment 29, further comprising a location conductor means to:
receive, from the settings for current commerce location concierge means, the locate for current commerce location request, effect one or more of receipt of the beacon data, ascertaining of the geographical coordinate data, capture of the panorama images, determining of the quick response data, or receipt of the user-penned description, and send a settings for current commerce location concierge-directed dispatch providing said locator data received by the settings for current commerce location concierge.

31. The system of embodiment 29, the point of sale transactor means further to:

receive, in reply to the authorization request, payment gateway dispatch of an authorization response, parse the authorization response, wherein one or more of an authorization code or a response code are extracted from the authorization response, and perform one or more of:

displaying said one or more of the authorization code or the response code on a user device interface, generating one or more of a quick response code or a barcode, wherein said generated one or more of the quick response code or the barcode conveys said one or more of the authorization code or the response code, or sending said one or more of the authorization code or the response code to a storage location.

32. The system of embodiment 31, wherein said one or more of the authorization code or the response code is displayed on a infrastructure point of sale device of the user device-situated commerce location.

33. The system of embodiment 29, the point of sale transactor means further to receive one or more of user selection of a payment card to be employed in making the payment, or user selection of an amount to be disbursed in making the payment.

34. The system of embodiment 29, the point of sale transactor means further to:

dispatch a compliance authorization master means-directed compliance check request, wherein the compliance check request includes one or more universal product codes, receive a compliance authorization master means-dispatched reply to the compliance check request, and perform one or more operations in view of the content of said compliance check reply.

35. The system of embodiment 34, wherein the user device receives the universal product codes via one or more of a quick response code conveying the universal product codes, or user device-performed universal product code reading with respect to one or more products.

36. A limited-capability point of sale system, comprising:

means for receiving one or more alteration indications, wherein each said alteration indication provides instruction for performing a specified alteration to a specified portion of point of sale software, wherein the system possesses a complete-overwrite-only software memory, and wherein the receipt of the alteration indications is over a data link which is one or more of limited bandwidth or high cost;

means for copying into random access memory point of sale software held in said software memory;

means for altering, in accordance with the alteration indications, said random access memory-held copy of the point of sale software; and means for overwriting the software memory with said altered copy of the point of sale software.

37. The system of embodiment 36, further comprising:

means for receiving, over the data link, a checksum hash;

means for calculating a checksum hash of said altered copy of the point of sale software; and means for comparing the received checksum hash with the calculated checksum hash.

38. The system of embodiment 36, wherein one or more of:

said limited-capability point of sale system is a card machine, said data link is a cellular link, or said software memory is flash memory.

39. A processor-implemented method, the method comprising:

executing processor-implemented keyscan sipper component instructions to:

receive one or more point of sale device-directed barcode scanner-generated scancodes, access one or more scancode-character correlations, produce a character listing, wherein the character listing reflects one or more translations performed using the received scancodes and the scancode correlations, and produce a universal product code list, wherein the production takes as input the character listing;

executing processor-implemented compliance authorization assistant component instructions to:

receive a payment gateway-formatted point of sale device-generated card authorization request, parse the payment gateway-formatted authorization request, wherein one or more authorization request elements are extracted from the authorization request, receive the universal product code list from the keyscan sipper component, dispatch a compliance authorization master component-directed authorization-compliance check request, wherein the authorization-compliance check request includes authorization request elements extracted via the parsing, wherein the authorization-compliance check request further includes the received universal product code list, and formulate a point of sale device-directed reply to the received authorization request, wherein the formulation takes into account a received reply to the authorization-compliance check request;

executing processor-implemented print sipper component instructions to:

receive printer-directed point of sale device-generated receipt data, extract, from the received receipt data, textual data, receive the universal product code list from the keyscan sipper component, dispatch an archivist component-directed omnibus record creation request, wherein the omnibus record creation request includes the received universal product code list, wherein the list further includes the textual receipt data, and receive, in reply to the omnibus record creation request, an archivist component dispatch providing an identifier corresponding to a generated omnibus record, wherein the generated omnibus record reflects the universal product code list, and wherein the generated omnibus record further reflects the textual receipt data.

40. The method of embodiment 39, further comprising executing processor-implemented print sipper component instructions to:

send an archivist component-directed coupon vending request, wherein the coupon vending request includes the omnibus record identifier provided via the archivist component identifier dispatch, receive, in reply to the coupon vending request, an archivist component dispatch providing coupon data, wherein the coupon data reflects one or more of the universal product code list or the textual receipt data, parse the coupon data, wherein one or more content aspects are extracted from the coupon data, formulate, based on the extracted coupon content aspects, coupon print content, and cause point of dale printer print of the coupon print content.

41. The method of embodiment 39, further comprising executing processor-implemented keyscan sipper component instructions to:

receive one or more point of sale device-directed keyboard-generated scancodes, access one or more of one or more scancode-character correlations or one or more scancode-quantity key token correlations, produce one or more of a character listing, wherein the character listing reflects one or more translations performed using the received scancodes and the scancode-character correlations or a quantity key token listing, wherein the token listing reflects one or more translations performed using the received scancodes and the scan-code-quantity key token correlations, and produce one or more of a universal product code list reflecting point of sale keyboard-entered universal product codes wherein the production takes as input the character listing or a quantity key press-corresponding quantity designation list wherein the production takes as input one or more of the character listing or the token listing.

42. A processor-implemented method, the method comprising:

executing processor-implemented compliance authorization master component instructions to:

receive compliance authorization assistant component dispatch of an authorization-compliance check request wherein the authorization-compliance check request includes one or more elements extracted from a point of sale device-generated authorization request, wherein the authorization-compliance check request further includes a universal product code list reflecting one or more of point of sale scanner-scanned universal product codes or point of sale keyboard-entered universal product codes, determine, with respect to each of one or more universal product codes of the universal product code list, a classification, wherein the classification determination involves accessing a classification store, determine, with respect to a payment card number of the extracted authorization request elements, one or more restrictions, wherein the restriction determination involves accessing a restriction store, compare one or more of the determined universal product code classifications and one or more of the determined payment card number restrictions, make, based on the comparison, a determination regarding classification check-based decline, and dispatch a compliance authorization assistant component-directed code indication, wherein the code indication reflects the made determination regarding classification check-based decline.

43. The method of embodiment 42, further comprising executing processor-implemented archivist component instructions to:

receive print sipper component dispatch of an omnibus record creation request, wherein the omnibus record creation request includes the universal product code list, wherein the omnibus record creation request further includes textual receipt data extracted from point of sale printer-directed receipt print data, generate an omnibus record identifier, apply tagging with respect to the received textual receipt data, wherein the receipt data tagging involves accessing a receipt data tagging rules store, apply tagging with respect to the received universal product code list, wherein the universal product code list tagging involves accessing a universal product code list tagging rules store, create an omnibus record, wherein the omnibus record includes the tagged textual receipt data, wherein the omnibus record includes the tagged universal product code list, and wherein the omnibus record includes the generated omnibus record identifier, add the created omnibus record to a store, and dispatch a print sipper component-directed indication of the generated omnibus record identifier.

44. The method of embodiment 43, further comprising executing processor-implemented archivist component instructions to:

receive print sipper component dispatch of a coupon vending request, wherein the coupon vending request includes the generated omnibus record identifier, fetch, from an omnibus store, an omnibus record corresponding to the omnibus record identifier, perform one or more coupon eligibility checks, wherein each said coupon eligibility check applies a coupon qualifier record to one or more of textual receipt data of the fetched omnibus record or universal product codes of the fetched omnibus record, wherein the coupon qualifier records are retrieved from a store, and send a print sipper component-directed dispatch providing coupon data, wherein the coupon data corresponds to one or more of said coupon qualifier records for which coupon eligibility check was met.

45. The method of embodiment 42, further comprising executing processor-implemented archivist component instructions to:

receive dispatch of a universal product code for stock keeping unit request, wherein said request includes a stock keeping unit indication, fetch, from an omnibus store, one or more omnibus records which set forth the indicated stock keeping unit, send a tupleization request, wherein the tupleization request includes one or more stock keeping units drawn from the fetched omnibus records and one or more universal product codes drawn from the fetched omnibus records, receive, in reply to the tupleization request, one or more tuples, send a bucketization request, wherein the bucketization request includes the received tuples, receive, in reply to the bucketization request, one or more buckets, apply filtering to the received buckets, wherein the filtering removes received buckets which do not correspond to the stock keeping unit included in the universal product code for stock keeping unit request, perform a highest value determination with respect to values set forth by buckets which remain after said filtering, and dispatch, in reply to the universal product code for stock keeping unit request, a universal product code indication, wherein the universal product code indication corresponds to the highest value determination.

46. The method of embodiment 42, further comprising executing processor-implemented archivist component instructions to:
receive dispatch of a correlations request,
select a tuple n-number, wherein the tuple n-number selection is based on one or more of one or more provided directives or automatic selection,
perform field selection, wherein selected field quantity matches the selected tuple n-number, and wherein identities of the selected fields are based on one or more of one or more provided directives or automatic selection,
send a bucketization request, wherein the bucketization request includes one or more tuples loaded with respect to said selected fields,
receive, in reply to the bucketization request, one or more buckets, and
dispatch, in reply to the correlations request, the one or more buckets.

47. The method of embodiment 46, wherein the correlations request includes one or more of a floor indication or a ceiling indication, and wherein the buckets dispatched in reply to the correlations request satisfy said indications included in the correlations request.

48. A processor-implemented method, the method comprising:
executing processor-implemented settings for current commerce location concierge component instructions to:
receive a user request that user device point of sale capabilities be configured with respect to a user device-situated commerce location,
send a location conductor component-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
dispatch a settings vendor concierge component-directed point of sale settings request, wherein the settings request includes the received locator data, and
receive, in reply to the point of sale settings request, user device point of sale capability configuration settings,
executing processor-implemented point of sale transactor component instructions to:
receive a user request that the user device point of sale capabilities be employed to make a payment at the user device-situated commerce location,
access the received user device point of sale capability configuration settings, and
dispatch an authorization request, wherein the authorization request conveys the payment, wherein the authorization request is payment gateway-directed in agreement with a payment gateway specification of the user device point of sale capability configuration settings, and wherein the authorization request includes one or more of a merchant identifier specified by the user device point of sale capability configuration settings or a terminal identifier specified by the user device point of sale capability configuration settings.

49. The method of embodiment 48, further comprising executing processor-implemented location component instructions to:
receive, from the settings for current commerce location concierge component, the locate for current commerce location request,
effect one or more of receipt of the beacon data, ascertaining of the geographical coordinate data, capture of the panorama images, determining of the quick response data, or receipt of the user-penned description, and
send a settings for current commerce location concierge-directed dispatch providing said locator data received by the settings for current commerce location concierge.

50. The method of embodiment 48, further comprising executing processor-implemented point of sale transactor component instructions to:
receive, in reply to the authorization request, payment gateway dispatch of an authorization response,
parse the authorization response, wherein one or more of an authorization code or a response code are extracted from the authorization response, and
perform one or more of:
displaying said one or more of the authorization code or the response code on a user device interface,
generating one or more of a quick response code or a barcode, wherein said generated one or more of the quick response code or the barcode conveys said one or more of the authorization code or the response code, or
sending said one or more of the authorization code or the response code to a storage location.

51. The method of embodiment 50, wherein said one or more of the authorization code or the response code is displayed on a infrastructure point of sale device of the user device-situated commerce location.

52. The method of embodiment 48, further comprising executing processor-implemented point of sale transactor component instructions to receive one or more of user selection of a payment card to be employed in making the payment, or user selection of an amount to be disbursed in making the payment.

53. The method of embodiment 48, further comprising executing processor-implemented point of sale transactor component instructions to:
dispatch a compliance authorization master component-directed compliance check request, wherein the compliance check request includes one or more universal product codes,
receive a compliance authorization master component-dispatched reply to the compliance check request, and
perform one or more operations in view of the content of said compliance check reply.

54. The method of embodiment 53, wherein the user device receives the universal product codes via one or more of a quick response code conveying the universal product codes, or user device-performed universal product code reading with respect to one or more products.

55. A processor-implemented method, the method comprising:
receiving, at a limited-capability point of sale apparatus, one or more alteration indications, wherein each said alteration indication provides instruction for performing a specified alteration to a specified portion of point of sale software, wherein the limited-capability point of sale apparatus possesses a complete-overwrite-only software memory, and wherein the receipt of the alteration indications is over a data link which is one or more of limited bandwidth or high cost;
copying by the limited-capability point of sale apparatus, into random access memory of the limited-capability point of sale apparatus, point of sale software held in said software memory of the limited-capability point of sale apparatus;

altering, by the limited-capability point of sale apparatus, in accordance with the alteration indications, said random access memory-held copy of the point of sale software; and overwriting, by the limited-capability point of sale apparatus, the software memory with said altered copy of the point of sale software.

56. The method of embodiment 55, further comprising:

receiving, at the limited-capability point of sale apparatus over the data link, a checksum hash;

calculating, by the limited-capability point of sale apparatus, a checksum hash of said altered copy of the point of sale software; and comparing, by the limited-capability point of sale apparatus, the received checksum hash with the calculated checksum hash.

57. The method of embodiment 55, wherein one or more of:

said limited-capability point of sale apparatus is a card machine, said data link is a cellular link, or said software memory is flash memory.

58. A processor-readable non-transient medium storing processor-executable components, the components comprising:

a component collection in the medium, including:

a keyscan sipper component, a compliance authorization assistant component, and a print sipper component;

wherein the component collection, stored in the medium, includes processor-issuable keyscan sipper component instructions to:

receive one or more point of sale device-directed barcode scanner-generated scancodes, access one or more scancode-character correlations, produce a character listing, wherein the character listing reflects one or more translations performed using the received scancodes and the scancode correlations, and produce a universal product code list, wherein the production takes as input the character listing;

wherein the component collection, stored in the medium, includes processor-issuable compliance authorization assistant component instructions to:

receive a payment gateway-formatted point of sale device-generated card authorization request, parse the payment gateway-formatted authorization request, wherein one or more authorization request elements are extracted from the authorization request, receive the universal product code list from the keyscan sipper component, dispatch a compliance authorization master component-directed authorization-compliance check request, wherein the authorization-compliance check request includes authorization request elements extracted via the parsing, wherein the authorization-compliance check request further includes the received universal product code list, and formulate a point of sale device-directed reply to the received authorization request, wherein the formulation takes into account a received reply to the authorization-compliance check request;

wherein the component collection, stored in the medium, includes processor-issuable print sipper component instructions to:

receive printer-directed point of sale device-generated receipt data, extract, from the received receipt data, textual data, receive the universal product code list from the keyscan sipper component, dispatch an archivist component-directed omnibus record creation request, wherein the omnibus record creation request includes the received universal product code list, wherein the list further includes the textual receipt data, and receive, in reply to the omnibus record creation request, an archivist component dispatch providing an identifier corresponding to a generated omnibus record, wherein the generated omnibus record reflects the universal product code list, and wherein the generated omnibus record further reflects the textual receipt data.

59. The processor-readable non-transient medium of embodiment 58, wherein the component collection, stored in the medium, further includes processor-issuable print sipper component instructions to:

send an archivist component-directed coupon vending request, wherein the coupon vending request includes the omnibus record identifier provided via the archivist component identifier dispatch, receive, in reply to the coupon vending request, an archivist component dispatch providing coupon data, wherein the coupon data reflects one or more of the universal product code list or the textual receipt data, parse the coupon data, wherein one or more content aspects are extracted from the coupon data, formulate, based on the extracted coupon content aspects, coupon print content, and cause point of dale printer print of the coupon print content.

60. The processor-readable non-transient medium of embodiment 58, wherein the component collection, stored in the medium, further includes processor-issuable keyscan sipper component instructions to:

receive one or more point of sale device-directed keyboard-generated scancodes, access one or more of one or more scancode-character correlations or one or more scancode-quantity key token correlations, produce one or more of a character listing, wherein the character listing reflects one or more translations performed using the received scancodes and the scancode-character correlations or a quantity key token listing, wherein the token listing reflects one or more translations performed using the received scancodes and the scancode-quantity key token correlations, and produce one or more of a universal product code list reflecting point of sale keyboard-entered universal product codes wherein the production takes as input the character listing or a quantity key press-corresponding quantity designation list wherein the production takes as input one or more of the character listing or the token listing.

61. A processor-readable non-transient medium storing processor-executable components, the components comprising:

a component collection in the medium, including:

a compliance authorization master component;

wherein the component collection, stored in the medium, includes processor-issuable compliance authorization master component instructions to:

receive compliance authorization assistant component dispatch of an authorization-compliance check request wherein the authorization-compliance check request includes one or more elements extracted from a point of sale device-generated authorization request, wherein the authorization-compliance check request further includes a universal product code list reflecting one or more of point of sale scanner-scanned universal product codes or point of sale keyboard-entered universal product codes, determine, with respect to each of one or more universal product codes of the universal product code list, a classification, wherein the classification determination involves accessing a classification store, determine, with respect to a payment card number of the extracted authorization request elements, one or more restrictions, wherein the restriction determination involves accessing a restriction store, compare one or more of the determined universal product code classifications and one or more of the determined payment card number restrictions, make, based on the comparison, a determination regarding classification check-based decline, and dispatch a compliance authorization assistant component-directed code indication, wherein the code indication reflects the made determination regarding classification check-based decline.

62. The processor-readable non-transient medium of embodiment 61, wherein the component collection in the medium further includes an archivist component, and wherein the component collection, stored in the medium, includes processor-issuable archivist component instructions to:

receive print sipper component dispatch of an omnibus record creation request, wherein the omnibus record creation request includes the universal product code list, wherein the omnibus record creation request further includes textual receipt data extracted from point of sale printer-directed receipt print data, generate an omnibus record identifier, apply tagging with respect to the received textual receipt data, wherein the receipt data tagging involves accessing a receipt data tagging rules store, apply tagging with respect to the received universal product code list, wherein the universal product code list tagging involves accessing a universal product code list tagging rules store, create an omnibus record, wherein the omnibus record includes the tagged textual receipt data, wherein the omnibus record includes the tagged universal product code list, and wherein the omnibus record includes the generated omnibus record identifier, add the created omnibus record to a store, and dispatch a print sipper component-directed indication of the generated omnibus record identifier.

63. The processor-readable non-transient medium of embodiment 62, wherein the component collection, stored in the medium, further includes processor-issuable archivist component instructions to:

receive print sipper component dispatch of a coupon vending request, wherein the coupon vending request includes the generated omnibus record identifier, fetch, from an omnibus store, an omnibus record corresponding to the omnibus record identifier, perform one or more coupon eligibility checks, wherein each said coupon eligibility check applies a coupon qualifier record to one or more of textual receipt data of the fetched omnibus record or universal product codes of the fetched omnibus record, wherein the coupon qualifier records are retrieved from a store, and send a print sipper component-directed dispatch providing coupon data, wherein the coupon data corresponds to one or more of said coupon qualifier records for which coupon eligibility check was met.

64. The processor-readable non-transient medium of embodiment 61, wherein the component collection in the medium further includes an archivist component, and wherein the component collection, stored in the medium, includes processor-issuable archivist component instructions to:

receive dispatch of a universal product code for stock keeping unit request, wherein said request includes a stock keeping unit indication, fetch, from an omnibus store, one or more omnibus records which set forth the indicated stock keeping unit, send a tupleization request, wherein the tupleization request includes one or more stock keeping units drawn from the fetched omnibus records and one or more universal product codes drawn from the fetched omnibus records, receive, in reply to the tupleization request, one or more tuples, send a bucketization request, wherein the bucketization request includes the received tuples, receive, in reply to the bucketization request, one or more buckets, apply filtering to the received buckets, wherein the filtering removes received buckets which do not correspond to the stock keeping unit included in the universal product code for stock keeping unit request, perform a highest value determination with respect to values set forth by buckets which remain after said filtering, and dispatch, in reply to the universal product code for stock keeping unit request, a universal product code indication, wherein the universal product code indication corresponds to the highest value determination.

65. The processor-readable non-transient medium of embodiment 61, wherein the component collection in the medium further includes an archivist component, and wherein the component collection, stored in the medium, includes processor-issuable archivist component instructions to:

receive dispatch of a correlations request, select a tuple n-number, wherein the tuple n-number selection is based on one or more of one or more provided directives or automatic selection, perform field selection, wherein selected field quantity matches the selected tuple n-number, and wherein identities of the selected fields are based on one or more of one or more provided directives or automatic selection, send a bucketization request, wherein the bucketization request includes one or more tuples loaded with respect to said selected fields, receive, in reply to the bucketization request, one or more buckets, and dispatch, in reply to the correlations request, the one or more buckets.

66. The processor-readable non-transient medium of embodiment 65, wherein the correlations request includes one or more of a floor indication or a ceiling indication, and wherein the buckets dispatched in reply to the correlations request satisfy said indications included in the correlations request.

67. A processor-readable non-transient medium storing processor-executable components, the components comprising:
a component collection in the medium, including:
a settings for current commerce location concierge component, and
a point of sale transactor component;
wherein the component collection, stored in the medium, includes processor-issuable settings for current commerce location concierge component instructions to:
receive a user request that user device point of sale capabilities be configured with respect to a user device-situated commerce location,
send a location conductor component-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
dispatch a settings vendor concierge component-directed point of sale settings request, wherein the settings request includes the received locator data, and
receive, in reply to the point of sale settings request, user device point of sale capability configuration settings,
wherein the component collection, stored in the medium, includes processor-issuable point of sale transactor component instructions to:
receive a user request that the user device point of sale capabilities be employed to make a payment at the user device-situated commerce location,
access the received user device point of sale capability configuration settings, and
dispatch an authorization request, wherein the authorization request conveys the payment, wherein the authorization request is payment gateway-directed in agreement with a payment gateway specification of the user device point of sale capability configuration settings, and wherein the authorization request includes one or more of a merchant identifier specified by the user device point of sale capability configuration settings or a terminal identifier specified by the user device point of sale capability configuration settings.

68. The processor-readable non-transient medium of embodiment 67, wherein the component collection in the medium further includes a location conductor component, and wherein the component collection, stored in the medium, includes processor-issuable location conductor component instructions to:
receive, from the settings for current commerce location concierge component, the locate for current commerce location request,
effect one or more of receipt of the beacon data, ascertaining of the geographical coordinate data, capture of the panorama images, determining of the quick response data, or receipt of the user-penned description, and
send a settings for current commerce location concierge-directed dispatch providing said locator data received by the settings for current commerce location concierge.

69. The processor-readable non-transient medium of embodiment 67, wherein the component collection, stored in the medium, further includes processor-issuable point of sale transactor component instructions to:
receive, in reply to the authorization request, payment gateway dispatch of an authorization response,
parse the authorization response, wherein one or more of an authorization code or a response code are extracted from the authorization response, and
performing one or more of:
displaying said one or more of the authorization code or the response code on a user device interface,
generating one or more of a quick response code or a barcode, wherein said generated one or more of the quick response code or the barcode conveys said one or more of the authorization code or the response code, or
sending said one or more of the authorization code or the response code to a storage location.

70. The processor-readable non-transient medium of embodiment 69, wherein said one or more of the authorization code or the response code is displayed on a infrastructure point of sale device of the user device-situated commerce location.

71. The processor-readable non-transient medium of embodiment 67, wherein the component collection, stored in the medium, further includes processor-issuable point of sale transactor component instructions to receive one or more of user selection of a payment card to be employed in making the payment, or user selection of an amount to be disbursed in making the payment.

72. The processor-readable non-transient medium of embodiment 67, wherein the component collection, stored in the medium, further includes processor-issuable point of sale transactor component instructions to:
dispatch a compliance authorization master component-directed compliance check request, wherein the compliance check request includes one or more universal product codes,
receive a compliance authorization master component-dispatched reply to the compliance check request, and
perform one or more operations in view of the content of said compliance check reply.

73. The processor-readable non-transient medium of embodiment 72, wherein the user device receives the universal product codes via one or more of a quick response code conveying the universal product codes, or user device-performed universal product code reading with respect to one or more products.

74. A processor-readable non-transient medium storing processor-issuable instructions to:
receive, at a limited-capability point of sale apparatus, one or more alteration indications, wherein each said alteration indication provides instruction for performing a specified alteration to a specified portion of point of sale software, wherein the limited-capability point of sale apparatus possesses a complete-overwrite-only software memory, and wherein the receipt of the alteration indications is over a data link which is one or more of limited bandwidth or high cost;
copy by the limited-capability point of sale apparatus, into random access memory of the limited-capability point of sale apparatus, point of sale software held in said software memory of the limited-capability point of sale apparatus;
alter, by the limited-capability point of sale apparatus, in accordance with the alteration indications, said random access memory-held copy of the point of sale software; and overwrite, by the limited-capability point of sale apparatus, the software memory with said altered copy of the point of sale software.

75. The processor-readable non-transient medium of embodiment 74, wherein the processor-readable non-transient medium further stores processor-issuable instructions to:

receive, at the limited-capability point of sale apparatus over the data link, a checksum hash;

calculate, by the limited-capability point of sale apparatus, a checksum hash of said altered copy of the point of sale software; and compare, by the limited-capability point of sale apparatus, the received checksum hash with the calculated checksum hash.

76. The processor-readable non-transient medium of embodiment 74, wherein one or more of:

said limited-capability point of sale apparatus is a card machine, said data link is a cellular link, or said software memory is flash memory.

In order to address various issues and advance the art, the entirety of this application for Vehicle Appearance Protection and Enhancement Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a POSAMS individual and/or enterprise user, database configuration and/or relational model, data type, data transmission and/or network framework, syntax structure, and/or the like, various embodiments of the POSAMS, may be implemented that enable a great deal of flexibility and customization. While various embodiments and discussions of the POSAMS have included Electronic Communications, however, it is to be understood that the embodiments described herein may be readily configured and/or customized for a wide variety of other applications and/or implementations.

What is claimed is:

1. An apparatus, comprising:
a memory;
a component collection in the memory, including:
a settings for current commerce location concierge component, and
a point of sale transactor component;
a processor disposed in communication with the memory, and configured to issue a plurality of processing instructions from the component collection stored in the memory,
wherein the processor issues instructions from the settings for current commerce location concierge component, stored in the memory, to:
receive a user request that user device point of sale capabilities be configured with respect to a user device-situated commerce location,
send a location conductor component-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location, dispatch a settings vendor concierge component-directed point of sale settings request, wherein the settings request includes the received locator data, and receive, in reply to the point of sale settings request, user device point of sale capability configuration settings, wherein the user device point of sale capability configuration settings includes a universally unique identifier, a merchant identifier, and a terminal identifier, wherein the processor issues instructions from the point of sale transactor component, stored in the memory, to:

receive a user request that the user device point of sale capabilities be employed to make a payment at the user device-situated commerce location, access the received user device point of sale capability configuration settings, determine a datastructure configuration for an authorization request to an infrastructure point of sale device of the user device-situated commerce location; and dispatch the authorization request,
  wherein the authorization request conveys the payment,
  wherein the authorization request is payment gateway-directed in agreement with a payment gateway specification of the user device point of sale capability configuration settings, wherein the authorization request is configured to be processed by an unmodified point of sale terminal with the received merchant identifier and terminal identifier, and
  wherein the authorization request includes one or more of a merchant identifier specified by the user device point of sale capability configuration settings or a terminal identifier specified by the user device point of sale capability configuration settings.

2. The apparatus of claim 1, the component collection in memory further including a location conductor component, wherein the processor issues instructions from the location conductor component to:

receive, from the settings for current commerce location concierge component, the locate for current commerce location request, effect one or more of receipt of the beacon data, ascertaining of the geographical coordinate data, capture of the panorama images, determining of the quick response data, or receipt of the user-penned description, and send a settings for current commerce location concierge-directed dispatch providing said locator data received by the settings for current commerce location concierge.

3. The apparatus of claim 1, wherein the processor issues further instructions from the point of sale transactor component to:

receive, in reply to the authorization request, payment gateway dispatch of an authorization response, parse the authorization response, wherein one or more of an authorization code or a response code are extracted from the authorization response, and performing one or more of:
  displaying said one or more of the authorization code or the response code on a user device interface,
  generating one or more of a quick response code or a barcode, wherein said generated one or more of the quick response code or the barcode conveys said one or more of the authorization code or the response code, or
  sending said one or more of the authorization code or the response code to a storage location.

4. The apparatus of claim 3, wherein said one or more of the authorization code or the response code is displayed on the infrastructure point of sale device of the user device-situated commerce location.

5. The apparatus of claim 1, wherein the processor issues further instructions from the point of sale transactor component to receive one or more of user selection of a payment card to be employed in making the payment, or user selection of an amount to be disbursed in making the payment.

6. The apparatus of claim 1, wherein the processor issues further instructions from the point of sale transactor component to:

dispatch a compliance authorization master component-directed compliance check request, wherein the compliance check request includes one or more universal product codes, receive a compliance authorization master component-dispatched reply to the compliance check request, and perform one or more operations in view of the content of said compliance check reply.

7. The apparatus of claim 6, wherein the user device receives the universal product codes via one or more of a quick response code conveying the universal product codes, or user device-performed universal product code reading with respect to one or more products.

8. A processor-implemented system, comprising:

a settings for current commerce location concierge means to:

receive a user request that user device point of sale capabilities be configured with respect to a user device-situated commerce location, send a location conductor means-directed locate for current commerce location request, receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location, dispatch a settings vendor concierge means-directed point of sale settings request, wherein the settings request includes the received locator data, and receive, in reply to the point of sale settings request, user device point of sale capability configuration settings, wherein the user device point of sale capability configuration settings includes a universally unique identifier, a merchant identifier, and a terminal identifier, a point of sale transactor means to:

receive a user request that the user device point of sale capabilities be employed to make a payment at the user device-situated commerce location, access the received user device point of sale capability configuration settings, determine a datastructure configuration for an authorization request to an infrastructure point of sale device of the user device-situated commerce location; and dispatch the authorization request,
  wherein the authorization request conveys the payment,
  wherein the authorization request is payment gateway-directed in agreement with a payment gateway specification of the user device point of sale capability configuration settings, wherein the authorization request is configured to be processed by an unmodified point of sale terminal with the received merchant identifier and terminal identifier, and
  wherein the authorization request includes one or more of a merchant identifier specified by the user device point of sale capability configuration settings or a terminal identifier specified by the user device point of sale capability configuration settings.

9. The system of claim 8, further comprising a location conductor means to:
  receive, from the settings for current commerce location concierge means, the locate for current commerce location request,
  effect one or more of receipt of the beacon data, ascertaining of the geographical coordinate data, capture of the panorama images, determining of the quick response data, or receipt of the user-penned description, and
  send a settings for current commerce location concierge-directed dispatch providing said locator data received by the settings for current commerce location concierge.

10. The system of claim 8, the point of sale transactor means further to:
  receive, in reply to the authorization request, payment gateway dispatch of an authorization response,
  parse the authorization response, wherein one or more of an authorization code or a response code are extracted from the authorization response, and
  perform one or more of:
    displaying said one or more of the authorization code or the response code on a user device interface,
    generating one or more of a quick response code or a barcode, wherein said generated one or more of the quick response code or the barcode conveys said one or more of the authorization code or the response code, or
    sending said one or more of the authorization code or the response code to a storage location.

11. The system of claim 10, wherein said one or more of the authorization code or the response code is displayed on the infrastructure point of sale device of the user device-situated commerce location.

12. The system of claim 8, the point of sale transactor means further to receive one or more of user selection of a payment card to be employed in making the payment, or user selection of an amount to be disbursed in making the payment.

13. The system of claim 8, the point of sale transactor means further to:
  dispatch a compliance authorization master means-directed compliance check request, wherein the compliance check request includes one or more universal product codes,
  receive a compliance authorization master means-dispatched reply to the compliance check request, and perform one or more operations in view of the content of said compliance check reply.

14. The system of claim 13, wherein the user device receives the universal product codes via one or more of a quick response code conveying the universal product codes, or user device-performed universal product code reading with respect to one or more products.

15. A processor-implemented method, the method comprising:
  executing processor-implemented settings for current commerce location concierge component instructions to:
  receive a user request that user device point of sale capabilities be configured with respect to a user device-situated commerce location,
  send a location conductor component-directed locate for current commerce location request,
  receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
  dispatch a settings vendor concierge component-directed point of sale settings request, wherein the settings request includes the received locator data, and
  receive, in reply to the point of sale settings request, user device point of sale capability configuration settings, wherein the user device point of sale capability configuration settings includes a universally unique identifier, a merchant identifier, and a terminal identifier,
  executing processor-implemented point of sale transactor component instructions to:
  receive a user request that the user device point of sale capabilities be employed to make a payment at the user device-situated commerce location,
  access the received user device point of sale capability configuration settings,
  determine a datastructure configuration for an authorization request to an infrastructure point of sale device of the user device-situated commerce location; and
  dispatch the authorization request,
    wherein the authorization request conveys the payment,
    wherein the authorization request is payment gateway-directed in agreement with a payment gateway specification of the user device point of sale capability configuration settings, wherein the authorization request is configured to be processed by an unmodified point of sale terminal with the received merchant identifier and terminal identifier, and
    wherein the authorization request includes one or more of a merchant identifier specified by the user device point of sale capability configuration settings or a terminal identifier specified by the user device point of sale capability configuration settings.

16. The method of claim 15, further comprising executing processor-implemented location component instructions to:
  receive, from the settings for current commerce location concierge component, the locate for current commerce location request,
  effect one or more of receipt of the beacon data, ascertaining of the geographical coordinate data, capture of the panorama images, determining of the quick response data, or receipt of the user-penned description, and send settings for current commerce location concierge-directed dispatch providing said locator data received by the settings for current commerce location concierge.

17. The method of claim 15, further comprising executing processor-implemented point of sale transactor component instructions to:
receive, in reply to the authorization request, payment gateway dispatch of an authorization response,
parse the authorization response, wherein one or more of an authorization code or a response code are extracted from the authorization response, and
perform one or more of:
displaying said one or more of the authorization code or the response code on a user device interface,
generating one or more of a quick response code or a barcode, wherein said generated one or more of the quick response code or the barcode conveys said one or more of the authorization code or the response code, or
sending said one or more of the authorization code or the response code to a storage location.

18. The method of claim 17, wherein said one or more of the authorization code or the response code is displayed on the infrastructure point of sale device of the user device-situated commerce location.

19. The method of claim 15, further comprising executing processor-implemented point of sale transactor component instructions to receive one or more of user selection of a payment card to be employed in making the payment, or user selection of an amount to be disbursed in making the payment.

20. The method of claim 15, further comprising executing processor-implemented point of sale transactor component instructions to:
dispatch a compliance authorization master component-directed compliance check request, wherein the compliance check request includes one or more universal product codes,
receive a compliance authorization master component-dispatched reply to the compliance check request, and
perform one or more operations in view of the content of said compliance check reply.

21. The method of claim 20, wherein the user device receives the universal product codes via one or more of a quick response code conveying the universal product codes, or user device-performed universal product code reading with respect to one or more products.

22. A processor-readable non-transient medium storing processor-executable components, the components comprising:
a component collection in the medium, including:
a settings for current commerce location concierge component, and
a point of sale transactor component;
wherein the component collection, stored in the medium, includes processor-issuable settings for current commerce location concierge component instructions to:
receive a user request that user device point of sale capabilities be configured with respect to a user device-situated commerce location,
send a location conductor component-directed locate for current commerce location request,
receive, in reply to the locate for current commerce location request, locator data, wherein the locator data comprises beacon data received at the user device-situated commerce location, geographical coordinate data corresponding to the user device-situated commerce location, captured panorama images depicting the user device-situated commerce location, quick response code data captured with respect to the user device-situated commerce location, or user-penned description corresponding to the user device-situated commerce location,
dispatch a settings vendor concierge component-directed point of sale settings request, wherein the settings request includes the received locator data, and
receive, in reply to the point of sale settings request, user device point of sale capability configuration settings, wherein the user device point of sale capability configuration settings includes a universally unique identifier, a merchant identifier, and a terminal identifier,
wherein the component collection, stored in the medium, includes processor-issuable point of sale transactor component instructions to:
receive a user request that the user device point of sale capabilities be employed to make a payment at the user device-situated commerce location,
access the received user device point of sale capability configuration settings,
determine a datastructure configuration for an authorization request to an infrastructure point of sale device of the user device-situated commerce location; and
dispatch the authorization request,
wherein the authorization request conveys the payment,
wherein the authorization request is payment gateway-directed in agreement with a payment gateway specification of the user device point of sale capability configuration settings, wherein the authorization request is configured to be processed by an unmodified point of sale terminal with the received merchant identifier and terminal identifier, and
wherein the authorization request includes one or more of a merchant identifier specified by the user device point of sale capability configuration settings or a terminal identifier specified by the user device point of sale capability configuration settings.

23. The processor-readable non-transient medium of embodiment 34, wherein the component collection in the medium further includes a location conductor component, and wherein the component collection, stored in the medium, includes processor-issuable location conductor component instructions to:
receive, from the settings for current commerce location concierge component, the locate for current commerce location request,
effect one or more of receipt of the beacon data, ascertaining of the geographical coordinate data, capture of the panorama images, determining of the quick response data, or receipt of the user-penned description, and
send settings for current commerce location concierge-directed dispatch providing said locator data received by the settings for current commerce location concierge.

24. The processor-readable non-transient medium of embodiment 34, wherein the component collection, stored in the medium, further includes processor-issuable point of sale transactor component instructions to:
receive, in reply to the authorization request, payment gateway dispatch of an authorization response,
parse the authorization response, wherein one or more of an authorization code or a response code are extracted from the authorization response, and performing one or more of:
  displaying said one or more of the authorization code or the response code on a user device interface,
  generating one or more of a quick response code or a barcode, wherein said generated one or more of the quick response code or the barcode conveys said one or more of the authorization code or the response code, or
  sending said one or more of the authorization code or the response code to a storage location.

25. The processor-readable non-transient medium of embodiment 36, wherein said one or more of the authorization code or the response code is displayed on the infrastructure point of sale device of the user device-situated commerce location.

26. The processor-readable non-transient medium of embodiment 34, wherein the component collection, stored in the medium, further includes processor-issuable point of sale transactor component instructions to receive one or more of user selection of a payment card to be employed in making the payment, or user selection of an amount to be disbursed in making the payment.

27. The processor-readable non-transient medium of embodiment 34, wherein the component collection, stored in the medium, further includes processor-issuable point of sale transactor component instructions to:
  dispatch a compliance authorization master component-directed compliance check request, wherein the compliance check request includes one or more universal product codes,
  receive a compliance authorization master component-dispatched reply to the compliance check request, and
  perform one or more operations in view of the content of said compliance check reply.

28. The processor-readable non-transient medium of embodiment 39, wherein the user device receives the universal product codes via one or more of a quick response code conveying the universal product codes, or user device-performed universal product code reading with respect to one or more products.

* * * * *